US011775802B2

(12) United States Patent
Ovsiannikov et al.

(10) Patent No.: US 11,775,802 B2
(45) Date of Patent: Oct. 3, 2023

(54) NEURAL PROCESSOR

(71) Applicant: Samsung Electronics Co., Ltd., Suwon-si (KR)

(72) Inventors: Ilia Ovsiannikov, Porter Ranch, CA (US); Ali Shafiee Ardestani, San Jose, CA (US); Joseph H. Hassoun, Los Gatos, CA (US); Lei Wang, Burlingame, CA (US); Sehwan Lee, Hwaseong-si (KR); JoonHo Song, Hwaseong-si (KR); Jun-Woo Jang, Hwaseong-si (KR); Yibing Michelle Wang, Pasadena, CA (US); Yuecheng Li, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 463 days.

(21) Appl. No.: 16/552,945

(22) Filed: Aug. 27, 2019

(65) Prior Publication Data

US 2020/0026980 A1    Jan. 23, 2020

Related U.S. Application Data

(63) Continuation of application No. 16/446,610, filed on Jun. 19, 2019.

(Continued)

(51) Int. Cl.
*G06N 3/04* (2006.01)
*G06F 17/16* (2006.01)
(Continued)

(52) U.S. Cl.
CPC ............. *G06N 3/04* (2013.01); *G06F 17/153* (2013.01); *G06F 17/16* (2013.01); *G06N 3/08* (2013.01); *G06T 9/002* (2013.01); *G06F 9/3001* (2013.01)

(58) Field of Classification Search
None
See application file for complete search history.

(56) References Cited

U.S. PATENT DOCUMENTS

| 5,285,403 A | 2/1994 | Quisquater et al. |
| 6,061,749 A | 5/2000 | Webb et al. |

(Continued)

FOREIGN PATENT DOCUMENTS

| JP | 2018-92561 A | 6/2018 |
| TW | 201706871 A | 2/2017 |

(Continued)

OTHER PUBLICATIONS

Ahmad et al., "FPGA-based Accelerators of Deep Learning Networks for Learning and Classification: A Review," Jan. 1, 2019, Date of publication 2018 00, 0000, date of current version 2018 00, 0000. Digital Object Identifier 10.1109/ACCESS.2018.2890150. DOI, arXiv:1901.00121v1[cs.NE], pp. 1-41.

(Continued)

*Primary Examiner* — Joni Hsu
(74) *Attorney, Agent, or Firm* — Lewis Roca Rothgerber Christie LLP

(57) ABSTRACT

A neural processor. In some embodiments, the processor includes a first tile, a second tile, a memory, and a bus. The bus may be connected to the memory, the first tile, and the second tile. The first tile may include: a first weight register, a second weight register, an activations buffer, a first multiplier, and a second multiplier. The activations buffer may be configured to include: a first queue connected to the first multiplier and a second queue connected to the second multiplier. The first queue may include a first register and a second register adjacent to the first register, the first register being an output register of the first queue. The first tile may be configured: in a first state: to multiply, in the first multiplier, a first weight by an activation from the output (Continued)

register of the first queue, and in a second state: to multiply, in the first multiplier, the first weight by an activation from the second register of the first queue.

20 Claims, 127 Drawing Sheets

Related U.S. Application Data

(60) Provisional application No. 62/689,008, filed on Jun. 22, 2018, provisional application No. 62/798,297, filed on Jan. 29, 2019, provisional application No. 62/841,590, filed on May 1, 2019, provisional application No. 62/841,606, filed on May 1, 2019.

(51) Int. Cl.
*G06F 17/15* (2006.01)
*G06N 3/08* (2023.01)
*G06T 9/00* (2006.01)
*G06F 9/30* (2018.01)

(56) References Cited

U.S. PATENT DOCUMENTS

| | | | |
|---|---|---|---|
| 9,418,458 | B2 | 8/2016 | Chertok et al. |
| 9,721,203 | B1 | 8/2017 | Young et al. |
| 9,836,691 | B1 | 12/2017 | Narayanaswami et al. |
| 9,904,874 | B2 | 2/2018 | Shoaib et al. |
| 10,438,117 | B1 | 10/2019 | Ross et al. |
| 10,521,488 | B1* | 12/2019 | Ross ............... G06F 9/5061 |
| 10,664,751 | B2 | 5/2020 | Henry et al. |
| 10,706,147 | B1 | 7/2020 | Pohlack et al. |
| 11,250,326 | B1 | 2/2022 | Ko et al. |
| 2016/0162782 | A1 | 6/2016 | Park |
| 2017/0011288 | A1 | 1/2017 | Brothers et al. |
| 2017/0103306 | A1* | 4/2017 | Henry ............... G06F 9/30101 |
| 2017/0103314 | A1 | 4/2017 | Ross |
| 2017/0124452 | A1 | 5/2017 | Tucker et al. |
| 2017/0316312 | A1 | 11/2017 | Goyal et al. |
| 2017/0357891 | A1 | 12/2017 | Judd et al. |
| 2018/0032859 | A1 | 2/2018 | Park et al. |
| 2018/0046894 | A1 | 2/2018 | Yao |
| 2018/0046906 | A1 | 2/2018 | Dally et al. |
| 2018/0046913 | A1 | 2/2018 | Yu et al. |
| 2018/0096226 | A1 | 4/2018 | Aliabadi et al. |
| 2018/0101743 | A1 | 4/2018 | Yang et al. |
| 2018/0129935 | A1 | 5/2018 | Kim et al. |
| 2018/0181857 | A1 | 6/2018 | Mathew et al. |
| 2018/0189642 | A1 | 7/2018 | Boesch et al. |
| 2018/0217962 | A1 | 8/2018 | Takahashi |
| 2018/0218518 | A1 | 8/2018 | Yan et al. |
| 2018/0253636 | A1 | 9/2018 | Lee et al. |
| 2018/0259970 | A1 | 9/2018 | Wang et al. |
| 2018/0285254 | A1 | 10/2018 | Baum et al. |
| 2018/0307495 | A1 | 10/2018 | Ould-Ahmed-Vall et al. |
| 2018/0307950 | A1 | 10/2018 | Nealis et al. |
| 2019/0042923 | A1 | 2/2019 | Janedula et al. |
| 2019/0065896 | A1 | 2/2019 | Lee et al. |
| 2019/0066257 | A1 | 2/2019 | Daga et al. |
| 2019/0079764 | A1 | 3/2019 | Diamond et al. |
| 2019/0114511 | A1 | 4/2019 | Gao et al. |
| 2019/0147327 | A1 | 5/2019 | Martin |
| 2019/0156201 | A1 | 5/2019 | Bichler et al. |
| 2019/0205095 | A1* | 7/2019 | Gupta ............... G11C 11/412 |
| 2019/0236049 | A1 | 8/2019 | Vantrease et al. |
| 2019/0317732 | A1 | 10/2019 | Xu et al. |
| 2019/0392287 | A1 | 12/2019 | Ovsiannikov et al. |
| 2020/0210517 | A1 | 7/2020 | Baum et al. |
| 2021/0011732 | A1 | 1/2021 | Botimer et al. |

FOREIGN PATENT DOCUMENTS

| | | |
|---|---|---|
| WO | 2016/186826 A1 | 11/2016 |
| WO | WO 2016/186801 A1 | 11/2016 |
| WO | WO 2017/142397 A1 | 8/2017 |
| WO | WO 2017/186830 A1 | 11/2017 |
| WO | 2019/213745 A1 | 11/2019 |

OTHER PUBLICATIONS

Aimar et al., "Nullhop: A Flexible Convolutional Neural Network Accerlerator Based on Sparse Representations of Feature Maps," Mar. 6, 2018, arXiv:1706.01406v2 [cs.CV], pp. 1-13.
Lascorz, A.D. et al., "Bit-Tactical: Exploiting Ineffectual Computations in Convolutional Neural Networks: Which, Why, and How", Cornell University, Computer Science, Neural and Evolutionary Computing, Mar. 9, 2018, pp. 1-14, arXiv:1803.03688v1.
Shaoli et al., "Cambricon: An Instruction Set Architecture for Neural Networks," 2016 ACM/IEEE 43rd Annual International Symposium on Computer Architecture, pp. 1-13.
Yu-Hsin et al., "Eyeriss v2: A Flexible Accelerator for Emerging Deep Neural Networks on Mobile Devices," May 20, 2019, arXiv:1807.07928v2 [cs.DC], pp. 1-21.
Mittal, Sparsh, "A survey of FPGA-based accelerators for convolutional neural networks," Neural Computing and Applications, 2020, pp. 1109-1139.
Sombatsiri, Salita, et al., "Parallelism-Flexible Convolution Core for Sparse Convolutional Neural Networks," SASIMI 2018 Proceedings, 2018, pp. 188-193.
Office Action for U.S. Appl. No. 16/847,504 dated May 10, 2022, 16 pages.
Jorge Albericio, Bit-Pramatic Deep Neural Network Computing, Oct. 2017, Micro-50, p. 385-387. (Year: 2017).
U.S. Office Action dated Jun. 2, 2022, issued in U.S. Appl. No. 16/552,619, 14 pages.
U.S. Office Action dated Jun. 6, 2022, issued in U.S. Appl. No. 16/446,610, 14 pages.
U.S. Office Action dated Jun. 14, 2022, issued in U.S. Appl. No. 16/552,850, 17 pages.
U.S. Office Action dated Jul. 7, 2022, issued in U.S. Appl. No. 16/900,819, 15 pages.
U.S. Final Office Action dated Oct. 12, 2022, issued in U.S. Appl. No. 16/900,819 (15 pages).
U.S. Notice of Allowance dated Oct. 13, 2022, issued in U.S. Appl. No. 16/552,619 (10 pages).
U.S. Notice of Allowance dated Oct. 14, 2022, issued in U.S. Appl. No. 16/552,850 (9 pages).
U.S. Ex Parte Quayle Action dated Oct. 17, 2022, issued in U.S. Appl. No. 16/847,504 (11 pages).
U.S. Final Office Action dated Nov. 28, 2022, issued in U.S. Appl. No. 16/446,610 (9 pages).
U.S. Office Action dated Oct. 14, 2022, issued in U.S. Appl. No. 16/840,172 (53 pages).
U.S. Advisory Action dated Jan. 3, 2023, issued in U.S. Appl. No. 16/900,819 (3 pages).
U.S. Notice of Allowance dated Feb. 13, 2023, issued in U.S. Appl. No. 16/446,610 (5 pages).
U.S. Notice of Allowance dated Feb. 23, 2023, issued in U.S. Appl. No. 16/552,619 (5 pages).
U.S. Office Action dated Feb. 28, 2023, issued in U.S. Appl. No. 16/900,819 (15 pages).
U.S. Notice of Allowance dated Mar. 2, 2023, issued in U.S. Appl. No. 16/552,850 (5 pages).
U.S. Notice of Allowance dated Apr. 13, 2023, issued in U.S. Appl. No. 16/840,172 (10 pages).
U.S. Final Office Action dated May 30, 2023, issued in U.S. Appl. No. 16/900,819 (15 pages).
Japanese Notice of Allowance dated Jul. 25, 2023, issued on corresponding Japanese Patent Application No. 2020-571552 (3 pages).

* cited by examiner

| Convolution Size | Zigzag Scan "Z" Value | | | |
|---|---|---|---|---|
| | 1 | 2 | 3 | 4 |
| 1 | 0 | 0 | 0 | 0 |
| 2 | 12 | 16 | 20 | 24 |
| 3 | 16 | 20 | 24 | 28 |
| 4 | 15 | 18 | 21 | 24 |

Cache register file size (bytes), per lane, per tile

FIG. 1Q

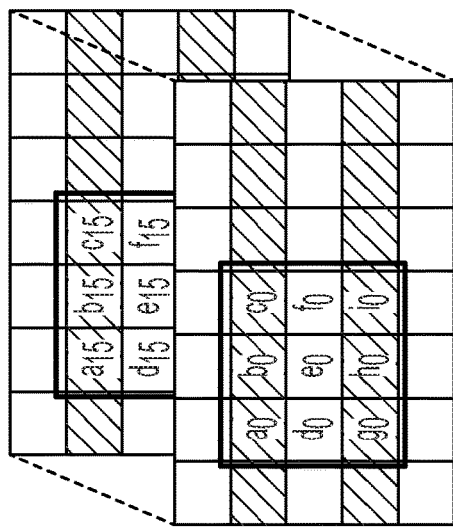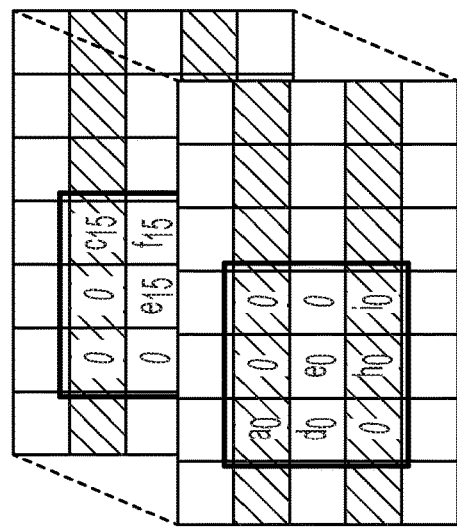

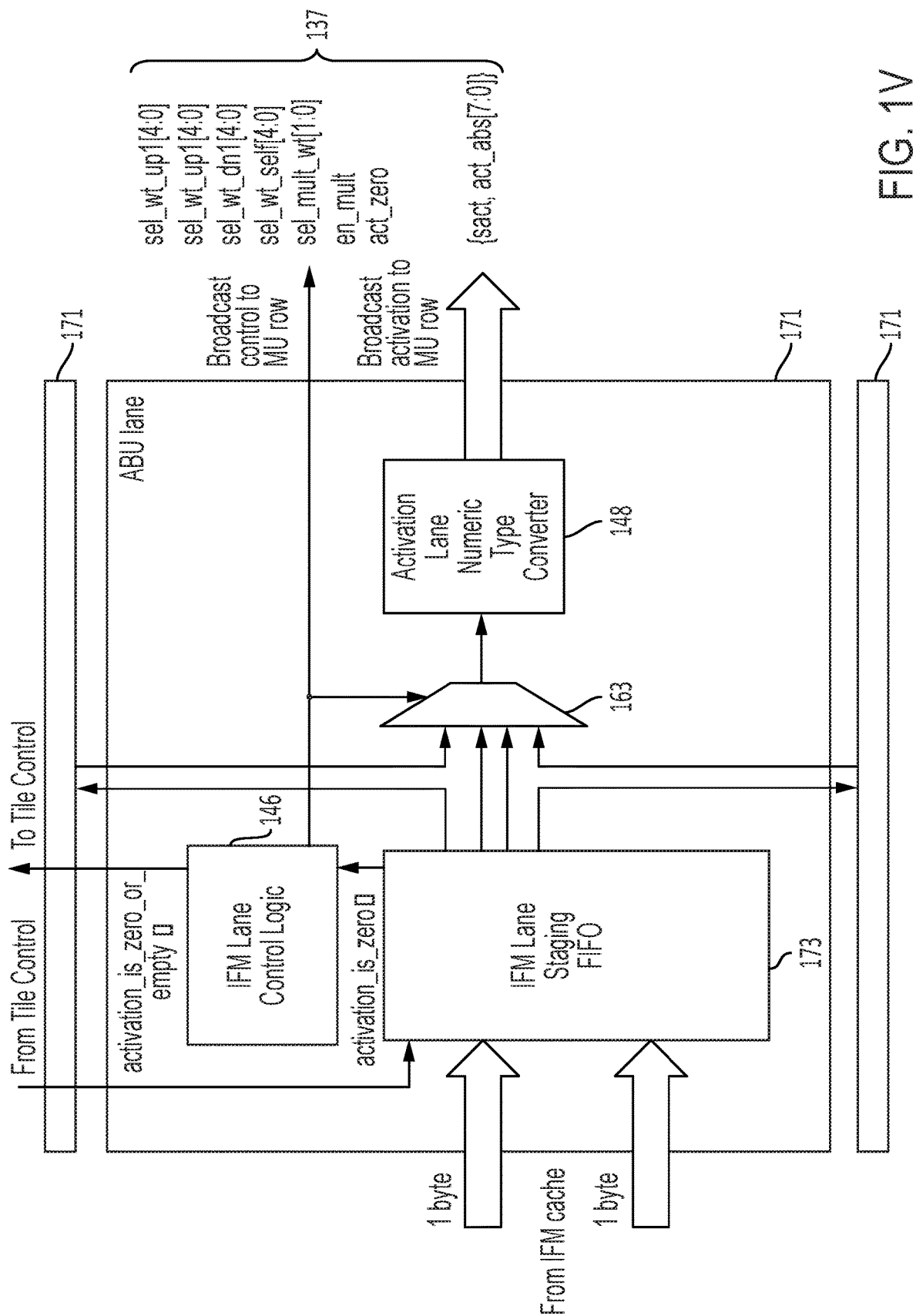

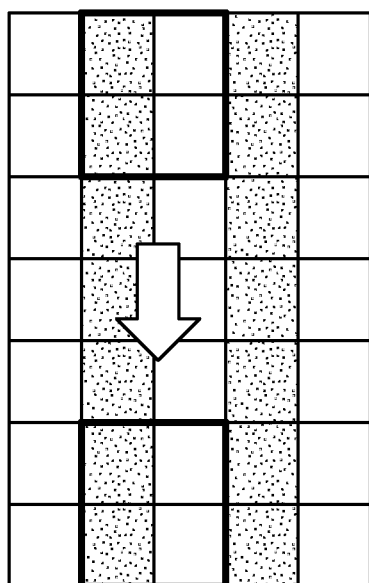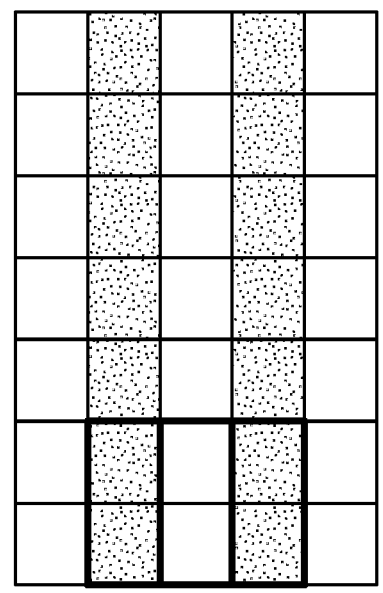

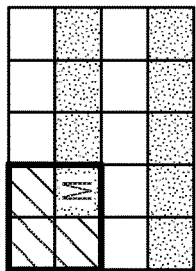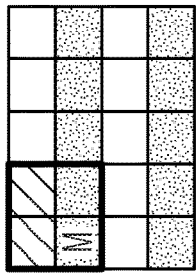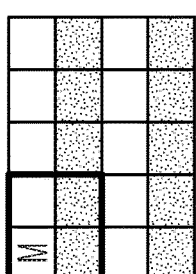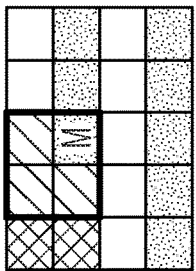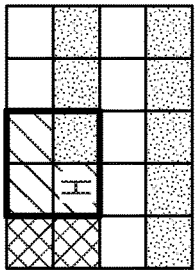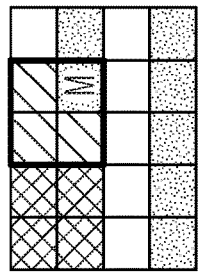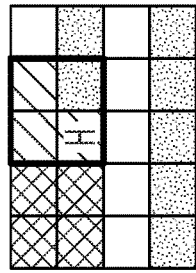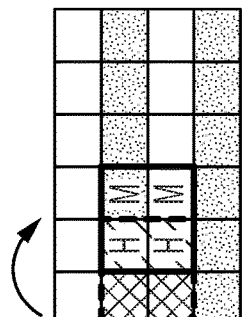

| Conv Size | Z | | | | | | | | | |
|---|---|---|---|---|---|---|---|---|---|---|
| | 1 | 2 | 3 | 4 | 5 | 6 | 7 | 8 | 9 | 10 |
| 1 | 1.0 | 1.0 | 1.0 | 1.0 | 1.0 | 1.0 | 1.0 | 1.0 | 1.0 | 1.0 |
| 2 | 2.0 | 1.5 | 1.3 | 1.3 | 1.2 | 1.2 | 1.1 | 1.1 | 1.1 | 1.1 |
| 3 | 3.0 | 2.0 | 1.7 | 1.5 | 1.4 | 1.3 | 1.3 | 1.3 | 1.2 | 1.2 |
| 4 | 4.0 | 2.5 | 2.0 | 1.8 | 1.6 | 1.5 | 1.4 | 1.4 | 1.3 | 1.3 |
| 5 | 5.0 | 3.0 | 2.3 | 2.0 | 1.8 | 1.7 | 1.6 | 1.5 | 1.4 | 1.4 |
| 6 | 6.0 | 3.5 | 2.7 | 2.3 | 2.0 | 1.8 | 1.7 | 1.6 | 1.6 | 1.5 |
| 7 | 7.0 | 4.0 | 3.0 | 2.5 | 2.2 | 2.0 | 1.9 | 1.8 | 1.7 | 1.6 |
| 8 | 8.0 | 4.5 | 3.3 | 2.8 | 2.4 | 2.2 | 2.0 | 1.9 | 1.8 | 1.7 |
| 9 | 9.0 | 5.0 | 3.7 | 3.0 | 2.6 | 2.3 | 2.1 | 2.0 | 1.9 | 1.8 |
| 10 | 10.0 | 5.5 | 4.0 | 3.3 | 2.8 | 2.5 | 2.3 | 2.1 | 2.0 | 1.9 |
| 11 | 11.0 | 6.0 | 4.3 | 3.5 | 3.0 | 2.7 | 2.4 | 2.3 | 2.1 | 2.0 |

FIG. 2E

| Conv Size | SRAM reads per clock | | | | | | | | | |
|---|---|---|---|---|---|---|---|---|---|---|
| | 1 | 2 | 3 | 4 | 5 | 6 | 7 | 8 | 9 | 10 |
| 1 | 1.00 | 1.00 | 1.00 | 1.00 | 1.00 | 1.00 | 1.00 | 1.00 | 1.00 | 1.00 |
| 2 | 0.50 | 0.38 | 0.33 | 0.31 | 0.30 | 0.29 | 0.29 | 0.28 | 0.28 | 0.28 |
| 3 | 0.33 | 0.22 | 0.19 | 0.17 | 0.16 | 0.15 | 0.14 | 0.14 | 0.14 | 0.13 |
| 4 | 0.25 | 0.16 | 0.13 | 0.11 | 0.10 | 0.09 | 0.09 | 0.09 | 0.08 | 0.08 |
| 5 | 0.20 | 0.12 | 0.09 | 0.08 | 0.07 | 0.07 | 0.06 | 0.06 | 0.06 | 0.06 |
| 6 | 0.17 | 0.10 | 0.07 | 0.06 | 0.06 | 0.05 | 0.05 | 0.05 | 0.04 | 0.04 |
| 7 | 0.14 | 0.08 | 0.06 | 0.05 | 0.04 | 0.04 | 0.04 | 0.04 | 0.03 | 0.03 |
| 8 | 0.13 | 0.07 | 0.05 | 0.04 | 0.04 | 0.03 | 0.03 | 0.03 | 0.03 | 0.03 |
| 9 | 0.11 | 0.06 | 0.05 | 0.04 | 0.03 | 0.03 | 0.03 | 0.02 | 0.02 | 0.02 |
| 10 | 0.10 | 0.06 | 0.04 | 0.03 | 0.03 | 0.03 | 0.02 | 0.02 | 0.02 | 0.02 |
| 11 | 0.09 | 0.05 | 0.04 | 0.03 | 0.02 | 0.02 | 0.02 | 0.02 | 0.02 | 0.02 |

FIG. 2F

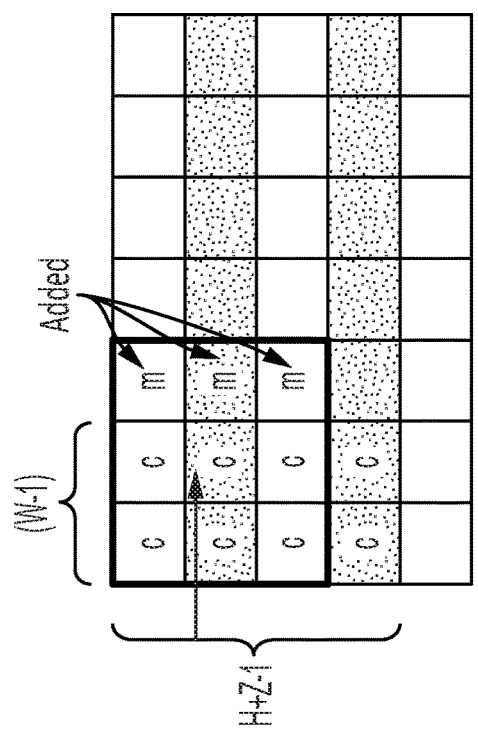 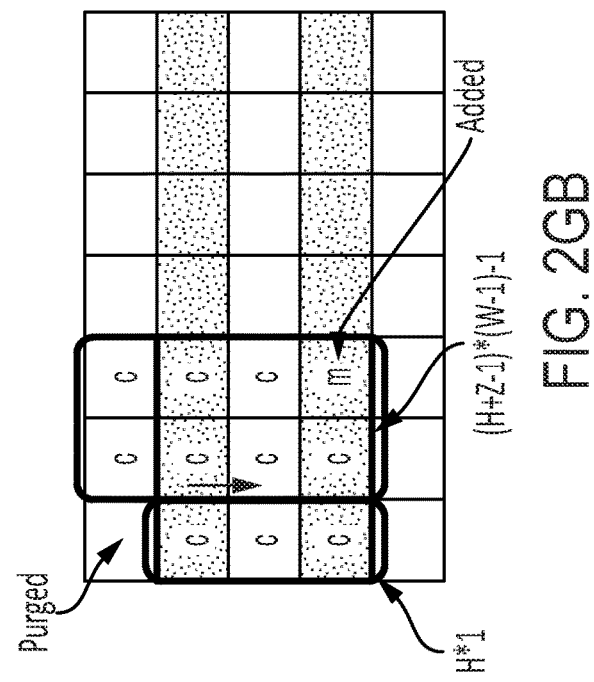

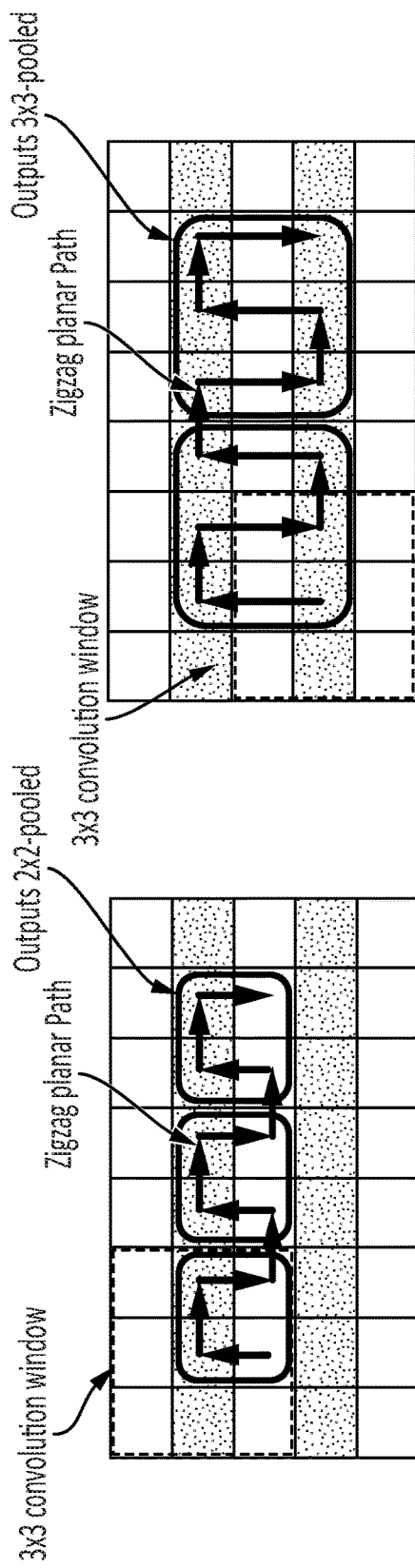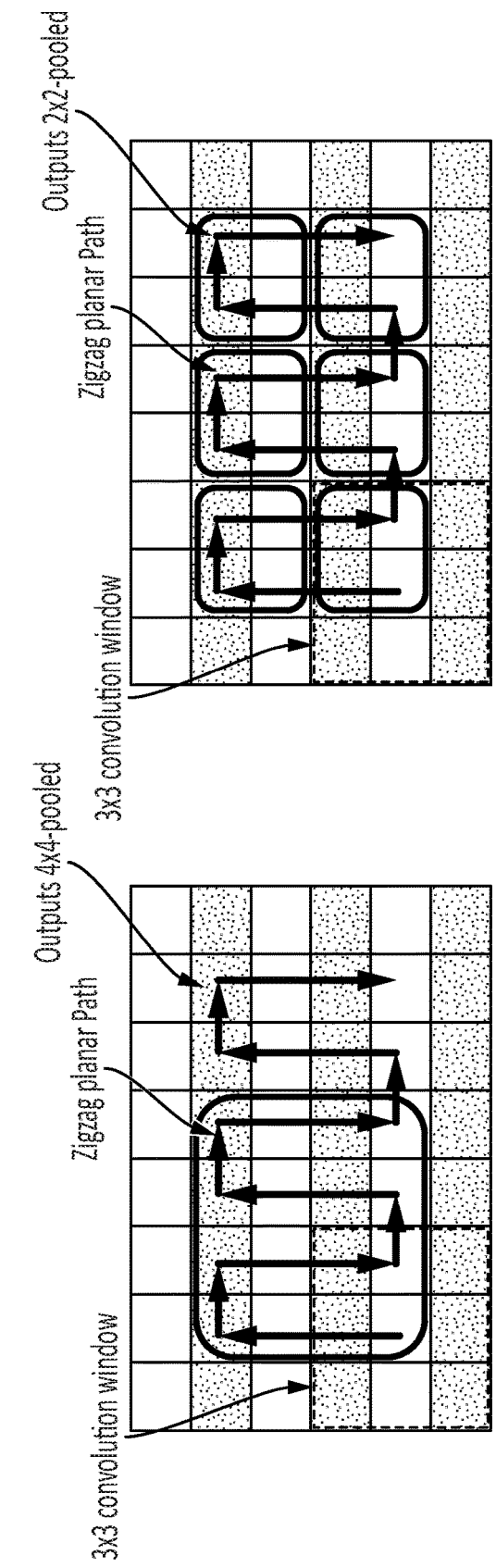

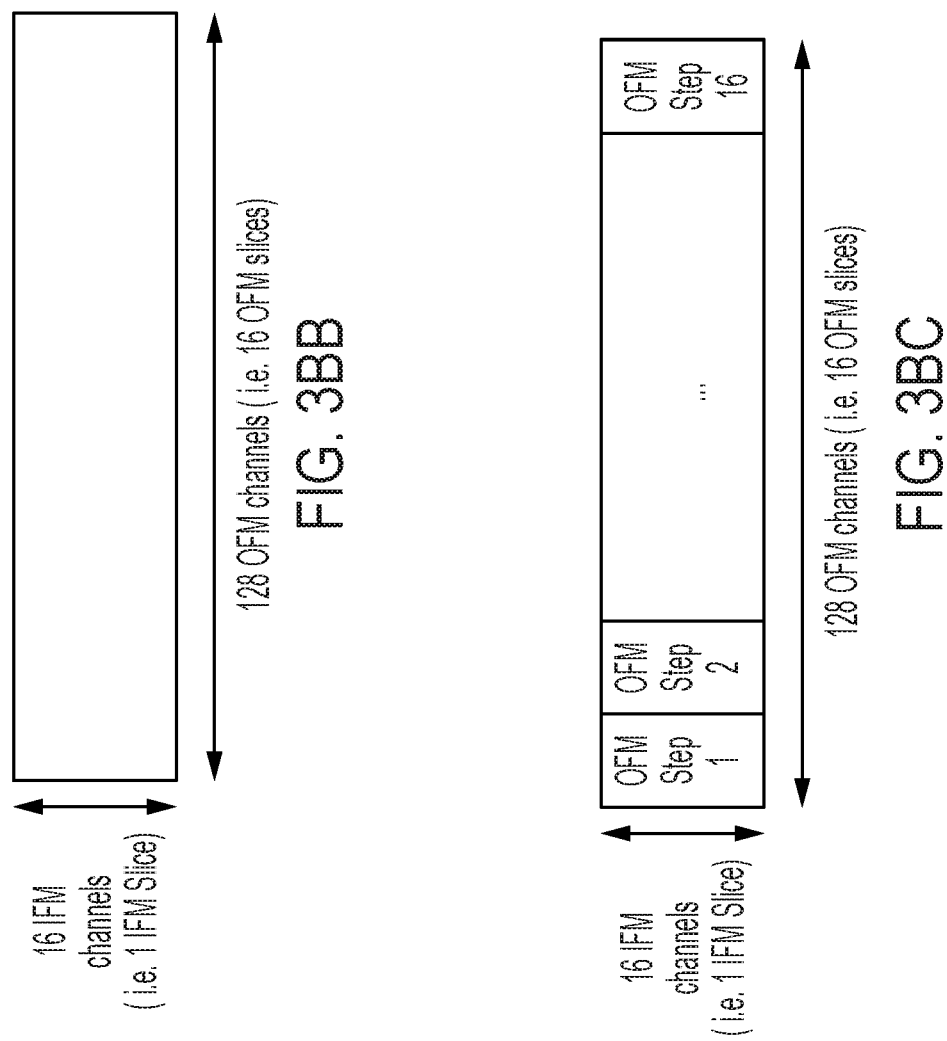

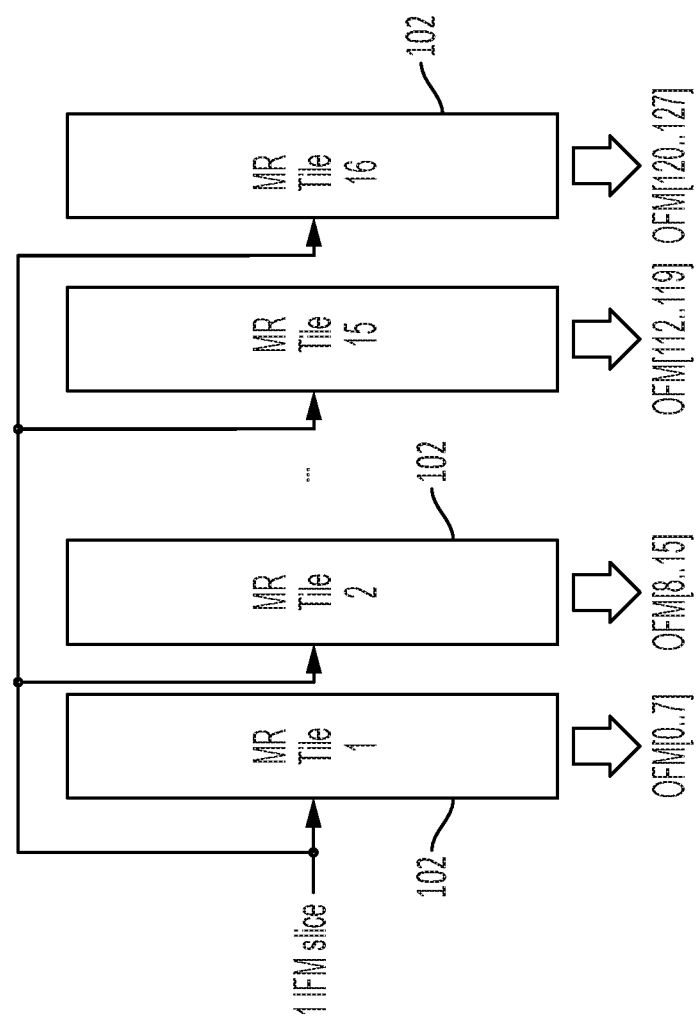

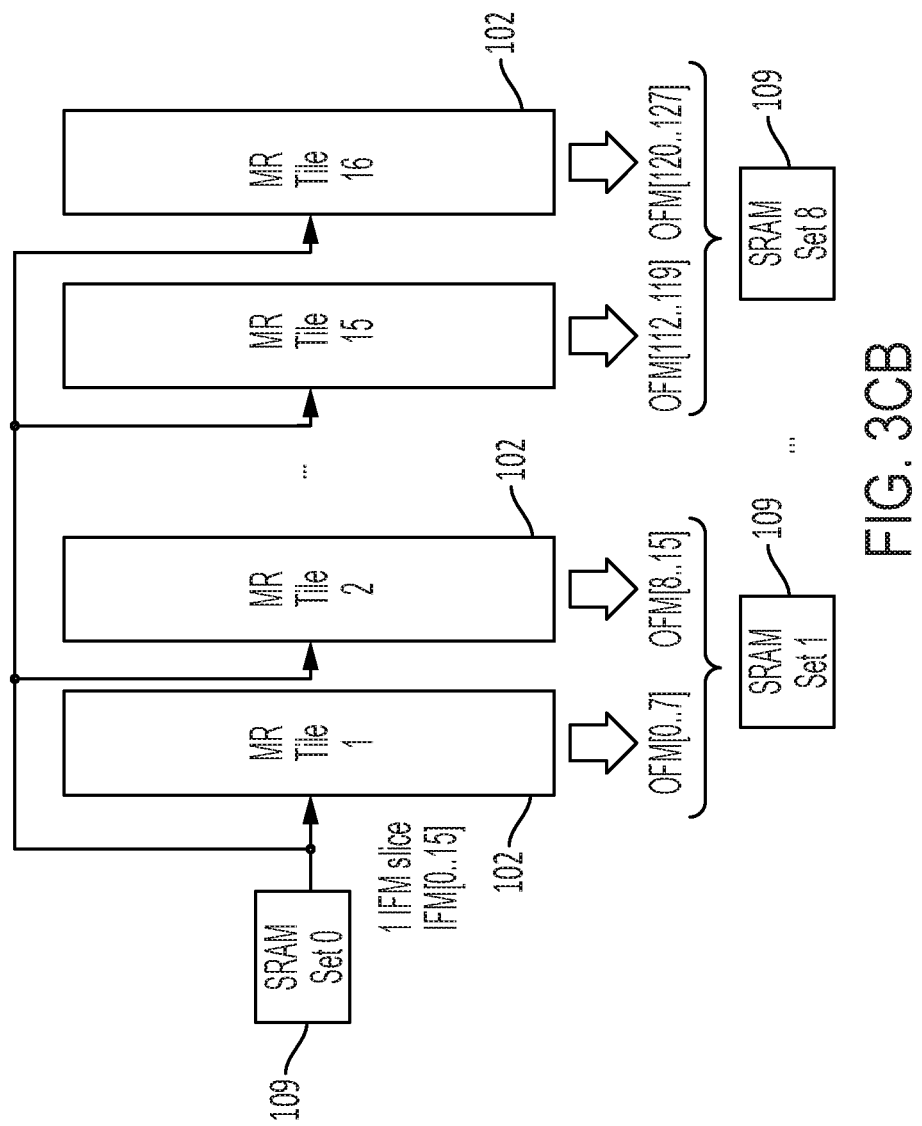

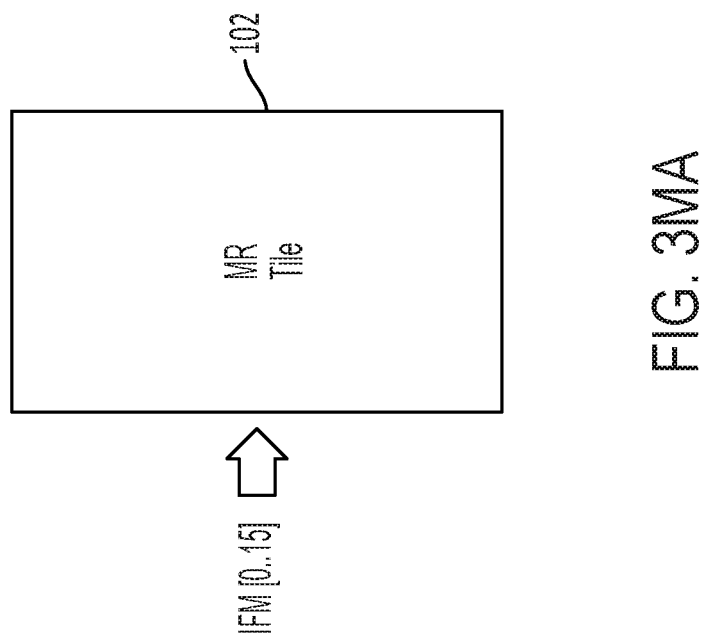

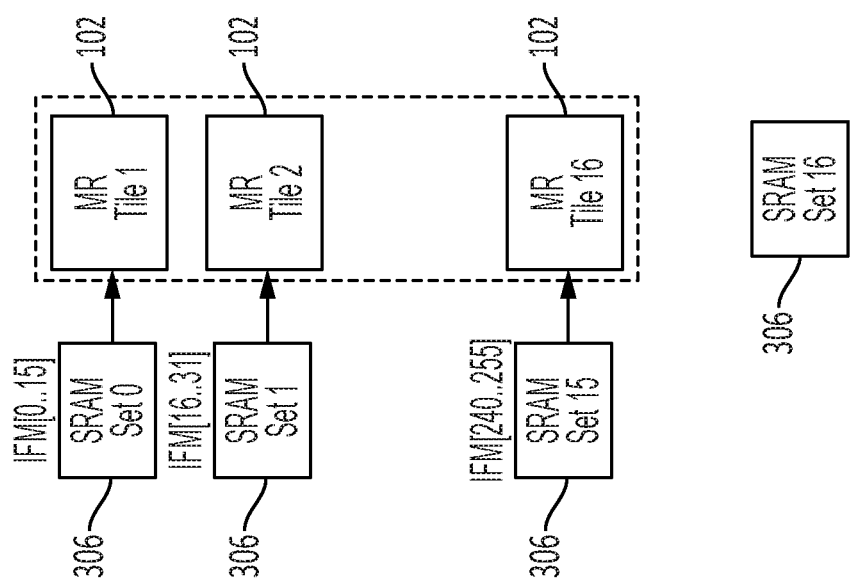

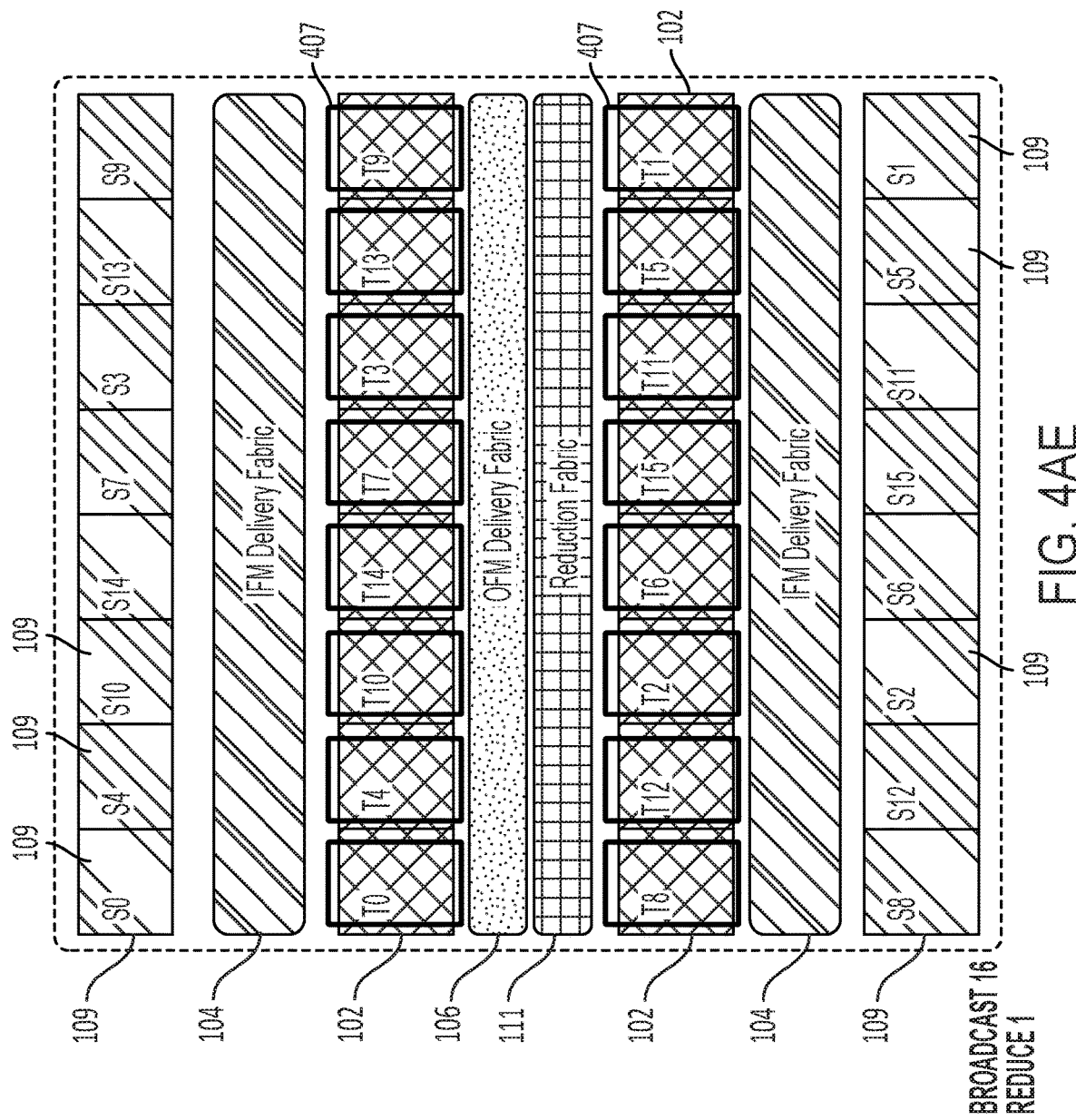

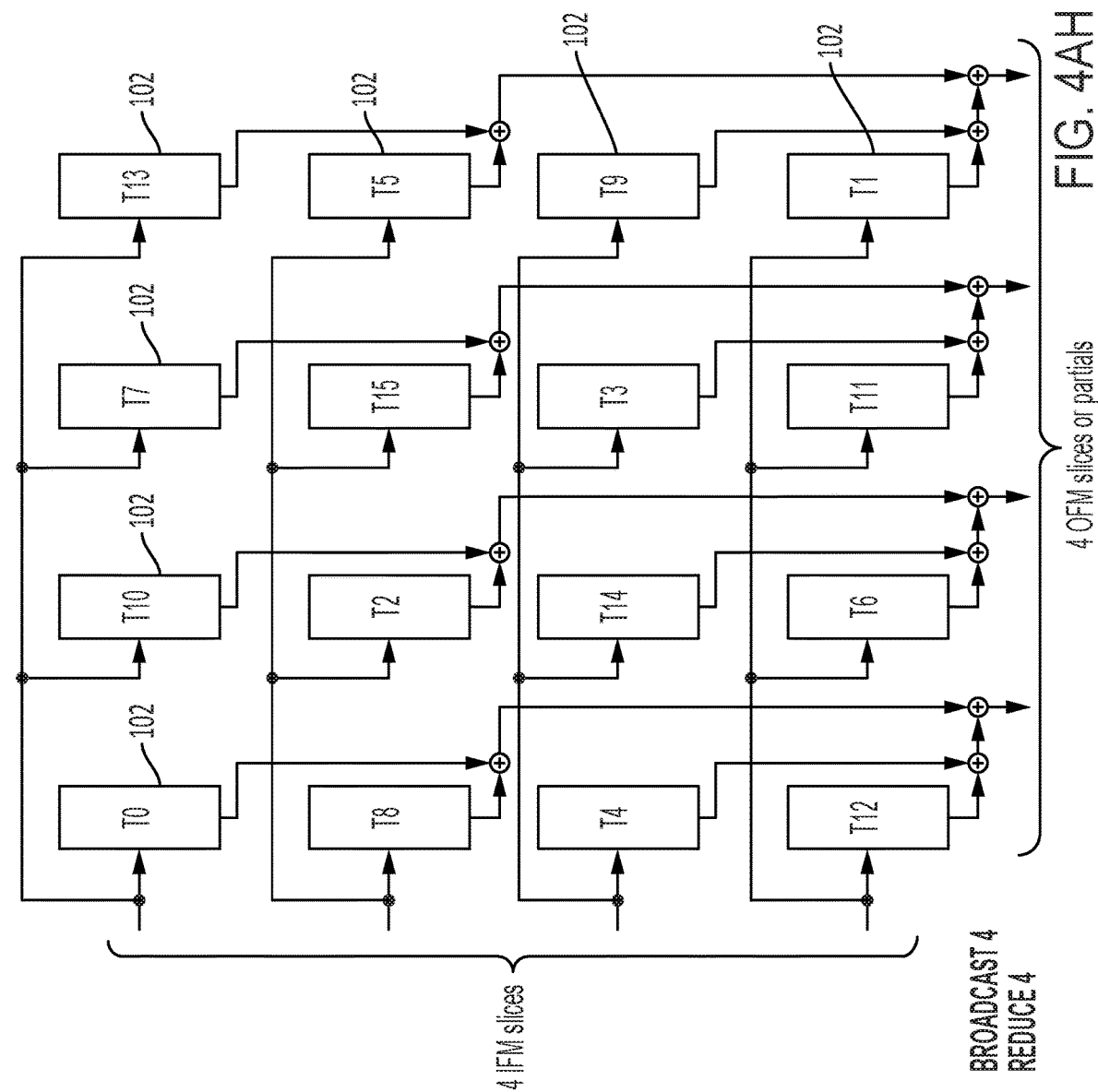

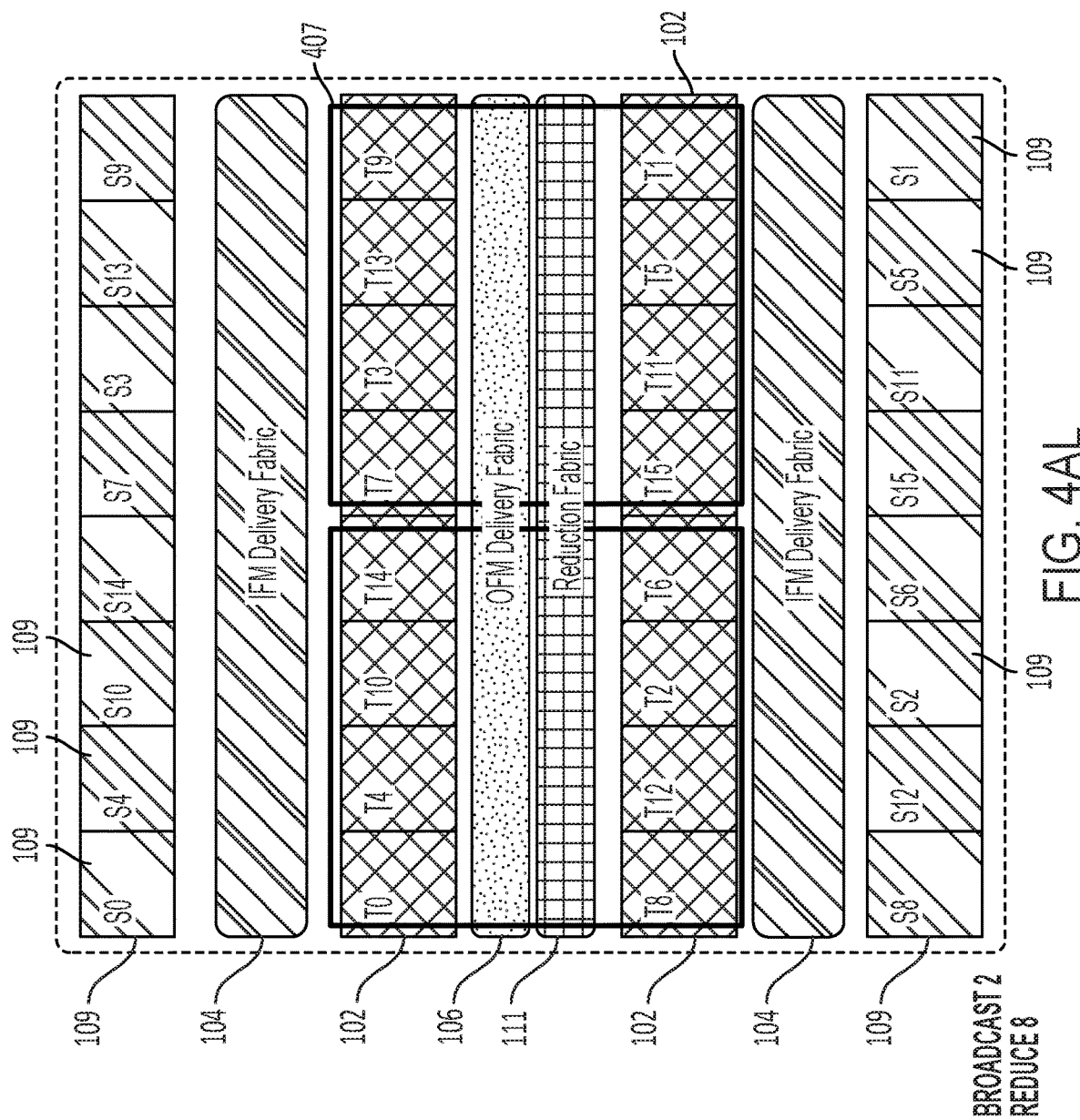

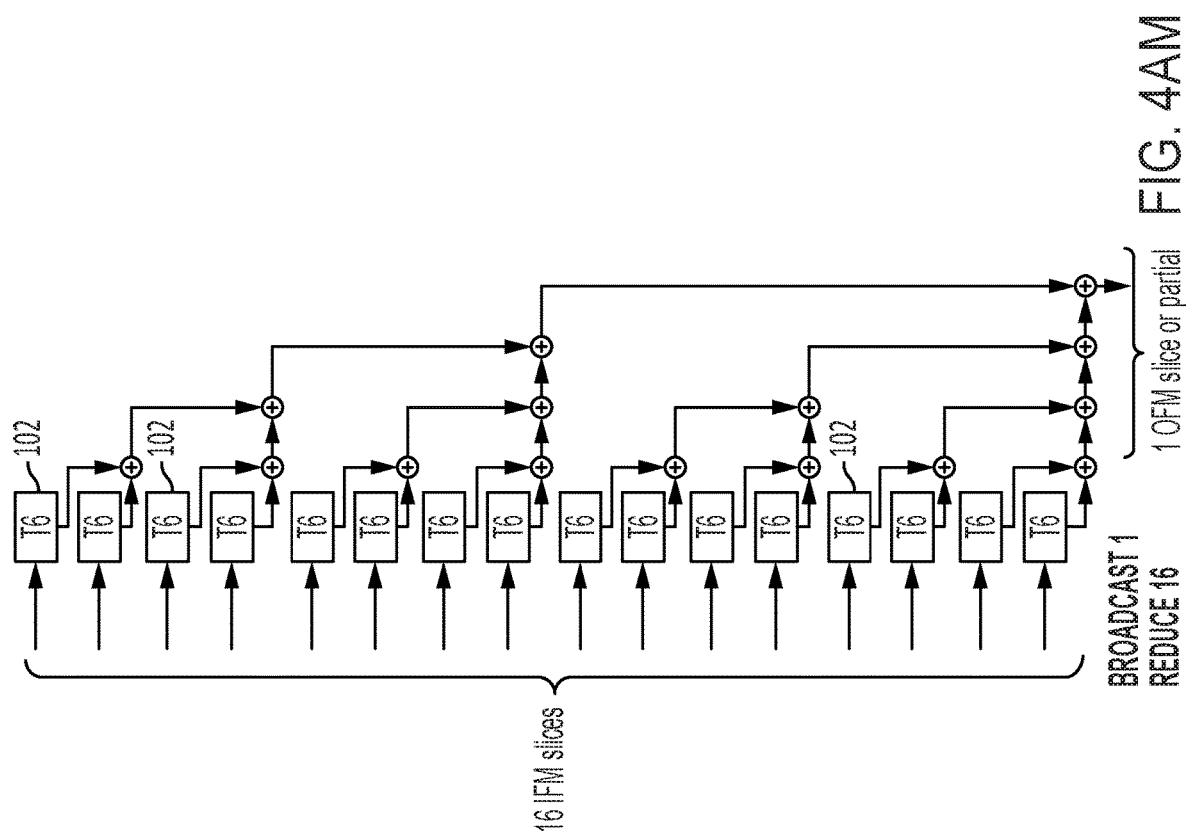

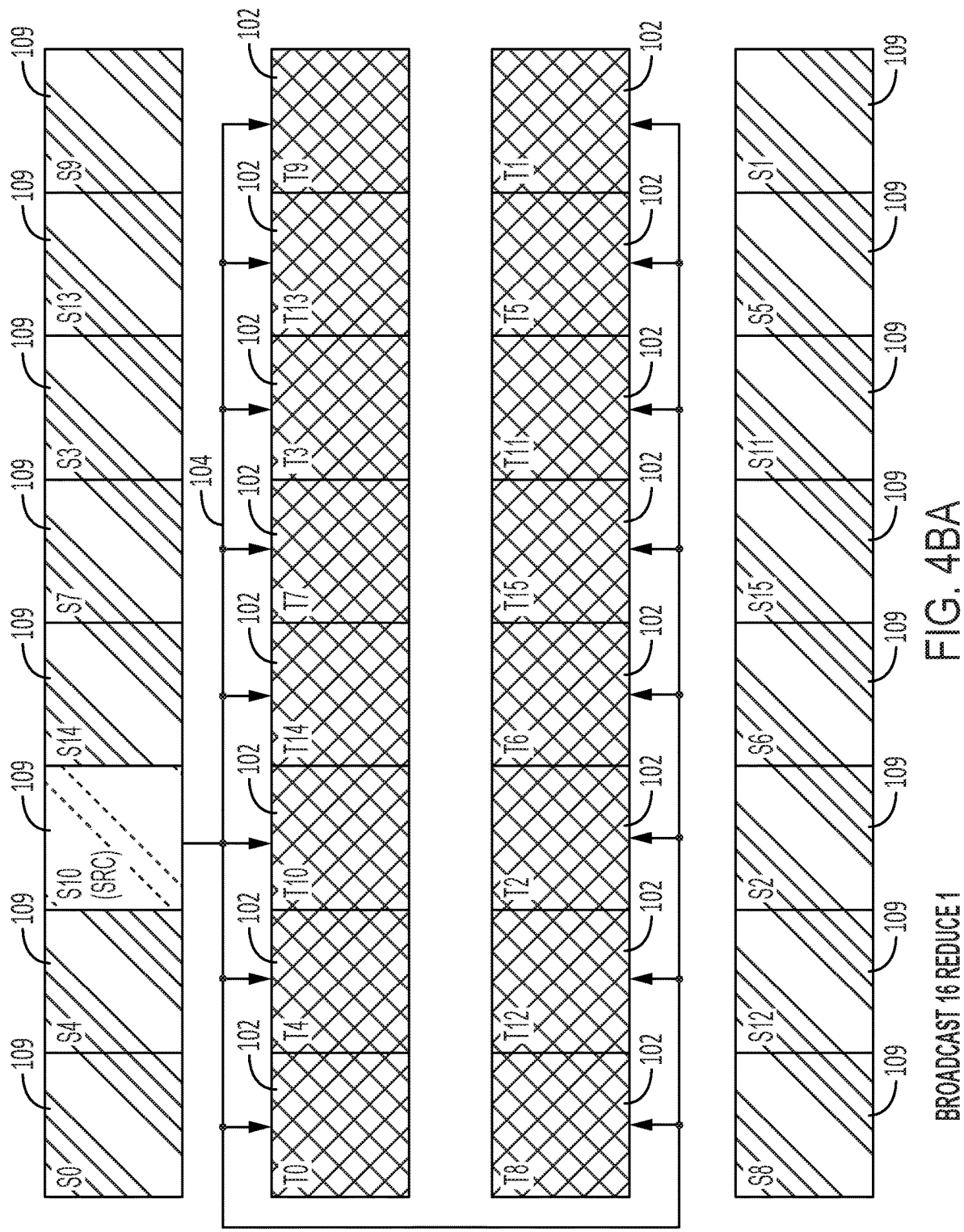

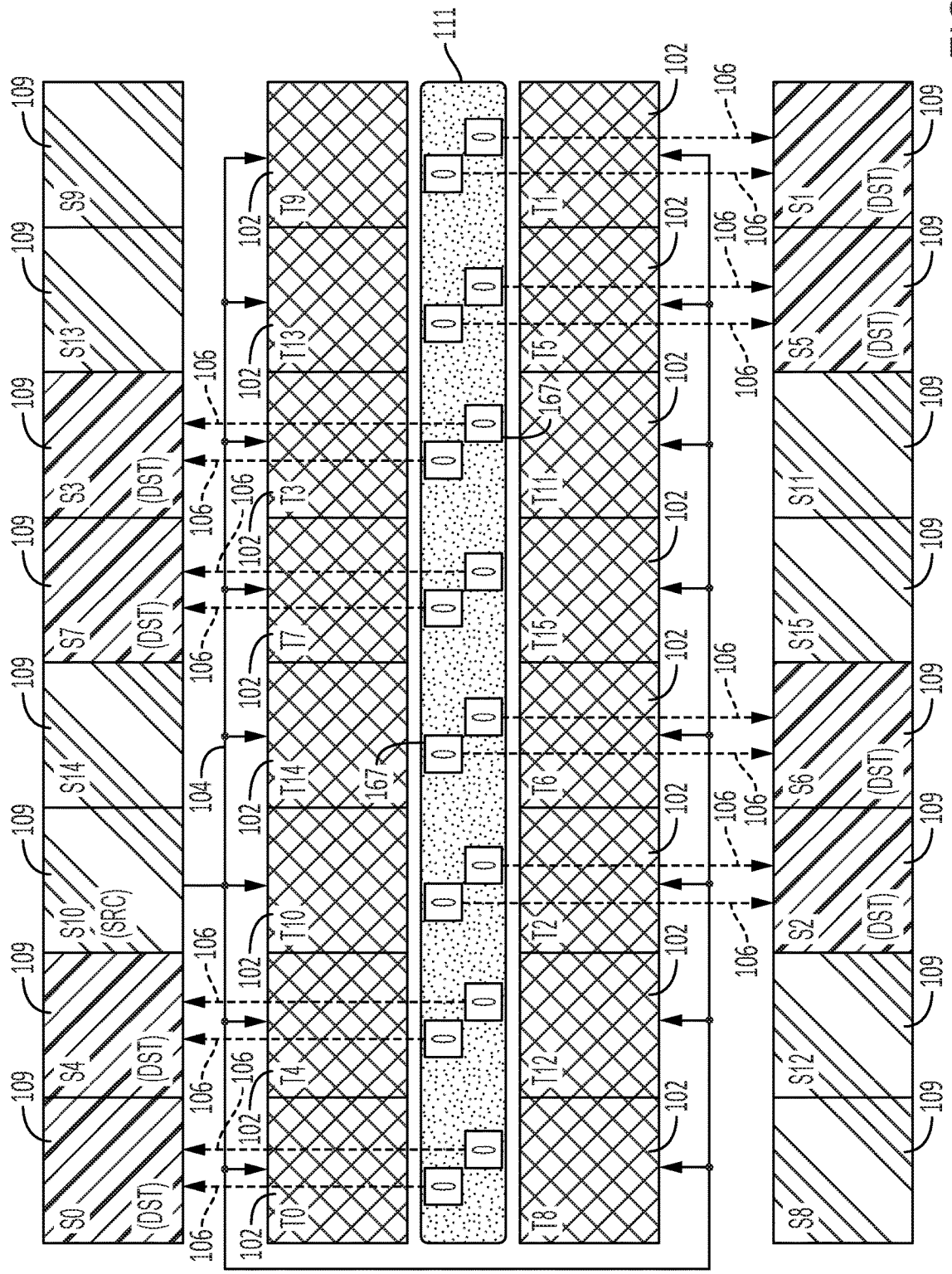

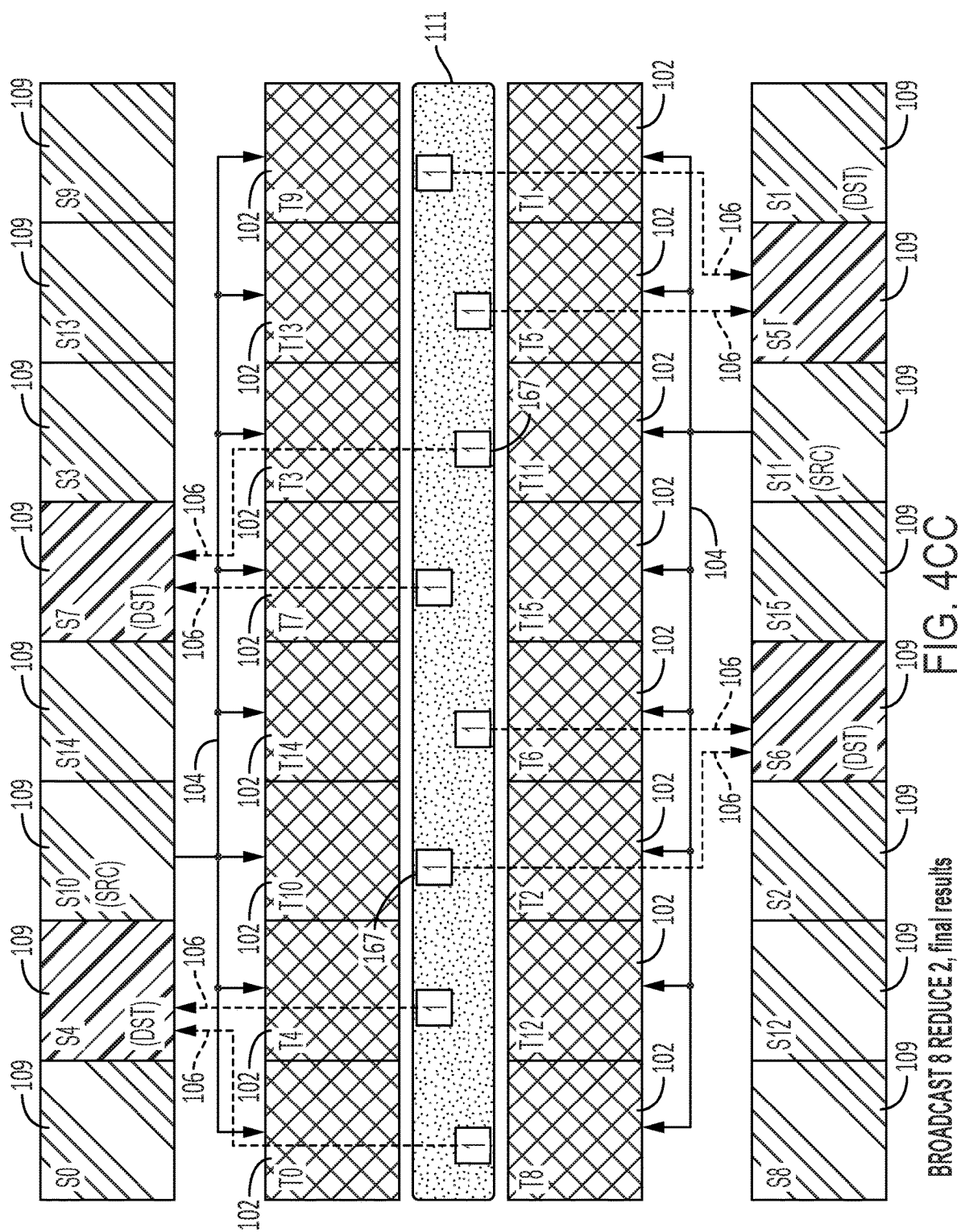

BROADCAST 4 REDUCE 4

BROADCAST 4 REDUCE 4, partial results

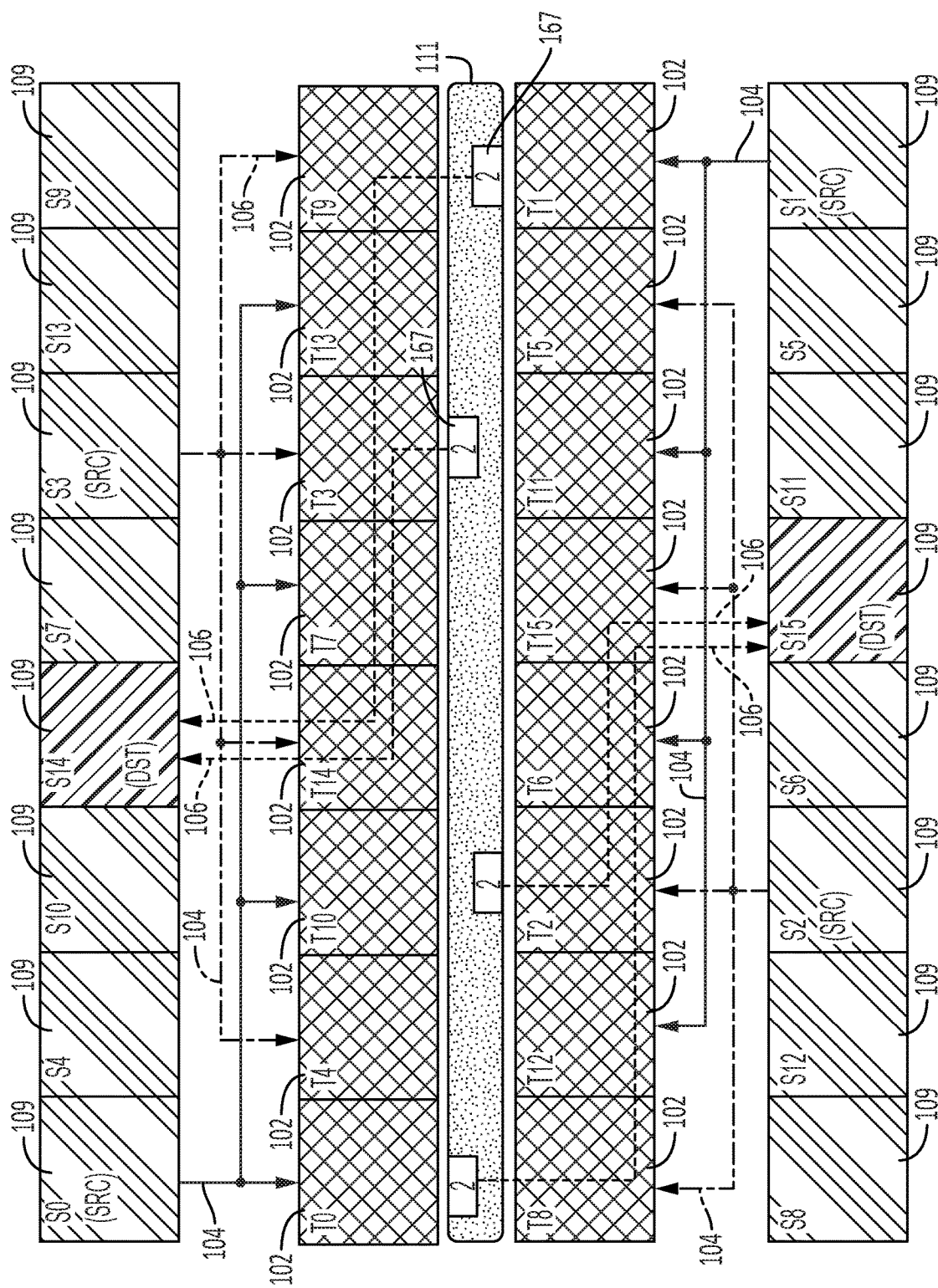

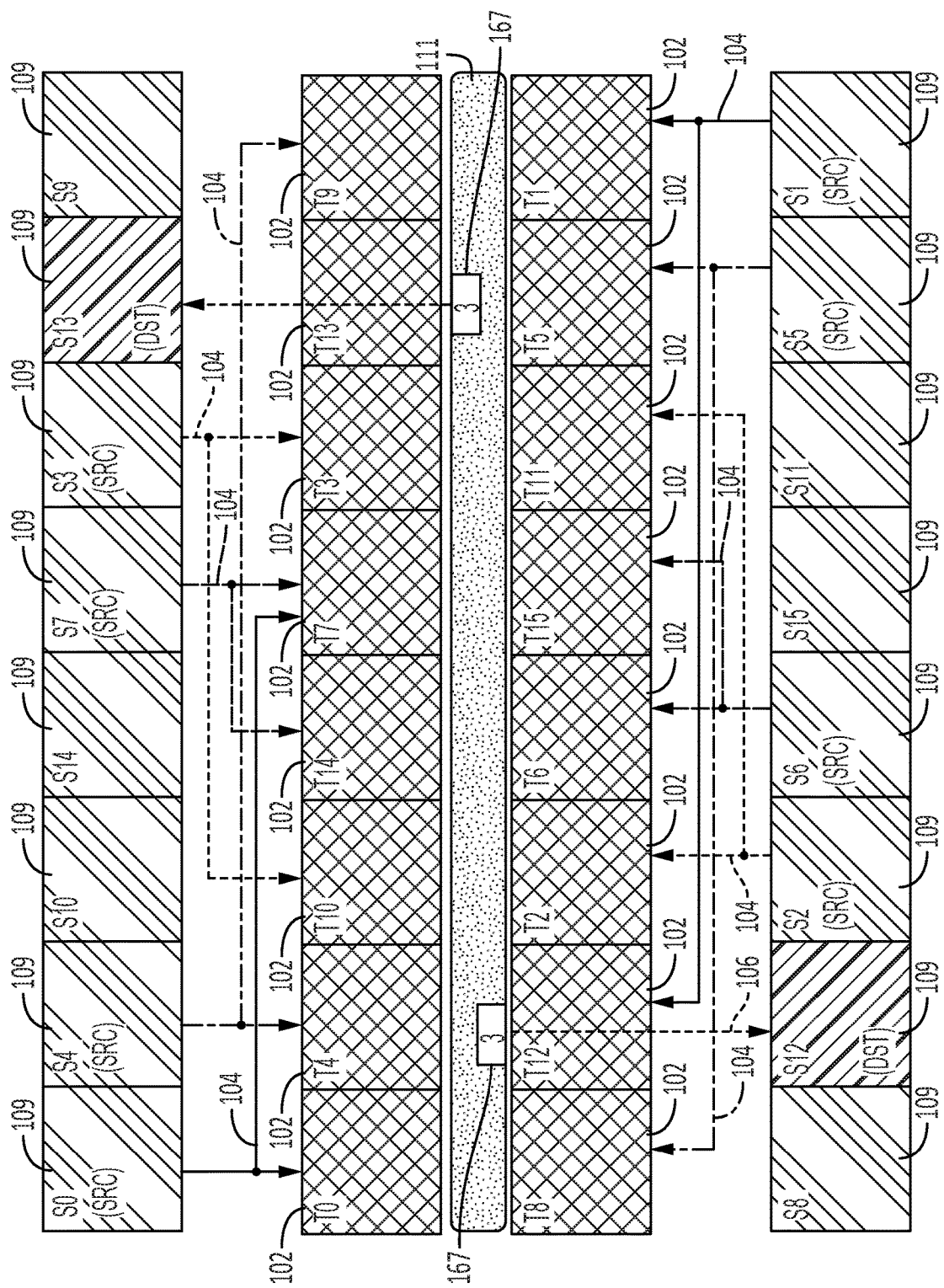
FIG. 4EB  BROADCAST 2 REDUCE 8, partial results

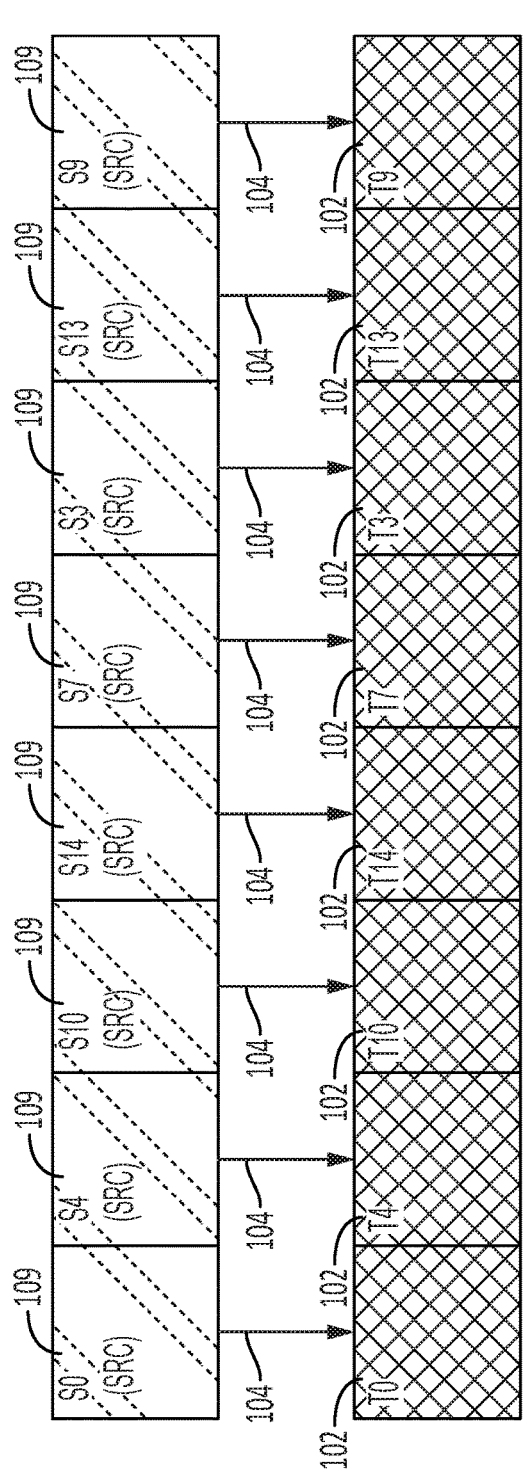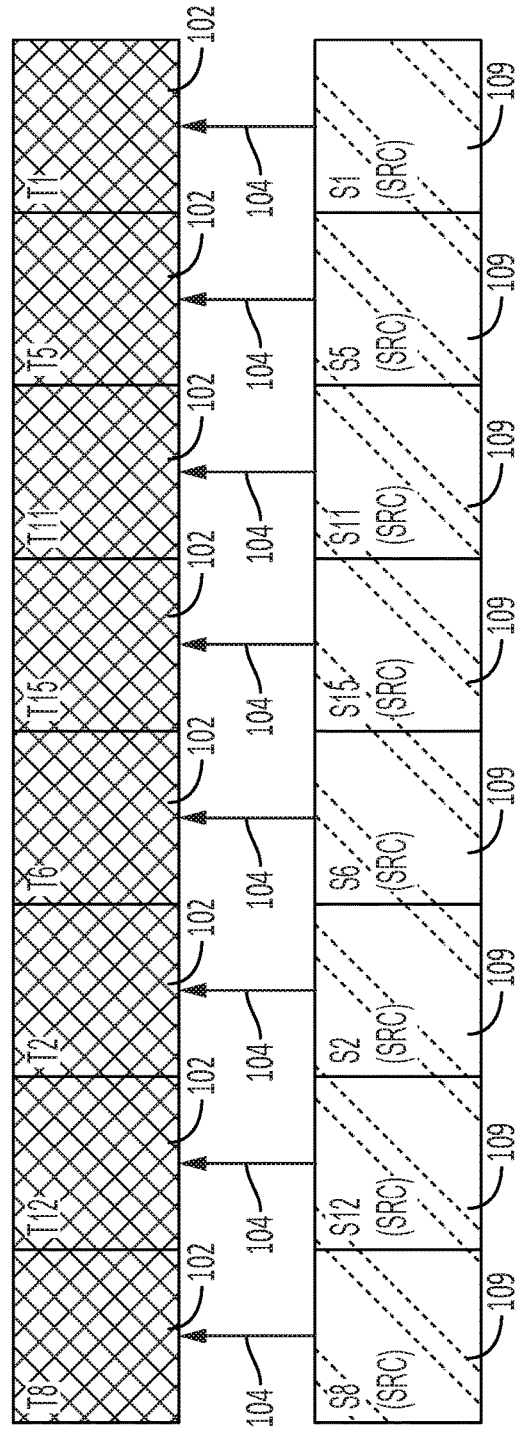
FIG. 4FA

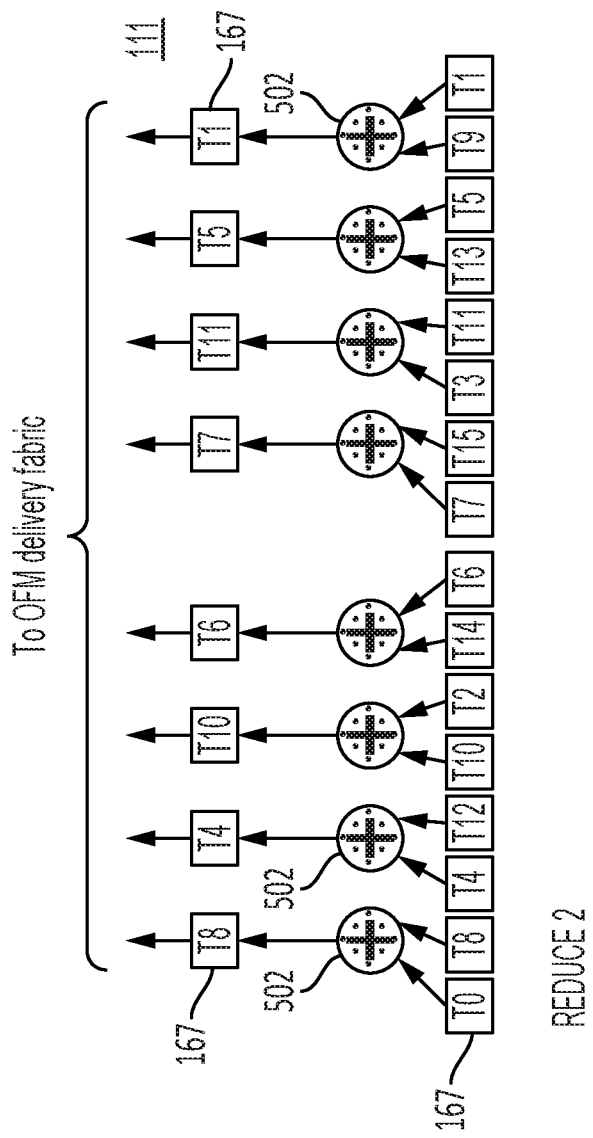

| Broadcast | FC Mult Utilization |
|---|---|
| 16 | 98.5% |
| 8 | 97.0% |
| 4 | 94.1% |
| 2 | 88.9% |
| 1 | 80.0% |

FIG. 6

NEURAL PROCESSOR

CROSS-REFERENCE TO RELATED APPLICATION(S)

This application is a continuation of U.S. patent application Ser. No. 16/446,610, filed Jun. 19, 2019, which claims priority to and the benefit of (i) U.S. Provisional Application No. 62/689,008, filed Jun. 22, 2018, entitled "SINGLE-PASS NEURAL PROCESSOR ACCELERATOR ARCHITECTURE", (ii) U.S. Provisional Application No. 62/798,297, filed Jan. 29, 2019, entitled "SINGLE PASS NPU", (iii) U.S. Provisional Application No. 62/841,590, filed May 1, 2019, entitled "MIXED-PRECISION NPU TILE WITH DEPTH-WISE CONVOLUTION", and (iv) U.S. Provisional Application No. 62/841,606, filed May 1, 2019, entitled "MIXED-PRECISION NEURAL-PROCESSING UNIT TILE", the entire content of all of which are incorporated herein by reference.

FIELD

One or more aspects of embodiments according to the present disclosure relate to processing circuits, and more particularly to a processing circuit for performing combinations of multiplications and additions.

BACKGROUND

Neural networks may, in operation, perform tensor operations (e.g., tensor multiplications and convolutions) involving large numbers of multiplications and additions. If performed by a general purpose central processing unit, or even a graphics processing unit (which may be better suited to such a task) the performing of these operations may be relatively slow and incur a relatively high energy cost per operation. Especially in small devices (e.g., mobile, handheld devices), which may have tightly constrained power budgets, the power consumption associated with the use of a general purpose central processing unit, or of a graphics processing unit, may be a significant disadvantage.

Thus, there is a need for an improved processing circuit for neural network calculations.

SUMMARY

According to some embodiments of the present disclosure, there is provided a processor, including: a first tile, a second tile, a memory, and a bus, the bus being connected to: the memory, the first tile, and the second tile, the first tile including: a first weight register, a second weight register, an activations buffer, a first multiplier, and a second multiplier, the first tile being configured to perform a convolution of an array of activations with a kernel of weights, the performing of the convolution including, in order: forming a tensor product of the kernel with a first subarray of the array of activations; forming a tensor product of the kernel with a second subarray of the array of activations, the second subarray being offset from the first subarray by n array elements in a first direction, n being a positive integer; and forming a tensor product of the kernel with a third subarray of the array of activations, the third subarray being offset from the second subarray by one array element in a second direction, perpendicular to the first direction.

In some embodiments, the performing of the convolution further includes, in order, after the forming of the tensor product of the kernel with the third subarray: forming a tensor product of the kernel with a fourth subarray of the array of activations, the fourth subarray being offset from the third subarray by m array elements in a third direction, opposite to the first direction, m being a positive integer, and forming a tensor product of the kernel with a fifth subarray of the array of activations, the fifth subarray being offset from the fourth subarray by one array element in the second direction.

In some embodiments, m equals n.

In some embodiments, n equals 1.

In some embodiments, the performing of the convolution further includes, in order, after the forming of the products of the kernel with the first subarray: forming n−1 products of the kernel with n−1 respective subarrays of the array of activations, the subarray in a k-th product, of the n−1 products, being offset from the first subarray by k+1 array elements in the first direction.

In some embodiments, the processor further includes a cache, connected to the activations buffer and configured to supply activations to the activations buffer, the cache having a size sufficient to store H+(H+n)*(W−1)−1 activations, wherein: H is a size of the kernel in the first direction, and W is a size of the kernel in the second direction.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processor further includes: a first adder, configured, in the first state: to be connected to an output of the first multiplier, and an output of the second multiplier, and to add: a product received from the output of the first multiplier, and a product received from the output of the second multiplier.

In some embodiments, the processor further includes a second adder, configured, in the second state, to be connected to the output of the first multiplier.

According to some embodiments of the present disclosure, there is provided a method for calculating with a processing circuit, the processing circuit including: a first tile, a second tile, a memory, and a bus, the bus being connected to: the memory, the first tile, and the second tile, the first tile including: a first weight register, a second weight register, an activations buffer, a first multiplier, and a second multiplier, the method including performing a convolution of an array of activations with a kernel of weights, the performing of the convolution including, in order: forming a tensor product of the kernel with a first subarray of the array of activations; forming a tensor product of the kernel with a second subarray of the array of activations, the second subarray being offset from the first subarray by n array elements in a first direction, n being a positive integer; and forming a tensor product of the kernel with a third subarray of the array of activations, the third subarray being offset from the second subarray by one array element in a second direction, perpendicular to the first direction.

In some embodiments, the performing of the convolution further includes, in order, after the forming of the tensor product of the kernel with the third subarray: forming a tensor product of the kernel with a fourth subarray of the array of activations, the fourth subarray being offset from the third subarray by m array elements in a third direction, opposite to the first direction, m being a positive integer, and forming a tensor product of the kernel with a fifth subarray of the array of activations, the fifth subarray being offset from the fourth subarray by one array element in the second direction.

In some embodiments, m equals n.

In some embodiments, n equals 1.

In some embodiments, the performing of the convolution further includes, in order, after the forming of the products of the kernel with the first subarray: forming n−1 products of the kernel with n−1 respective subarrays of the array of activations, the subarray in a k-th product, of the n−1 products, being offset from the first subarray by k+1 array elements in the first direction.

In some embodiments, the processing circuit further includes a cache, connected to the activations buffer and configured to supply activations to the activations buffer, the cache having a size sufficient to store H+(H+n)*(W−1)−1 activations, wherein: H is a size of the kernel in the first direction, and W is a size of the kernel in the second direction.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processing circuit further includes a first adder, the method further including, in the first state: connecting the first adder to: an output of the first multiplier, and an output of the second multiplier, and adding, by the first adder: a product received from the output of the first multiplier, and a product received from the output of the second multiplier.

According to some embodiments of the present disclosure, there is provided a method for calculating with a means for processing, the means for processing including: a first tile, a second tile, a memory, and a bus, the bus being connected to: the memory, the first tile, and the second tile, the first tile including: a first weight register, a second weight register, an activations buffer, a first multiplier, and a second multiplier, the method including performing a convolution of an array of activations with a kernel of weights, the performing of the convolution including, in order: forming a tensor product of the kernel with a first subarray of the array of activations; forming a tensor product of the kernel with a second subarray of the array of activations, the second subarray being offset from the first subarray by n array elements in a first direction, n being a positive integer; and forming a tensor product of the kernel with a third subarray of the array of activations, the third subarray being offset from the second subarray by one array element in a second direction, perpendicular to the first direction.

According to some embodiments of the present disclosure, there is provided a processor, including: a first tile, a second tile, a memory, and a bus, the bus being connected to: the memory, the first tile, and the second tile, the first tile including: a first weight register, a second weight register, an activations buffer, a first multiplier, and a second multiplier, the processor being configured to perform a first convolution of an array of activations with a first kernel of weights, the performing of the first convolution including: broadcasting a first subarray of the array of activations to: the first tile, and the second tile; forming a first tensor product, the first tensor product being a tensor product of a first subarray of the first kernel of weights with the first subarray of the array of activations; storing the first tensor product in the memory; broadcasting a second subarray of the array of activations to: the first tile, and the second tile; forming a second tensor product, the second tensor product being a tensor product of a second subarray of the first kernel of weights with the second subarray of the array of activations; and adding the first tensor product and the second tensor product.

In some embodiments, the first tile further includes a weight decompression unit configured to: decompress a data word encoding a plurality of weights in compressed form, to extract a first weight and a second weight; feed the first weight to the first weight register; and feed the second weight to the second weight register.

In some embodiments, the first tile is further configured to perform a second convolution of an array of activations with a second kernel of weights, the performing of the second convolution including, in order: forming a tensor product of a first portion of the second kernel with a first subarray of the array of activations, the first portion of the second kernel including a weight stored in the first weight register; forming a tensor product of a second portion of the second kernel with the first subarray of the array of activations, the second portion of the second kernel including a weight stored in the second weight register; and forming a tensor product of the first portion of the second kernel with a second subarray of the array of activations, the first portion of the second kernel including the weight stored in the first weight register.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processor further includes: a first adder, configured, in the first state: to be connected to an output of the first multiplier, and an output of the second multiplier; and to add; a product received from the output of the first multiplier, and a product received from the output of the second multiplier.

In some embodiments, the processor further includes a second adder, configured, in the second state, to be connected to the output of the first multiplier.

In some embodiments, the processor further includes: a first accumulator connected to the first adder, and a second accumulator connected to the second adder, the first accumulator including a register and being configured, in the first state: to add to a value in the register of the first accumulator a sum received from the first adder, to form an accumulated value of the first accumulator, and to store the accumulated value of the first accumulator in the register of the first accumulator.

In some embodiments, the second accumulator includes a register and is configured, in the second state, to add to a value in the register of the second accumulator a sum received from the second adder, to form an accumulated value of the second accumulator, and to store the accumulated value of the second accumulator in the register of the second accumulator.

In some embodiments, the processor further includes an activation zero skip control circuit configured to: determine whether the output register of the first queue contains zero, and in response to determining that the output register of the first queue contains zero, cause the first tile to operate in the second state.

According to some embodiments of the present disclosure, there is provided a method for calculating with a processing circuit, the processing circuit including: a first tile, a second tile, a memory, and a bus, the bus being connected to: the memory, the first tile, and the second tile, the first tile including: a first weight register, a second weight register, an activations buffer, a first multiplier, and a second multiplier, the method including performing a first convolution of an array of activations with a first kernel of weights, the performing of the first convolution including: broadcasting a first subarray of the array of activations to: the first tile, and the second tile; forming a first tensor product, the first tensor product being a tensor product of a first subarray of the first kernel of weights with the first subarray of the array of activations; storing the first tensor product in the memory; broadcasting a second subarray of the array of activations to: the first tile, and the second tile; forming a second tensor product, the second tensor product being a tensor product of a second subarray of the first kernel of weights with the second subarray of the array of activations; and adding the first tensor product and the second tensor product.

In some embodiments, the first tile further includes a weight decompression unit, and the method further includes: decompressing, by the weight decompression unit, a data word encoding a plurality of weights in compressed form, to extract a first weight and a second weight; feeding the first weight to the first weight register; and feeding the second weight to the second weight register.

In some embodiments, the method further includes performing a second convolution of an array of activations with a second kernel of weights, the performing of the second convolution including, in order: forming a tensor product of a first portion of the second kernel with a first subarray of the array of activations, the first portion of the second kernel including a weight stored in the first weight register; forming a tensor product of a second portion of the second kernel with the first subarray of the array of activations, the second portion of the second kernel including a weight stored in the second weight register; and forming a tensor product of the first portion of the second kernel with a second subarray of the array of activations, the first portion of the second kernel including the weight stored in the first weight register.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processing circuit further includes a first adder, the method further including, in the first state: connecting the first adder to: an output of the first multiplier, and an output of the second multiplier; and adding, by the first adder: a product received from the output of the first multiplier, and a product received from the output of the second multiplier.

In some embodiments, the processing circuit further includes a second adder, the method further including, in the second state, connecting the second adder to the output of the first multiplier.

In some embodiments, the processing circuit further includes: a first accumulator connected to the first adder, and a second accumulator connected to the second adder, the first accumulator including a register, the method further including, in the first state: adding, by the first accumulator, to a value in the register of the first accumulator, a sum received from the first adder, to form an accumulated value of the first accumulator, and storing, by the first accumulator, the accumulated value of the first accumulator in the register of the first accumulator.

In some embodiments, the second accumulator includes a register and the method further includes, in the second state, adding, by the second accumulator, to a value in the register of the second accumulator, a sum received from the second adder, to form an accumulated value of the second accumulator, and storing, by the second accumulator, the accumulated value of the second accumulator in the register of the second accumulator.

According to some embodiments of the present disclosure, there is provided a method for calculating with a means for processing, the means for processing including: a first tile, a second tile, a memory, and a bus, the bus being connected to: the memory, the first tile, and the second tile, the first tile including: a first weight register, a second weight register, an activations buffer, a first multiplier, and a second multiplier, the method including performing a first convolution of an array of activations with a first kernel of weights, the performing of the first convolution including: broadcasting a first subarray of the array of activations to: the first tile, and the second tile; forming a first tensor product, the first tensor product being a tensor product of a first subarray of the first kernel of weights with the first subarray of the array of activations; storing the first tensor product in the memory; broadcasting a second subarray of the array of activations to: the first tile, and the second tile; forming a second tensor product, the second tensor product being a tensor product of a second subarray of the first kernel of weights with the second subarray of the array of activations; and adding the first tensor product and the second tensor product.

According to some embodiments of the present disclosure, there is provided a processor, including: a first tile, a second tile, a memory, an input bus, and an output bus, the input bus being connected to: the memory, the first tile, and the second tile, the first tile including: a first weight register, a second weight register, an activations buffer, a first multiplier, and a second multiplier, the first tile being configured to perform a first convolution of an array of activations with a kernel of weights; the memory including: a first memory bank set, and a second memory bank set; the input bus including: a first segmented bus for data propagating in a first direction, and a second segmented bus for data propagating in a second direction, opposite the first direction; the first segmented bus including: a first switch block, and a second switch block; the first switch block being connected to: the first tile, and the first memory bank set; the second switch block being connected to: the second tile, and the second memory bank set; the second segmented bus including: a third switch block, and a fourth switch block; the third switch block being connected to: the first tile, and the first memory bank set; the fourth switch block being connected to: the second tile, and the second memory bank set; an input of the first switch block being connected to an output of the second switch block; and an output of the third switch block being connected to an input of the fourth switch block.

In some embodiments, the first segmented bus is configured, in a first bus state, to connect the first memory bank set, through the first switch block, to the first tile, and to connect the second memory bank set, through the second switch block, to the second tile.

In some embodiments, the first segmented bus is further configured, in a second bus state, to connect the second memory bank set, through the first switch block, and through the second switch block, to the first tile, and to connect the second memory bank set, through the second switch block, to the second tile.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processor further includes a first adder, configured, in the first state: to be connected to: an output of the first multiplier, and an output of the second multiplier; and to add: a product received from the output of the first multiplier, and a product received from the output of the second multiplier.

In some embodiments, the processor further includes a second adder, configured, in the second state, to be connected to the output of the first multiplier.

In some embodiments, the processor further includes: a first accumulator connected to the first adder, and a second accumulator connected to the second adder, the first accumulator including a register and being configured, in the first state: to add to a value in the register of the first accumulator a sum received from the first adder, to form an accumulated value of the first accumulator, and to store the accumulated value of the first accumulator in the register of the first accumulator.

In some embodiments, the second accumulator includes a register and is configured, in the second state, to add to a value in the register of the second accumulator a sum received from the second adder, to form an accumulated value of the second accumulator, and to store the accumulated value of the second accumulator in the register of the second accumulator.

In some embodiments, the processor further includes an activation zero skip control circuit configured to: determine whether the output register of the first queue contains zero, and in response to determining that the output register of the first queue contains zero, cause the first tile to operate in the second state.

In some embodiments, the processor further includes a multiplexer having: an input, at a single-port side of the multiplexer, connected to the first multiplier, a first output, at a multi-port side of the multiplexer, connected to the first adder, and a second output, at the multi-port side of the multiplexer, connected to the second adder.

According to some embodiments of the present disclosure, there is provided a method for calculating with a processing circuit, the processing circuit including: a first tile, a second tile, a memory, an input bus, and an output bus, the input bus being connected to: the memory, the first tile, and the second tile, the first tile including: a first weight register, a second weight register, an activations buffer, a first multiplier, and a second multiplier, the first tile being configured to perform a first convolution of an array of activations with a kernel of weights; the memory including: a first memory bank set, and a second memory bank set; the input bus including: a first segmented bus for data propagating in a first direction, and a second segmented bus for data propagating in a second direction, opposite the first direction; the first segmented bus including: a first switch block, and a second switch block; the first switch block being connected to: the first tile, and the first memory bank set; the second switch block being connected to: the second tile, and the second memory bank set; the second segmented bus including: a third switch block, and a fourth switch block; the third switch block being connected to: the first tile, and the first memory bank set; the fourth switch block being connected to: the second tile, and the second memory bank set; an input of the first switch block being connected to an output of the second switch block; and an output of the third switch block being connected to an input of the fourth switch block, the method including: in a first bus state, connecting, by the first switch block, the first memory bank set to the first tile, and connecting, by the second switch block, the second memory bank set to the second tile.

In some embodiments, the method further includes: in a second bus state, connecting, by the first switch block and the second switch block, the second memory bank set to the first tile, and connecting, by the second switch block, the second memory bank set to the second tile.

In some embodiments: the activations buffer is configured to include: a first queue connected to the first multiplier, and a second queue connected to the second multiplier, the first queue includes a first register and a second register adjacent to the first register, the first register being an output register of the first queue, the first tile is further configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processing circuit further includes a first adder, the method further including, in the first state: connecting the first adder to: an output of the first multiplier, and an output of the second multiplier; and adding, by the first adder: a product received from the output of the first multiplier, and a product received from the output of the second multiplier.

In some embodiments, the processing circuit further includes a second adder, the method further including, in the second state, connecting the second adder to the output of the first multiplier.

In some embodiments, the processing circuit further includes: a first accumulator connected to the first adder, and a second accumulator connected to the second adder, the first accumulator including a register, the method further including, in the first state: adding, by the first accumulator, to a value in the register of the first accumulator, a sum received from the first adder, to form an accumulated value of the first accumulator, and storing, by the first accumulator, the accumulated value of the first accumulator in the register of the first accumulator.

In some embodiments, the second accumulator includes a register and the method further includes, in the second state, adding, by the second accumulator, to a value in the register of the second accumulator, a sum received from the second adder, to form an accumulated value of the second accumulator, and storing, by the second accumulator, the accumulated value of the second accumulator in the register of the second accumulator.

According to some embodiments of the present disclosure, there is provided a method for calculating with a means for processing, the means for processing including: a first tile, a second tile, a memory, an input bus, and an output bus, the input bus being connected to: the memory, the first tile, and the second tile, the first tile including: a first weight register, a second weight register, an activations buffer, a first multiplier, and a second multiplier, the first tile being configured to perform a first convolution of an array of activations with a kernel of weights; the memory including: a first memory bank set, and a second memory bank set; the input bus including: a first segmented bus for data propagating in a first direction, and a second segmented bus for data propagating in a second direction, opposite the first direction; the first segmented bus including: a first switch block, and a second switch block; the first switch block being connected to the first tile, and the first memory bank set; the second switch block being connected to the second tile, and the second memory bank set; the second segmented bus including: a third switch block, and a fourth switch block; the third switch block being connected to the first tile, and the first memory bank set; the fourth switch block being connected to the second tile, and the second memory bank set; an input of the first switch block being connected to an output of the second switch block; and an output of the third switch block being connected to an input of the fourth switch block, the method including: in a first bus state, connecting, by the first switch block, the first memory bank set to the first tile, and connecting, by the second switch block, the second memory bank set to the second tile.

According to some embodiments of the present disclosure, there is provided a processor, including: a first tile, a second tile, a memory, and a bus, the bus being connected to: the memory, the first tile, and the second tile, the first tile including: a first weight register, a second weight register, an activations buffer, a first multiplier, and a second multiplier, the activations buffer being configured to include: a first queue connected to the first multiplier, and a second queue connected to the second multiplier, the first queue including a first register and a second register adjacent to the first register, the first register being an output register of the first queue, the first tile being configured: in a first state: to multiply, in the first multiplier, a first weight by an activation from the output register of the first queue, and in a second state: to multiply, in the first multiplier, the first weight by an activation from the second register of the first queue.

In some embodiments, in the second state, the output register of the first queue contains zero.

In some embodiments, the processor further includes: a first adder, configured, in the first state: to be connected to an output of the first multiplier, and an output of the second multiplier, and to add; a product received from the output of the first multiplier, and a product received from the output of the second multiplier.

In some embodiments, the processor further includes a second adder, configured, in the second state, to be connected to the output of the first multiplier.

In some embodiments, the processor further includes: a first accumulator connected to the first adder, and a second accumulator connected to the second adder, the first accumulator including a register and being configured, in the first state: to add to a value in the register of the first accumulator a sum received from the first adder, to form an accumulated value of the first accumulator, and to store the accumulated value of the first accumulator in the register of the first accumulator.

In some embodiments, the second accumulator includes a register and is configured, in the second state, to add to a value in the register of the second accumulator a sum received from the second adder, to form an accumulated value of the second accumulator, and to store the accumulated value of the second accumulator in the register of the second accumulator.

In some embodiments, the processor further includes an activation zero skip control circuit configured to: determine whether the output register of the first queue contains zero, and in response to determining that the output register of the first queue contains zero, cause the first tile to operate in the second state.

In some embodiments, the processor further includes a multiplexer having: an input, at a single-port side of the multiplexer, connected to the first multiplier, a first output, at a multi-port side of the multiplexer, connected to the first adder, and a second output, at the multi-port side of the multiplexer, connected to the second adder.

In some embodiments, the activation zero skip control circuit is configured to control the multiplexer, in the first state, to connect the input to the first output, and in the second state, to connect the input to the second output.

In some embodiments: the second queue includes a first register and a second register adjacent to the first register, the first register being an output register of the second queue; and the first tile is further configured, in a third state, to multiply, in the first multiplier, the first weight by an activation from the second register of the second queue.

According to some embodiments of the present disclosure, there is provided a method for calculating with a processing circuit, the processing circuit including: a first tile, a second tile, a memory, and a bus, the bus being connected to: the memory, the first tile, and the second tile, the first tile including: a first weight register, a second weight register, an activations buffer, a first multiplier, and a second multiplier, the activations buffer being configured to include: a first queue connected to the first multiplier, and a second queue connected to the second multiplier, the first queue including a first register and a second register adjacent to the first register, the first register being an output register of the first queue, the method including: in a first state: multiplying, by the first multiplier, a first weight by an activation from the output register of the first queue, and in a second state: multiplying, by the first multiplier, the first weight by an activation from the second register of the first queue.

In some embodiments, in the second state, the output register of the first queue contains zero.

In some embodiments, the processing circuit further includes a first adder, the method further including, in the first state: connecting the first adder to: an output of the first multiplier, and an output of the second multiplier, and adding, by the first adder: a product received from the output of the first multiplier, and a product received from the output of the second multiplier.

In some embodiments, the processing circuit further includes a second adder, the method further including, in the second state, connecting the second adder to the output of the first multiplier.

In some embodiments, the processing circuit further includes: a first accumulator connected to the first adder, and a second accumulator connected to the second adder, the first accumulator including a register, the method further including, in the first state: adding, by the first accumulator, to a value in the register of the first accumulator, a sum received from the first adder, to form an accumulated value of the first accumulator, and storing, by the first accumulator, the accumulated value of the first accumulator in the register of the first accumulator.

In some embodiments, the second accumulator includes a register and the method further includes, in the second state, adding, by the second accumulator, to a value in the register of the second accumulator, a sum received from the second adder, to form an accumulated value of the second accumulator, and storing, by the second accumulator, the accumulated value of the second accumulator in the register of the second accumulator.

In some embodiments, the processing circuit further includes an activation zero skip control circuit, and the method further includes: determining, by the activation zero skip control circuit, whether the output register of the first queue contains zero, and in response to determining that the output register of the first queue contains zero, causing the first tile to operate in the second state.

In some embodiments, the processing circuit further includes a multiplexer having: an input, at a single-port side of the multiplexer, connected to the first multiplier, a first output, at a multi-port side of the multiplexer, connected to the first adder, and a second output, at the multi-port side of the multiplexer, connected to the second adder.

In some embodiments, the method further includes controlling, by the activation zero skip control circuit, the multiplexer: in the first state, to connect the input to the first output, and in the second state, to connect the input to the second output.

According to some embodiments of the present disclosure, there is provided a method for calculating with a means for processing, the means for processing including: a first tile, a second tile, a memory, and a bus, the bus being connected to: the memory, the first tile, and the second tile, the first tile including: a first weight register, a second weight register, an activations buffer, a first multiplier, and a second multiplier, the activations buffer being configured to include: a first queue connected to the first multiplier, and a second queue connected to the second multiplier, the first queue including a first register and a second register adjacent to the first register, the first register being an output register of the first queue, the method including: in a first state: multiplying, in the first multiplier, a first weight by an activation from the output register of the first queue, and in a second state: multiplying, in the first multiplier, the first weight by an activation from the second register of the first queue.

BRIEF DESCRIPTION OF THE DRAWINGS

These and other features and advantages of the present disclosure will be appreciated and understood with reference to the specification, claims, and appended drawings wherein:

FIG. 1I is a block diagram of a portion of a neural processor, according to an embodiment of the present disclosure;

FIG. 1MB is a block diagram of a portion of a neural processor, according to an embodiment of the present disclosure;

FIG. 1O is a block diagram of a neural processor, according to an embodiment of the present disclosure;

FIG. 1Q is a size table, according to an embodiment of the present disclosure;

FIG. 1R is a tensor diagram, according to an embodiment of the present disclosure;

FIG. 1S is a tensor diagram, according to an embodiment of the present disclosure;

FIG. 1T is a data flow diagram in a portion of a neural processor, according to an embodiment of the present disclosure;

FIG. 1U is a data flow diagram in a portion of a neural processor, according to an embodiment of the present disclosure;

FIG. 1V is a block diagram of a portion of a neural processor, according to an embodiment of the present disclosure;

FIG. 1WB is a data flow diagram in a portion of a neural processor, according to an embodiment of the present disclosure;

FIG. 1WC is a data flow diagram in a portion of a neural processor, according to an embodiment of the present disclosure;

FIG. 1WD is a data flow diagram in a portion of a neural processor, according to an embodiment of the present disclosure;

FIG. 1WE is a data flow diagram in a portion of a neural processor, according to an embodiment of the present disclosure;

FIG. 2AB is a convolution diagram, according to an embodiment of the present disclosure;

FIG. 2AC is a convolution diagram, according to an embodiment of the present disclosure;

FIG. 2AD is a convolution diagram, according to an embodiment of the present disclosure;

FIG. 2BA is a convolution diagram, according to an embodiment of the present disclosure;

FIG. 2BB is a convolution diagram, according to an embodiment of the present disclosure;

FIG. 2BC is a convolution diagram, according to an embodiment of the present disclosure;

FIG. 2BD is a convolution diagram, according to an embodiment of the present disclosure;

FIG. 2BE is a convolution diagram, according to an embodiment of the present disclosure;

FIG. 2BF is a convolution diagram, according to an embodiment of the present disclosure;

FIG. 2BG is a convolution diagram, according to an embodiment of the present disclosure;

FIG. 2BH is a convolution diagram, according to an embodiment of the present disclosure;

FIG. 2BI is a convolution diagram, according to an embodiment of the present disclosure;

FIG. 2BJ is a convolution diagram, according to an embodiment of the present disclosure;

FIG. 2BK is a convolution diagram, according to an embodiment of the present disclosure;

FIG. 2BL is a convolution diagram, according to an embodiment of the present disclosure;

FIG. 2BM is a convolution diagram, according to an embodiment of the present disclosure;

FIG. 2DB is a convolution diagram, according to an embodiment of the present disclosure;

FIG. 2DC is a convolution diagram, according to an embodiment of the present disclosure;

FIG. 2DD is a convolution diagram, according to an embodiment of the present disclosure;

FIG. 2DE is a convolution diagram, according to an embodiment of the present disclosure;

FIG. 2DF is a convolution diagram, according to an embodiment of the present disclosure;

FIG. 2DG is a convolution diagram, according to an embodiment of the present disclosure;

FIG. 2DH is a convolution diagram, according to an embodiment of the present disclosure;

FIG. 2DI is a convolution diagram, according to an embodiment of the present disclosure;

FIG. 2DJ is a convolution diagram, according to an embodiment of the present disclosure;

FIG. 2DK is a convolution diagram, according to an embodiment of the present disclosure;

FIG. 2DL is a convolution diagram, according to an embodiment of the present disclosure;

FIG. 2DM is a convolution diagram, according to an embodiment of the present disclosure;

FIG. 2DN is a convolution diagram, according to an embodiment of the present disclosure;

FIG. 2DO is a convolution diagram, according to an embodiment of the present disclosure;

FIG. 2DP is a convolution diagram, according to an embodiment of the present disclosure;

FIG. 2DQ is a convolution diagram, according to an embodiment of the present disclosure;

FIG. 2DR is a convolution diagram, according to an embodiment of the present disclosure;

FIG. 2DS is a convolution diagram, according to an embodiment of the present disclosure;

FIG. 2DT is a convolution diagram, according to an embodiment of the present disclosure;

FIG. 2DV is a convolution diagram, according to an embodiment of the present disclosure;

FIG. 2DW is a convolution diagram, according to an embodiment of the present disclosure;

FIG. 2DX is a convolution diagram, according to an embodiment of the present disclosure;

FIG. 2E is a read table, according to an embodiment of the present disclosure;

FIG. 2F is a read table, according to an embodiment of the present disclosure;

FIG. 2GA is a convolution diagram, according to an embodiment of the present disclosure;

FIG. 2GB is a convolution diagram, according to an embodiment of the present disclosure;

FIG. 2HA is a convolution diagram, according to an embodiment of the present disclosure;

FIG. 2HB is a convolution diagram, according to an embodiment of the present disclosure;

FIG. 2HC is a convolution diagram, according to an embodiment of the present disclosure;

FIG. 2HD is a convolution diagram, according to an embodiment of the present disclosure;

FIG. 3AB is a data flow diagram, according to an embodiment of the present disclosure;

FIG. 3AC is a data flow diagram, according to an embodiment of the present disclosure;

FIG. 3AD is a data flow diagram, according to an embodiment of the present disclosure;

FIG. 3AE is a data flow diagram, according to an embodiment of the present disclosure;

FIG. 3AF is a data flow diagram, according to an embodiment of the present disclosure;

FIG. 3AG is a data flow diagram, according to an embodiment of the present disclosure;

FIG. 3AH is a data flow diagram, according to an embodiment of the present disclosure;

FIG. 3AI is a data flow diagram, according to an embodiment of the present disclosure;

FIG. 3AJ is a data flow diagram, according to an embodiment of the present disclosure;

FIG. 3AK is a data flow diagram, according to an embodiment of the present disclosure;

FIG. 3BB is a data diagram, according to an embodiment of the present disclosure;

FIG. 3BC is a data diagram, according to an embodiment of the present disclosure;

FIG. 3CB is a block diagram of a portion of a neural processor, according to an embodiment of the present disclosure;

FIG. 3EB is a block diagram of a portion of a neural processor, according to an embodiment of the present disclosure;

FIG. 3FB is a data diagram, according to an embodiment of the present disclosure;

FIG. 3FC is a block diagram of a portion of a neural processor, according to an embodiment of the present disclosure;

FIG. 3GB is a block diagram of a portion of a neural processor, according to an embodiment of the present disclosure;

FIG. 3GC is a block diagram of a portion of a neural processor, according to an embodiment of the present disclosure;

FIG. 3GD is a block diagram of a portion of a neural processor, according to an embodiment of the present disclosure;

FIG. 3HB is a block diagram of a portion of a neural processor, according to an embodiment of the present disclosure;

FIG. 3HC is a block diagram of a portion of a neural processor, according to an embodiment of the present disclosure;

FIG. 3HD is a data diagram, according to an embodiment of the present disclosure;

FIG. 3IB is a block diagram of a portion of a neural processor, according to an embodiment of the present disclosure;

FIG. 3IC is a block diagram of a portion of a neural processor, according to an embodiment of the present disclosure;

FIG. 3ID is a block diagram of a portion of a neural processor, according to an embodiment of the present disclosure;

FIG. 3IE is a data diagram, according to an embodiment of the present disclosure;

FIG. 3IF is a data diagram, according to an embodiment of the present disclosure;

FIG. 3JB is a data flow diagram, according to an embodiment of the present disclosure;

FIG. 3JC is a data flow diagram, according to an embodiment of the present disclosure;

FIG. 3JD is a data flow diagram, according to an embodiment of the present disclosure;

Figure 3A:
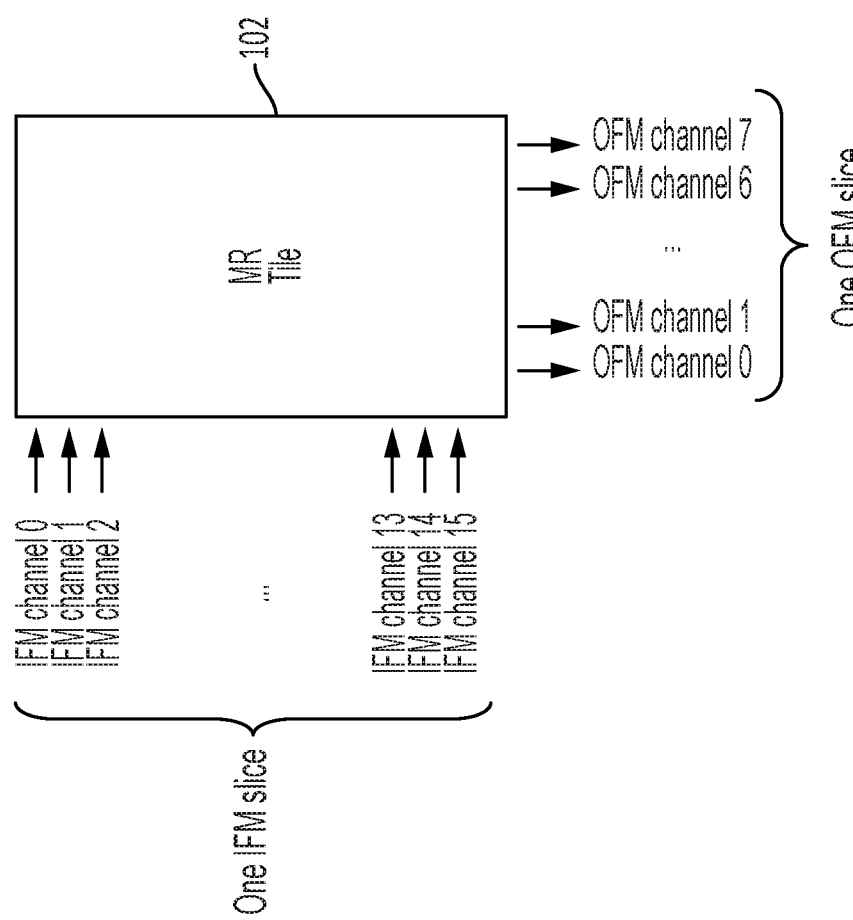
FIG. 3AA is a block diagram of a portion of a neural processor, according to an embodiment of the present disclosure.
Figure 3A:
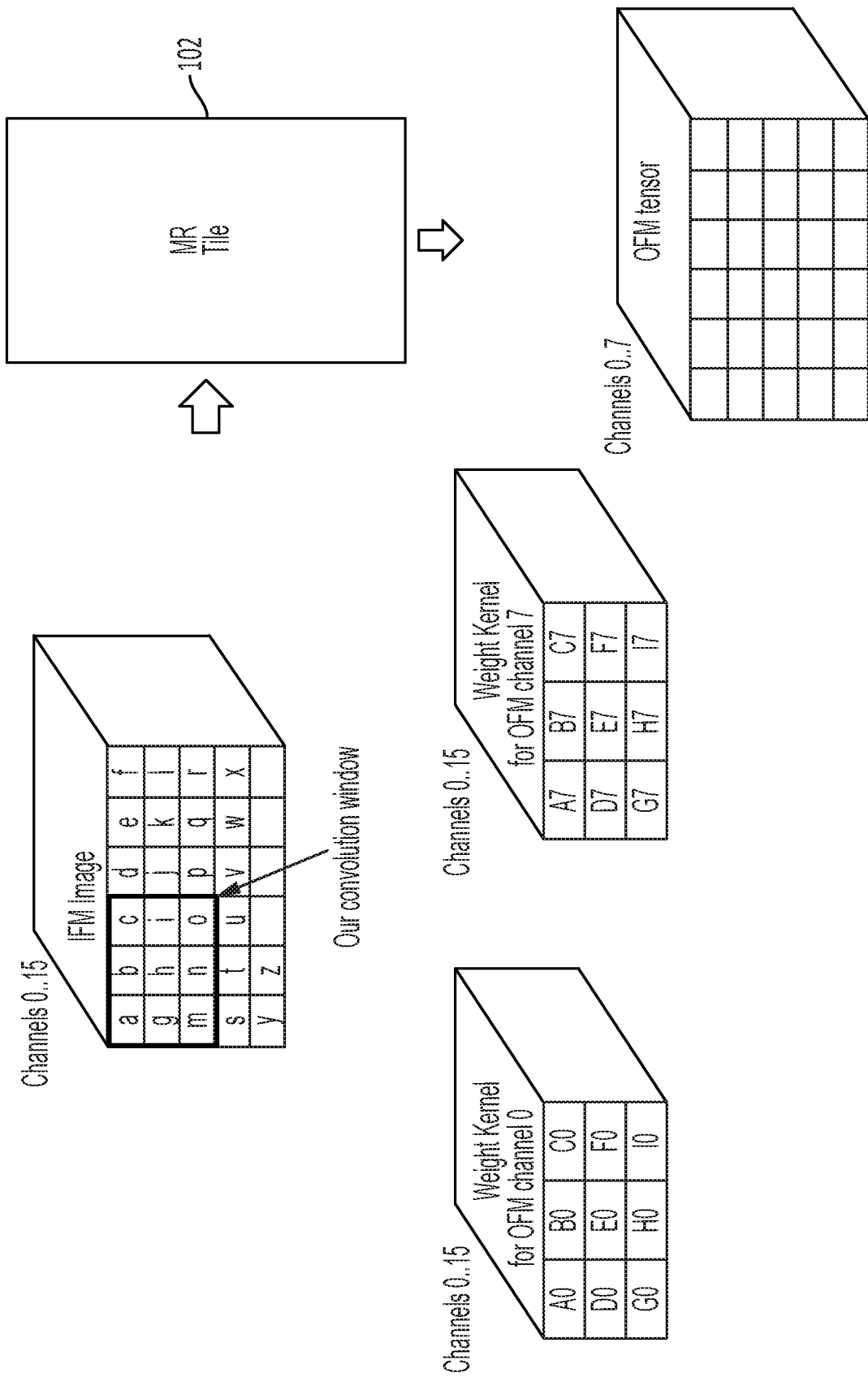
Figure 3A:
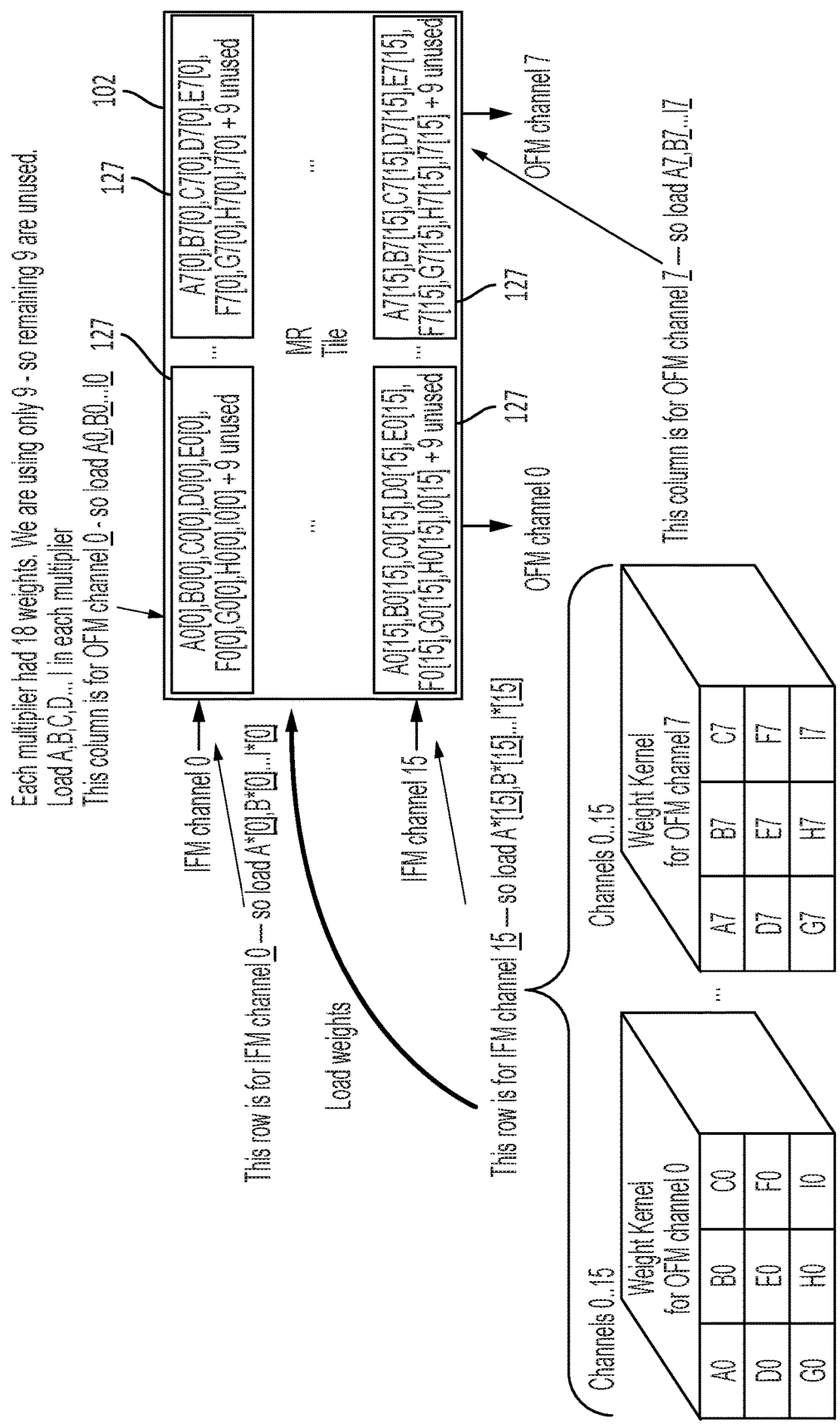
Figure 3A:
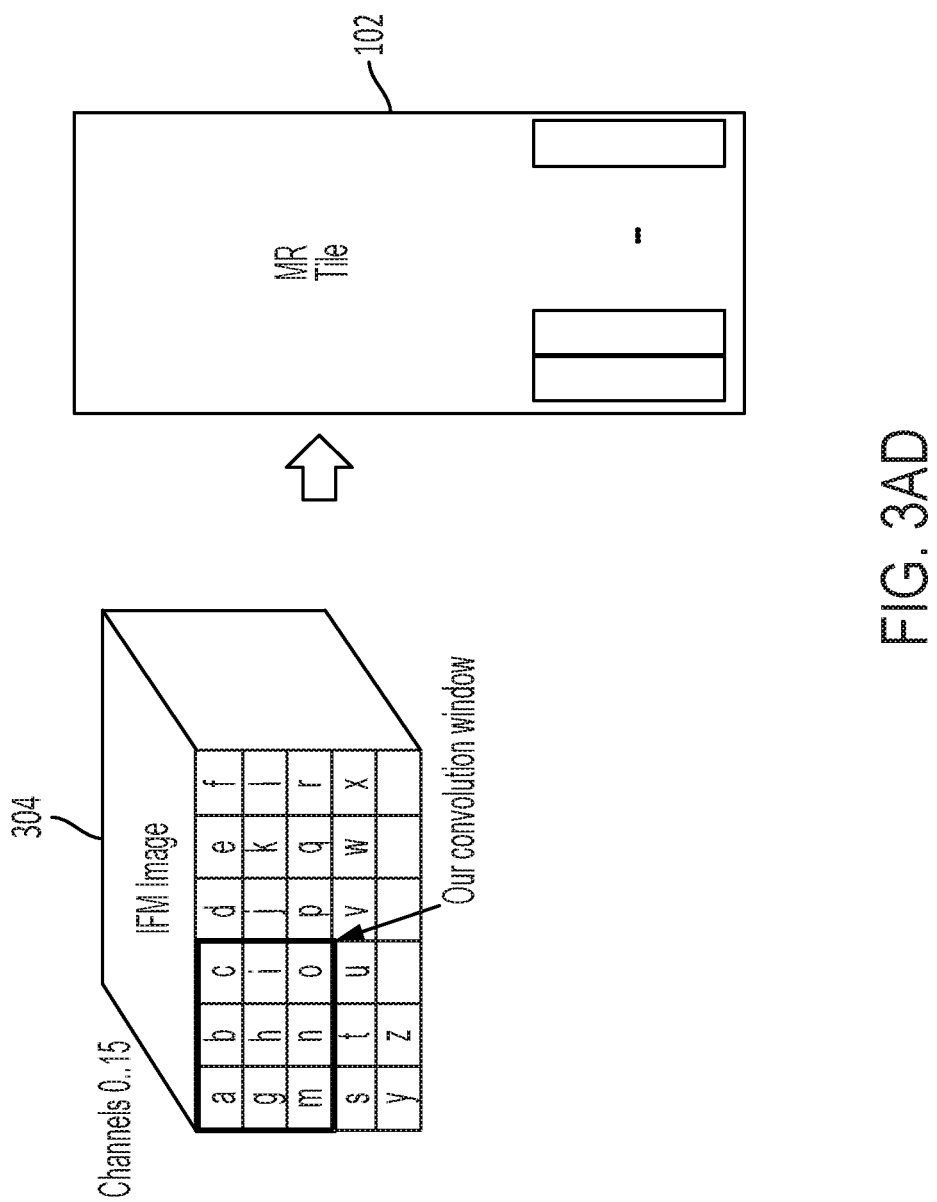
Figure 3A:
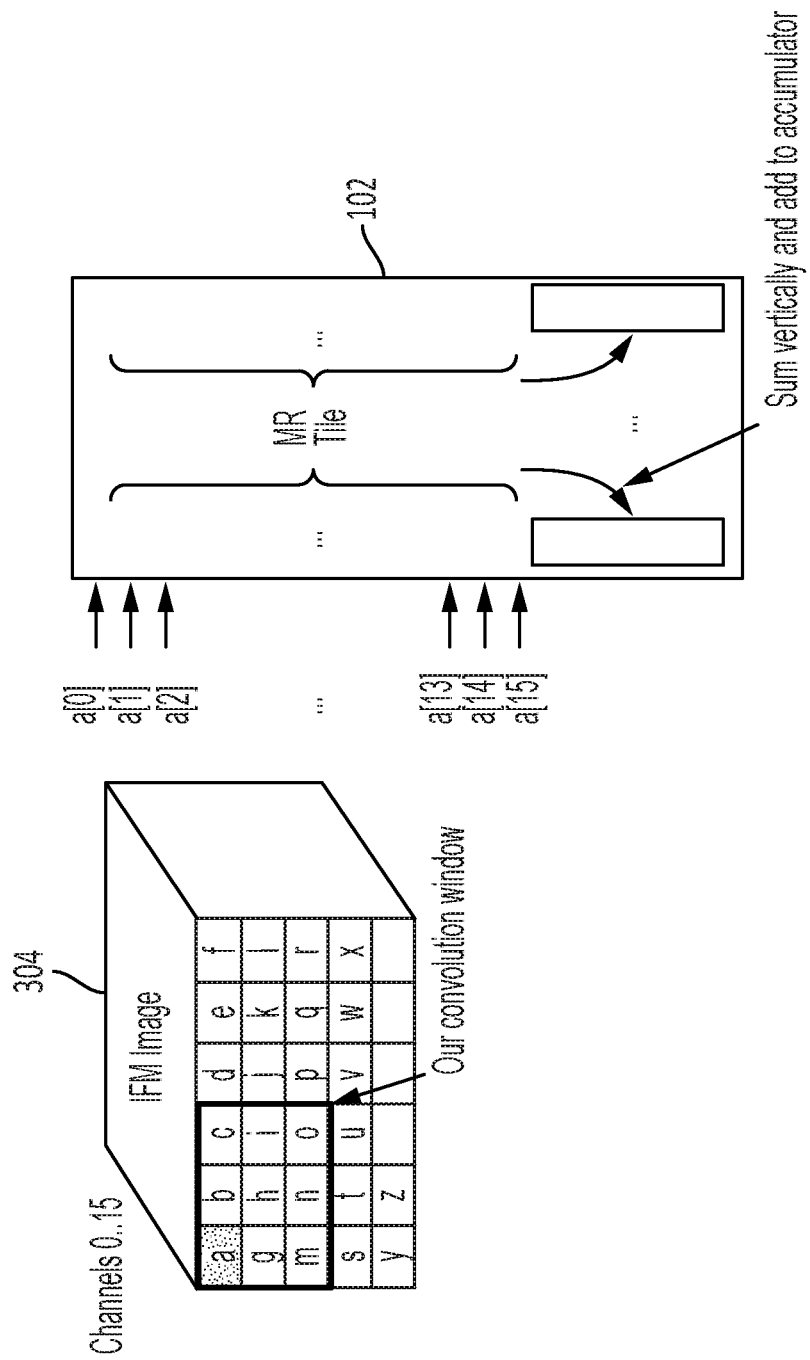
Figure 3A:
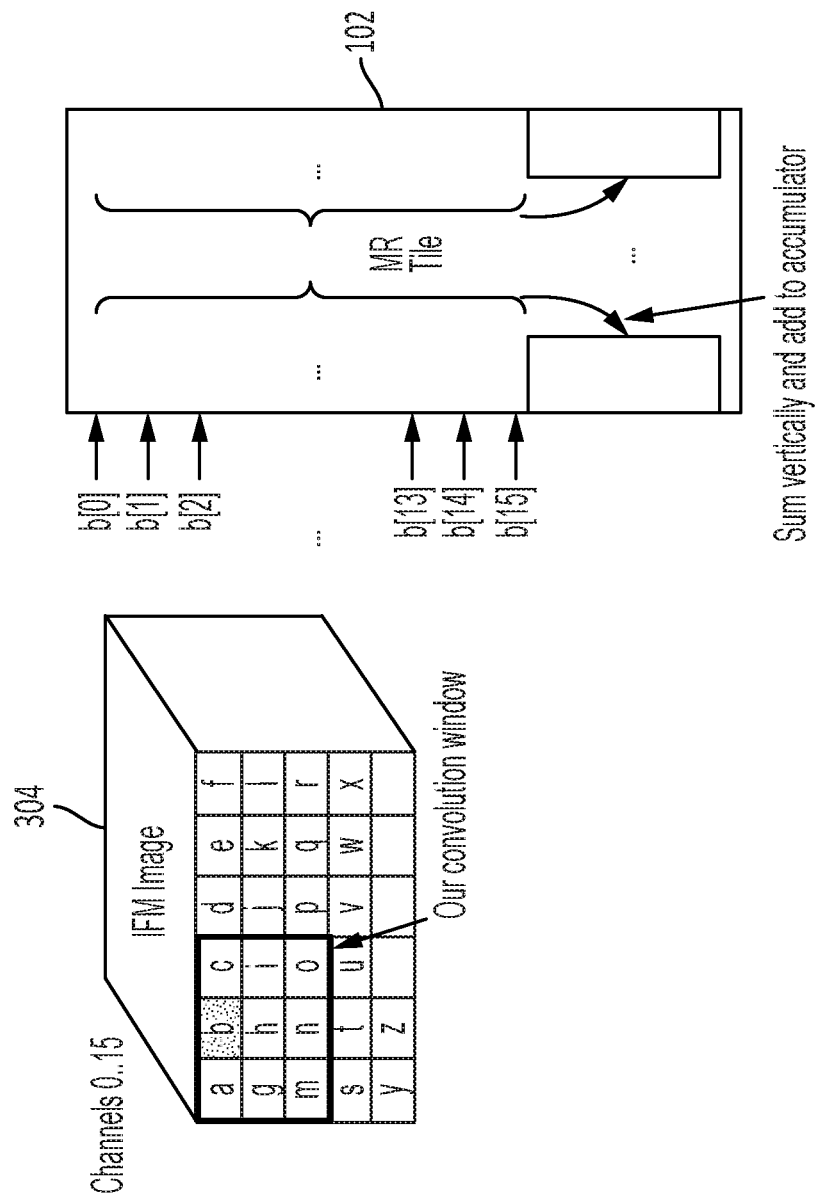
Figure 3A:
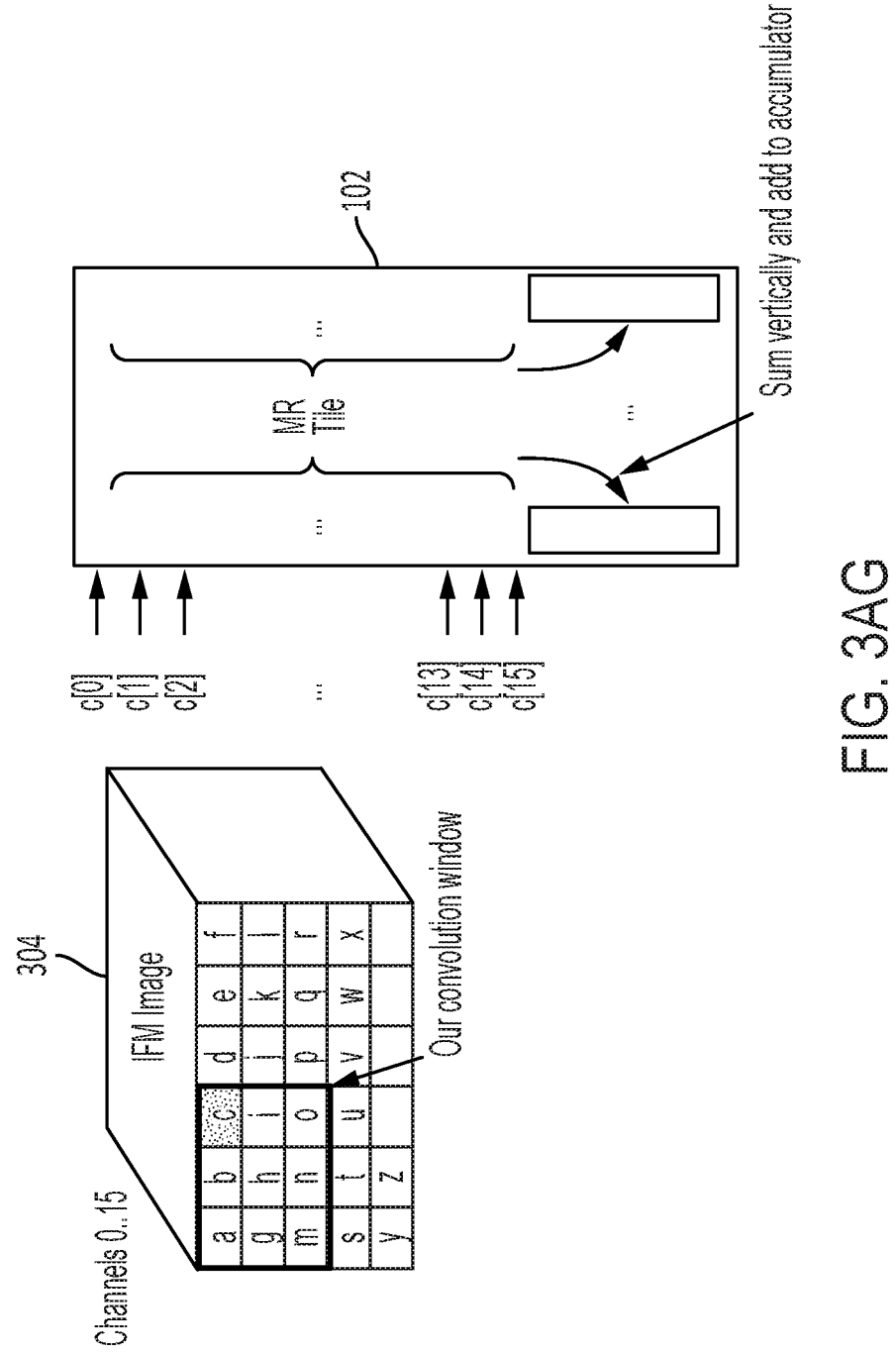
Figure 3A:
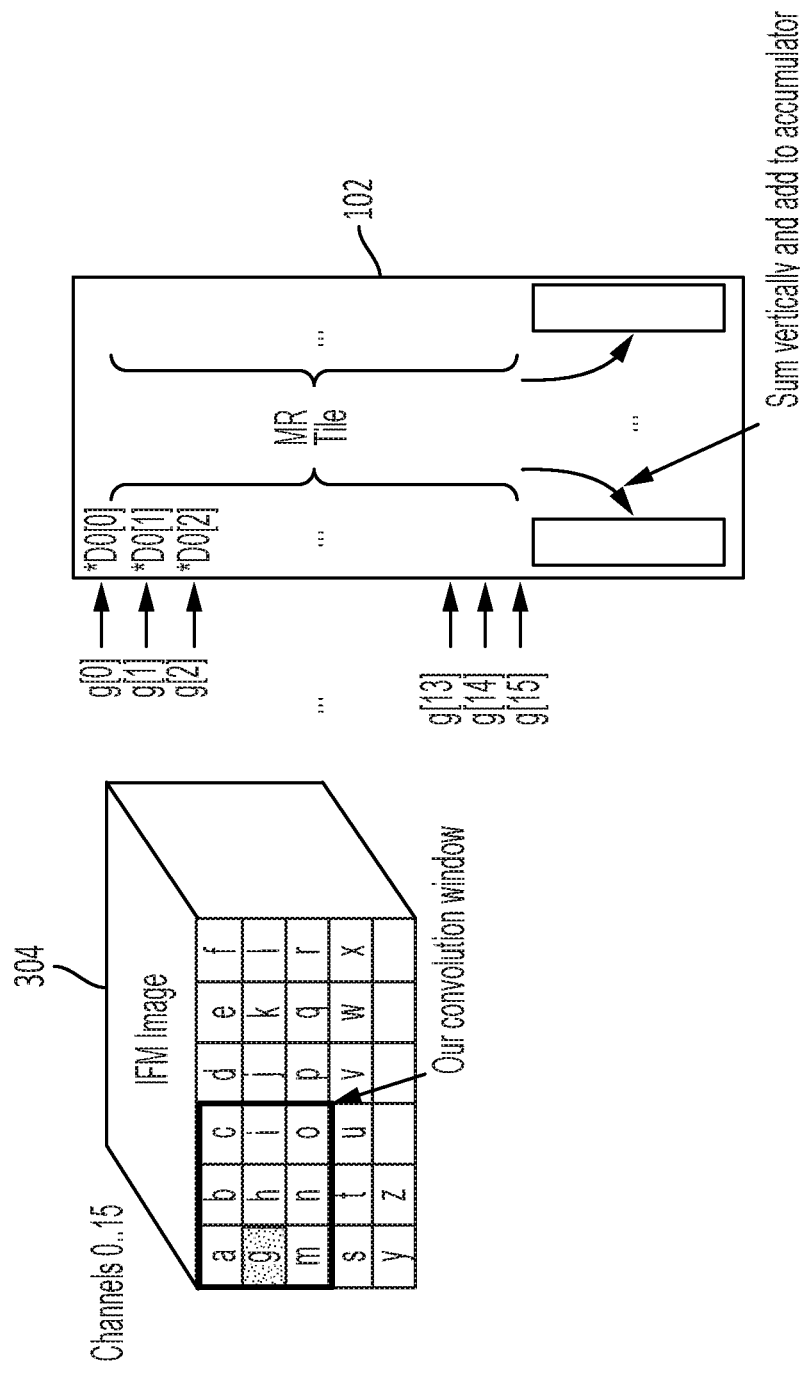
Figure 3A:
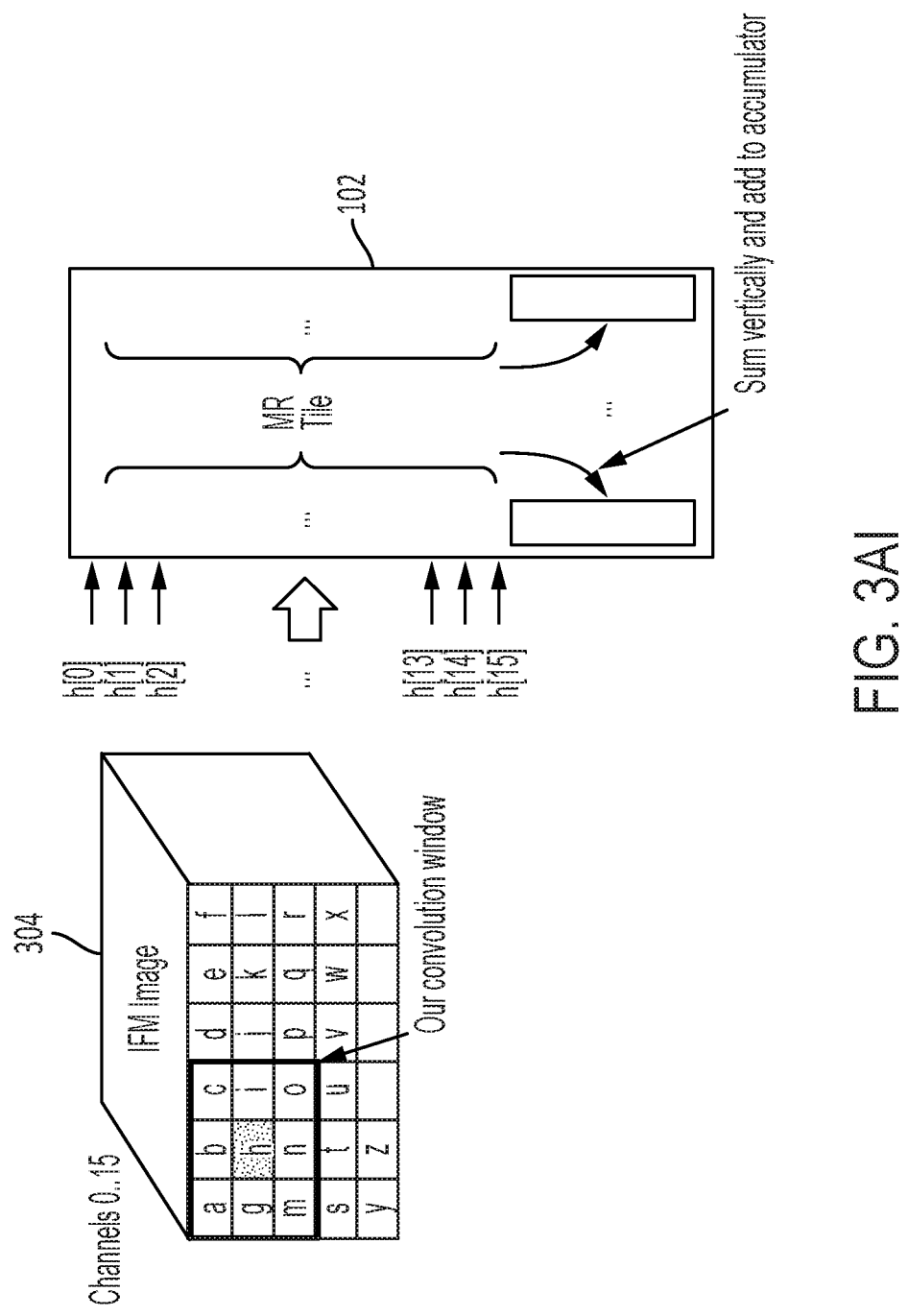
Figure 3A:
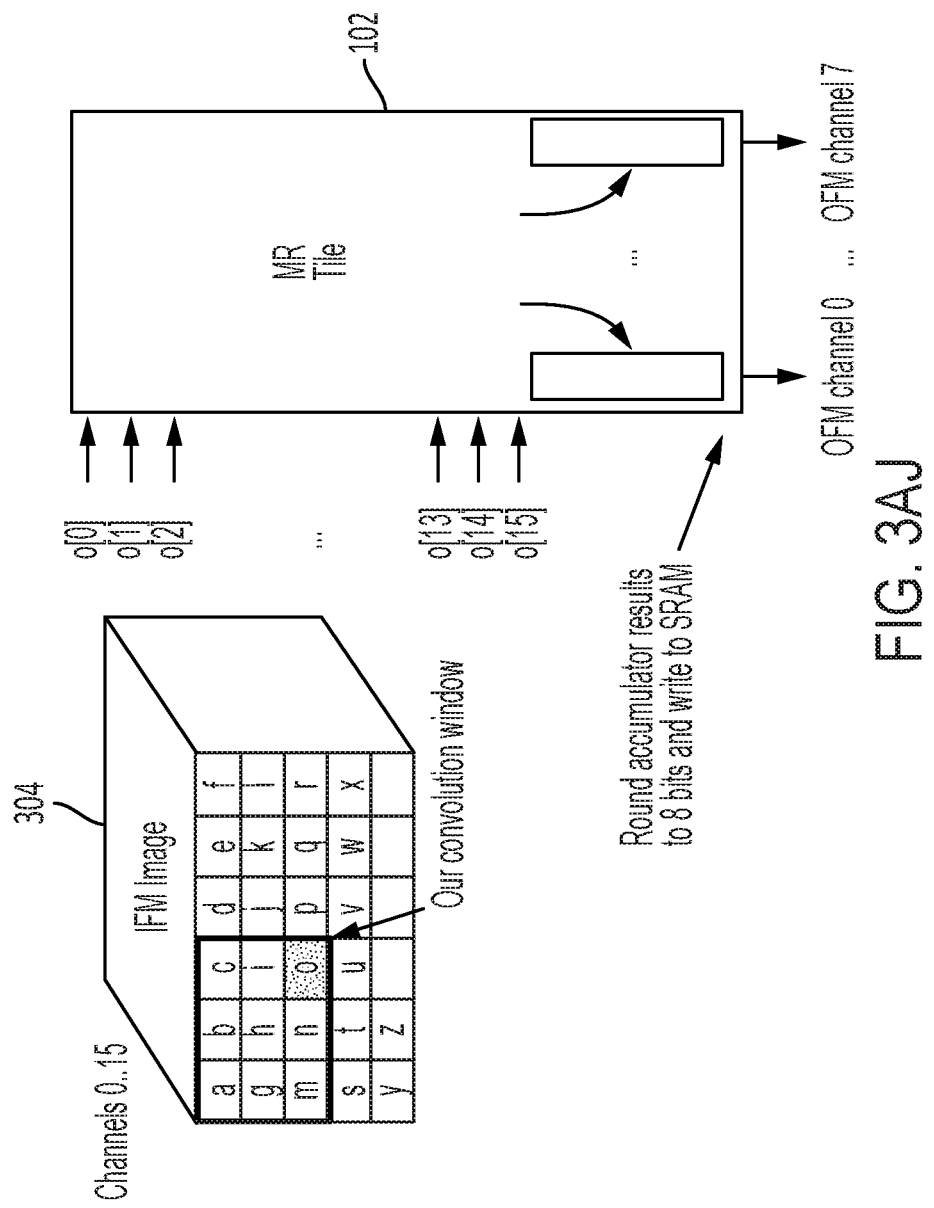
Figure 3A:
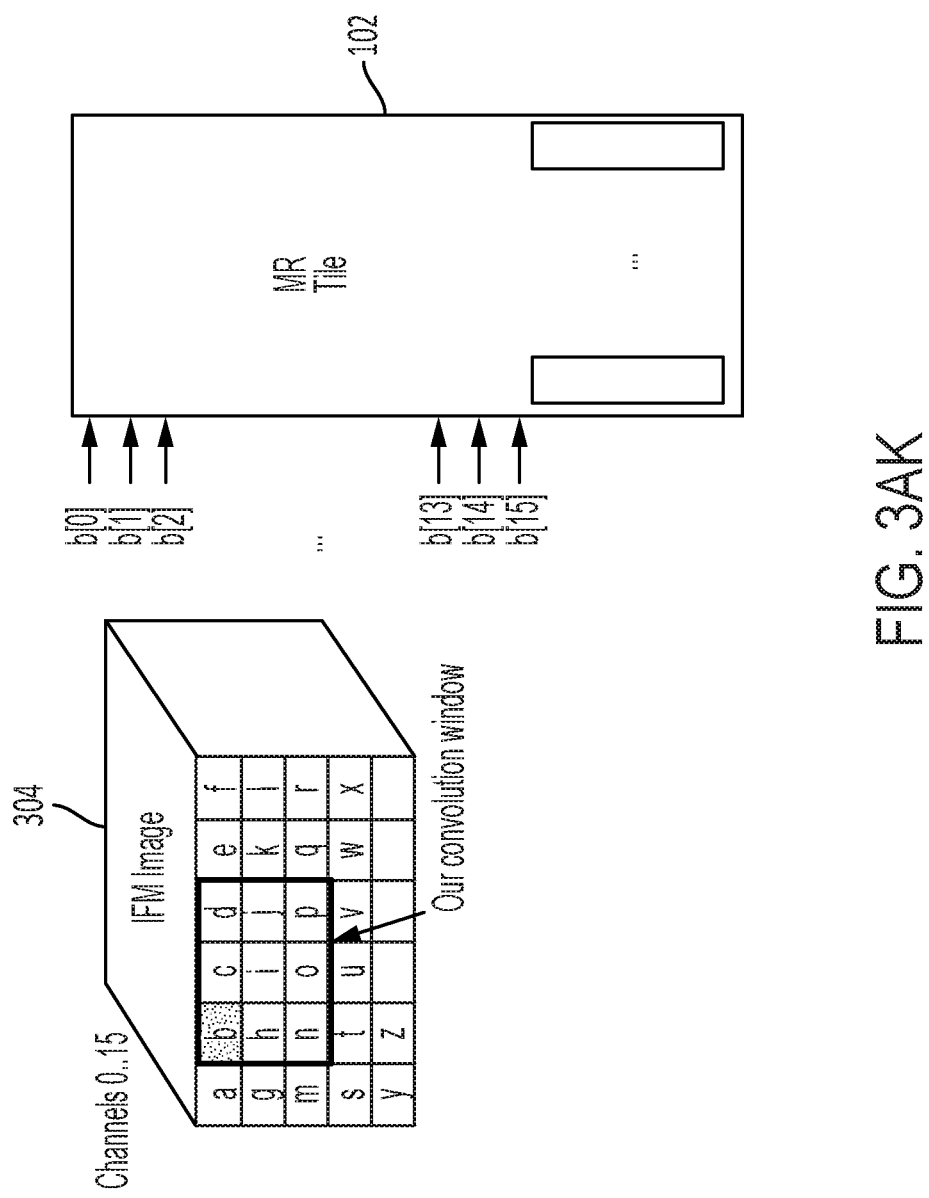
Figure 3B:
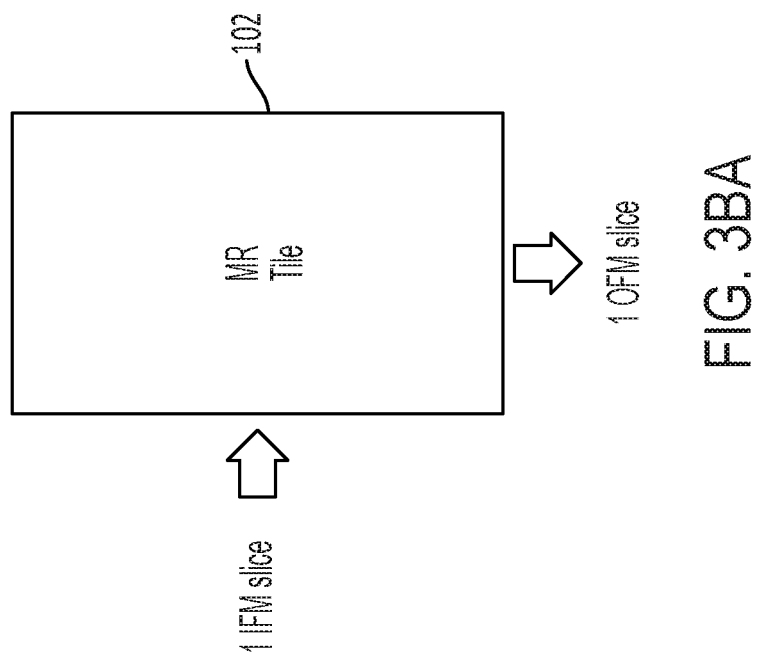
FIG. 3BA is a block diagram of a portion of a neural processor, according to an embodiment of the present disclosure.
Figure 3D:
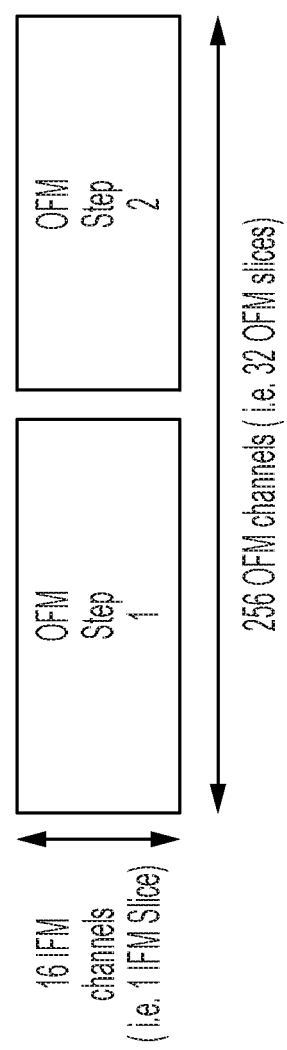
FIG. 3DA is a data diagram, according to an embodiment of the present disclosure.
Figure 3E:
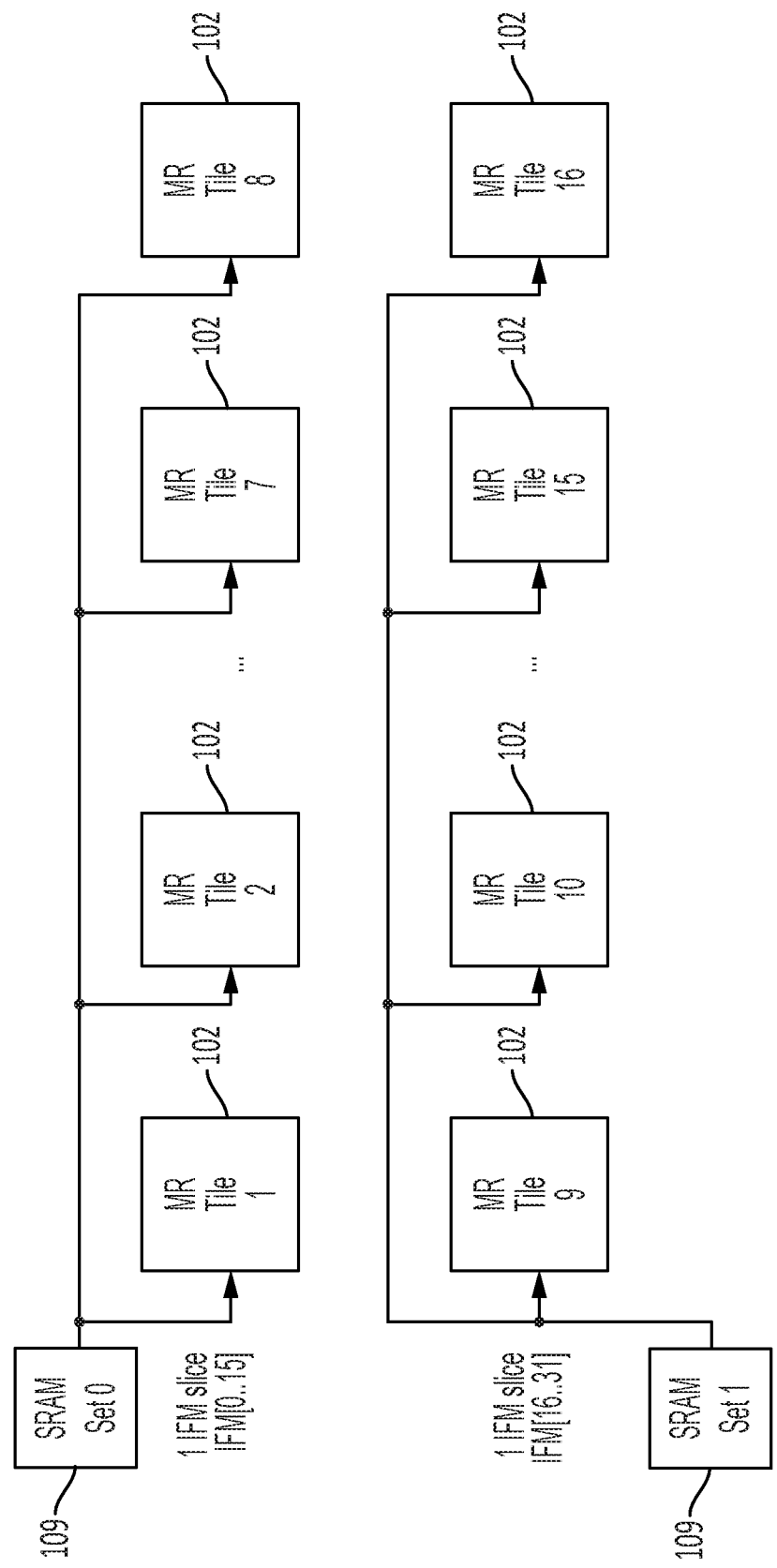
FIG. 3EA is a block diagram of a portion of a neural processor, according to an embodiment of the present disclosure.
Figure 3E:
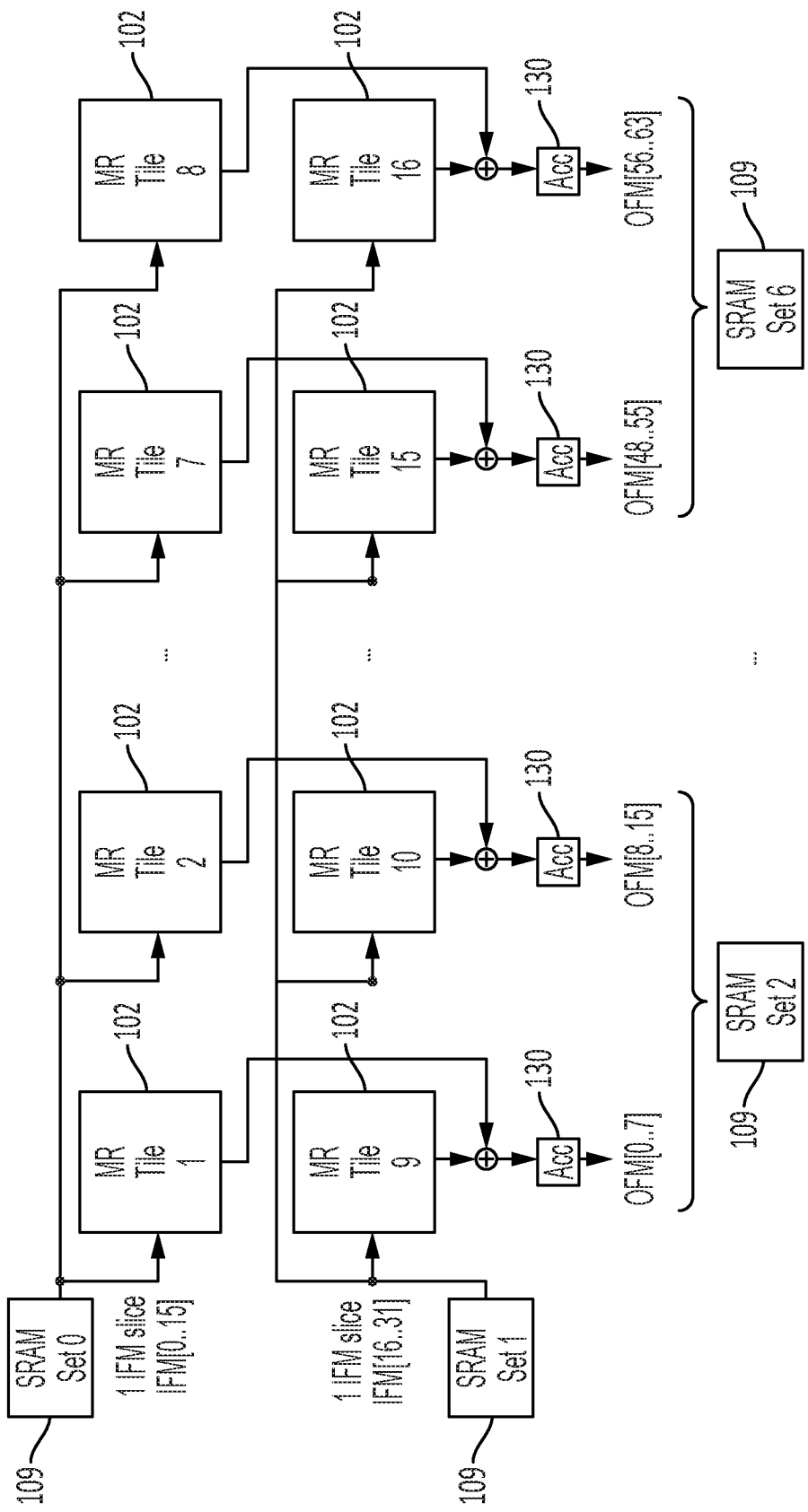
Figure 3F:
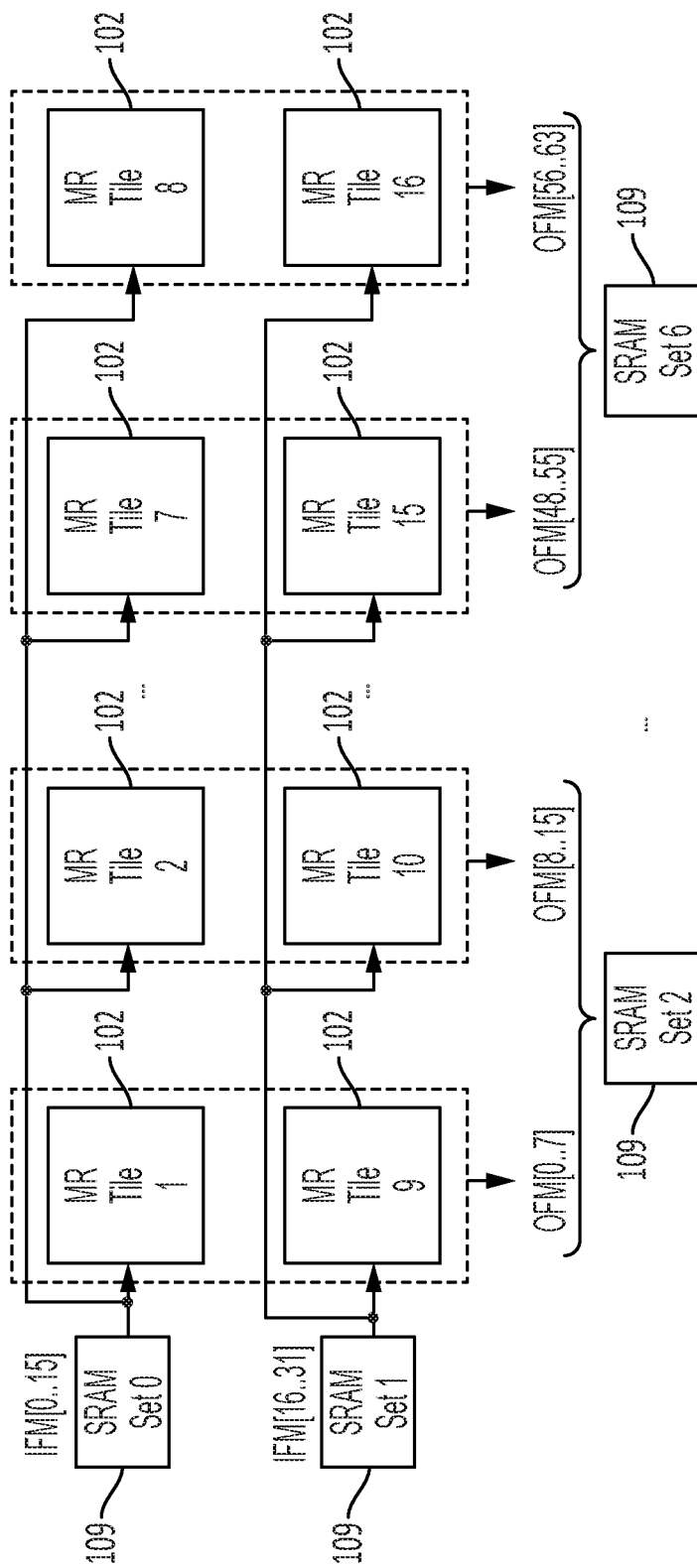
FIG. 3FA is a block diagram of a portion of a neural processor, according to an embodiment of the present disclosure.
Figure 3F:
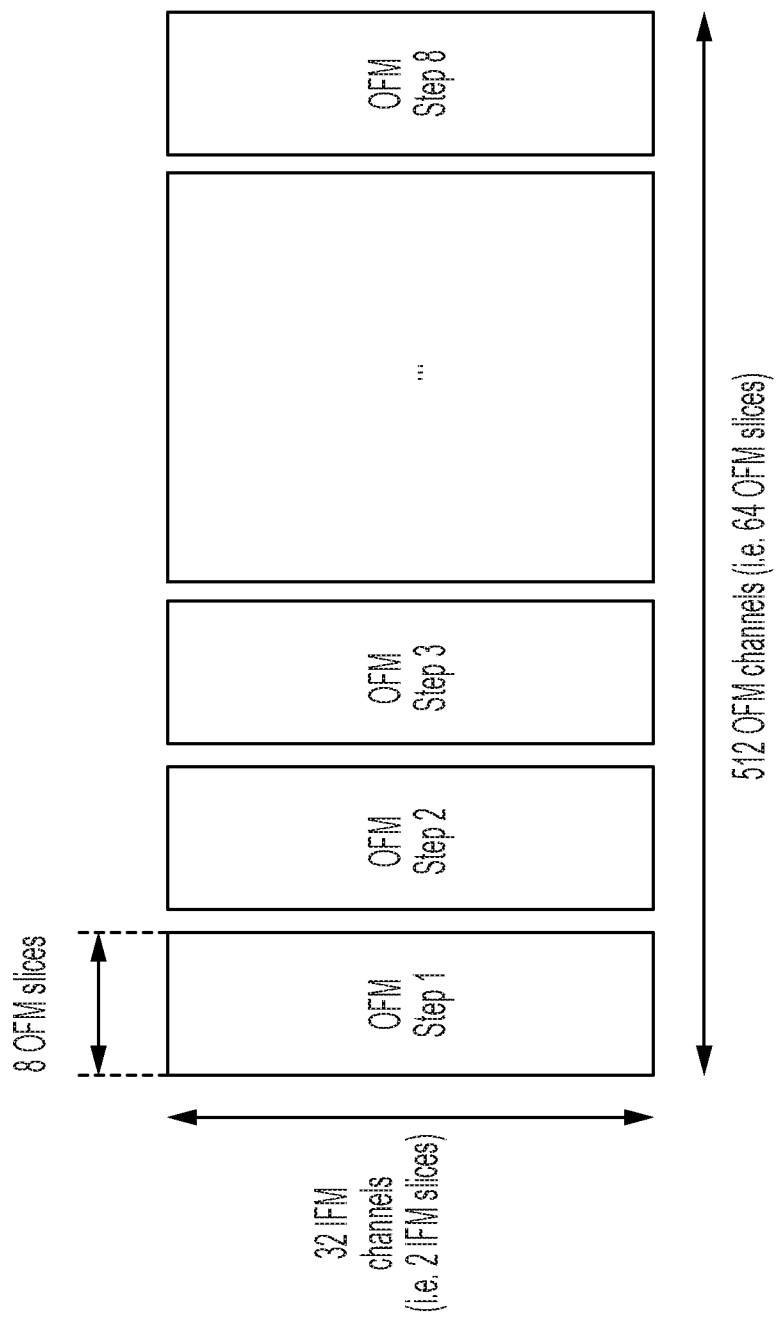
Figure 3F:
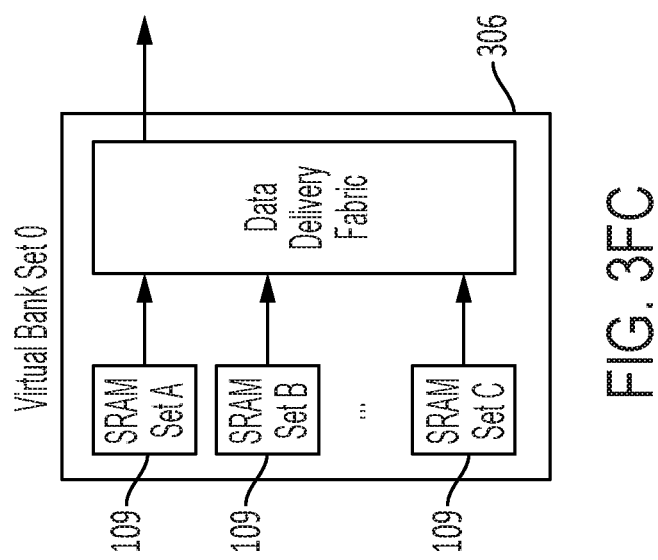
Figure 3G:
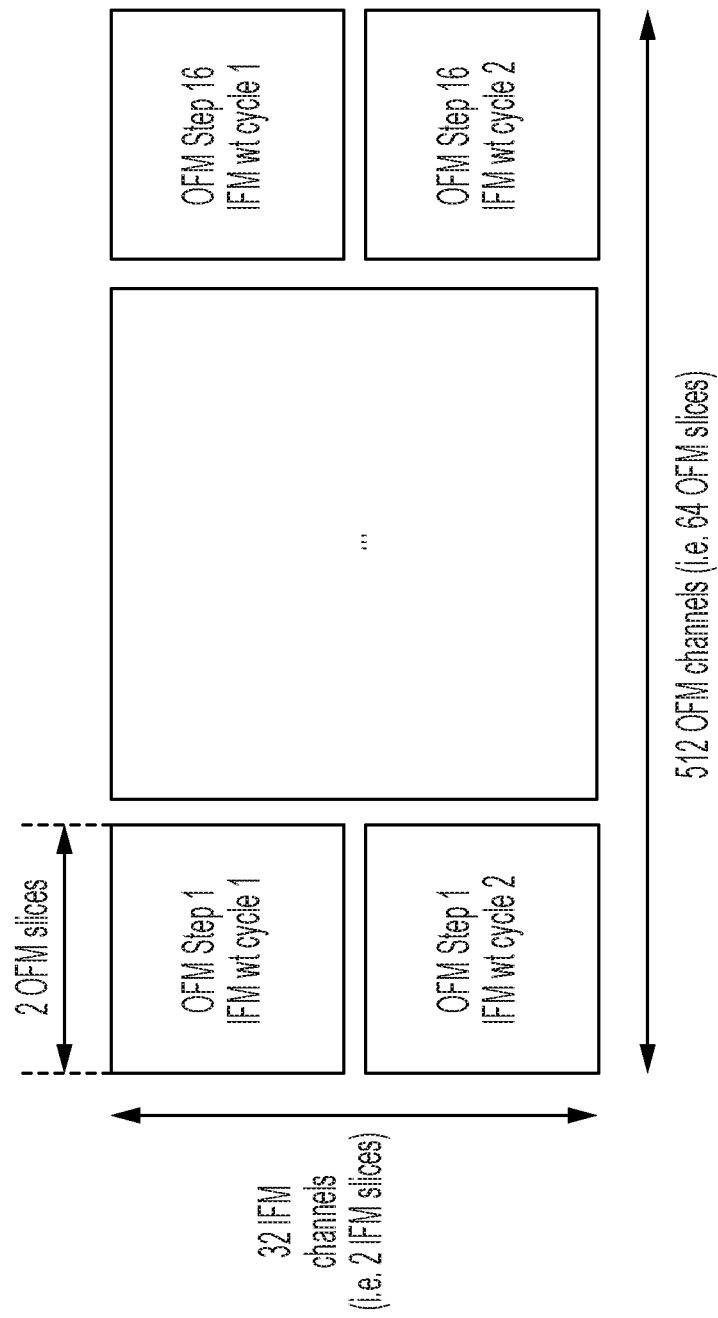
FIG. 3GA is a data diagram, according to an embodiment of the present disclosure.
Figure 3G:
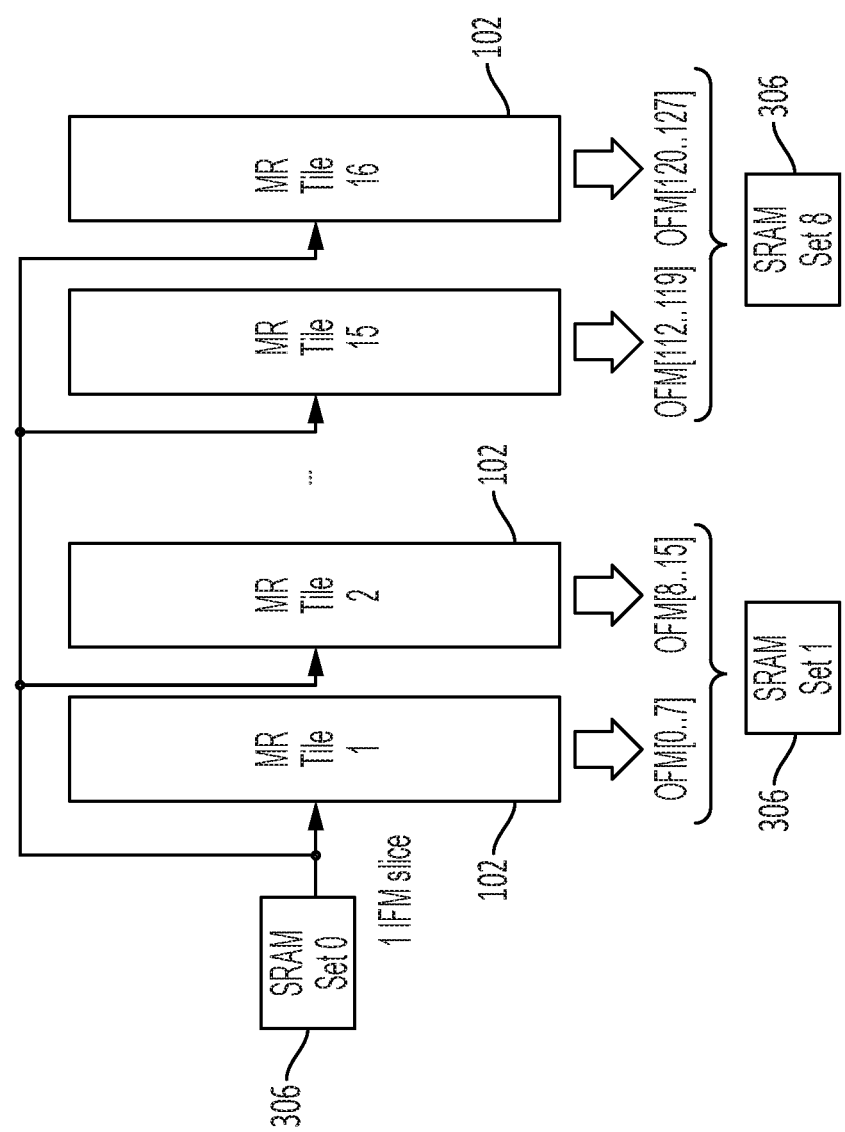
Figure 3G:
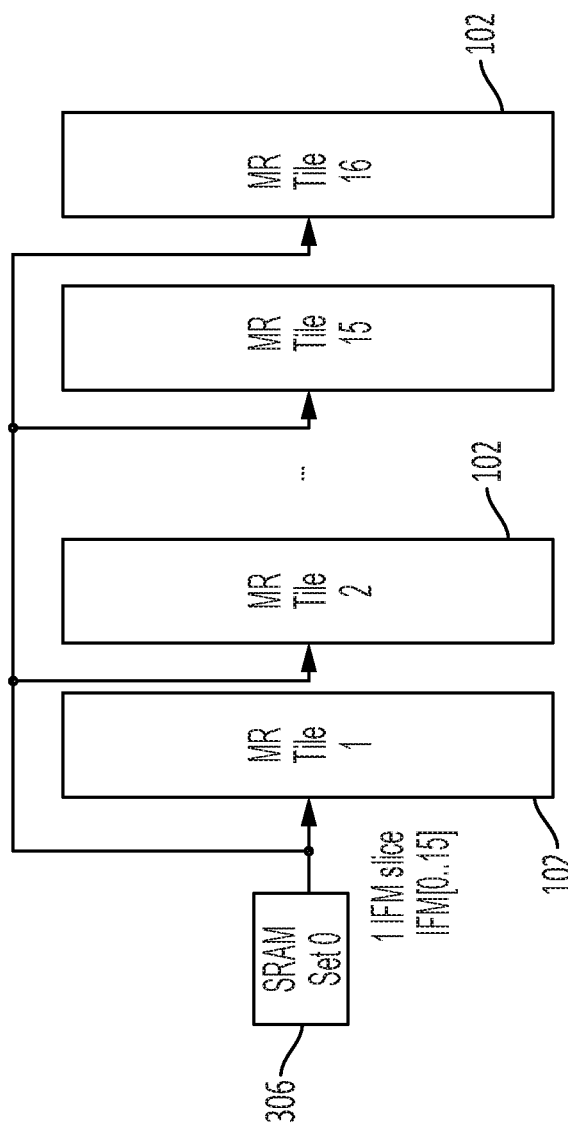
Figure 3G:
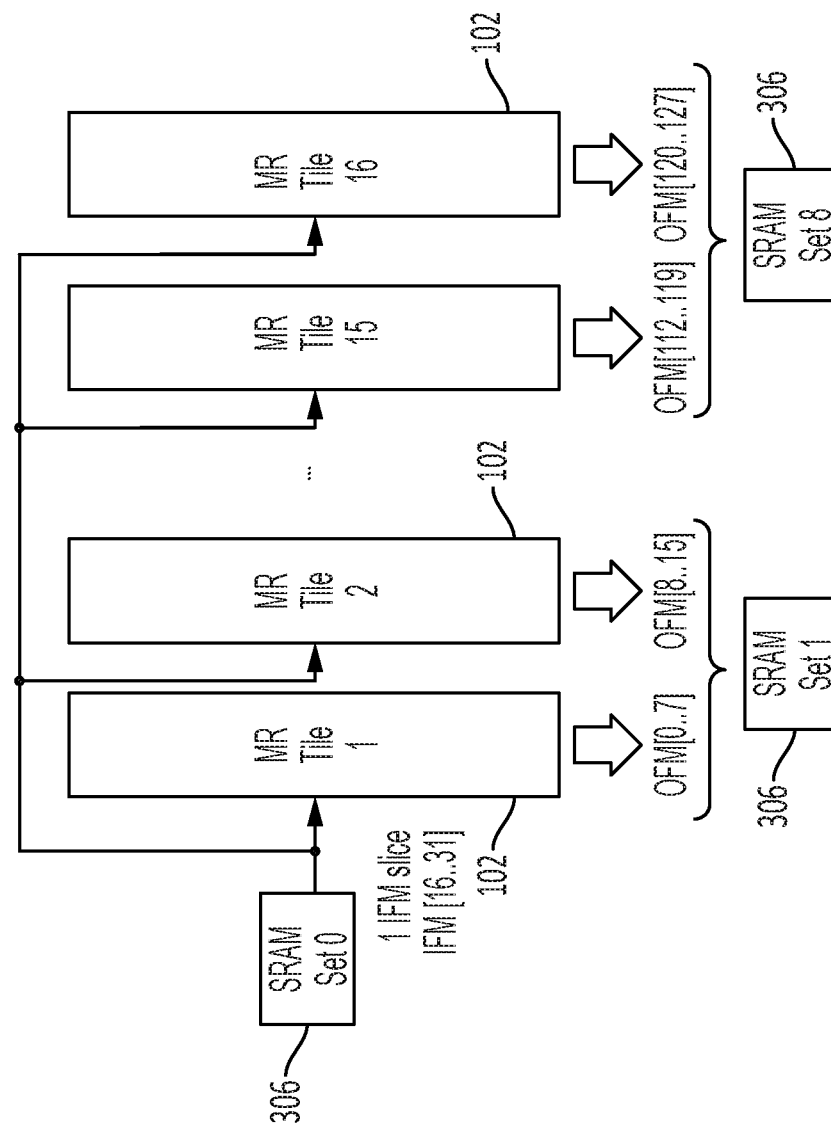
Figure 3H:
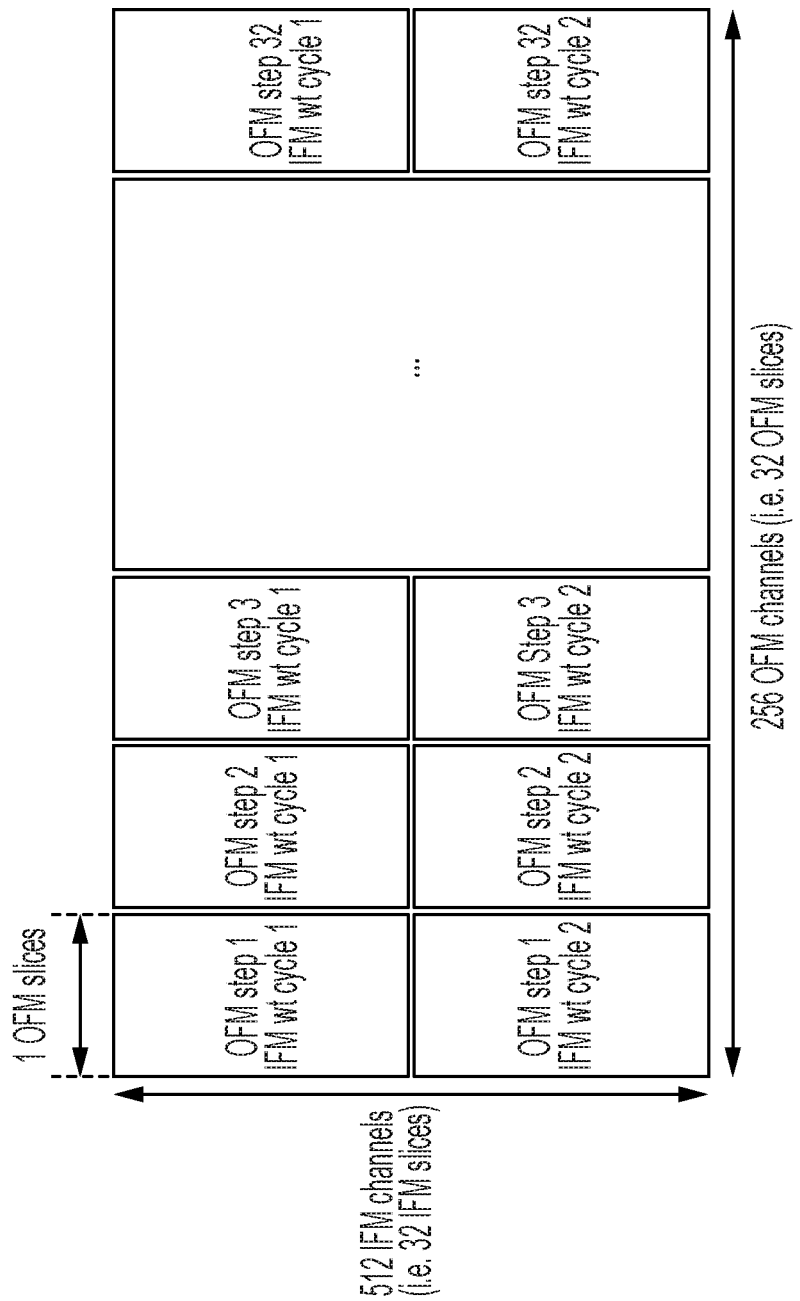
FIG. 3HA is a data diagram, according to an embodiment of the present disclosure.
Figure 3H:
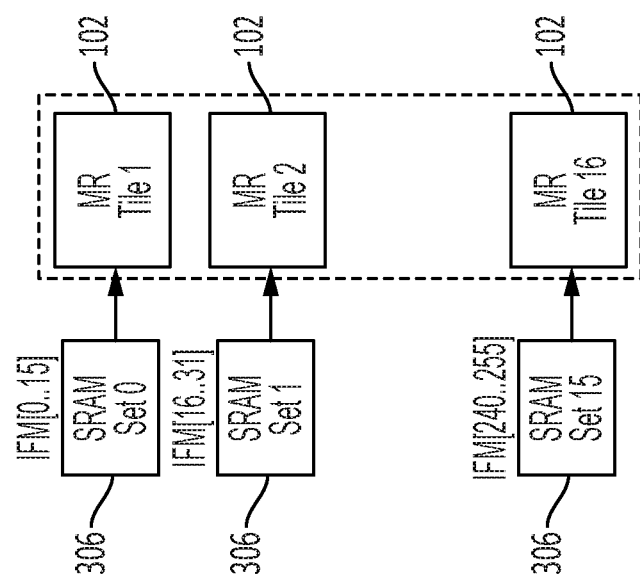
Figure 3H:
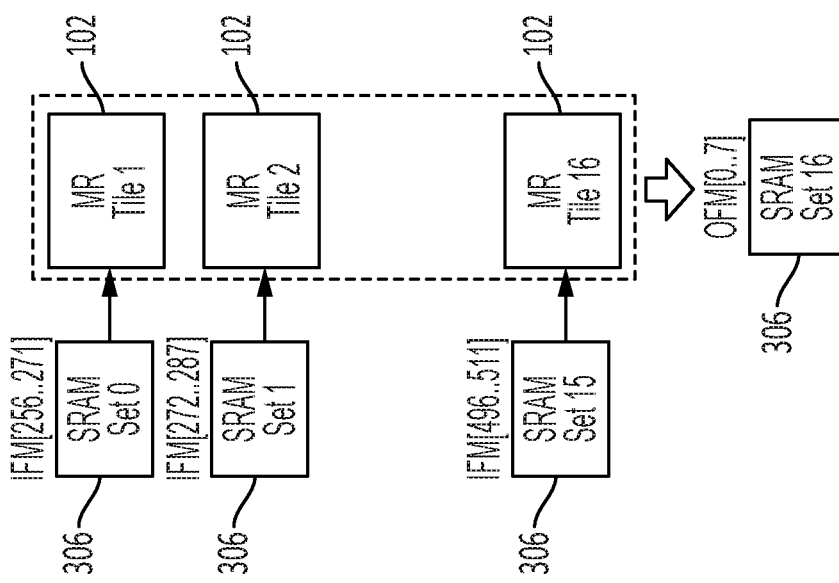
Figure 3H:
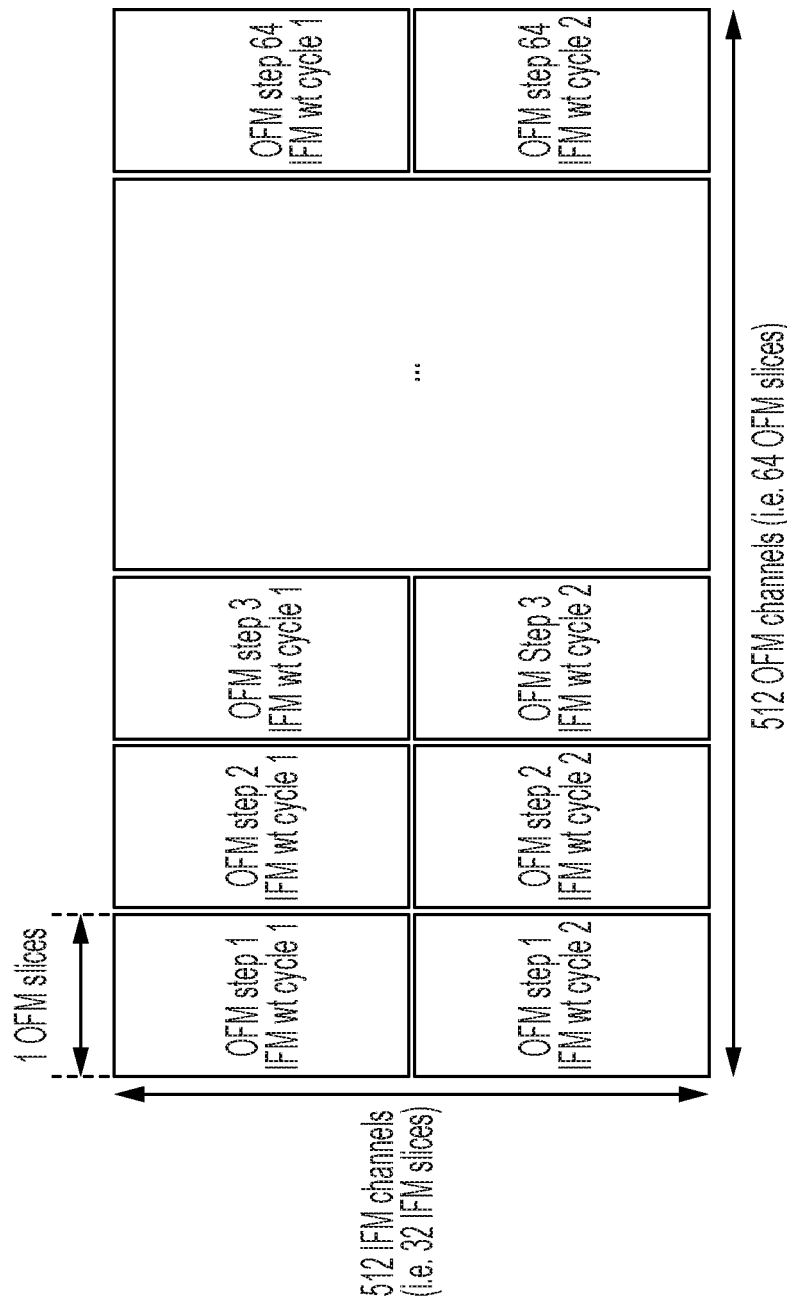
Figure 31A:
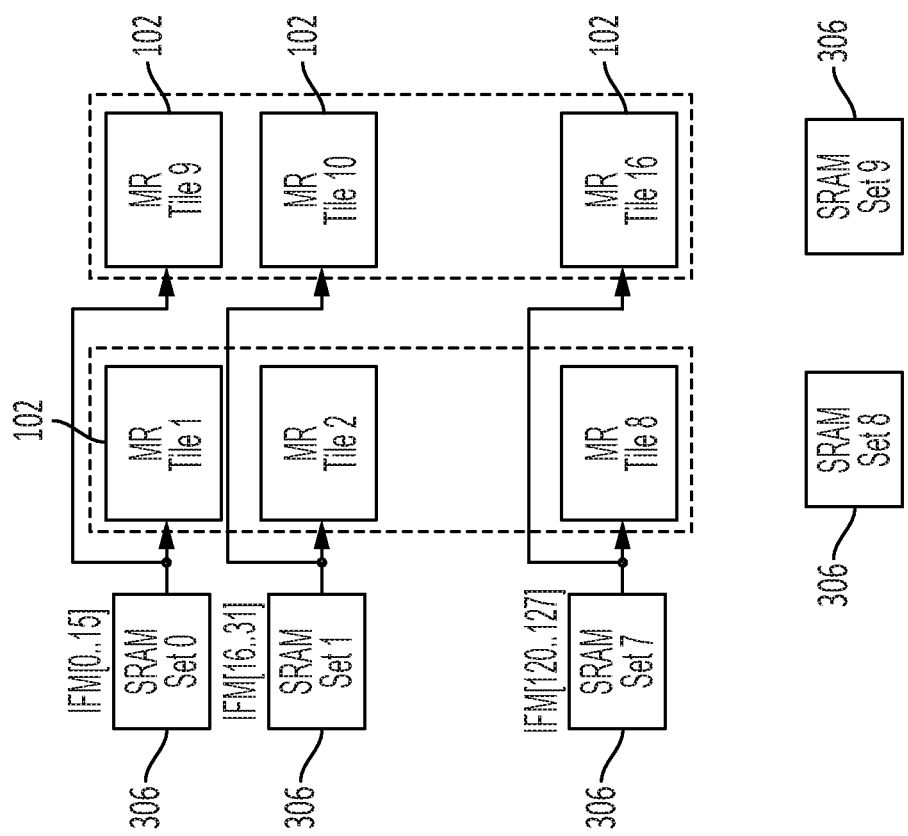
Figure 3B:
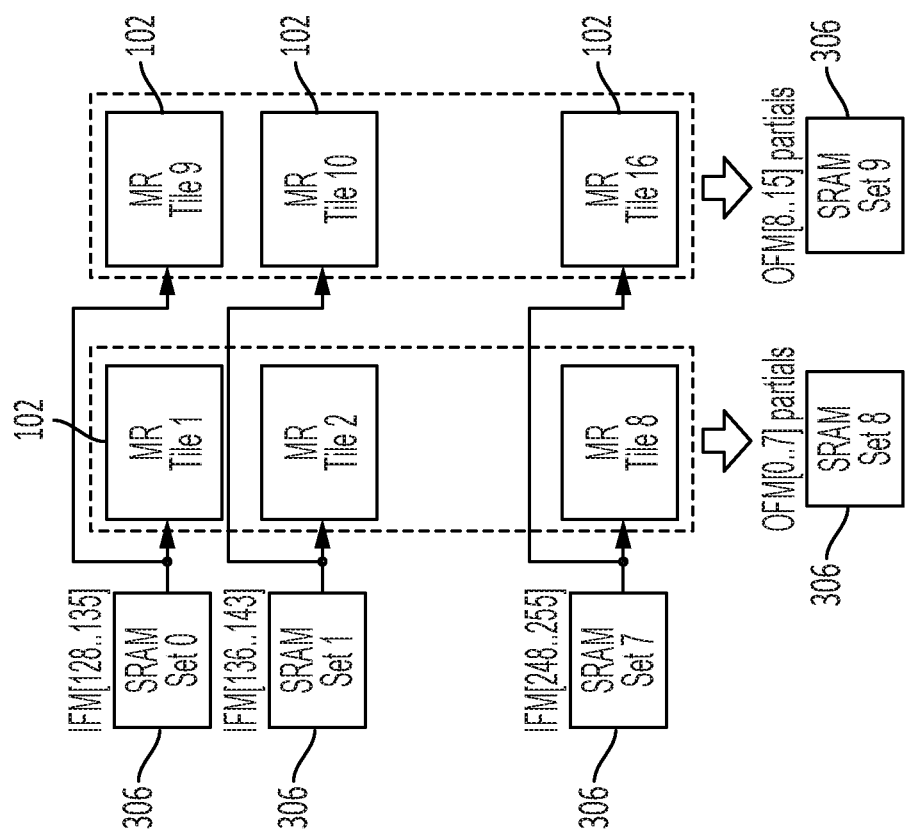
Figure 3I:
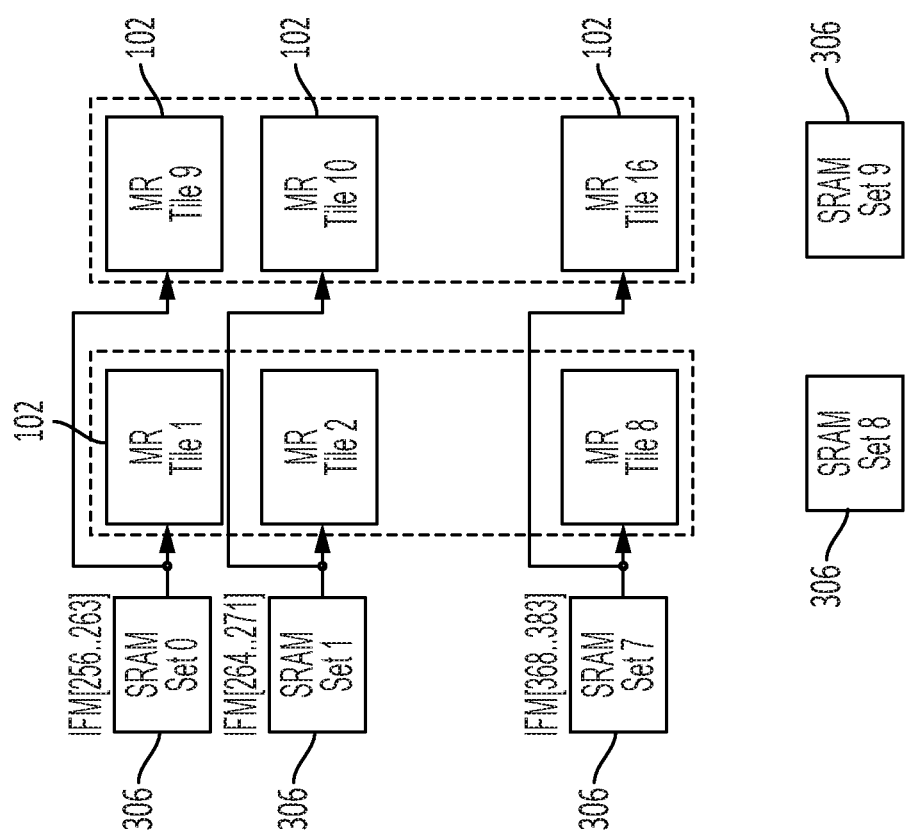
FIG. 3IA is a block diagram of a portion of a neural processor, according to an embodiment of the present disclosure.
Figure 3D:
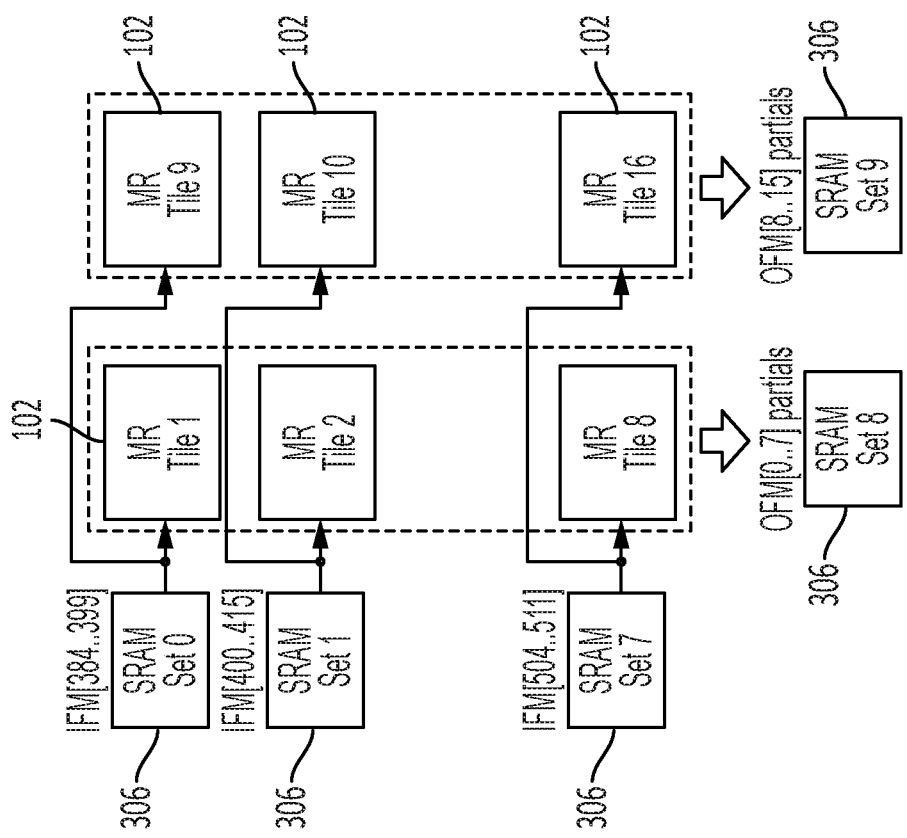
Figure 3I:
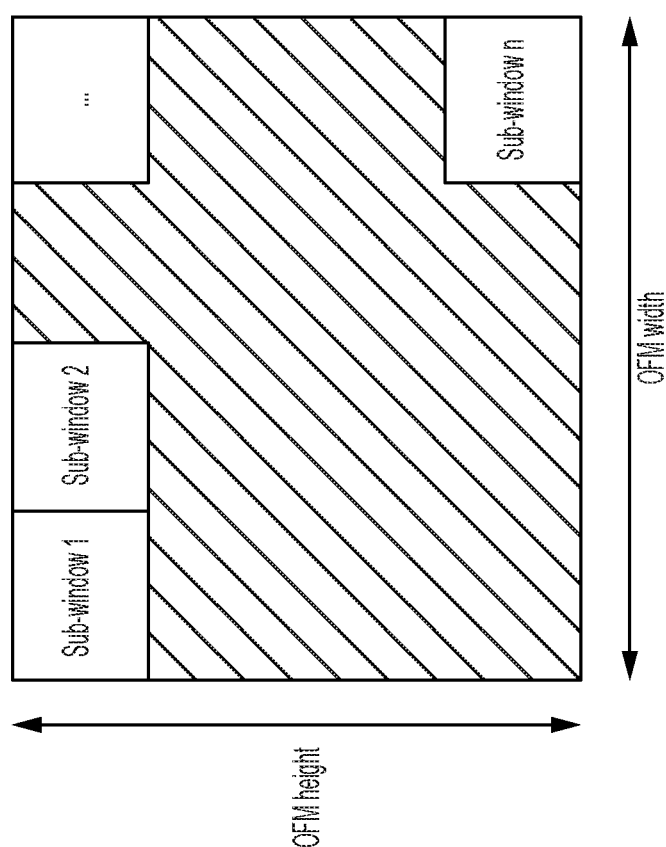
Figure 3I:
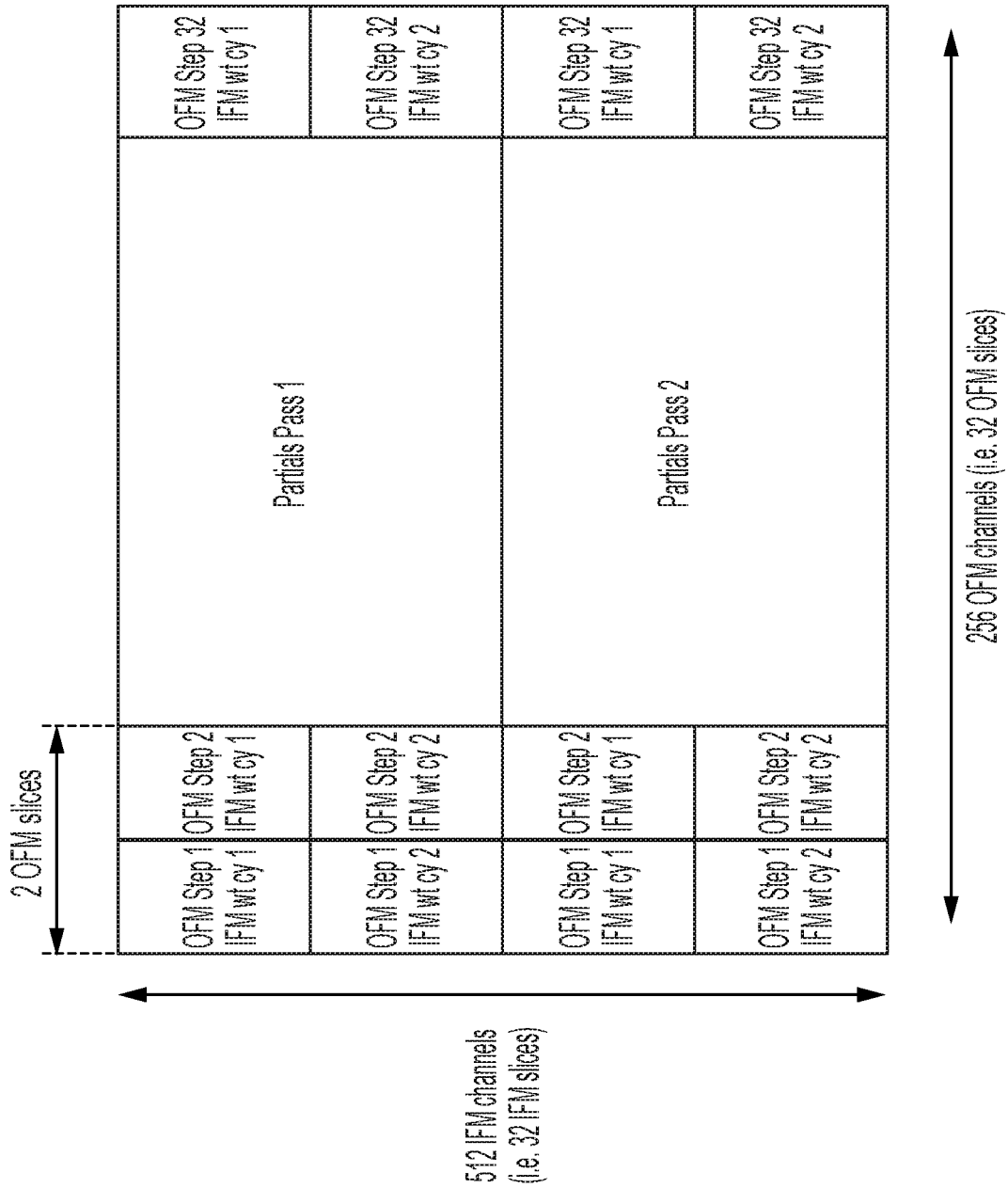
Figure 3J:
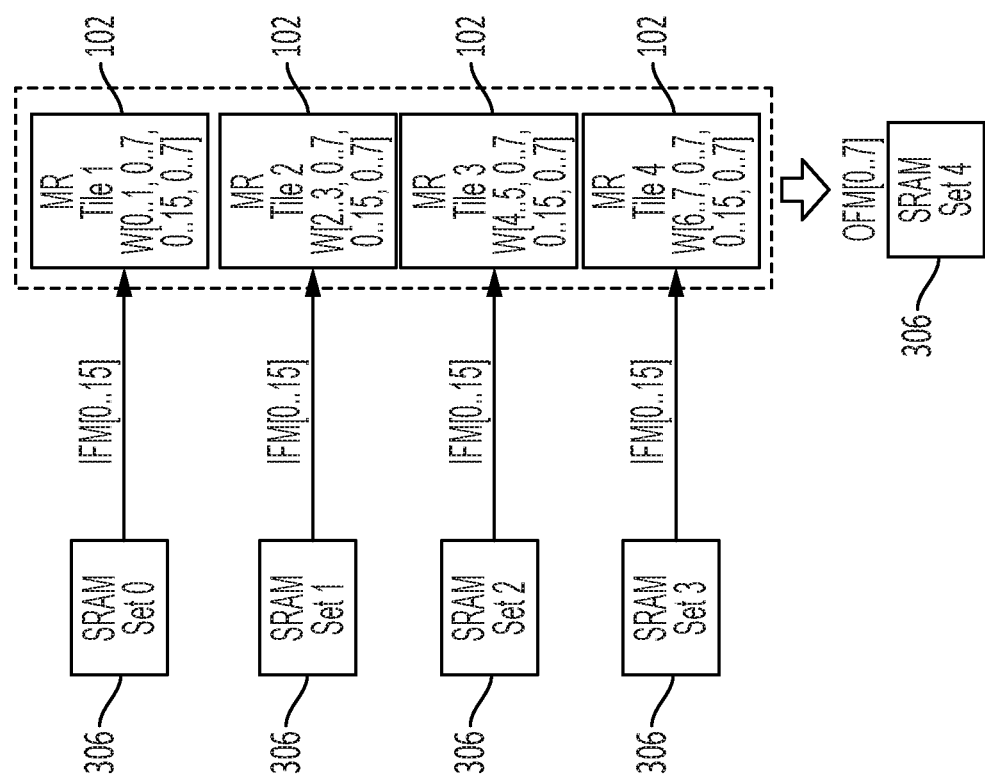
FIG. 3JA is a data flow diagram, according to an embodiment of the present disclosure.
Figure 3J:
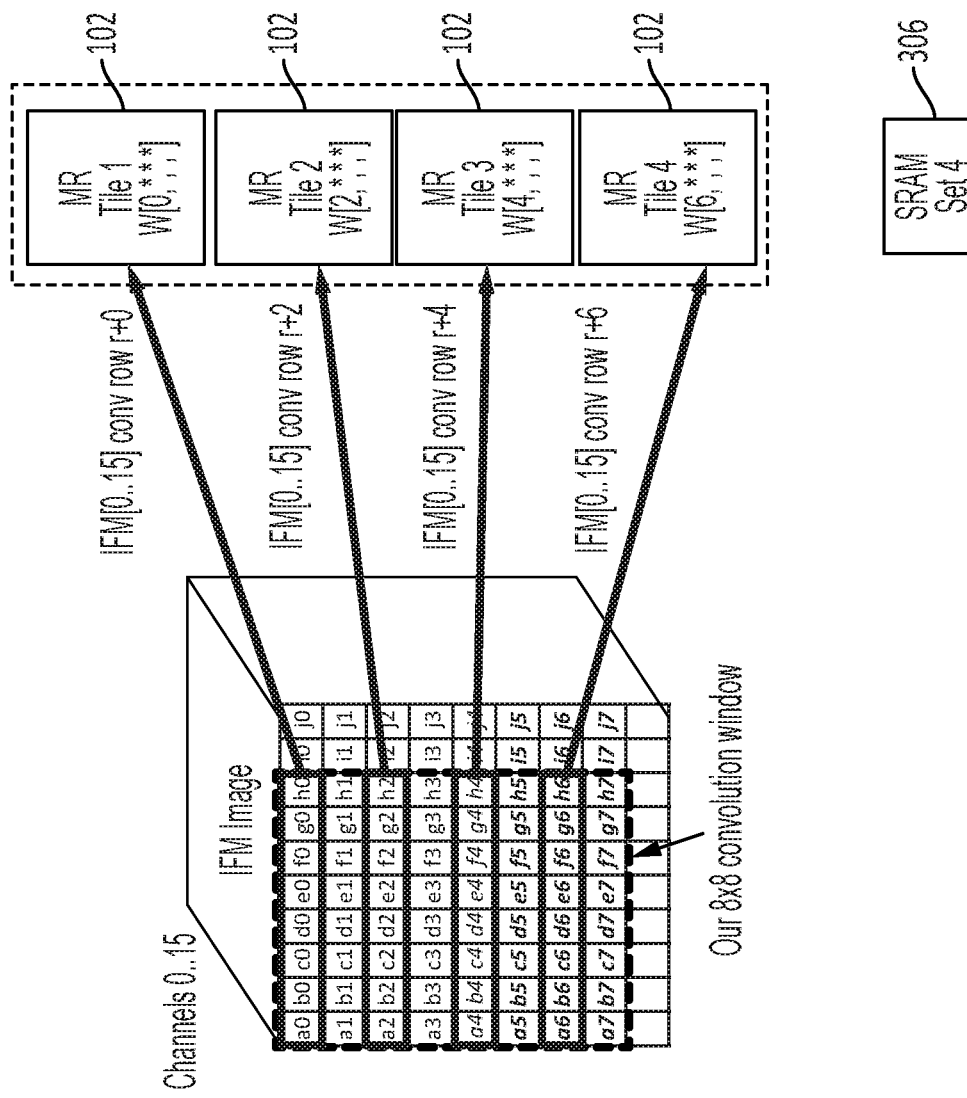
Figure 3J:
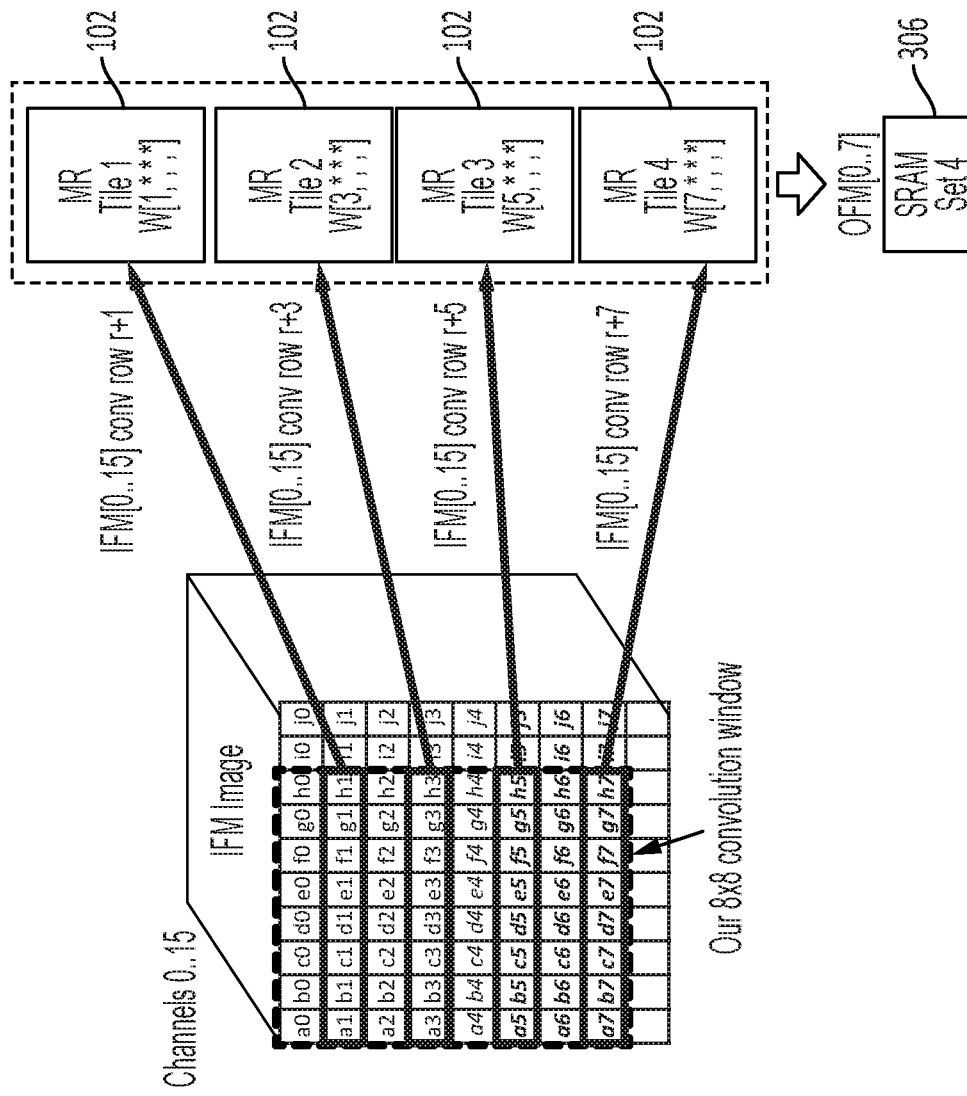
Figure 3J:
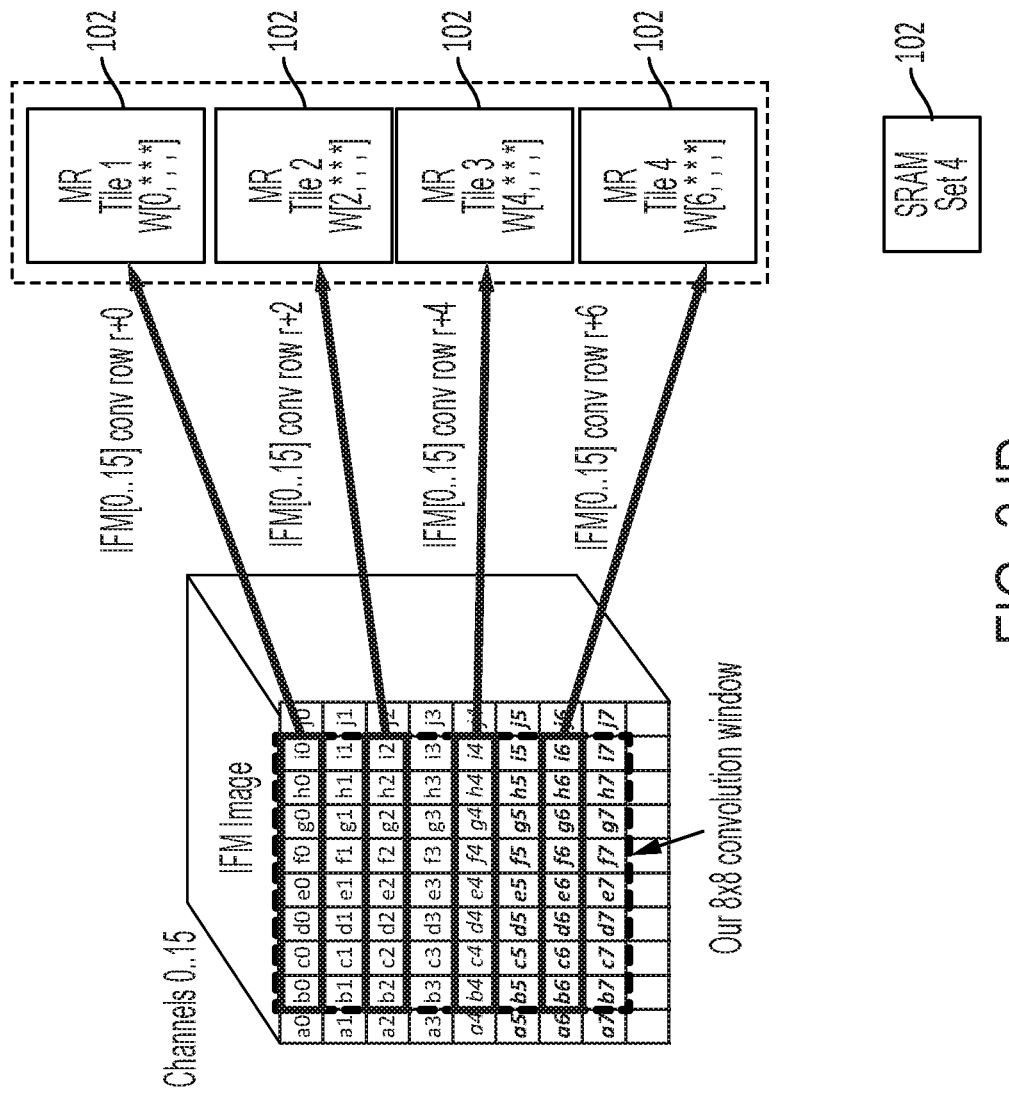
Figure 3K:
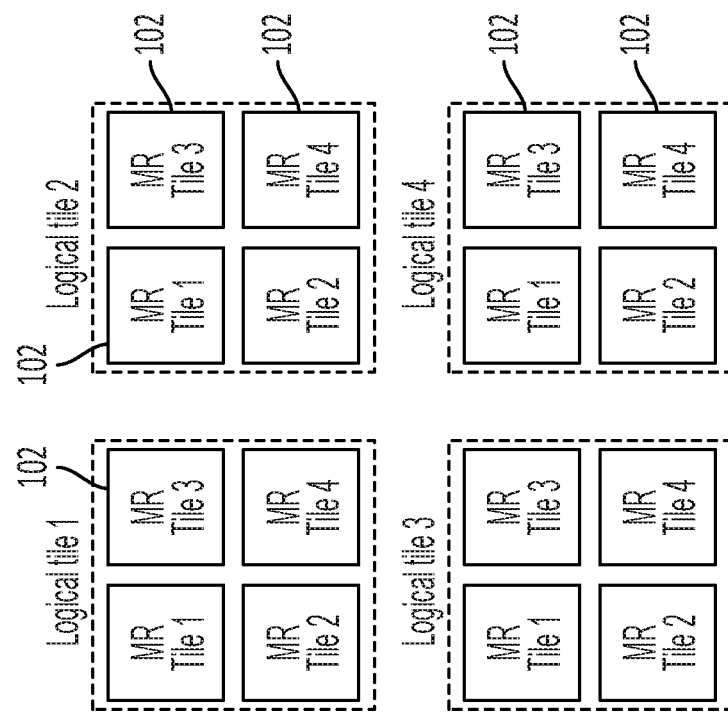
FIG. 3CA is a block diagram of a portion of a neural processor, according to an embodiment of the present disclosure.
Figure 3K:
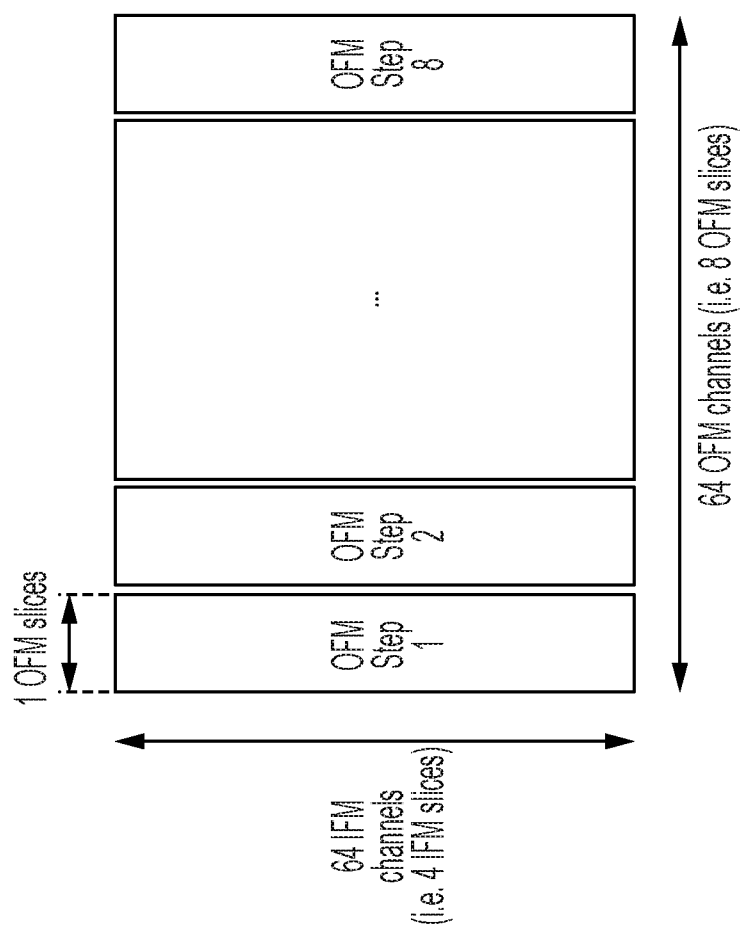
Figure 3L:
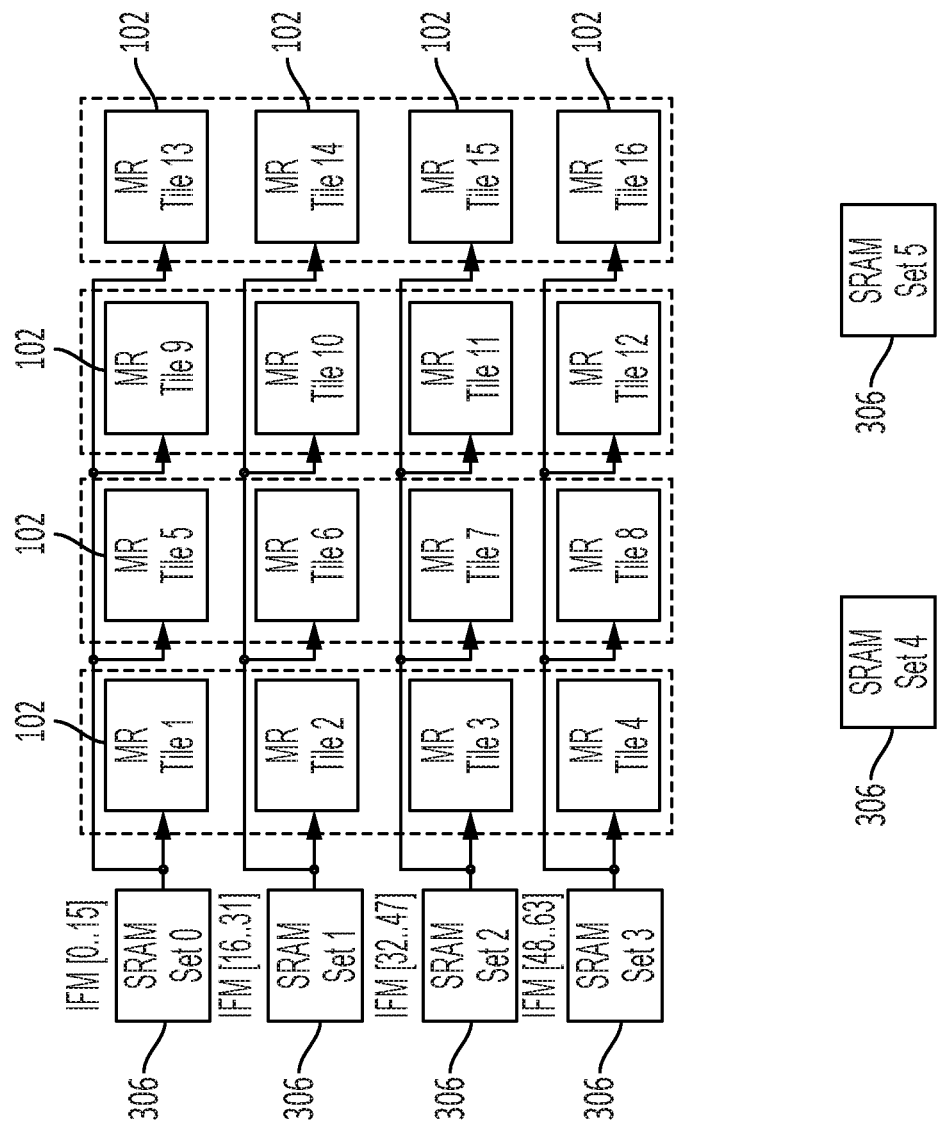
Figure 3L:
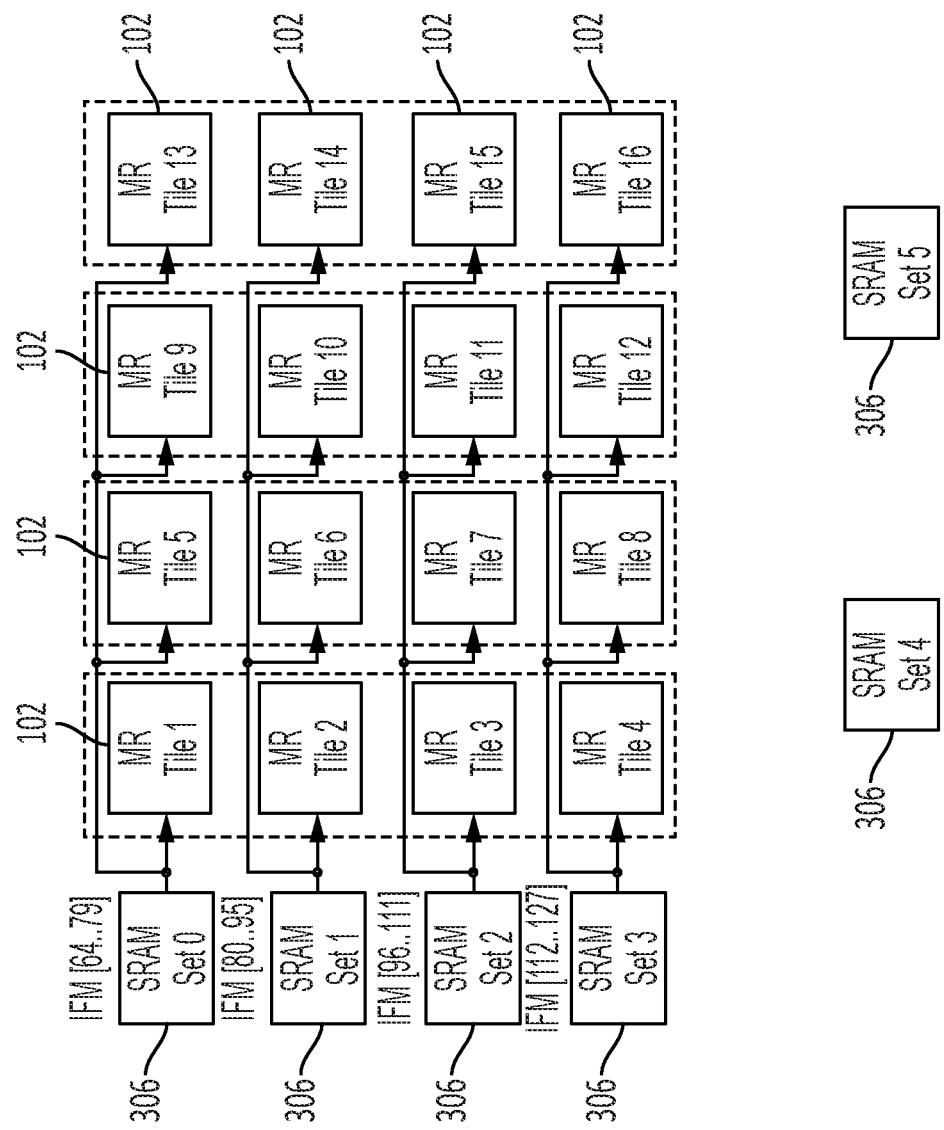
Figure 3L:
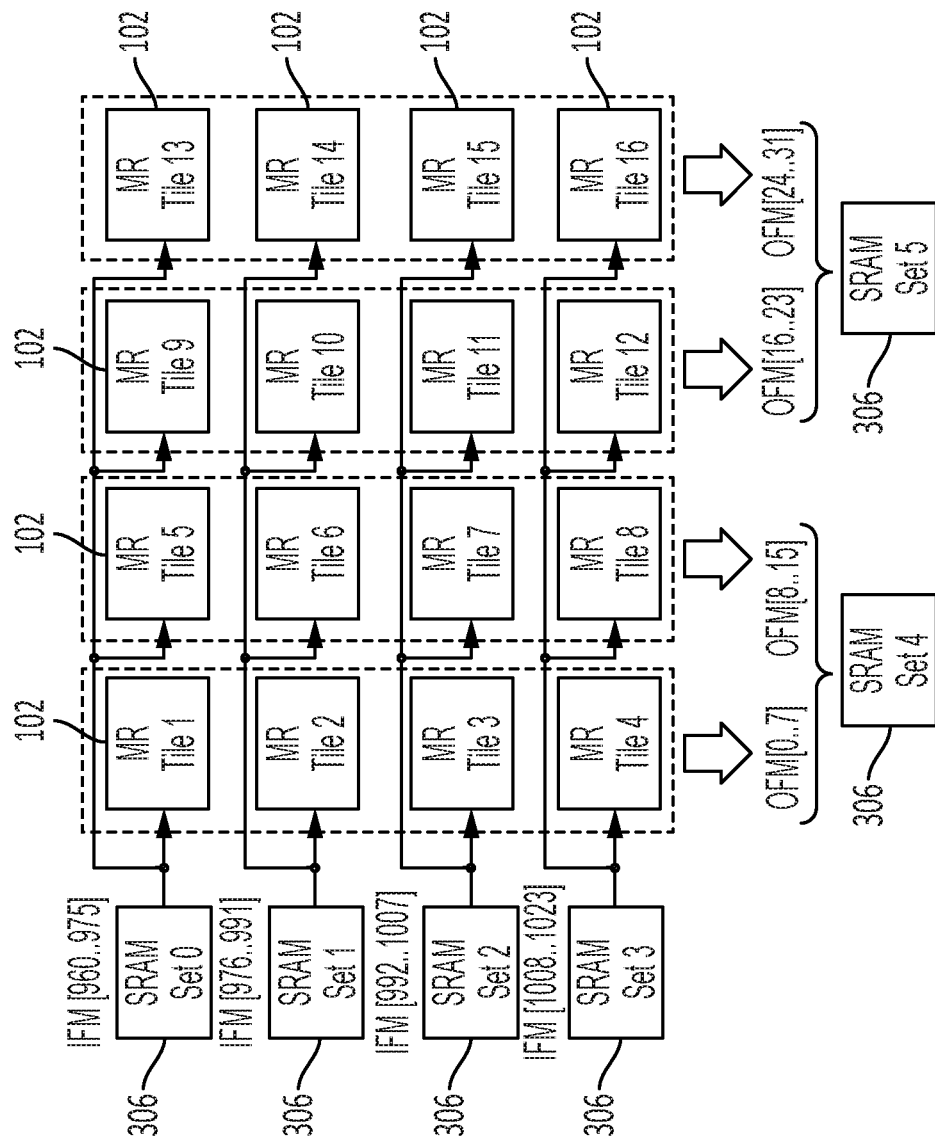
Figure 3L:
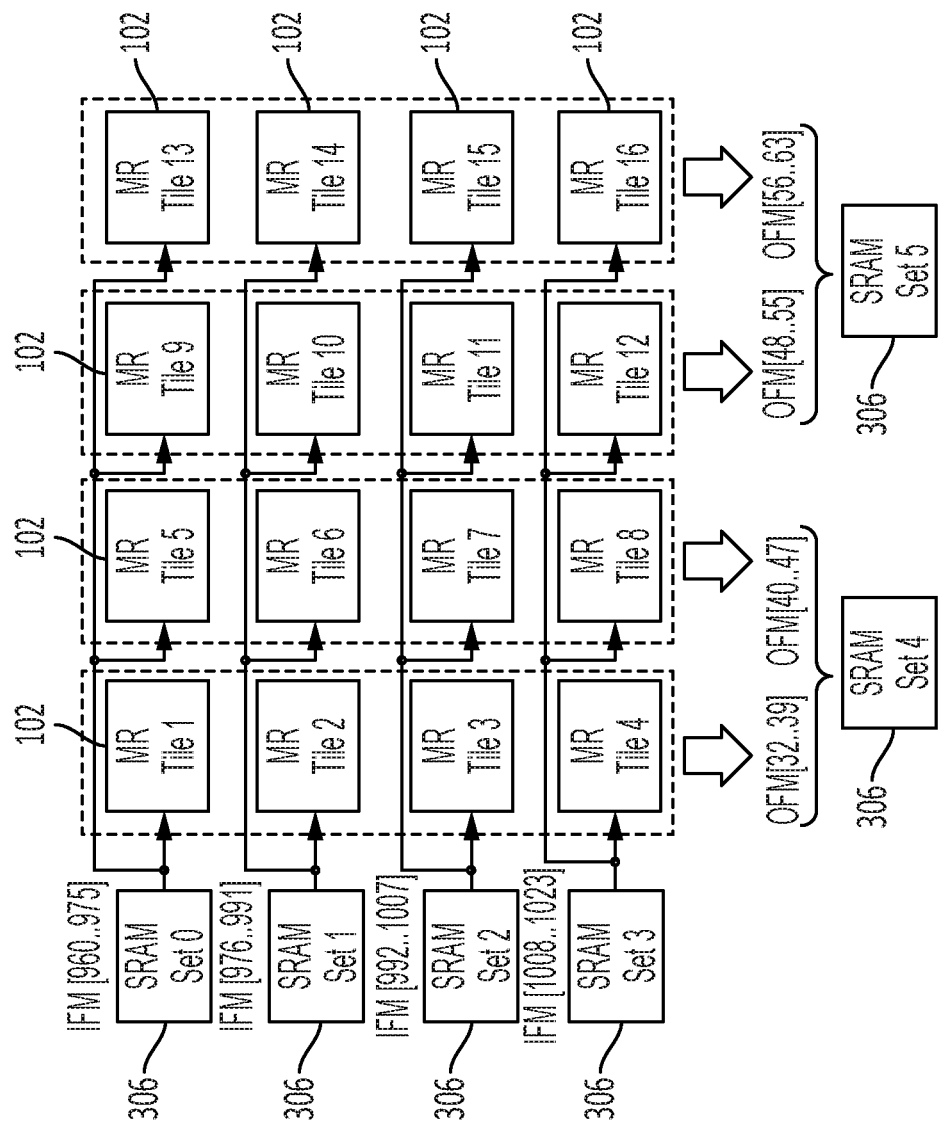
Figure 3M:
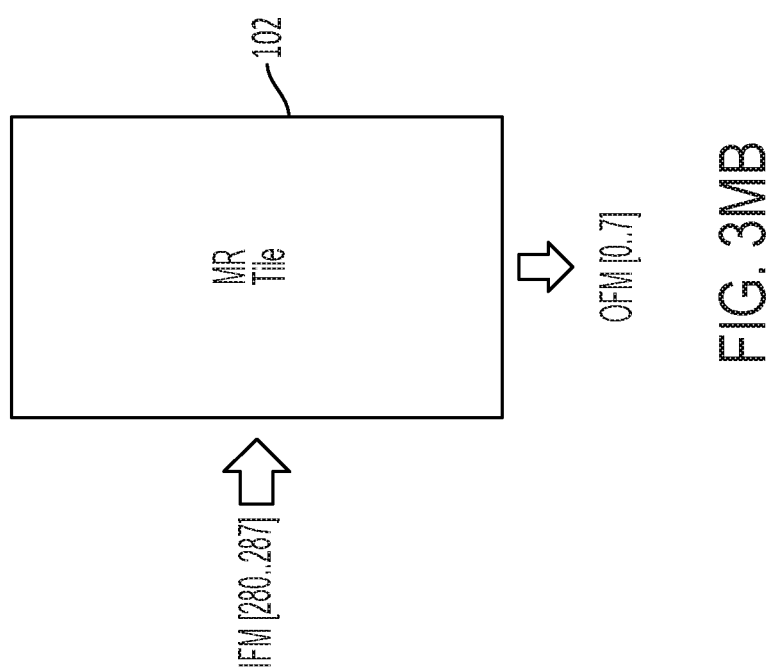
Figure 3N:
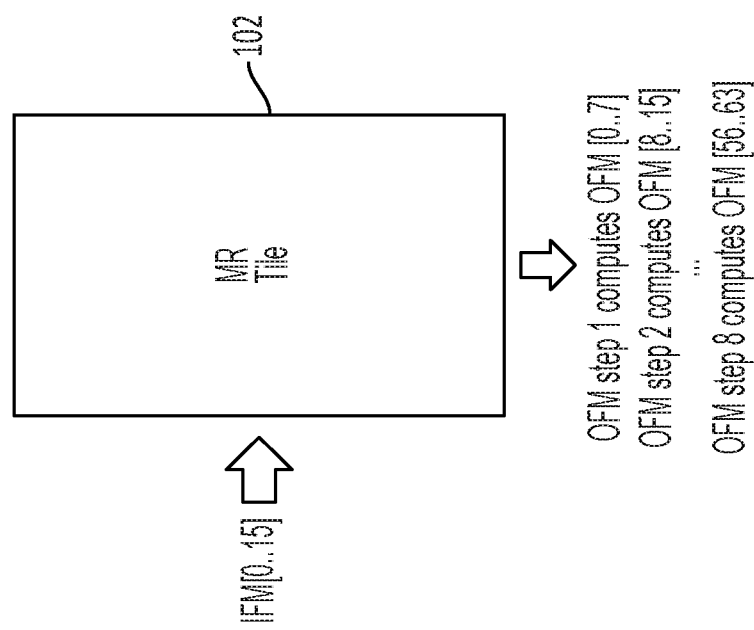
Figure 30A:
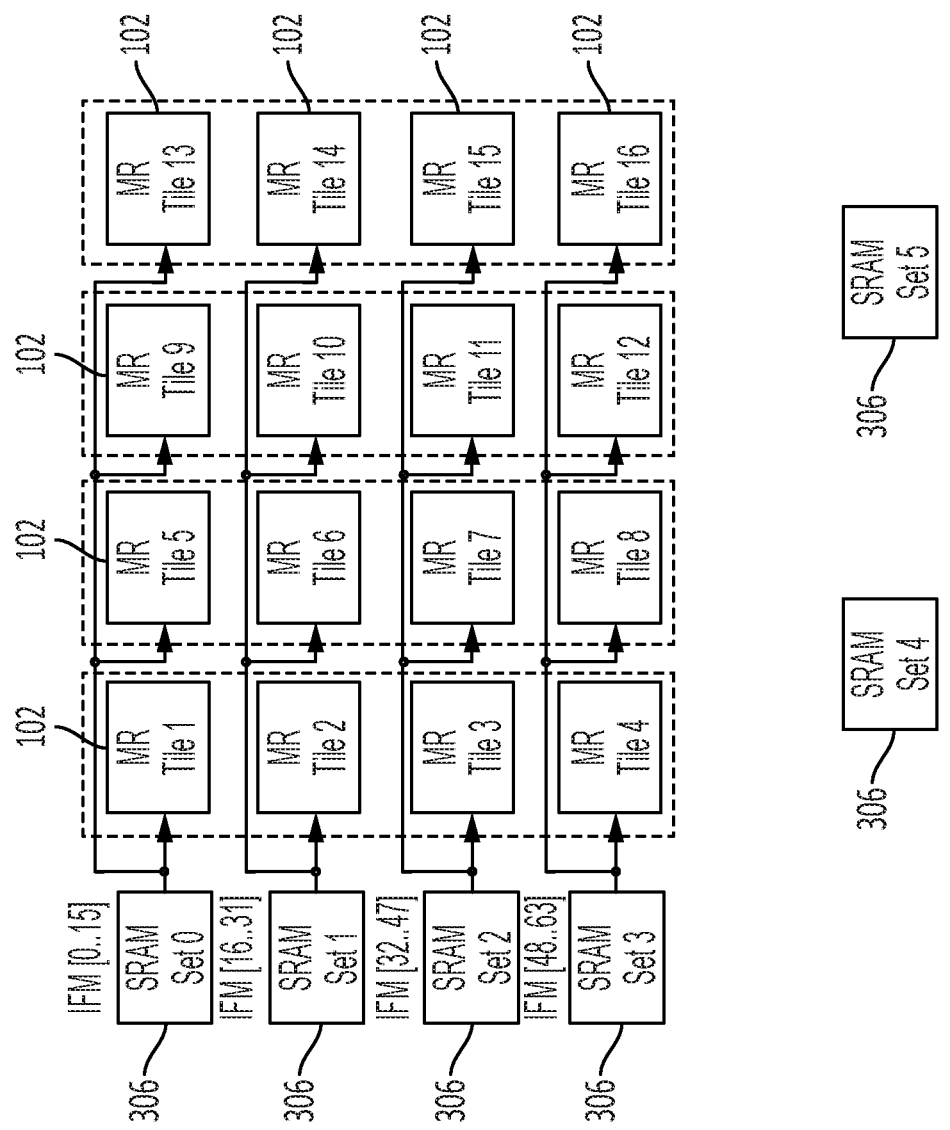
Figure 30B:
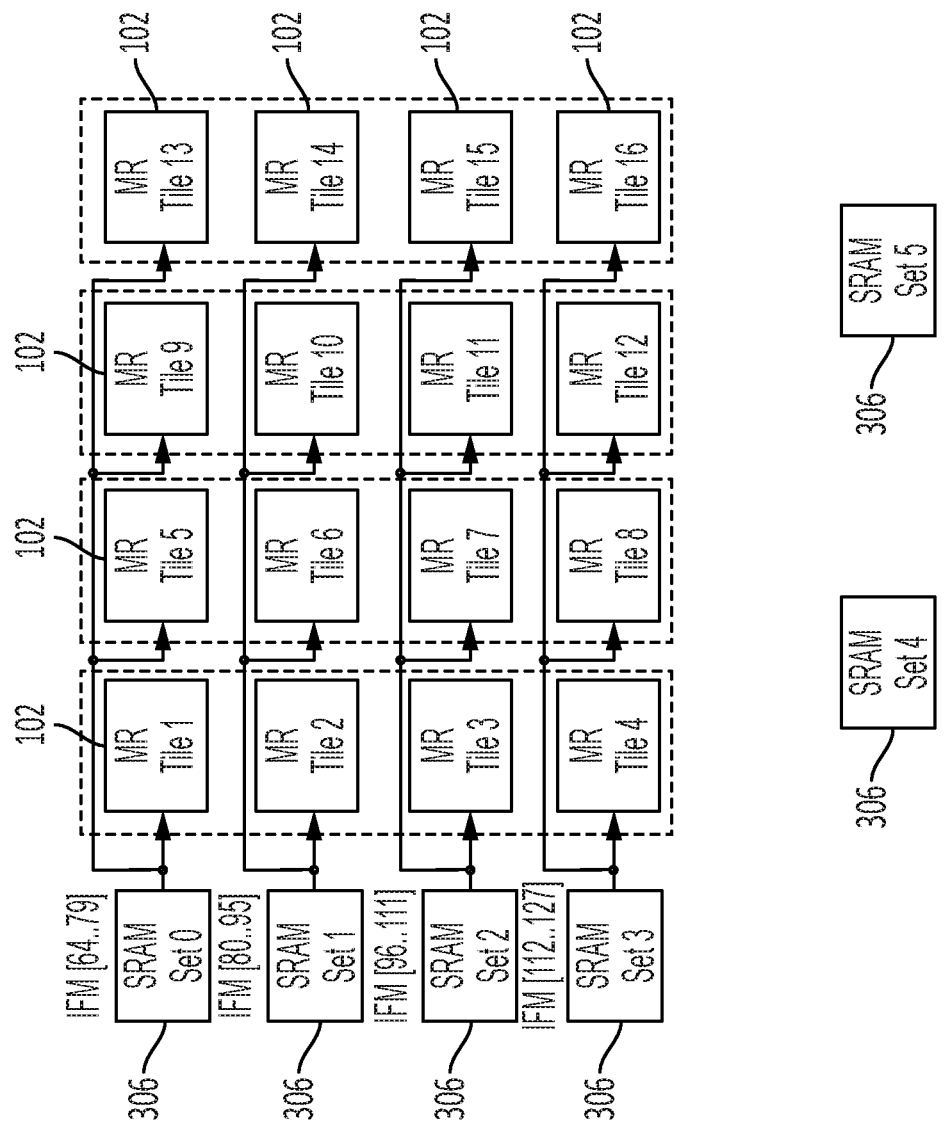
Figure 30C:
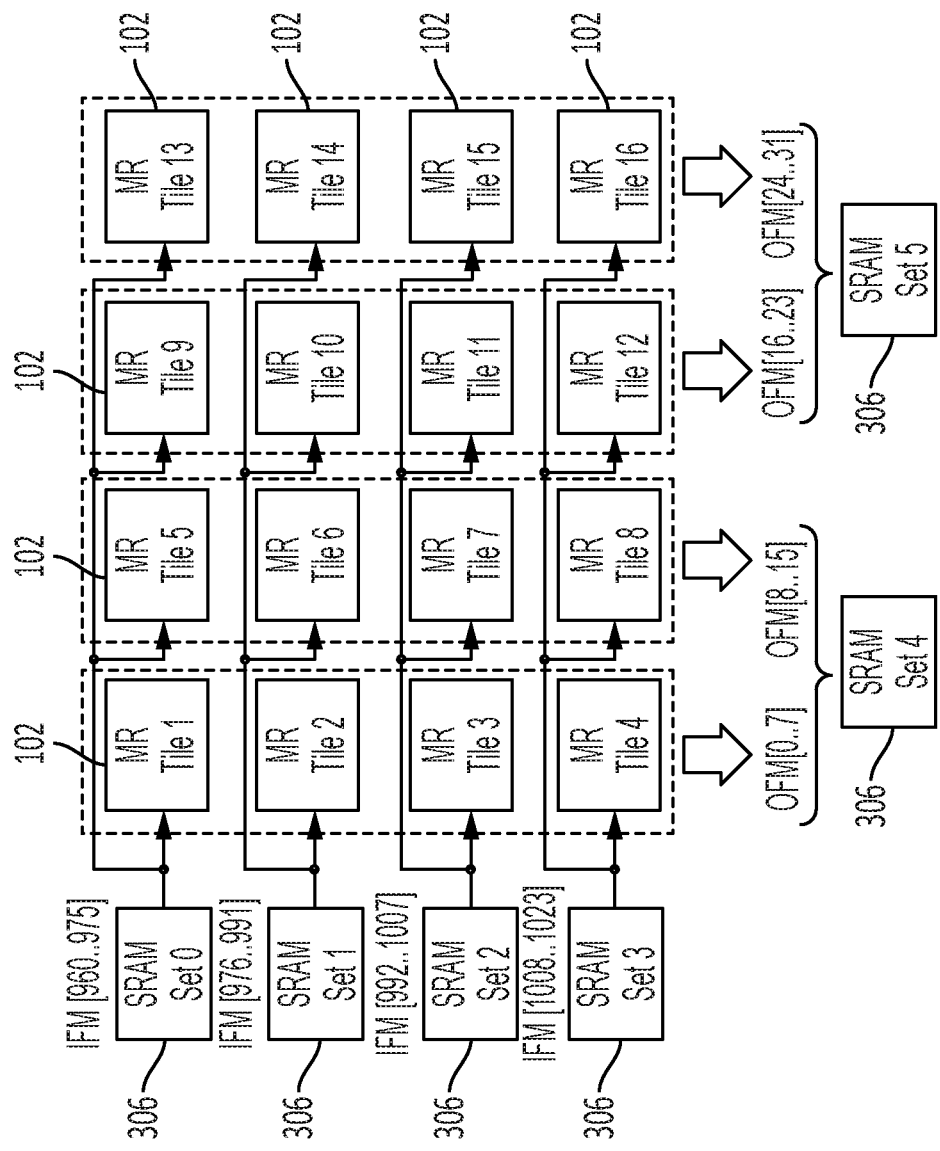
Figure 3P:
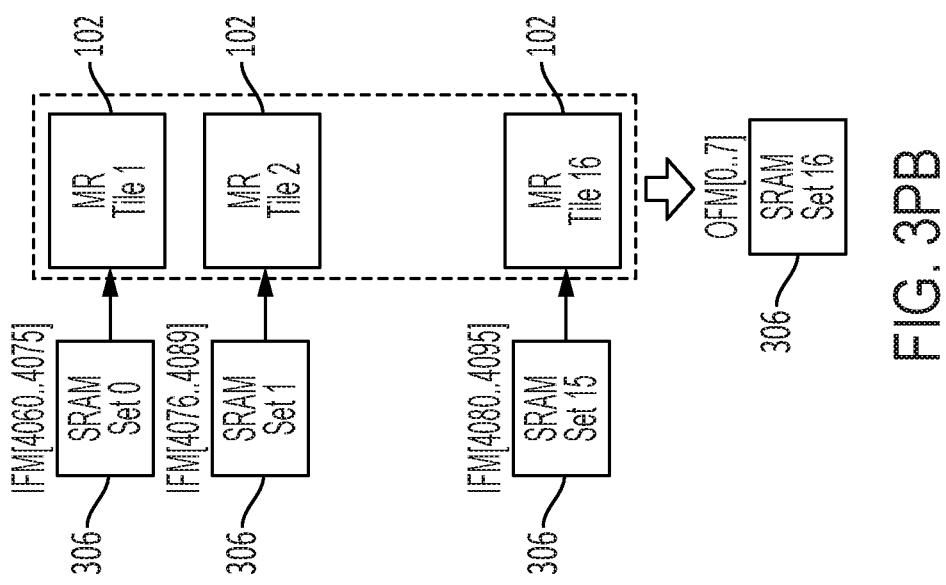
Figure 3P:
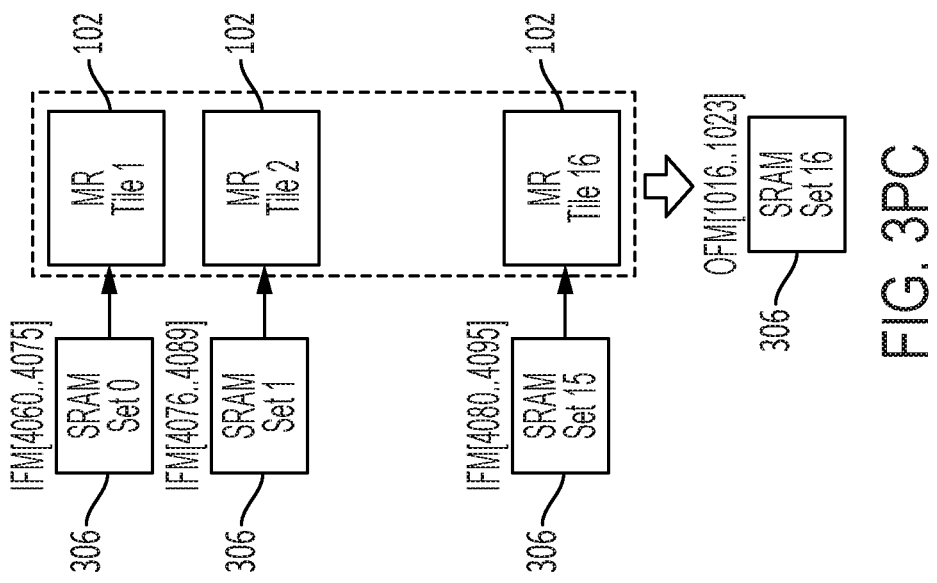
Figure 4A:
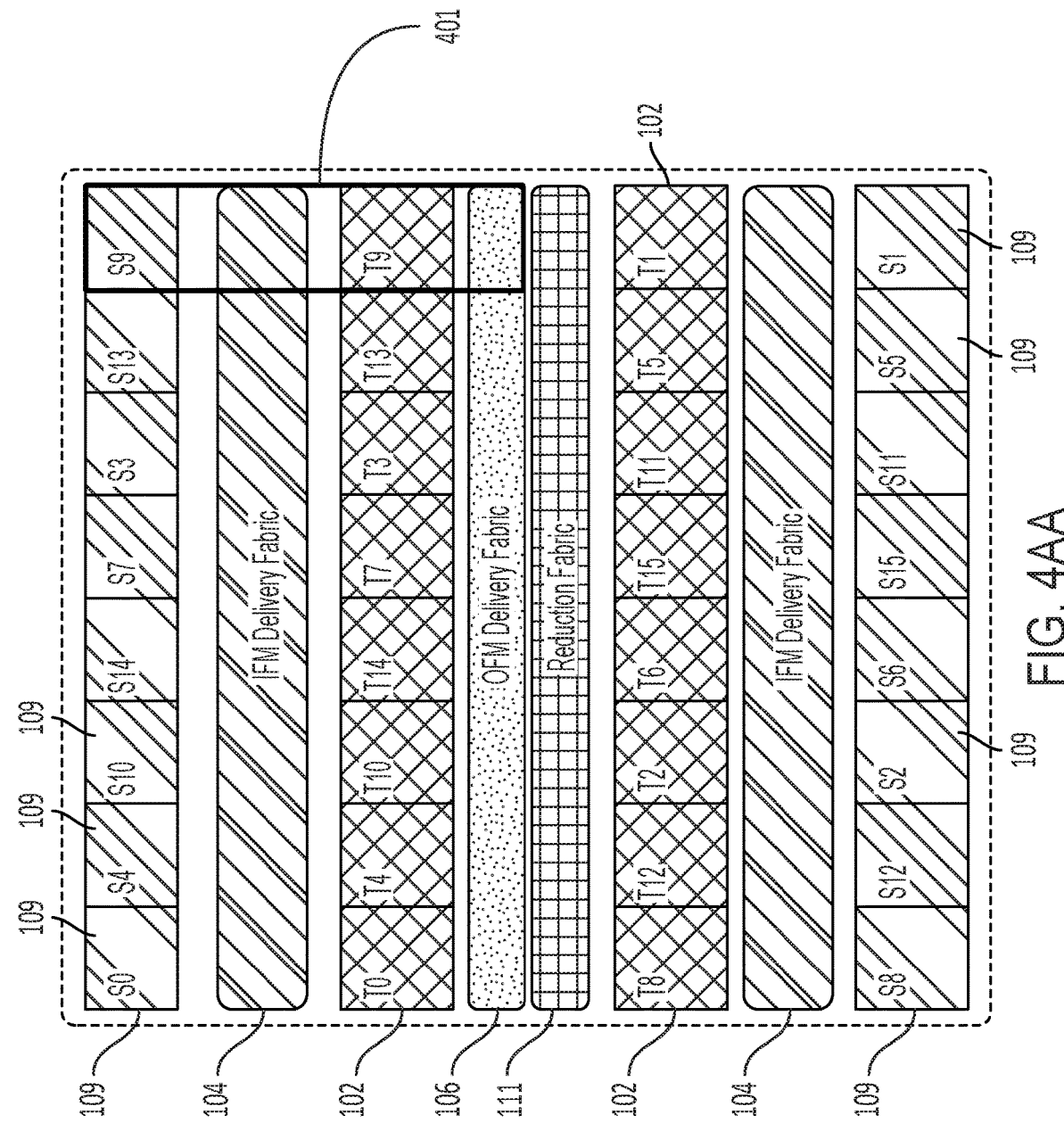
Figure 4A:
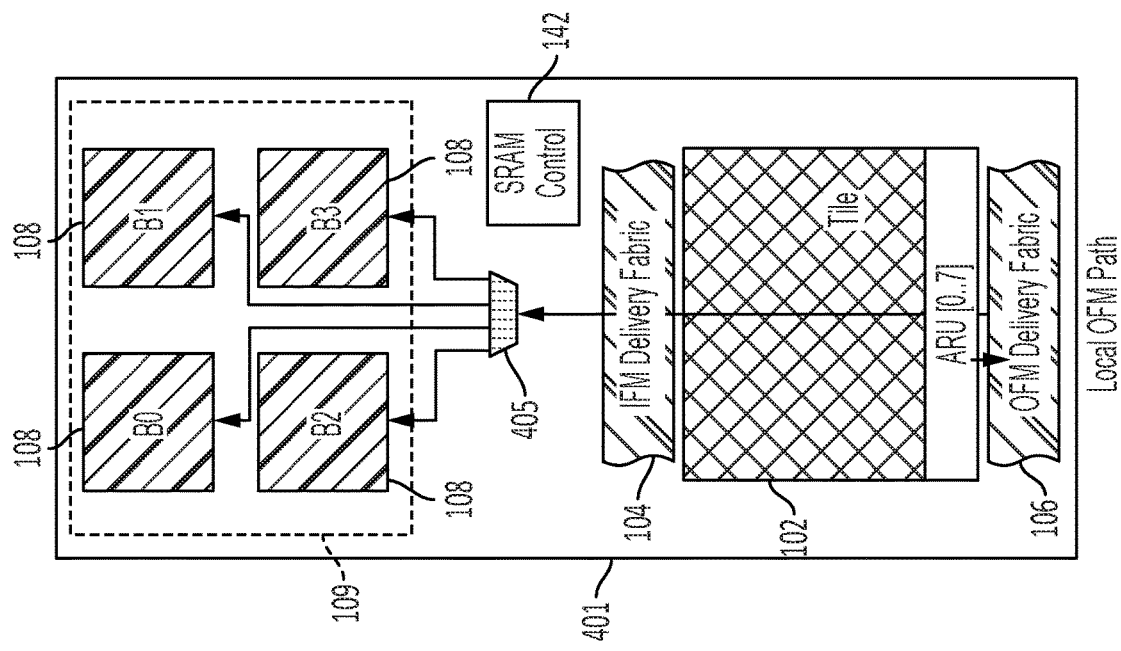
Figure 4A:
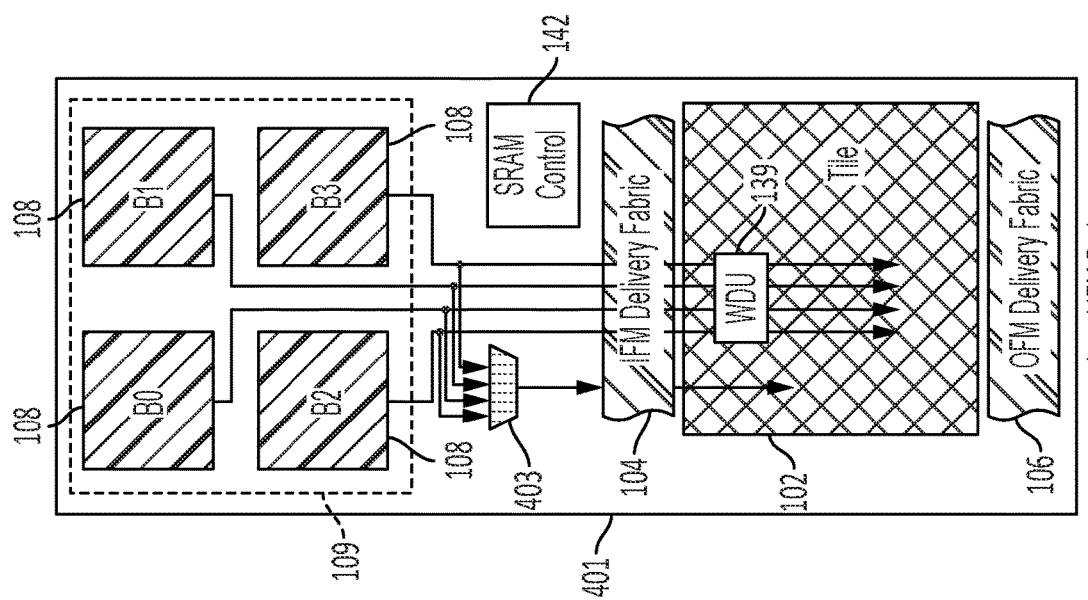
Figure 4A:
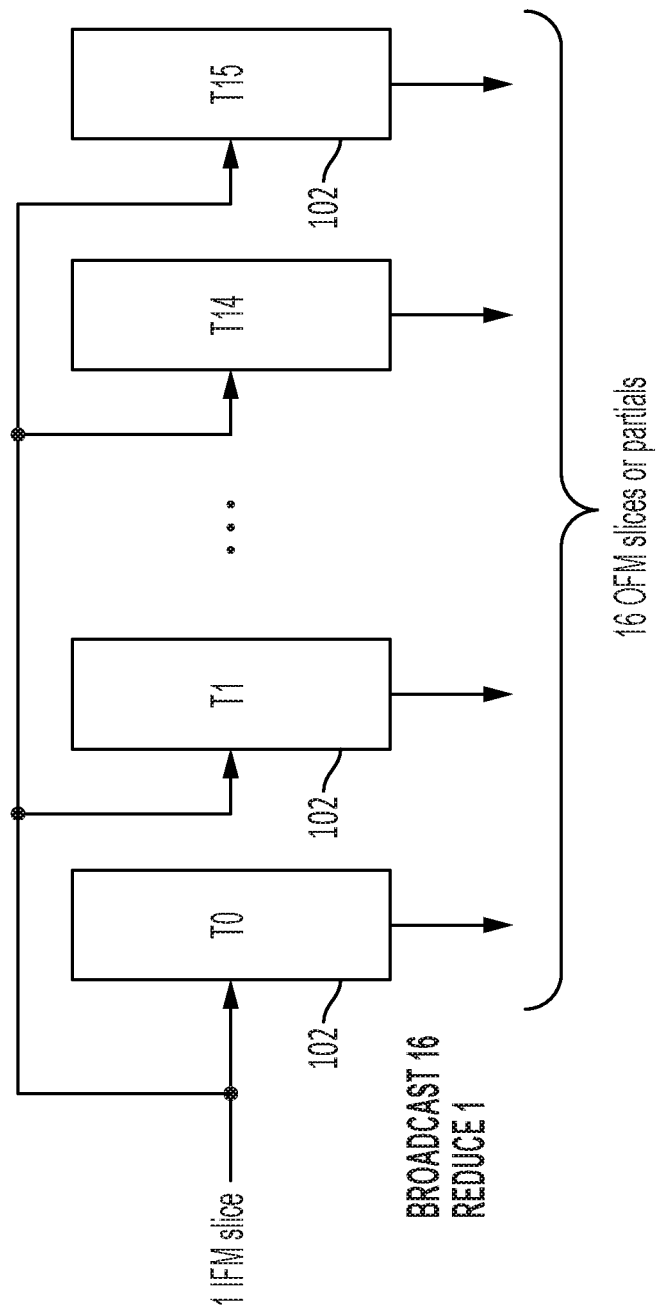
Figure 4A:
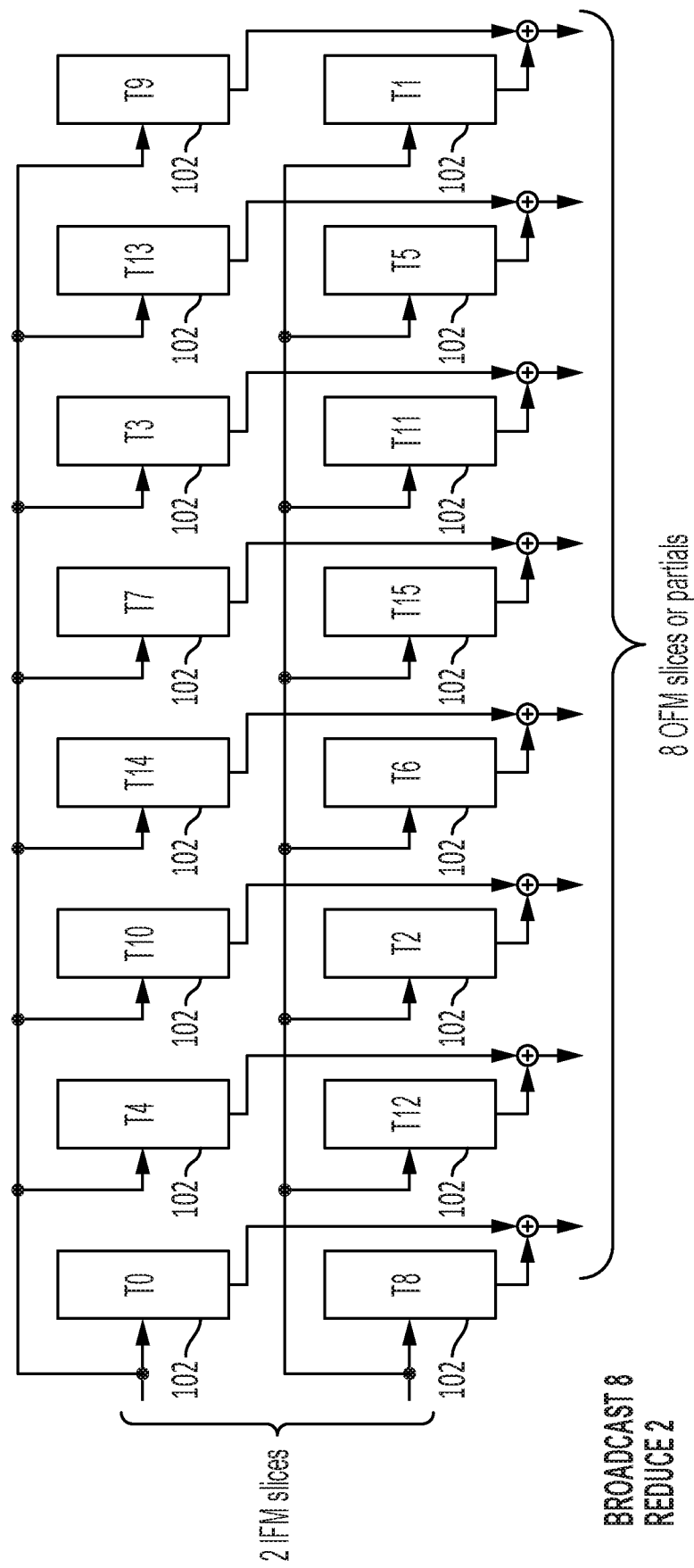
Figure 4A:
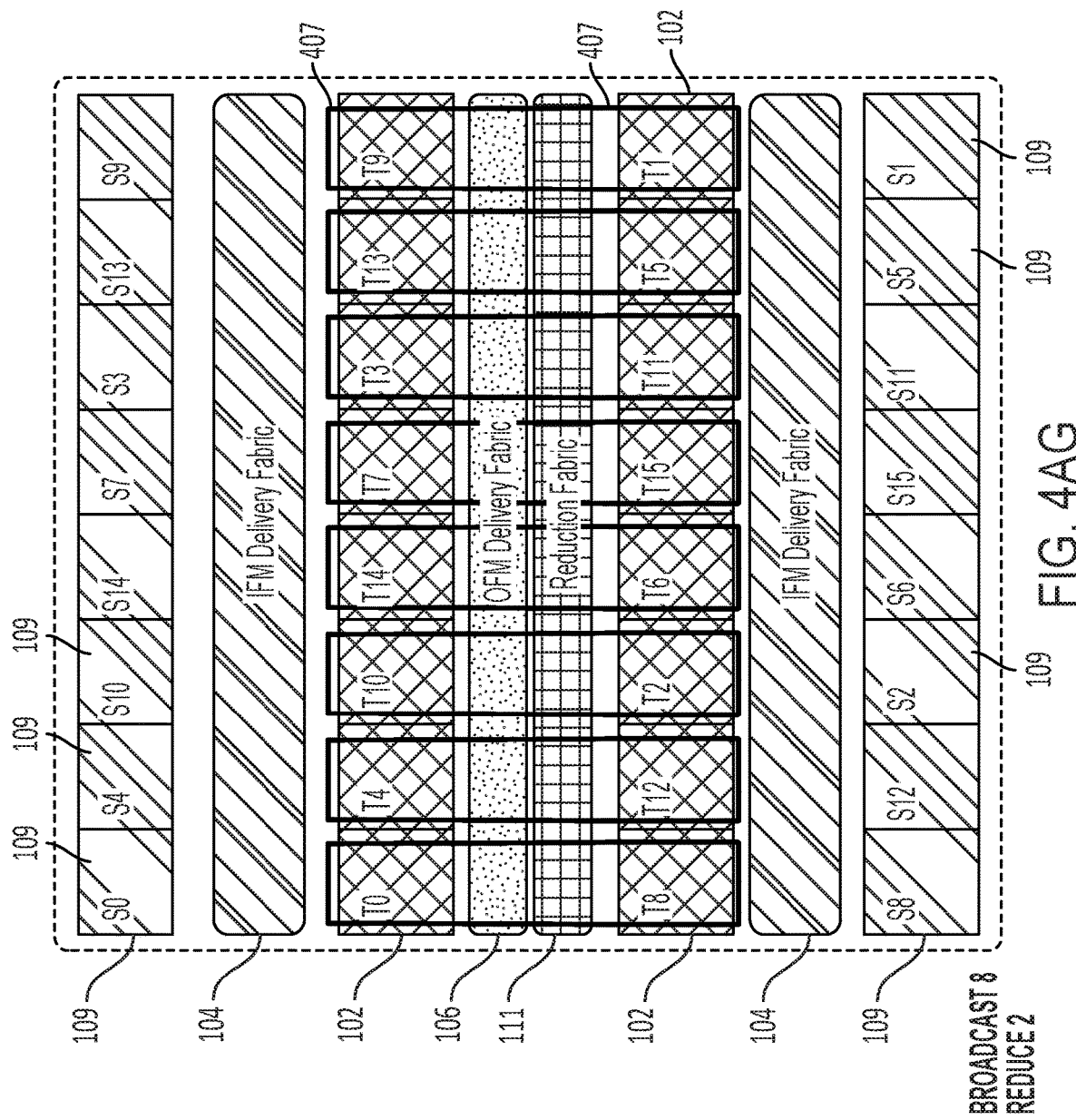
Figure 4A:
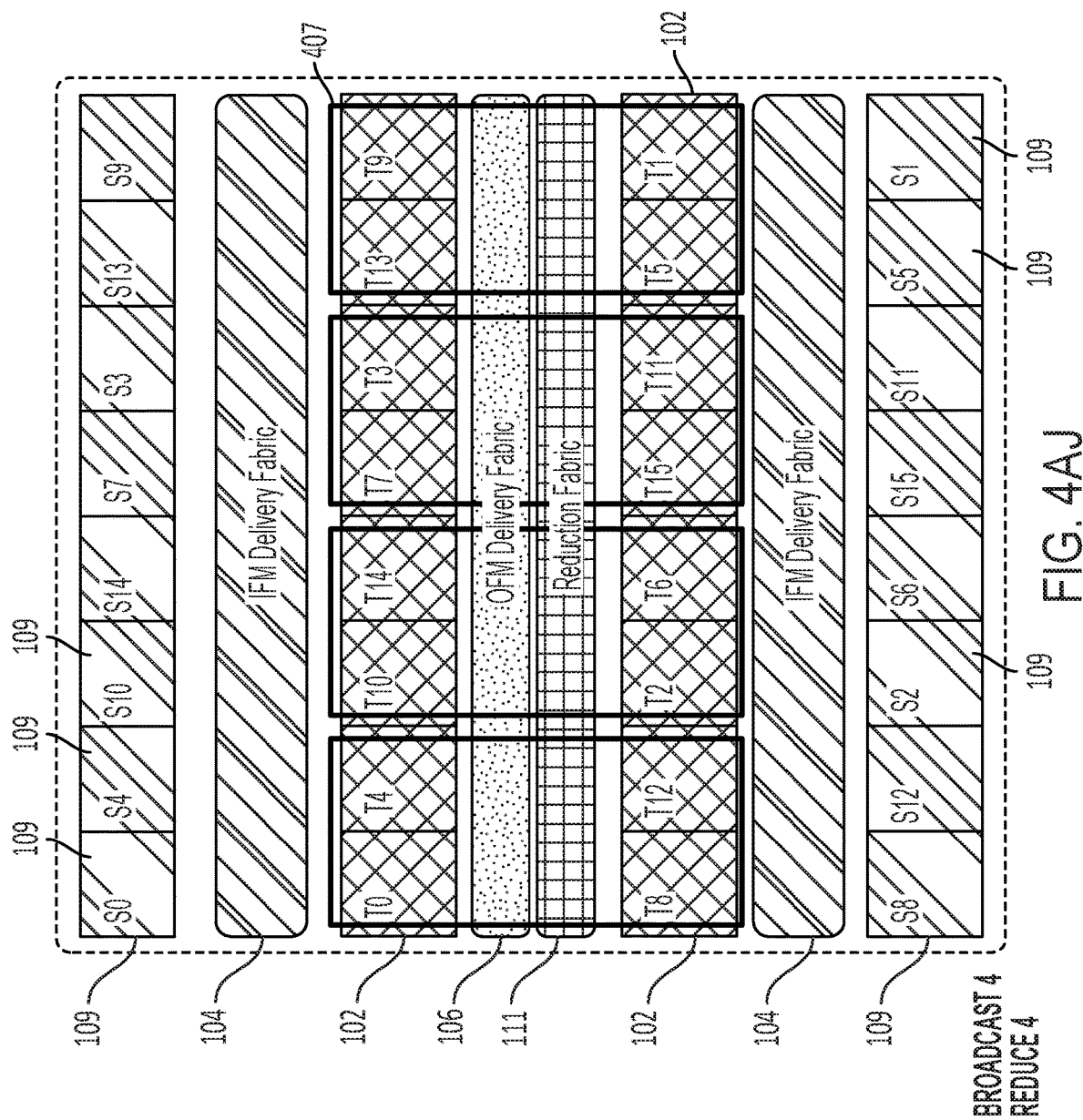
Figure 4A:
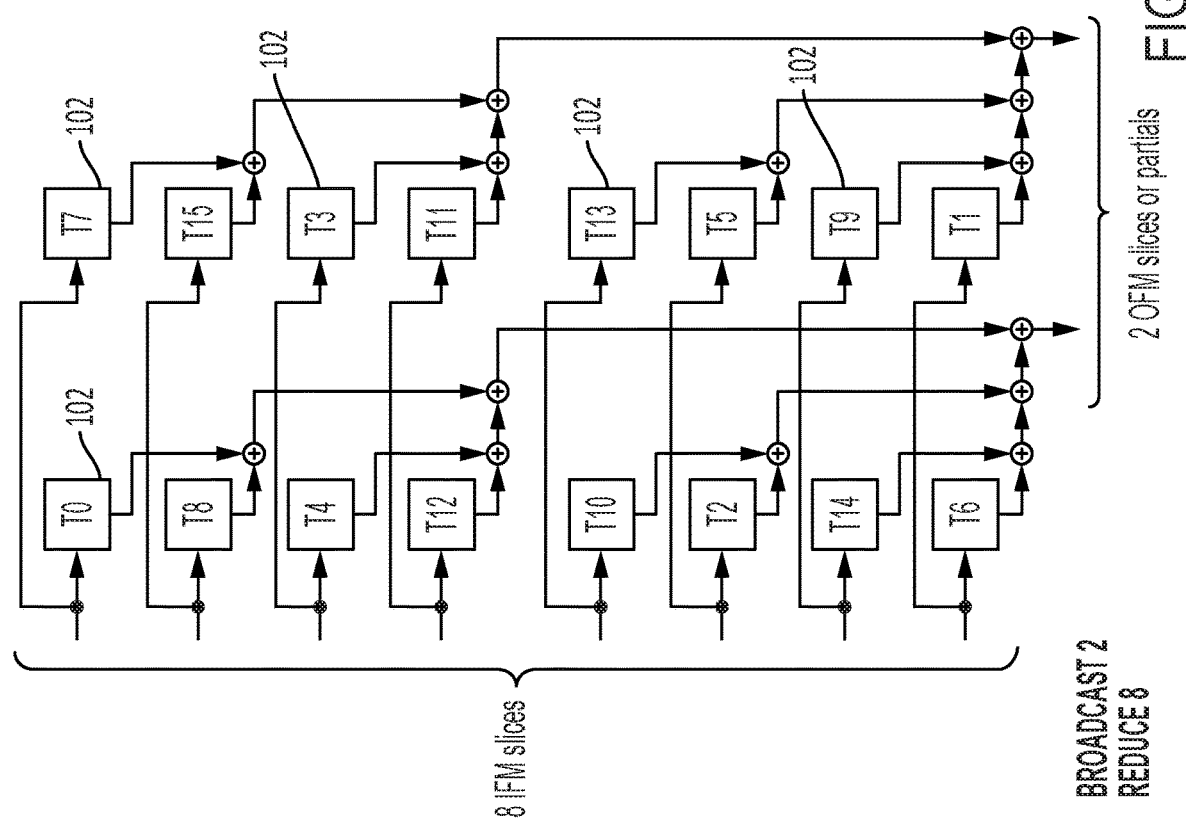
Figure 4A:
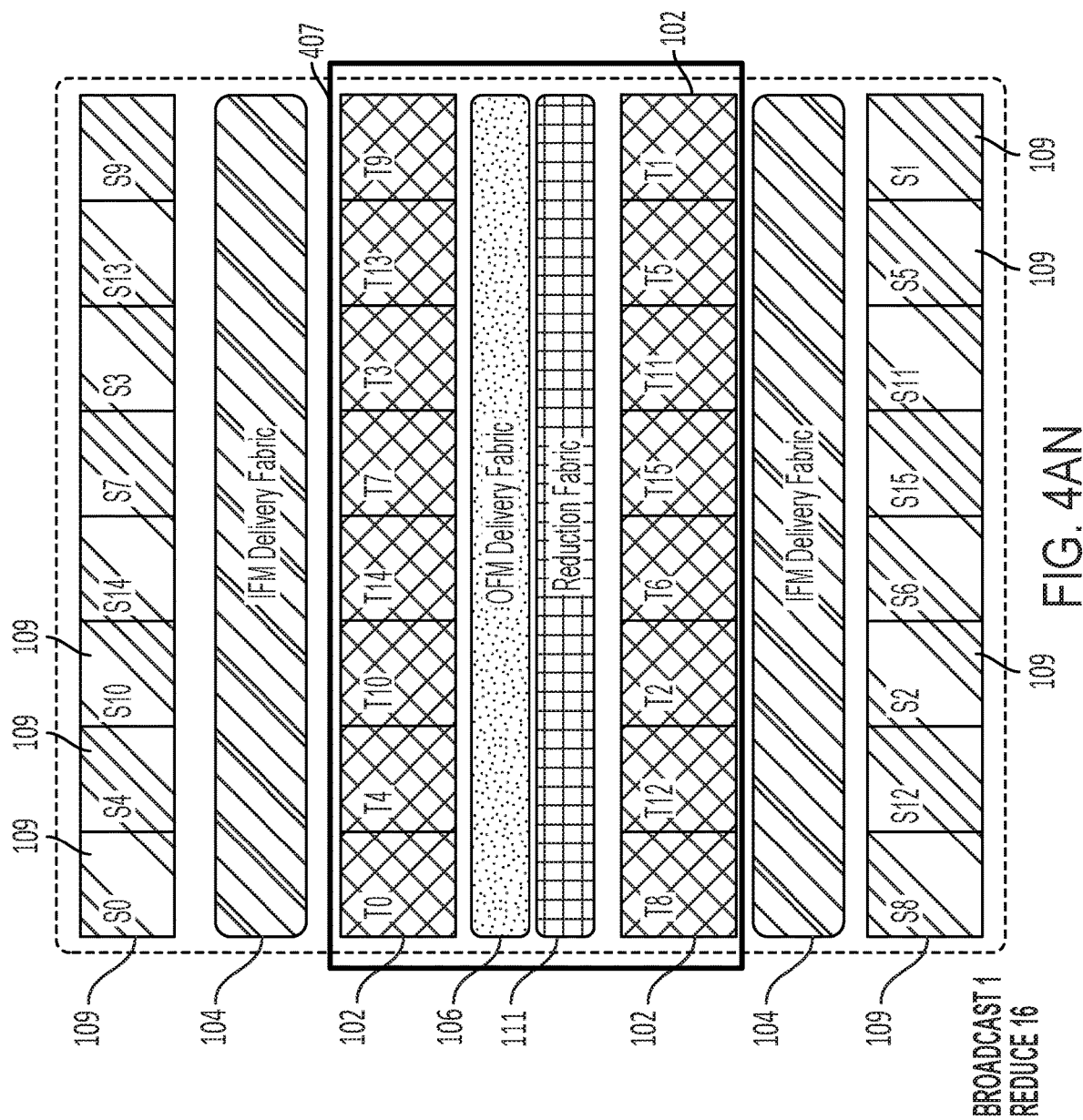
Figure 4B:
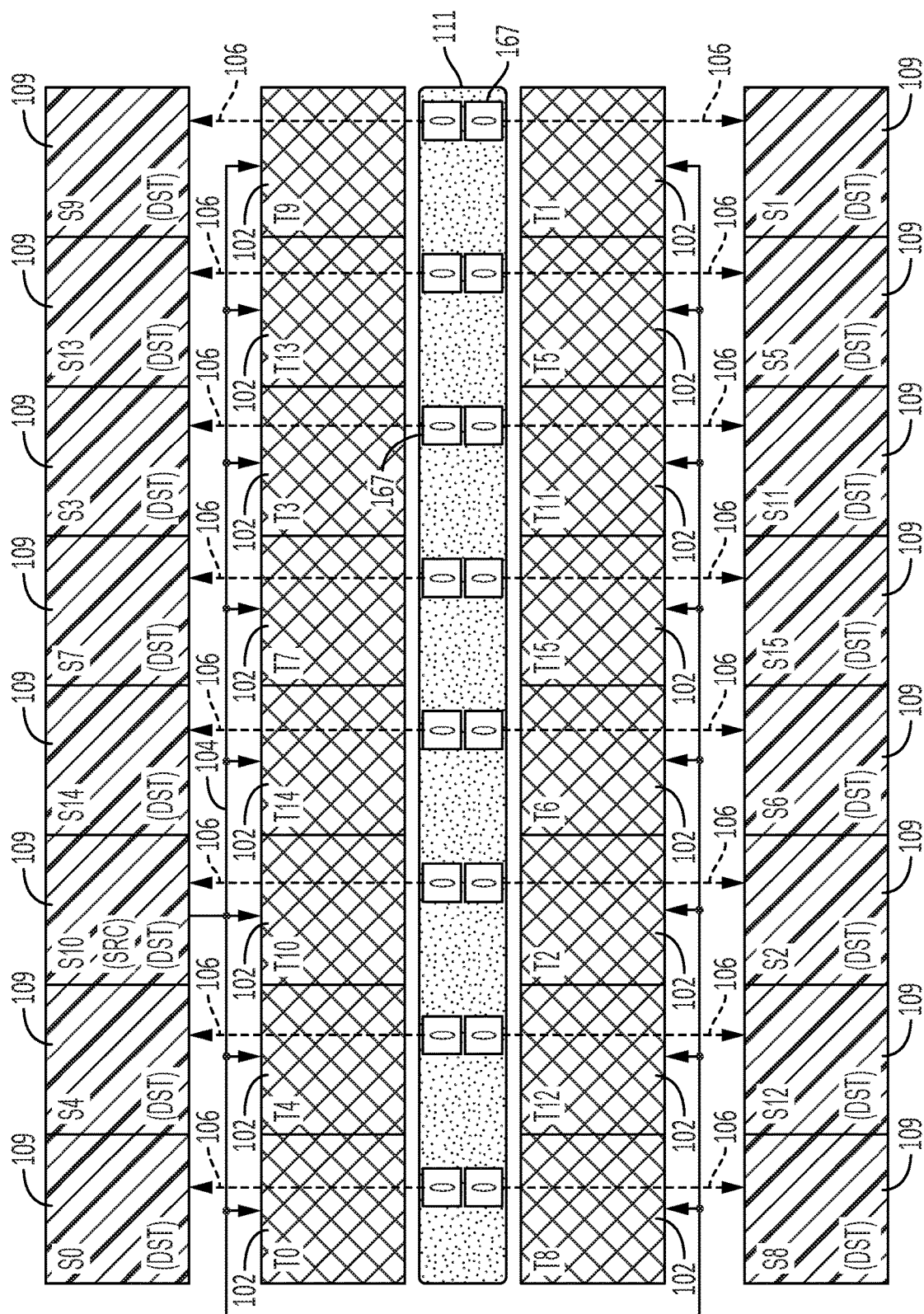
Figure 4B:
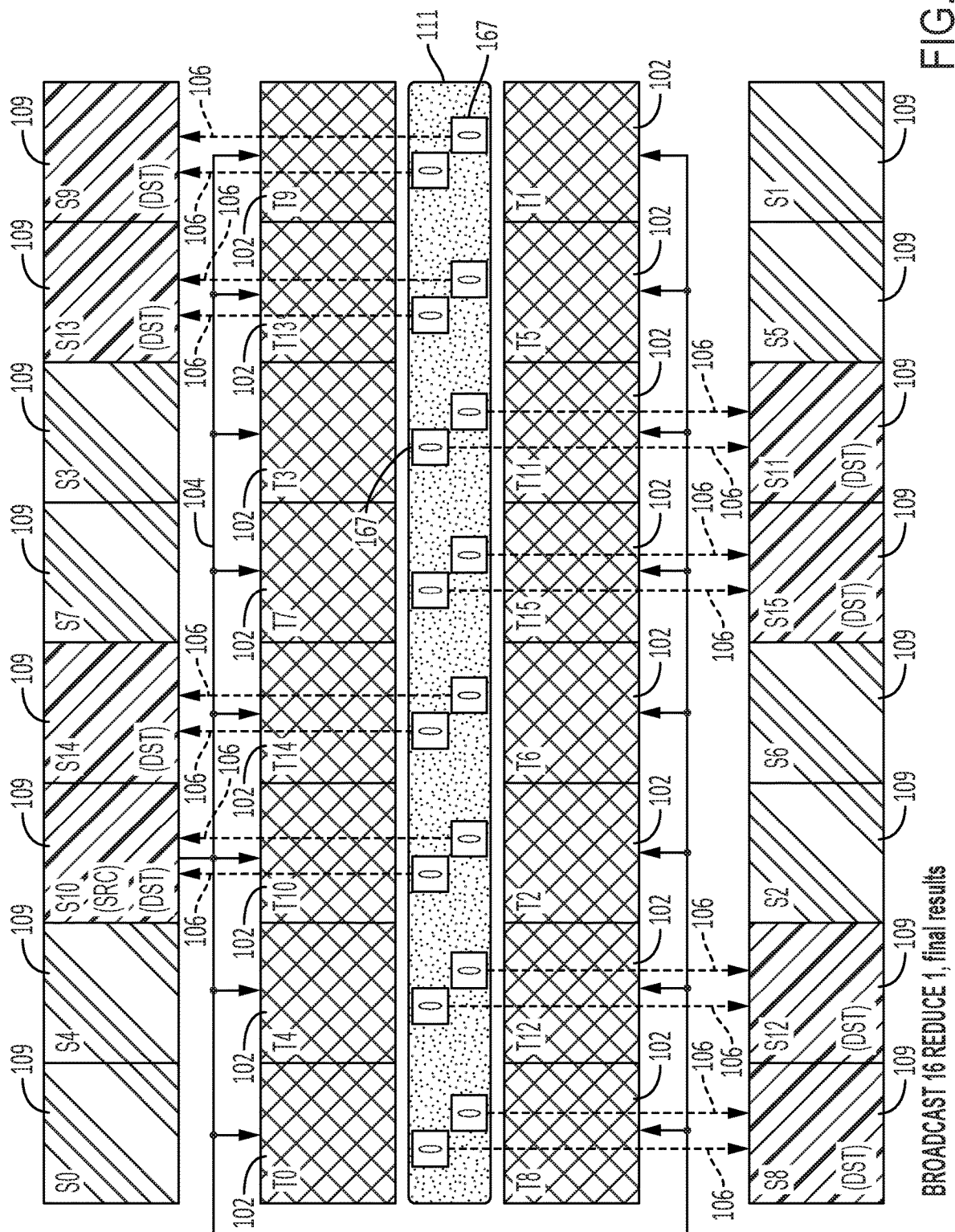
Figure 4C:
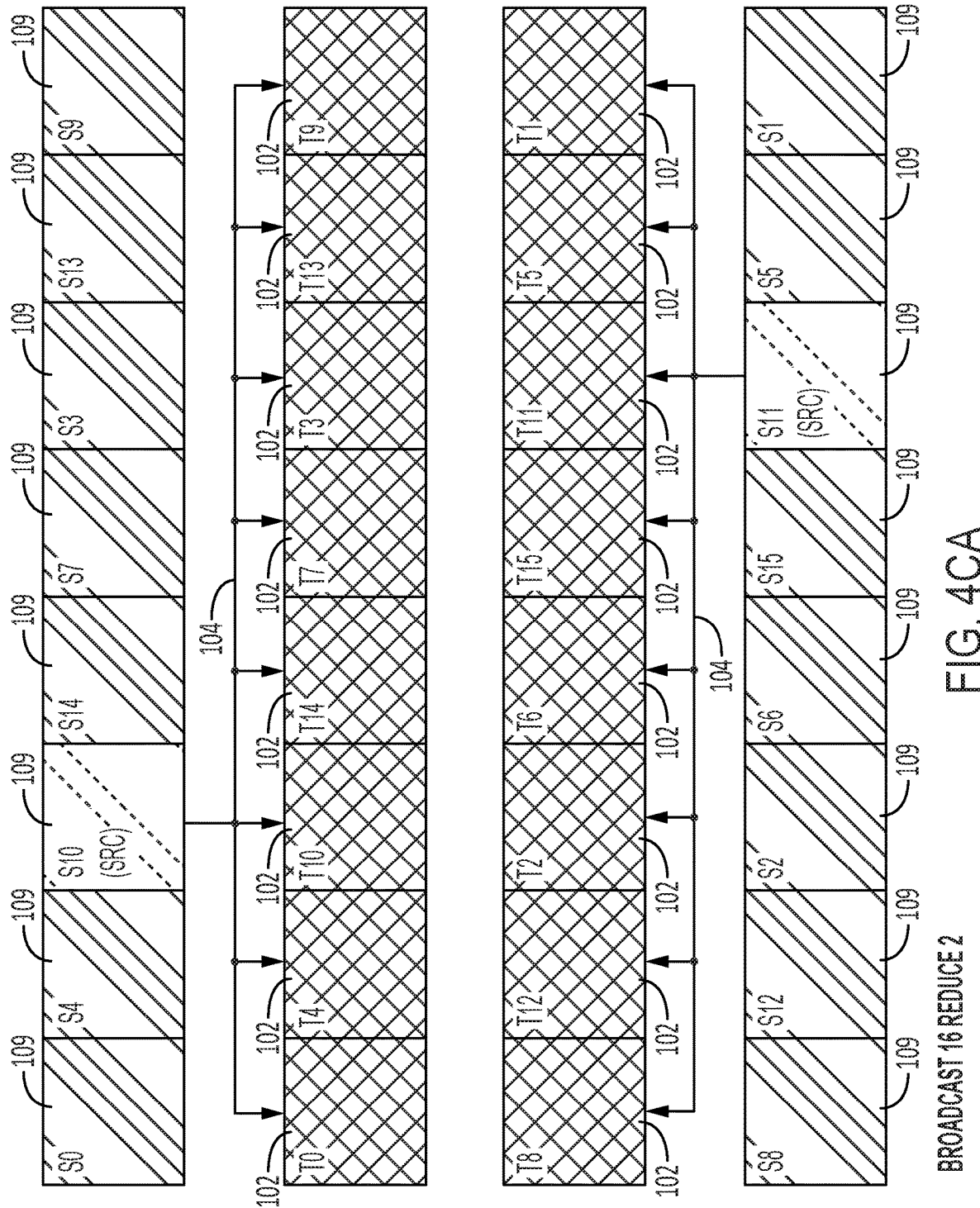
Figure 4C:
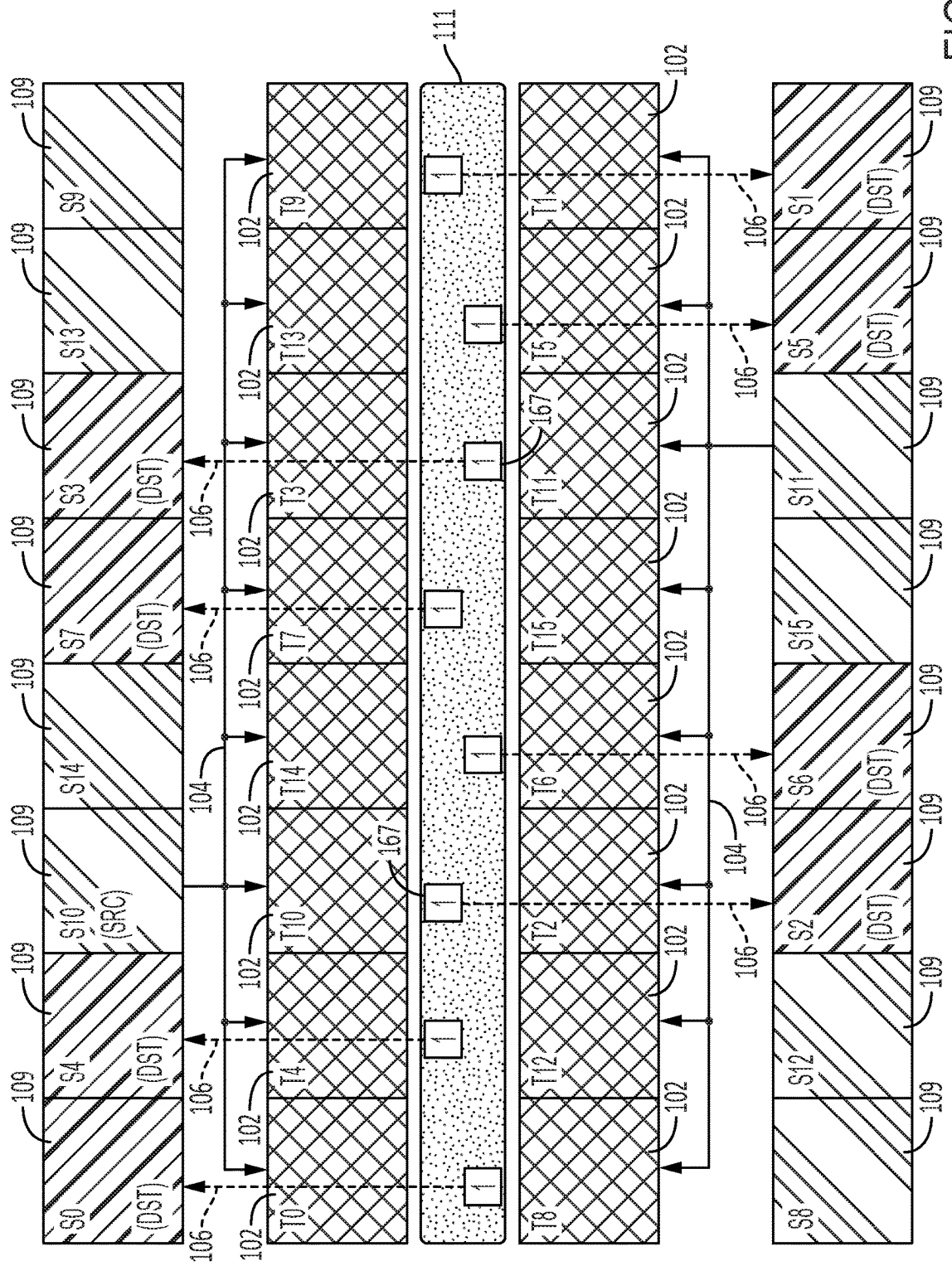
Figure 4D:
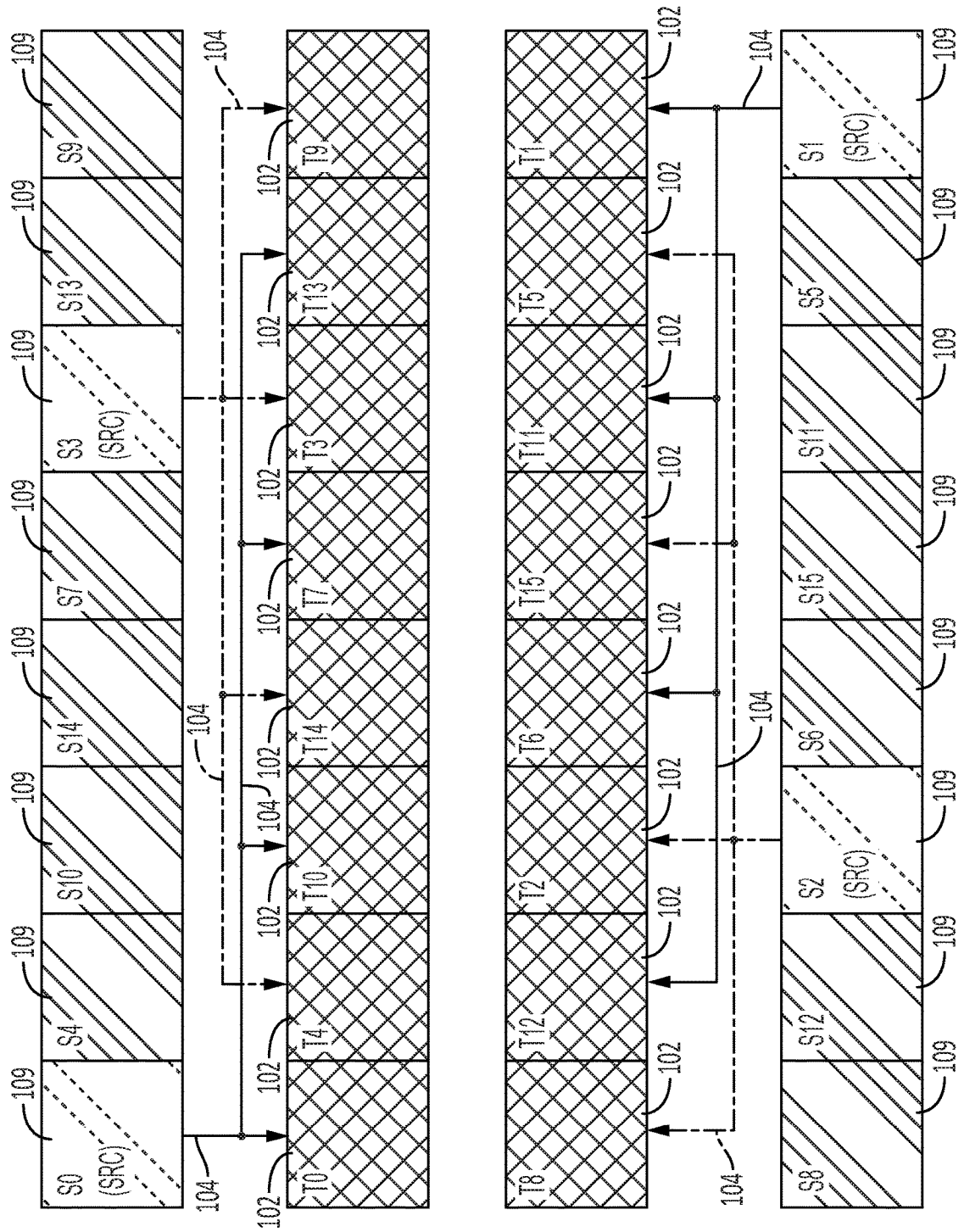
Figure 4D:
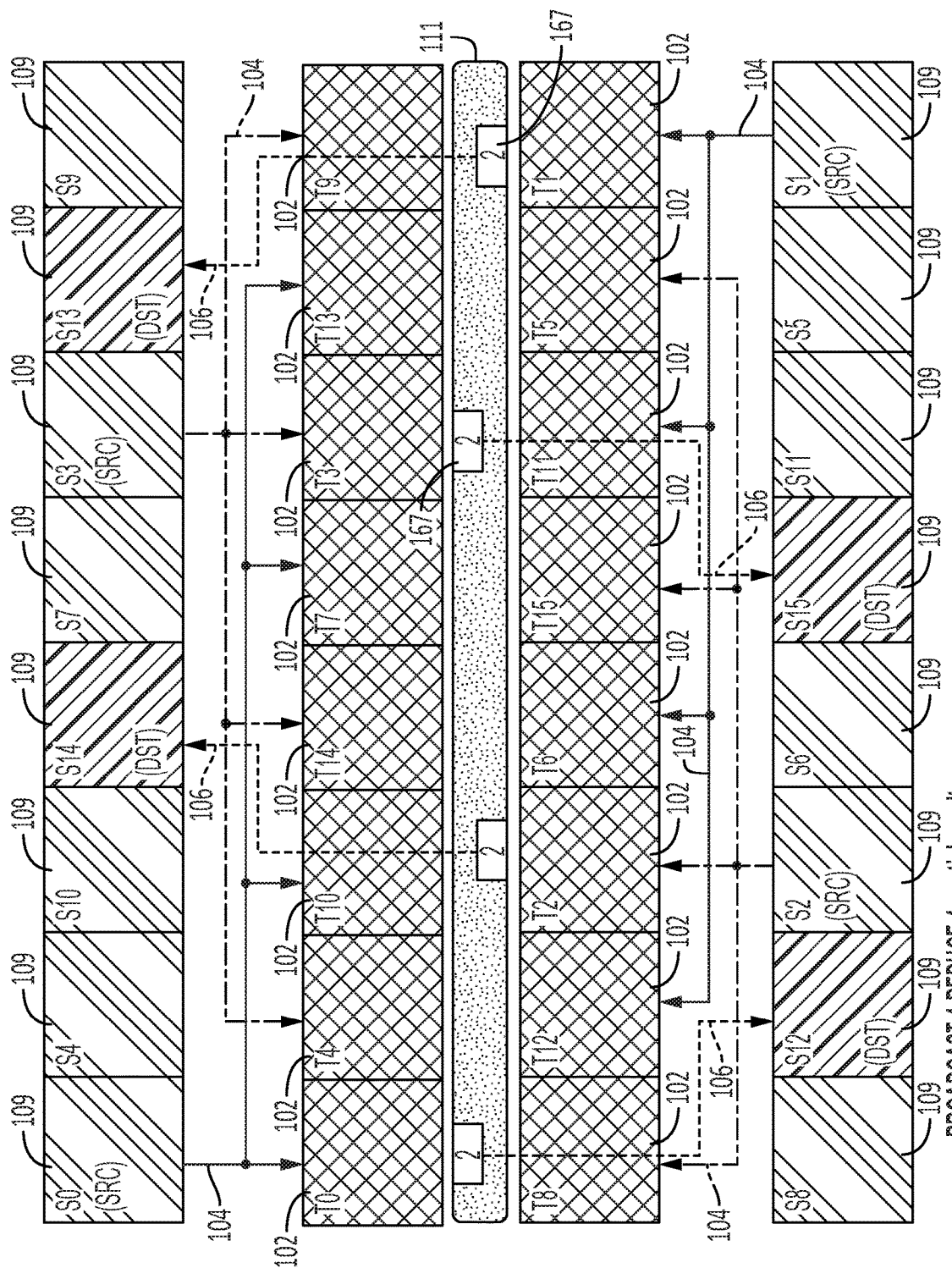
Figure 4E:
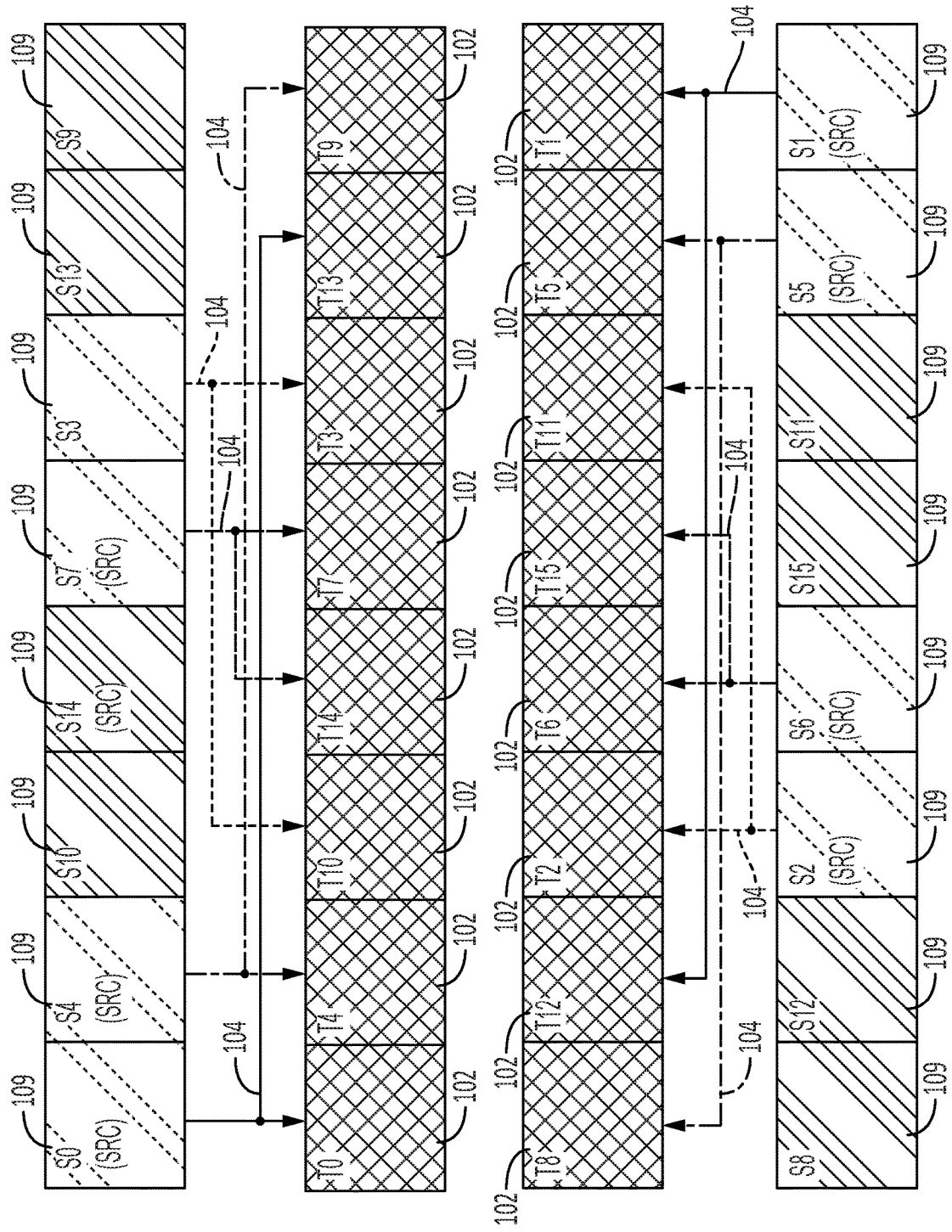
Figure 4E:
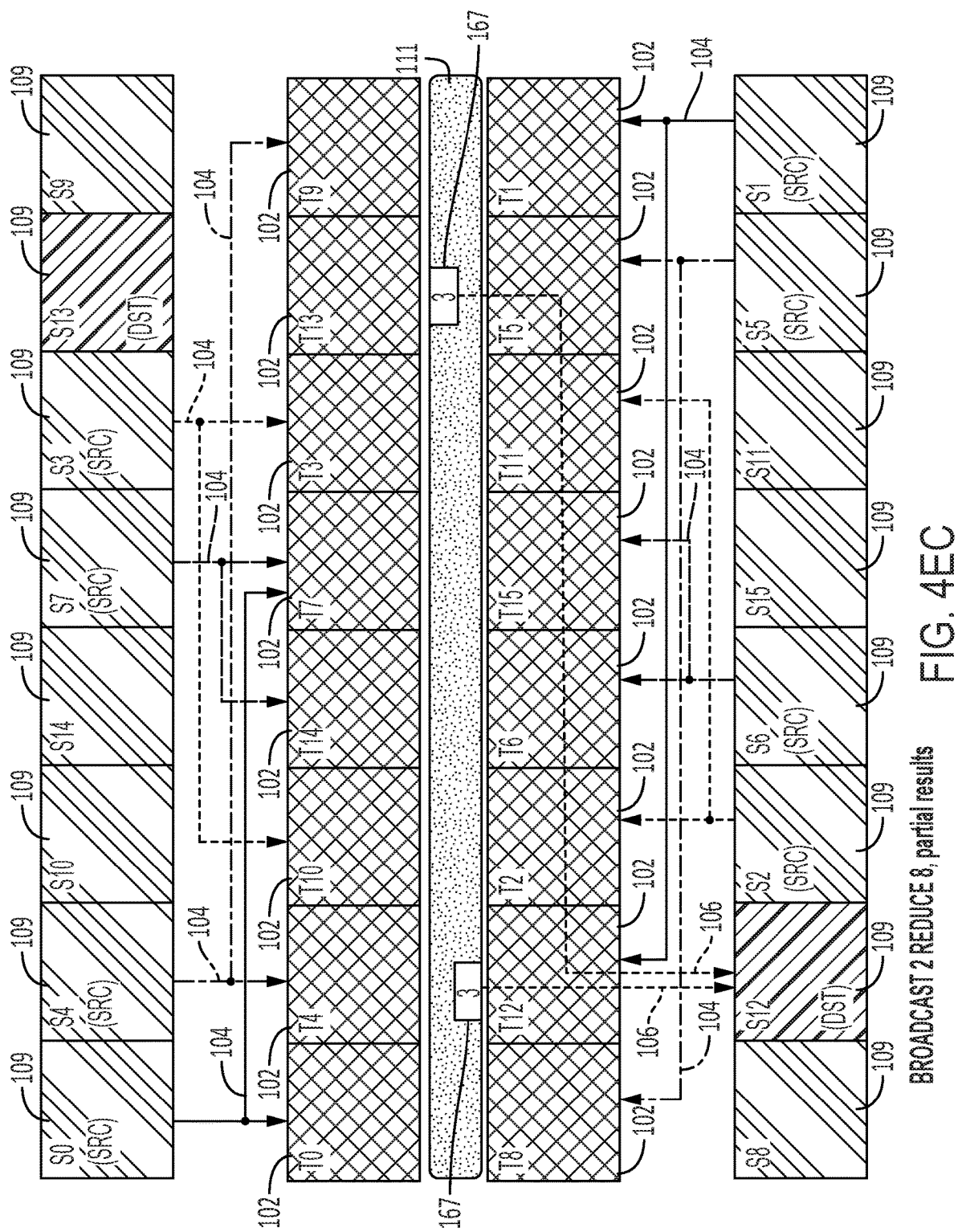
Figure 4F:
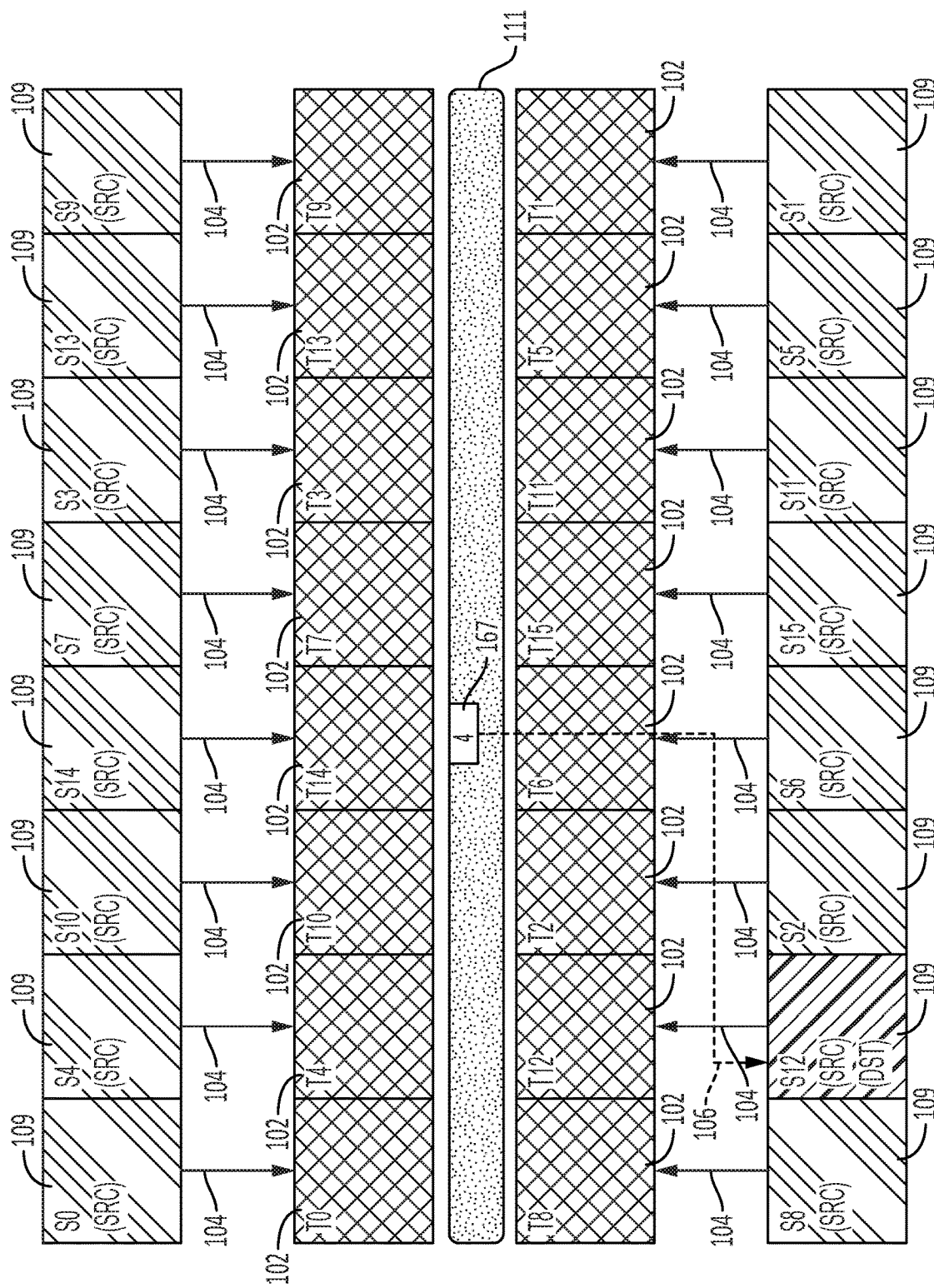
Figure 4G:
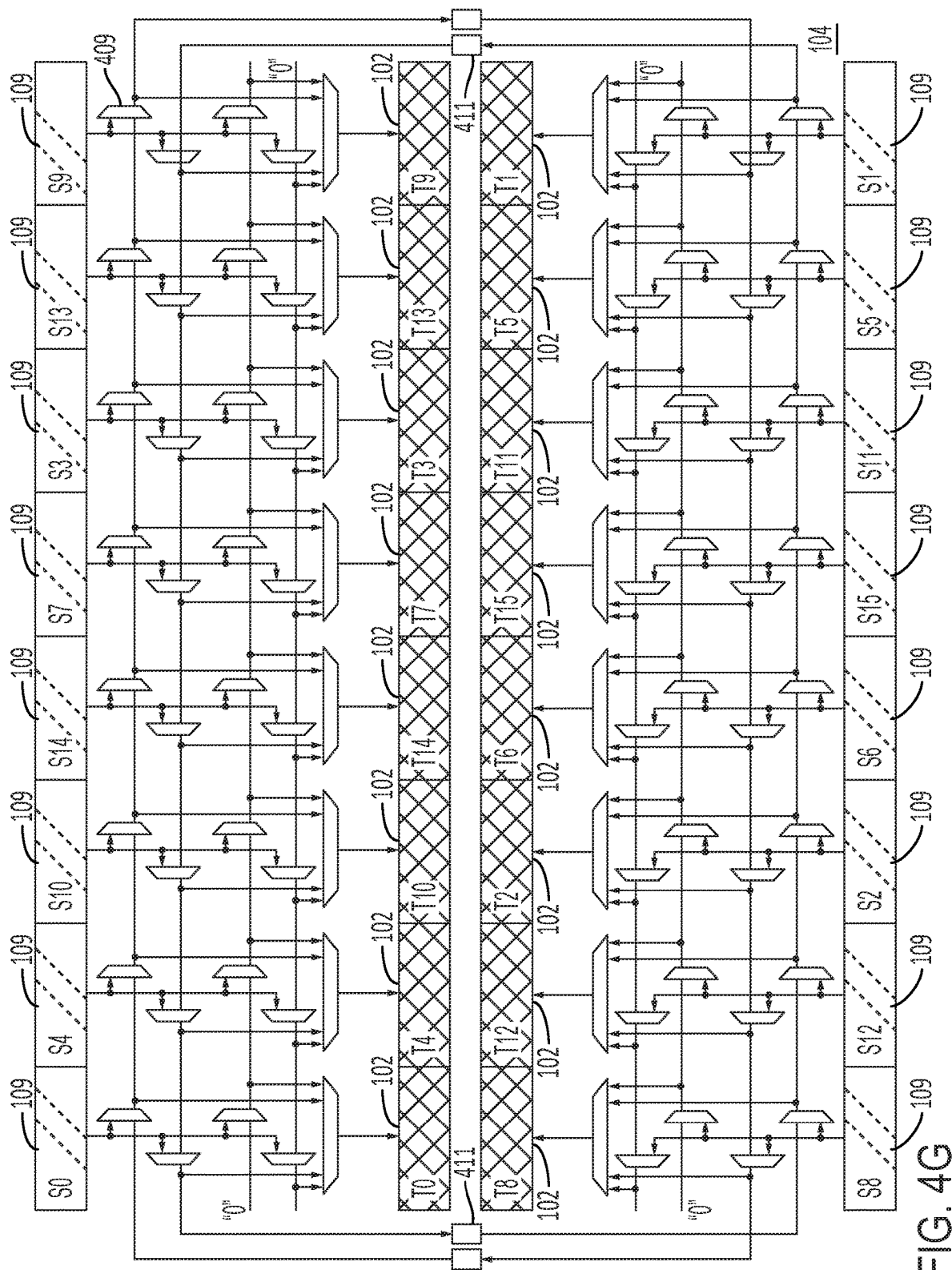
Figure 4H:
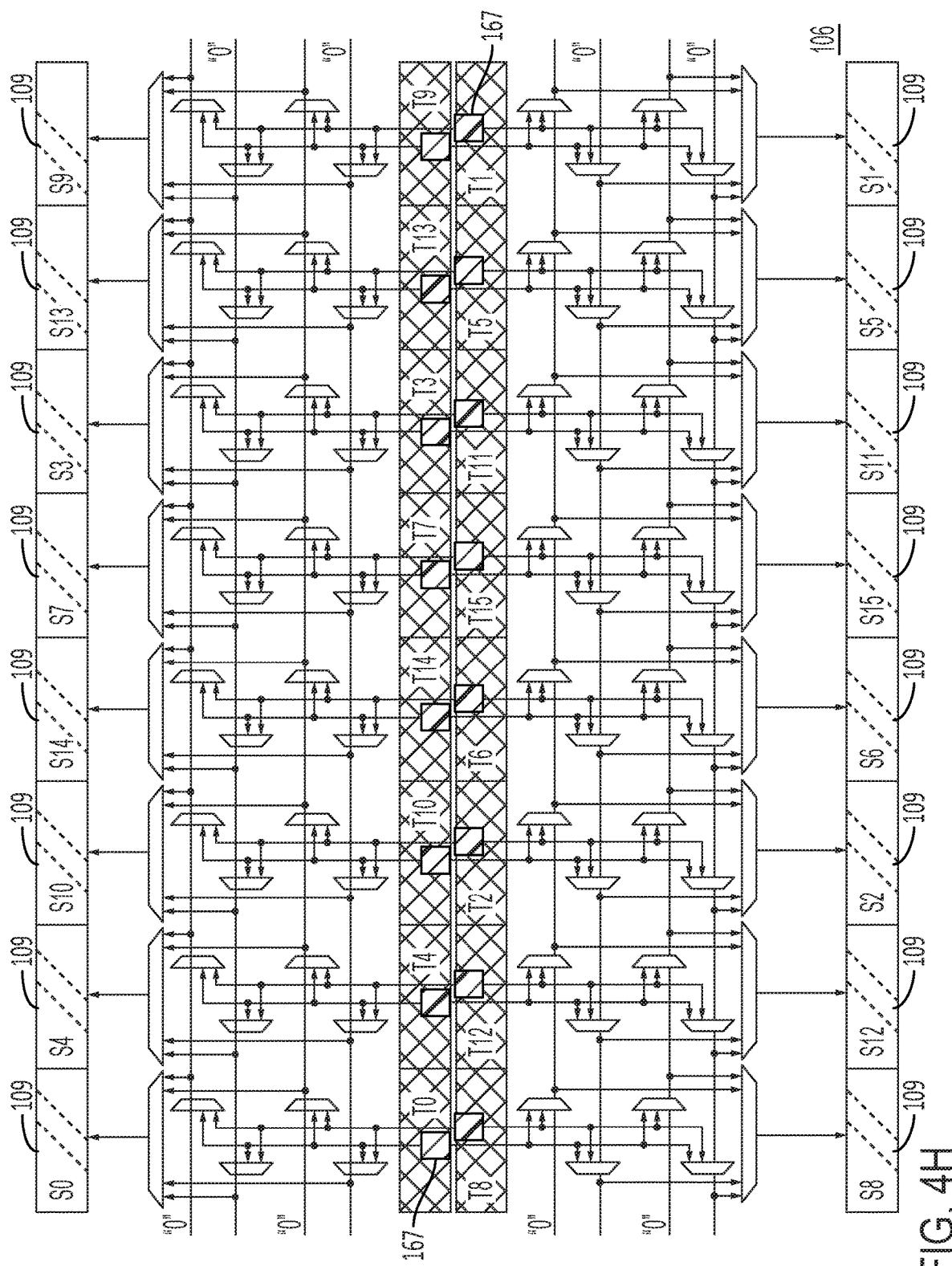
Figure 5A:
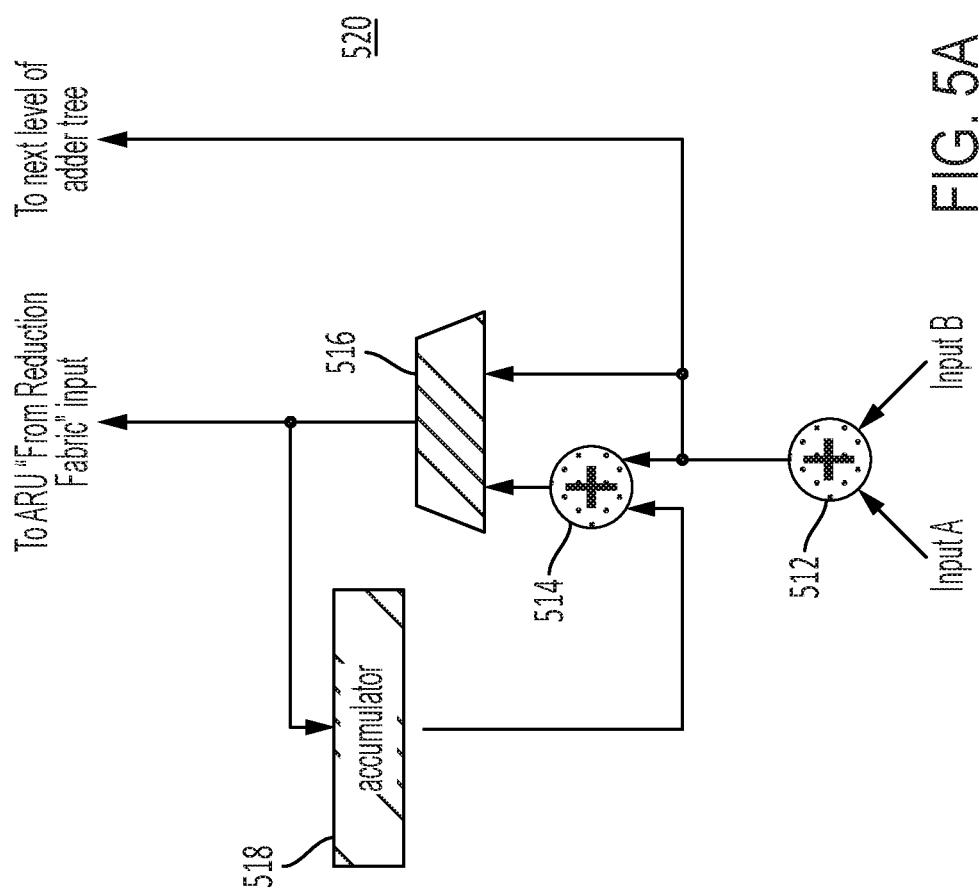
Figure 5B:
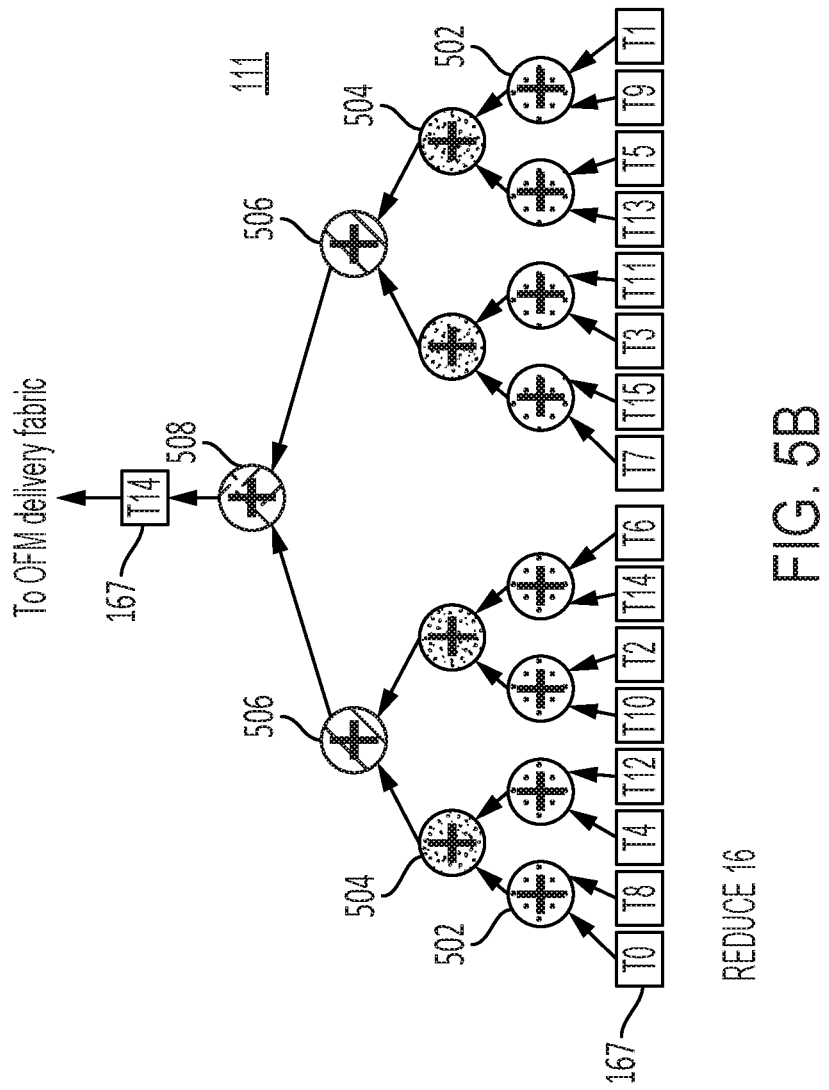
Figure 5C:
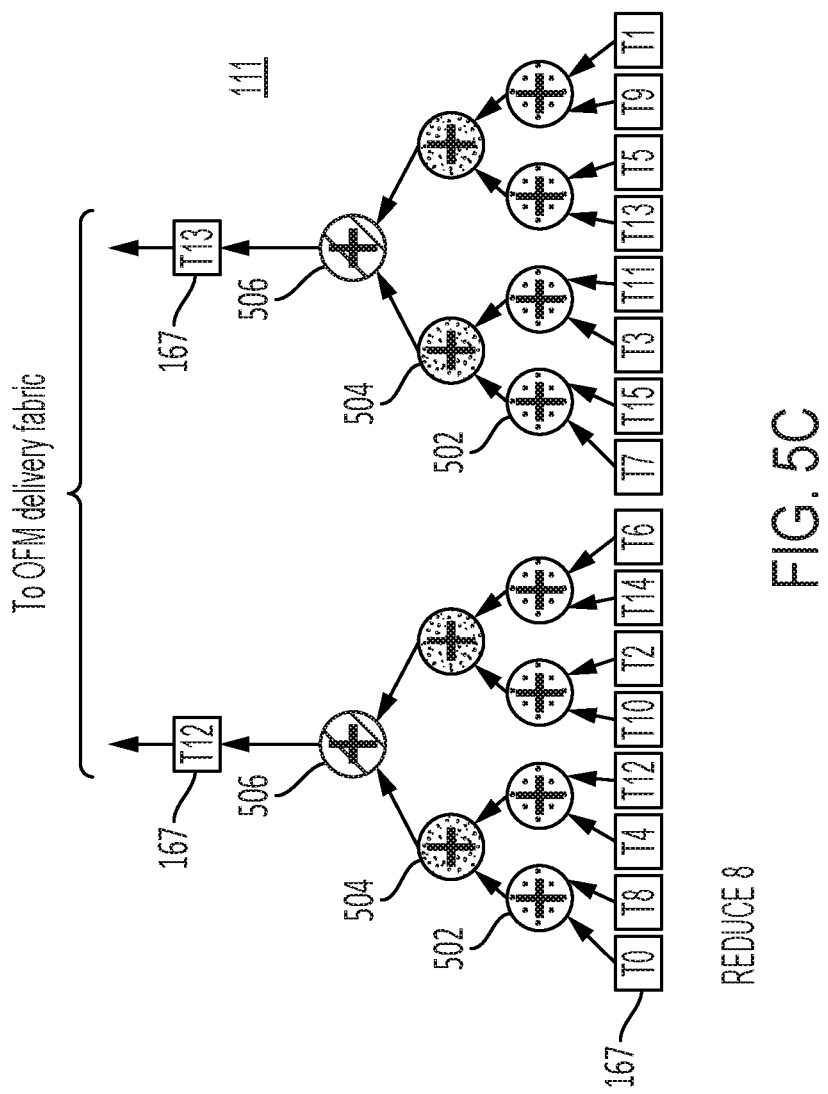
Figure 5D:
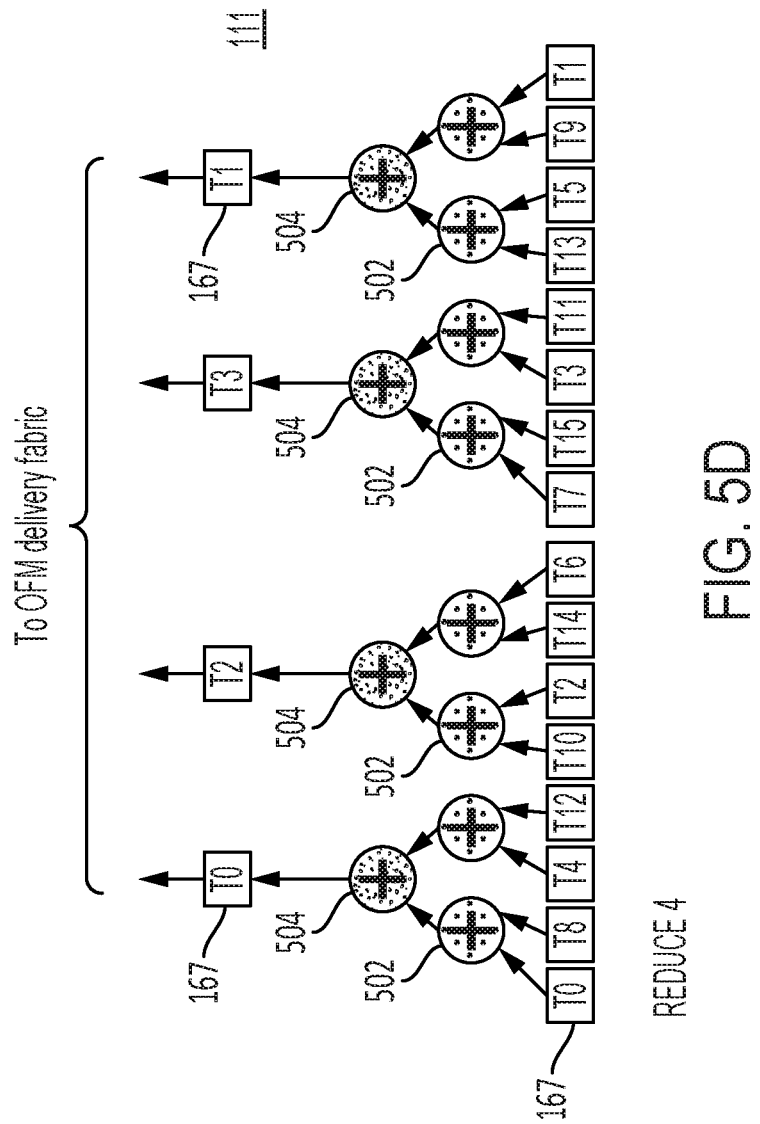
Figure 5F:
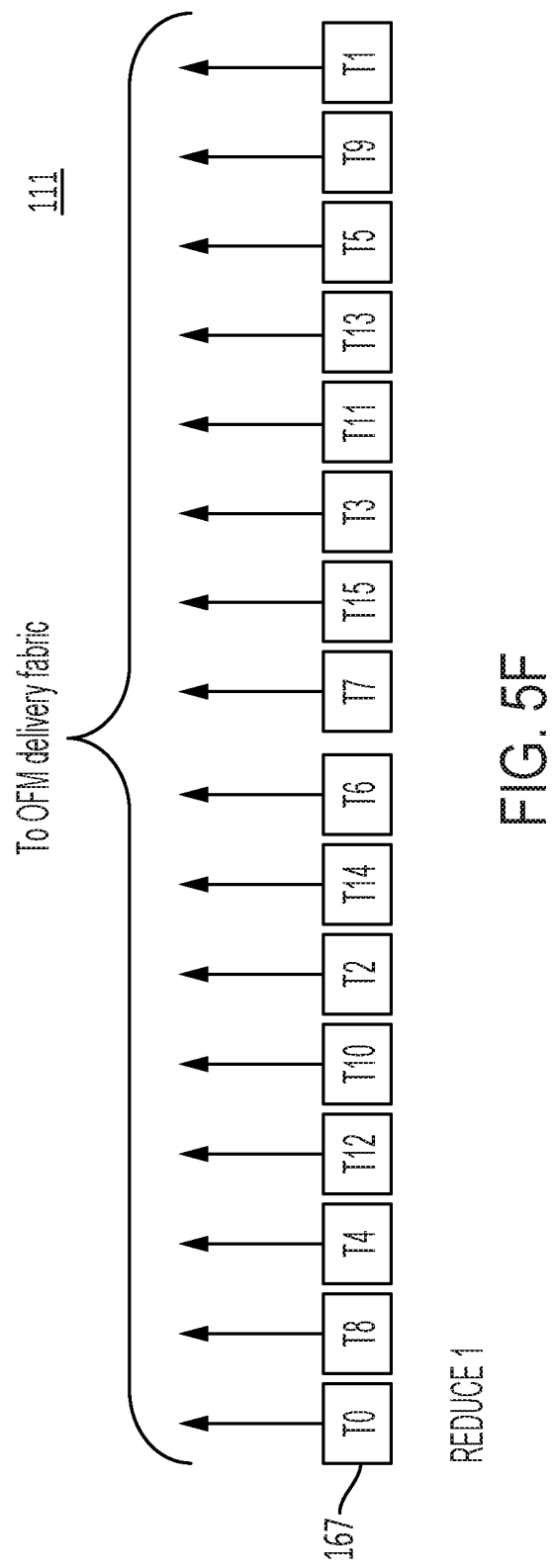
Figure 5G:
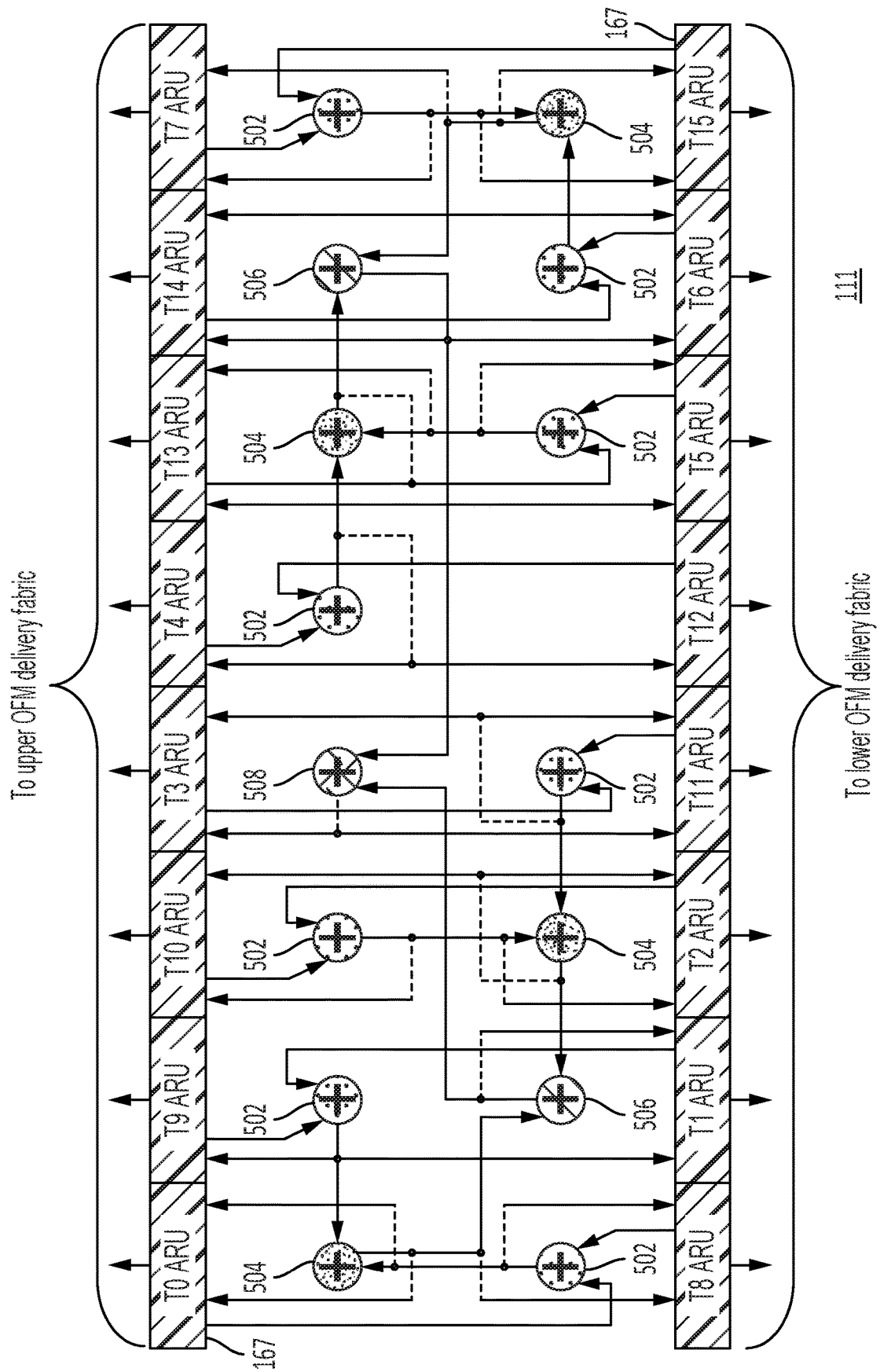

FIG. 3KA is a block diagram of a portion of a neural processor, according to an embodiment of the present disclosure;

FIG. 3KB is a data diagram, according to an embodiment of the present disclosure;

FIG. 3LA is a block diagram of a portion of a neural processor, according to an embodiment of the present disclosure;

FIG. 3LB is a block diagram of a portion of a neural processor, according to an embodiment of the present disclosure;

FIG. 3LC is a block diagram of a portion of a neural processor, according to an embodiment of the present disclosure;

FIG. 3LD is a block diagram of a portion of a neural processor, according to an embodiment of the present disclosure;

FIG. 3MA is a block diagram of a portion of a neural processor, according to an embodiment of the present disclosure;

FIG. 3MB is a block diagram of a portion of a neural processor, according to an embodiment of the present disclosure;

FIG. 3NA is a block diagram of a portion of a neural processor, according to an embodiment of the present disclosure;

FIG. 3OA is a block diagram of a portion of a neural processor, according to an embodiment of the present disclosure;

FIG. 3OB is a block diagram of a portion of a neural processor, according to an embodiment of the present disclosure;

FIG. 3OC is a block diagram of a portion of a neural processor, according to an embodiment of the present disclosure;

FIG. 3PA is a block diagram of a portion of a neural processor, according to an embodiment of the present disclosure;

FIG. 3PB is a block diagram of a portion of a neural processor, according to an embodiment of the present disclosure;

FIG. 3PC is a block diagram of a portion of a neural processor, according to an embodiment of the present disclosure;

FIG. 4AA is a block diagram of a portion of a neural processor, according to an embodiment of the present disclosure;

FIG. 4AB is a block diagram of a portion of a neural processor, according to an embodiment of the present disclosure;

FIG. 4AC is a block diagram of a portion of a neural processor, according to an embodiment of the present disclosure;

FIG. 4AD is a block diagram of a portion of a neural processor, according to an embodiment of the present disclosure;

FIG. 4AE is a block diagram of a portion of a neural processor, according to an embodiment of the present disclosure;

FIG. 4AF is a block diagram of a portion of a neural processor, according to an embodiment of the present disclosure;

FIG. 4AG is a block diagram of a portion of a neural processor, according to an embodiment of the present disclosure;

FIG. 4AH is a block diagram of a portion of a neural processor, according to an embodiment of the present disclosure;

FIG. 4AJ is a block diagram of a portion of a neural processor, according to an embodiment of the present disclosure;

FIG. 4AK is a block diagram of a portion of a neural processor, according to an embodiment of the present disclosure;

FIG. 4AL is a block diagram of a portion of a neural processor, according to an embodiment of the present disclosure;

FIG. 4AM is a block diagram of a portion of a neural processor, according to an embodiment of the present disclosure;

FIG. 4AN is a block diagram of a portion of a neural processor, according to an embodiment of the present disclosure;

FIG. 4BA is a block diagram of a portion of a neural processor, according to an embodiment of the present disclosure;

FIG. 4BB is a block diagram of a portion of a neural processor, according to an embodiment of the present disclosure;

FIG. 4BC is a block diagram of a portion of a neural processor, according to an embodiment of the present disclosure;

FIG. 4BD is a block diagram of a portion of a neural processor, according to an embodiment of the present disclosure;

FIG. 4CA is a block diagram of a portion of a neural processor, according to an embodiment of the present disclosure;

FIG. 4CB is a block diagram of a portion of a neural processor, according to an embodiment of the present disclosure;

FIG. 4CC is a block diagram of a portion of a neural processor, according to an embodiment of the present disclosure;

FIG. 4DA is a block diagram of a portion of a neural processor, according to an embodiment of the present disclosure;

FIG. 4DB is a block diagram of a portion of a neural processor, according to an embodiment of the present disclosure;

FIG. 4DC is a block diagram of a portion of a neural processor, according to an embodiment of the present disclosure;

FIG. 4EA is a block diagram of a portion of a neural processor, according to an embodiment of the present disclosure;

FIG. 4EB is a block diagram of a portion of a neural processor, according to an embodiment of the present disclosure;

FIG. 4EC is a block diagram of a portion of a neural processor, according to an embodiment of the present disclosure;

FIG. 4FA is a block diagram of a portion of a neural processor, according to an embodiment of the present disclosure;

FIG. 4FB is a block diagram of a portion of a neural processor, according to an embodiment of the present disclosure;

FIG. 4G is a block diagram of a portion of a neural processor, according to an embodiment of the present disclosure;

FIG. 4H is a block diagram of a portion of a neural processor, according to an embodiment of the present disclosure;

FIG. 5A is a block diagram of a portion of a neural processor, according to an embodiment of the present disclosure;

FIG. 5B is a block diagram of a portion of a neural processor, according to an embodiment of the present disclosure;

FIG. 5C is a block diagram of a portion of a neural processor, according to an embodiment of the present disclosure;

FIG. 5D is a block diagram of a portion of a neural processor, according to an embodiment of the present disclosure;

FIG. 5E is a block diagram of a portion of a neural processor, according to an embodiment of the present disclosure;

FIG. 5F is a block diagram of a portion of a neural processor, according to an embodiment of the present disclosure;

FIG. 5G is a block diagram of a portion of a neural processor, according to an embodiment of the present disclosure; and FIG. 6 is a block diagram of a portion of a neural processor, according to an embodiment of the present disclosure.

DETAILED DESCRIPTION

The detailed description set forth below in connection with the appended drawings is intended as a description of exemplary embodiments of a neural processor provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
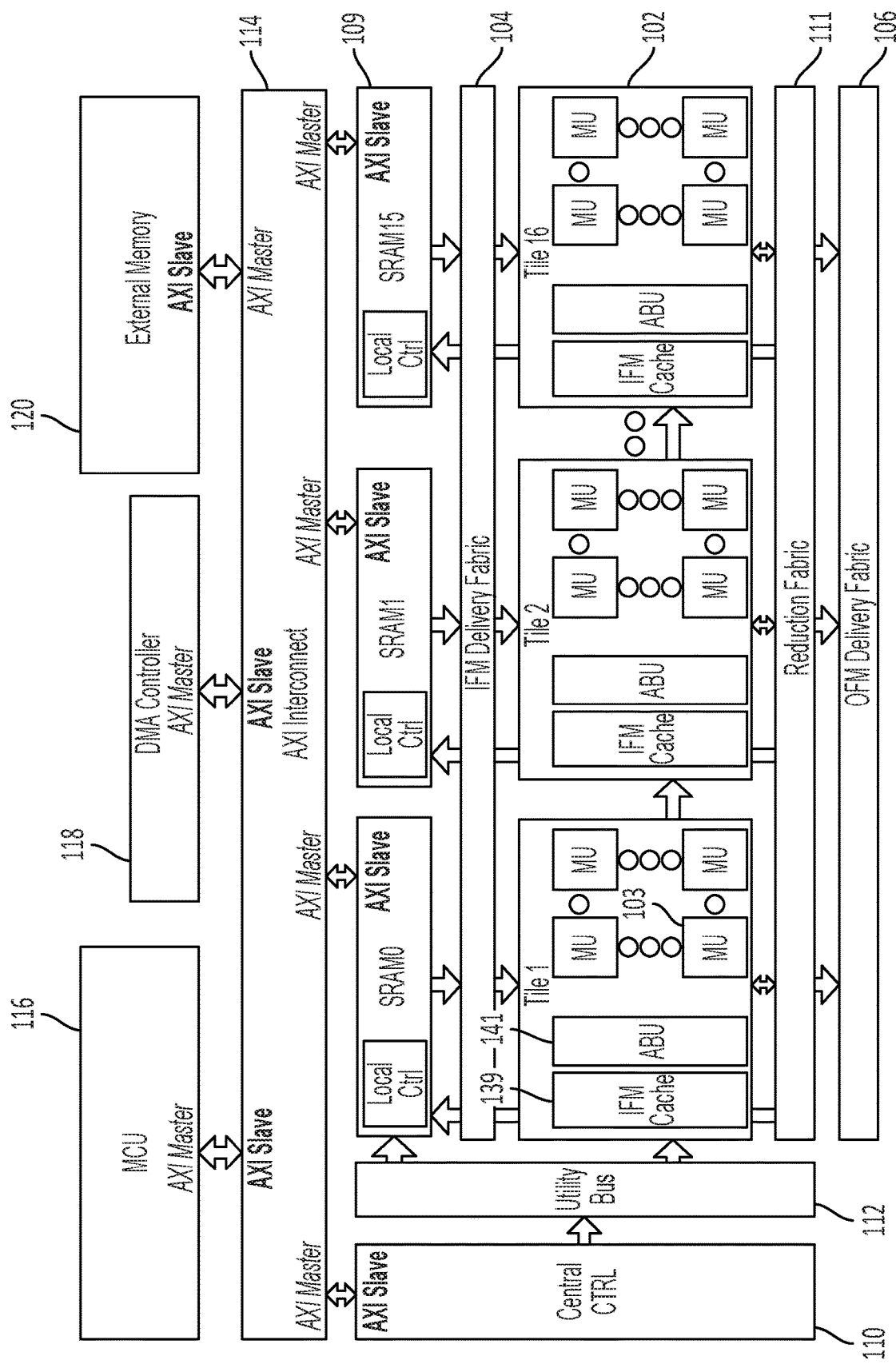
FIG. 1A is a block diagram of a neural processor, according to an embodiment of the present disclosure.

FIG. 1A shows a high-level block diagram of a neural processor, according to some embodiments. The neural processor may be configured to efficiently calculate a convolution or a tensor product of an input feature map (IFM) (or a tensor of "activations") with a multi-dimensional array (or tensor) of weights, to form an output feature map (OFM). The neural processor may also be configured to compute feature map pooling and activation function, however for purposes of clarity and brevity, pooling and activation function are largely not covered in this particular disclosure.

A plurality of SRAM bank sets 109 (each including several, e.g., four SRAM banks 108 in FIGS. 4AB and 4AC) may be connected to Multiply-and-Reduce tiles 102 (or "MR tiles") (discussed in further detail below) through an input feature map (IFM) delivery fabric 104 that brings input activation maps stored in SRAM bank sets 109 to tiles 102 for subsequent computation. As will be discussed in further detail below, tiles 102 contain an array of Multiplier Units (MU) 103. Tiles 102 also connect to SRAM bank sets 109 via an output feature map (OFM) delivery fabric 106 that transmits computed results from tiles 102 to SRAM bank sets 109 for storage.

The IFM delivery fabric 104 may be a segmented bus (as discussed in further detail below), and, as a result, each one of the SRAM bank sets 109 may be associated with one of the tiles 102, as discussed in further detail below. A central controller 110 may supply control words to control registers in the system via a utility bus 112. Data may be delivered to the neural processor via an AXI (Advanced Extensible Interconnect by ARM Ltd) interconnect 114 and the results of processing operations performed by the neural processor may similarly be retrieved via the AXI interconnect 114. An MCU (micro-controller) 116 can be used to orchestrate computation by properly configuring the central controller in a timely fashion, as well as coordinate and execute data transfers using DMA controller 118 between the neural processor and an external memory 120.

Figure 1B:
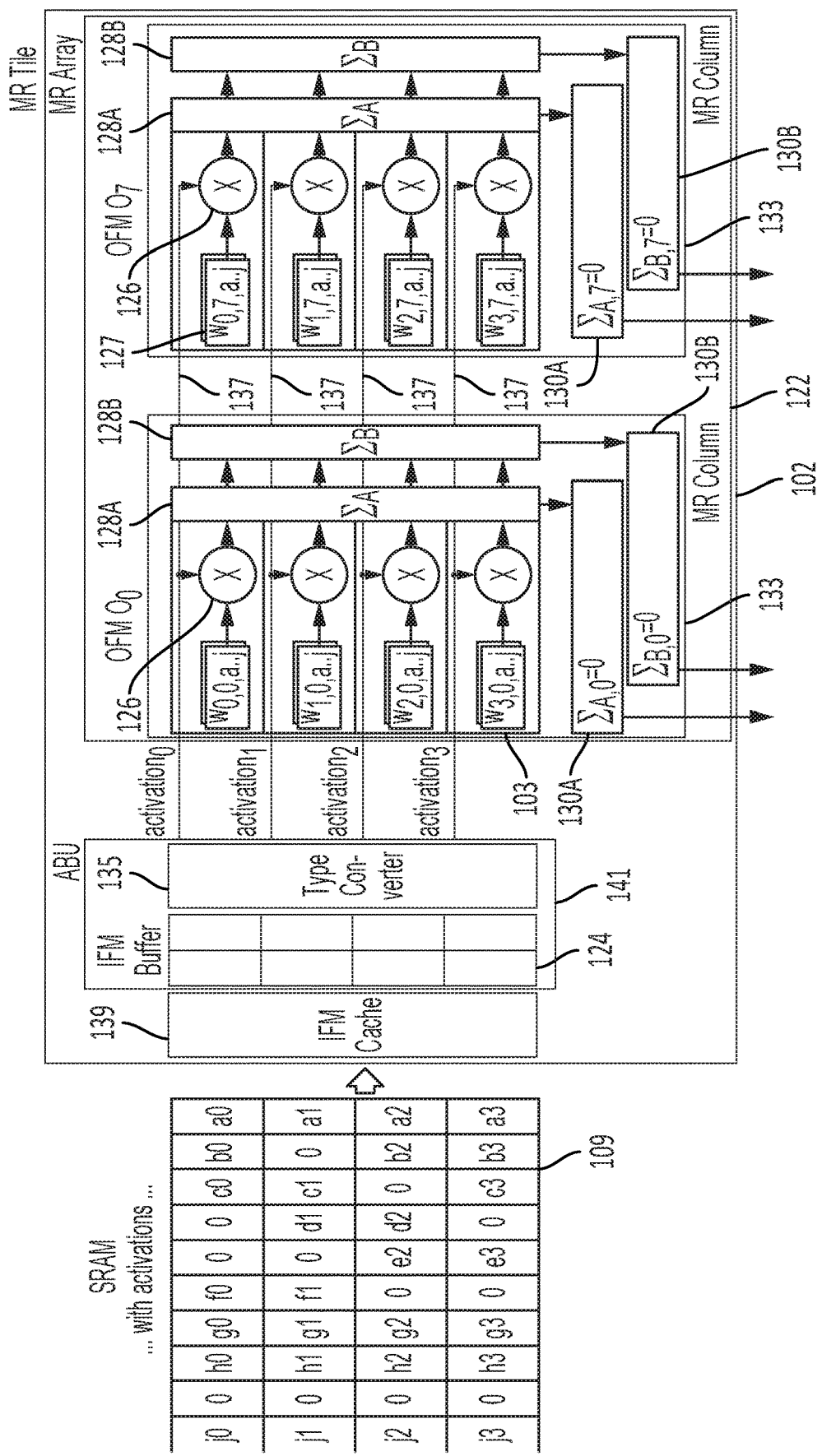
FIG. 1B is a block diagram of a portion of a neural processor, according to an embodiment of the present disclosure.

Each tile 102 may include a multiply-and-reduce (MR) array 122 of multiply-and-reduce (MR) columns 133. FIG. 1B shows an MR array 122, in some embodiments. Each MR array contains eight MR columns 133. Each MR column 133 contains sixteen multiplier units MU 103 and two adder trees 128A and 128B. Note that for clarity FIG. 1B shows only four of sixteen MUs 103.

Each MU 103 may include a plurality of registers, e.g. a register file 127 containing 18 9-bit registers that may be referred to as "weight registers", and a multiplier 126. Multiplier 126 multiplies input activations by weights. Subsequently, adder trees 128A and 128B in each MR column 133 sum up (reduce) resulting products from the sixteen MUs in the column to form a dot product. The summation is performed in a particular way as explained in detail below.

Each tile 102 also contains IFM Cache 139 and Activation Broadcast Unit (ABU) 141. IFM Cache 139 aims to reduce SRAM reads for input feature maps by caching IFM values received from SRAM. Just as each MR Column 133 contains sixteen Multiplier Units 103, IFM Cache 139 contains sixteen parallel "activation lanes", each activation lane 137 effectively corresponding to a "row" of Multiplier Units in MR Array.

The Activation Broadcast Unit is responsible for preparation of input activations. The first step in the preparation process includes fetching input activations from IFM Cache 139 into IFM Activations Buffer 124 following the required convolution sequence while also omitting zero-valued activations, when possible, to realize sparse activation computation. The sparse activation computation feature can be optionally disabled, resulting in "dense" tensor computation mode. The second step in the preparation process includes converting numerical type of activations into sign-and-8bit-magnitude format, including partitioning data types with bit width exceeding 8 bits into a series of sign-and-8bit-magnitude values using Type Converter 135. When activations have been encoded using a "zero-point", as supported by Google TensorFlow, the zero-point constant value Z may be added to activations before converting them to sign-and-8bit-magnitude format.

Just as each MR Column 133 contains sixteen Multiplier Units 103, ABU 141, IFM Buffer 124 and Type Converter 135 also contain sixteen lanes each. The resulting converted sixteen activation values are broadcast in parallel to MR Array 122 such that each activation lane brings an input activation value to the corresponding row of eight multiplier units.

Each MR column also contains accumulators 130A and 130B, one for each adder tree 128A and 128B. As used herein, an "accumulator" is a combination of an adder and a register that is configured to add an input value to the contents of the register, and overwrite the contents of the register with the sum.

As mentioned previously, multiplier units in MR array 122 may be arranged as a plurality of rows, e.g., 16 rows, with FIG. 1B showing only four rows out of 16 for clarity, and columns (or "OFM channels"), e.g., eight columns, of which two labeled "$O_0$" and "$O_7$" are shown in FIG. 1B.

Let us refer to IFM vector with the length of sixteen as "IFM slice". An IFM slice may have planar coordinates (x, y) and depth channel index d associated with it as indices into the associated IFM tensor, e.g. IFM[x, y, d:d+15]. In a general case, tile 102 receives one IFM slice at a time from on-chip SRAM containing a 3D IFM tensor, where each input IFM slice contains values for sixteen depth channels from index d to d+15 inclusive at planar location (x, y) in the input layer.

Similarly, let us refer to OFM vector with the length of eight as "OFM slice". An OFM slice may have planar coordinates (x, y) and depth channel index d associated with it as indices into the associated OFM tensor, e.g. OFM[x, y, d:d+7]. In a general case, tile 102 produces OFM slices as output. When a tile is not stalled, the output rate may vary, as will be seen below, from one OFM slice per clock up to, for example, a maximum of two OFM slices per clock in some embodiments. Note that tile 102 OFM output vectors (OFM slices) from tiles 102 may need to be further reduced by Reduction Fabric 111 to complete the OFM vector computation, before transmitting the final OFM vector result over OFM delivery fabric 106 for storage in SRAM.

Note that both IFM and OFM tensors may also have a fourth "batch" dimension, however the neural processor purpose is to accelerate neural network model real-time inference, as opposed to neural network model training, and real-time inference is typically performed on batch size of 1. For the sake of explanation simplicity we will omit the batch dimension in most of discussion and describe batch dimension details later separately.

The neural processor may be implemented in synchronous logic, and each MR column 133 may be entirely within one clock domain. In some embodiments, in operation, during each cycle of operation (e.g., during each cycle of the clock), each of the sixteen multipliers 126 may form a respective product from two factors at its inputs, each of the adders 128 may form a sum of some of those sixteen products at its inputs (as illustrated in FIG. 1 B for four lanes), and the adder of each accumulator 130 may form the sum of (i) the current value of the register of the accumulator 130, and (ii) the output of a corresponding adder 128. At the beginning of the next clock cycle, the output of each adder of each accumulator 130 may be written into the register of the accumulator 130.

In some embodiments, the calculation may be pipelined and additional registers (i.e., arrays of flip-flops) may be present between the elements shown in FIG. 1B, for example to provide adequate timing margins at the clock speed at which the circuit is to be operated. In such an embodiment the throughput may be the same (i.e., the same as in the absence of the additional registers, e.g., one multiplication and addition per clock cycle) but the latency between (i) the input data being fed to the multipliers 126 and (ii) the final results of the multiplications and additions being written to the registers of the accumulators 130 may be greater (e.g., several clock cycles).

FIGS. 1C-1H illustrate an example of operation in which the neural processor takes advantage of sparsity in the IFM to accelerate the completion of a calculation, by advancing certain multiplication and addition operations out of turn, so as to make use of a multiplier that would otherwise perform a multiplication by zero, when an element of the IFM equals zero. The IFM may be stored in an SRAM bank set 109 and the fetching of data from the SRAM bank set 109 may be scheduled such that the activations buffer 124 operates as a plurality of queues, each corresponding to one row of data as shown in FIG. 1B, and each feeding a respective lane of the MR array 122.

For clarity of explanation, let us assume that IFM cache 139 between the SRAM and the activations buffer 124 has been disabled and bypassed. Let us assume that activations data type is uint8 and weights data type is int8, in which case the type converter 135 acts to pass activation values through unchanged and multiplication in MU 103 takes one clock (i.e., one clock cycle). Let us assume that SRAM bank set 109 contains some sample IFM values as shown in FIG. 1B at the beginning of the example operation and only one tile is being used.

Let us also assume that weight tensor W[0 . . . 15,0 . . . 7, a . . . j] corresponding to 16 IFM lanes, 8 OFM columns and 10 IFM input vectors a through j has been pre-loaded into corresponding MU register files.

Figure 1C:
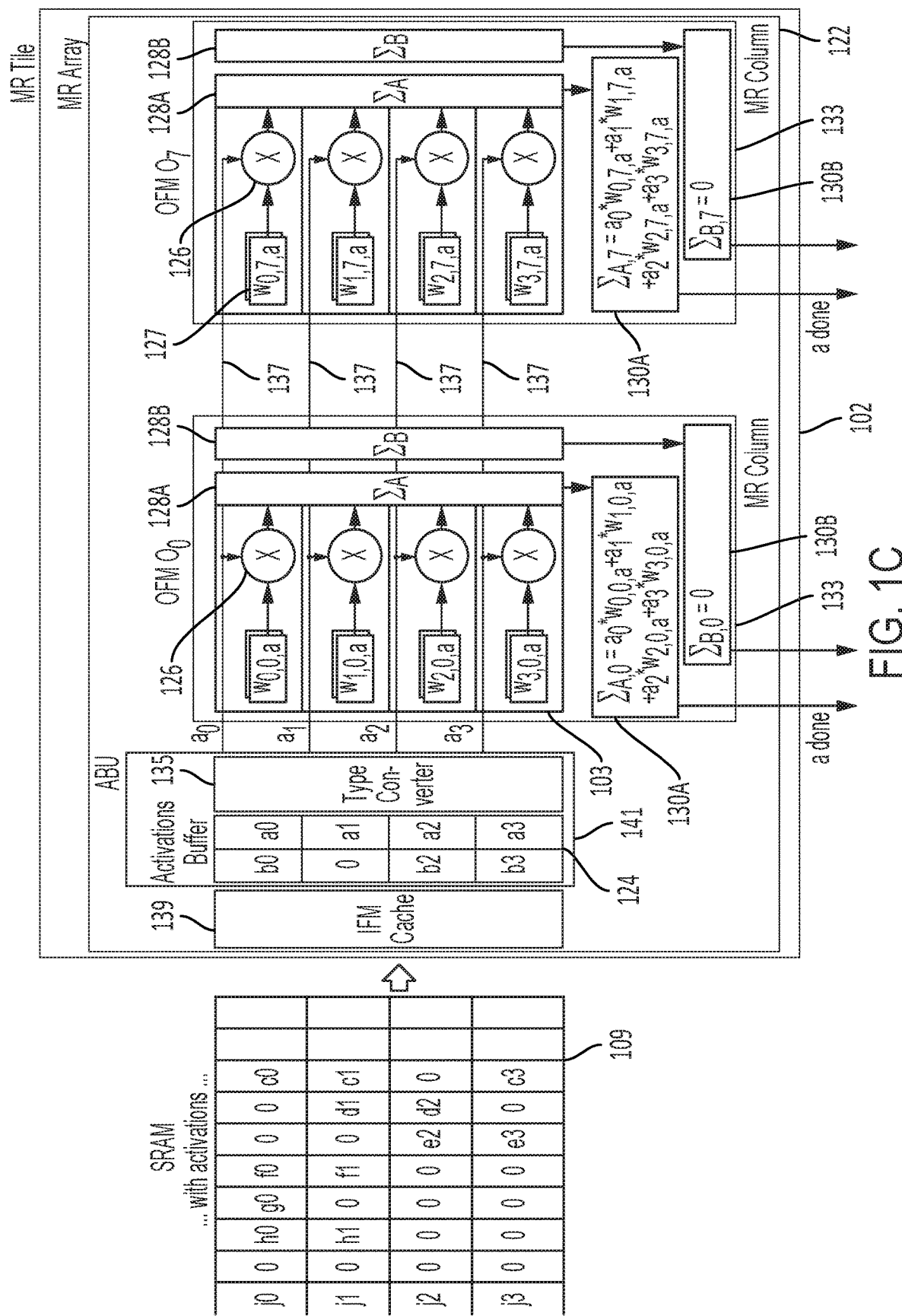
FIG. 1C is a data flow diagram in a portion of a neural processor, according to an embodiment of the present disclosure.

Once the example operation starts, it may be seen from FIG. 1C, that, in the example illustrated, two IFM vectors a[ ] and b[ ] (two rightmost columns in FIG. 1C) are fetched into the activations buffer 124, such that the first column of the activations buffer 124 (i.e., the right-hand column a[ ], as illustrated) contains the first vector of the IFM (consisting of the elements a0 through a3) and the second column of the activations buffer 124 (i.e., the left-hand column b[ ], as illustrated) contains the second vector of the IFM (consisting of the elements b0 through b3, with b1=0 in the notation used to identify the array forming the IFM). In FIG. 1C the second queue contains a1 as its first element (nearest the MR array 122), and the second queue contains zero (0) as its second element (i.e., b1=0).

Being at the front of the activations buffer 124, IFM vector a[0 . . . 3] gets broadcast to MR array 122, that is IFM value a0 is broadcast over the top activation lane as input to each of the eight multipliers 126 in the top row. At the same time the top row multipliers in columns 0 through 7 respectively receive weights W[0,0 . . . 7,a] from their respective local register files as second input to each multiplier.

Similarly, value a1 gets broadcast over the second-from-top activation lane as input to the second-from-top row of multipliers. At the same time the second-from-top row multipliers in columns 0 through 7 respectively receive weights W[1,0 . . . 7,a] from their respective local register files as second input to each multiplier.

In operation, products of the first vector of the IFM (consisting of the elements a0 through a3) with respective weights may be formed in each of the (16×8) array of multipliers 126, and sums of the products, corresponding to the desired dot product may be formed in the first adders 128A and saved in the first accumulators 130A:

$$\sum_{A,0} = a_0 * w_{0,0,a} + a_1 * w_{1,0,a} + a_2 * w_{2,0,a} + a_3 * w_{3,0,a}$$

$$\ldots$$

$$\sum_{A,7} = a_0 * w_{0,7,a} + a_1 * w_{1,7,a} + a_2 * w_{2,7,a} + a_3 * w_{3,7,a}$$

At this point the calculation of OFM output vector corresponding to IFM a[ ] is finished, with the result available in the accumulator 130A (shown as $\Sigma_{A,0 \ldots 7}$ in FIG. 1C), ready to be sent out to the OFM delivery fabric 106 (and accumulator 130A of each column may then be cleared).

Figure 1D:
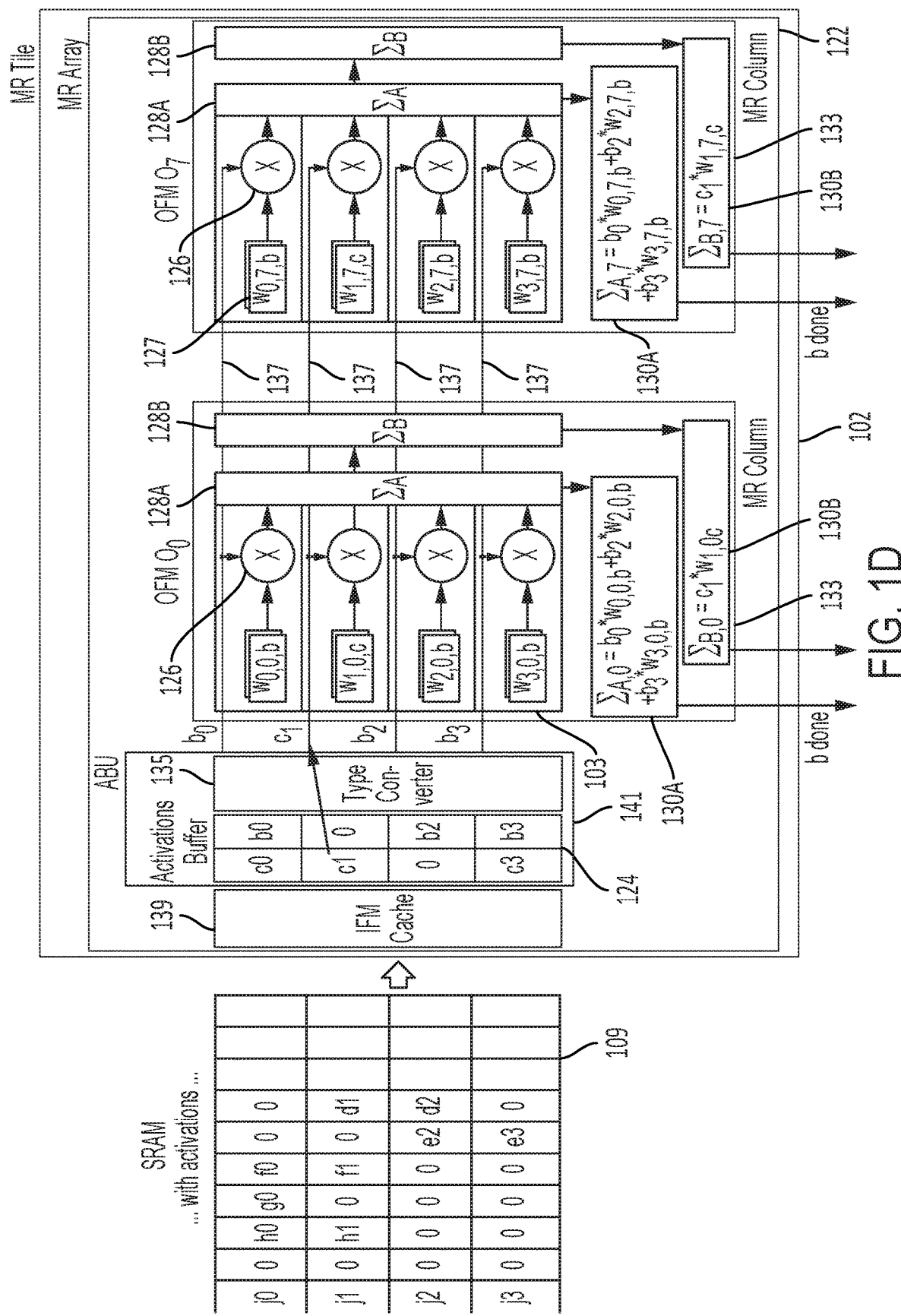
FIG. 1D is a data flow diagram in a portion of a neural processor, according to an embodiment of the present disclosure.

In FIG. 1D, after the first vector of the IFM has been processed, the third vector of the IFM (consisting of the elements c0 through c3, with c2=0) is read into the activations buffer 124. Instead of forming the product of the weights with all of the elements of the second vector of the IFM (consisting of the elements b0 through b3, with b1=0) (which would entail forming, in each multiplier 126 of the second lane, the product of zero and a respective weight), the second element of the third vector of the IFM (i.e., the element c1) is advanced out of turn and multiplied by a respective weight in each multiplier 126 of the second lane.

At the same time, multipliers in lanes 0, 2 and 3 are receiving weights W[0,0 . . . 7,b], W[2,0 . . . 7,b] and W[3,0 . . . 7,b] correspondingly from their respective local register files. However, since lane 1 is operating out-of-turn due to activation b1=0 being skipped, note that multipliers in lane 1 are receiving weights W[0,0 . . . 7,c] associated with IFM vector ("pixel") c, not IFM vector (pixel) b.

Since tile 122 is now processing two pixels simultaneously (pixel b and part of pixel c), adding multiplication products in a column can yield an incorrect result. To obtain the correct result, let us use one of the two adder trees to compute the dot product for pixel b, while using the other adder tree to start computing the dot product for pixel c.

The product formed by each multiplier 126 of the second lane is fed to a respective second adder 128B (shown as $\Sigma_{B,0 \ldots 7}$ in FIG. 1C), whereas the products formed by the multipliers 126 of other lanes are fed to a respective first adder 128A. The advancing out of turn of the element c1 forms a "hole" in the activations buffer 124 that can be taken advantage of in a subsequent clock cycle, to advance another element out of turn (as shown in FIG. 1 E, when element d1 is advanced out of turn).

As such, once the products of the nonzero elements of the second vector of the IFM with respective weights have been calculated and their sum is in the first accumulator 130A of each column, the first accumulator 130A of each column contains the dot product of the second vector (b[ ]) of the IFM with the weight vector of the column, and may be sent out to the OFM delivery fabric 106 (and the first accumulator 130A of each column may then be cleared).

$$\sum_{A,0} = b_0 * w_{0,0,b} + b_2 * w_{2,0,b} + b_3 * w_{3,0,b}$$

$$\ldots$$

$$\sum_{A,7} = b_0 * w_{0,7,a} + b_2 * w_{2,7,b} + b_3 * w_{3,7,b}$$

At this time, the second accumulator 130B of each column contains only one term of the dot product of the third vector (c1) of the IFM with a respective weight vector.

$$\sum_{B,0} = c_1 * w_{1,0,c}$$

$$\ldots$$

$$\sum_{B,7} = c_1 * w_{1,7,c}$$

Figure 1E:
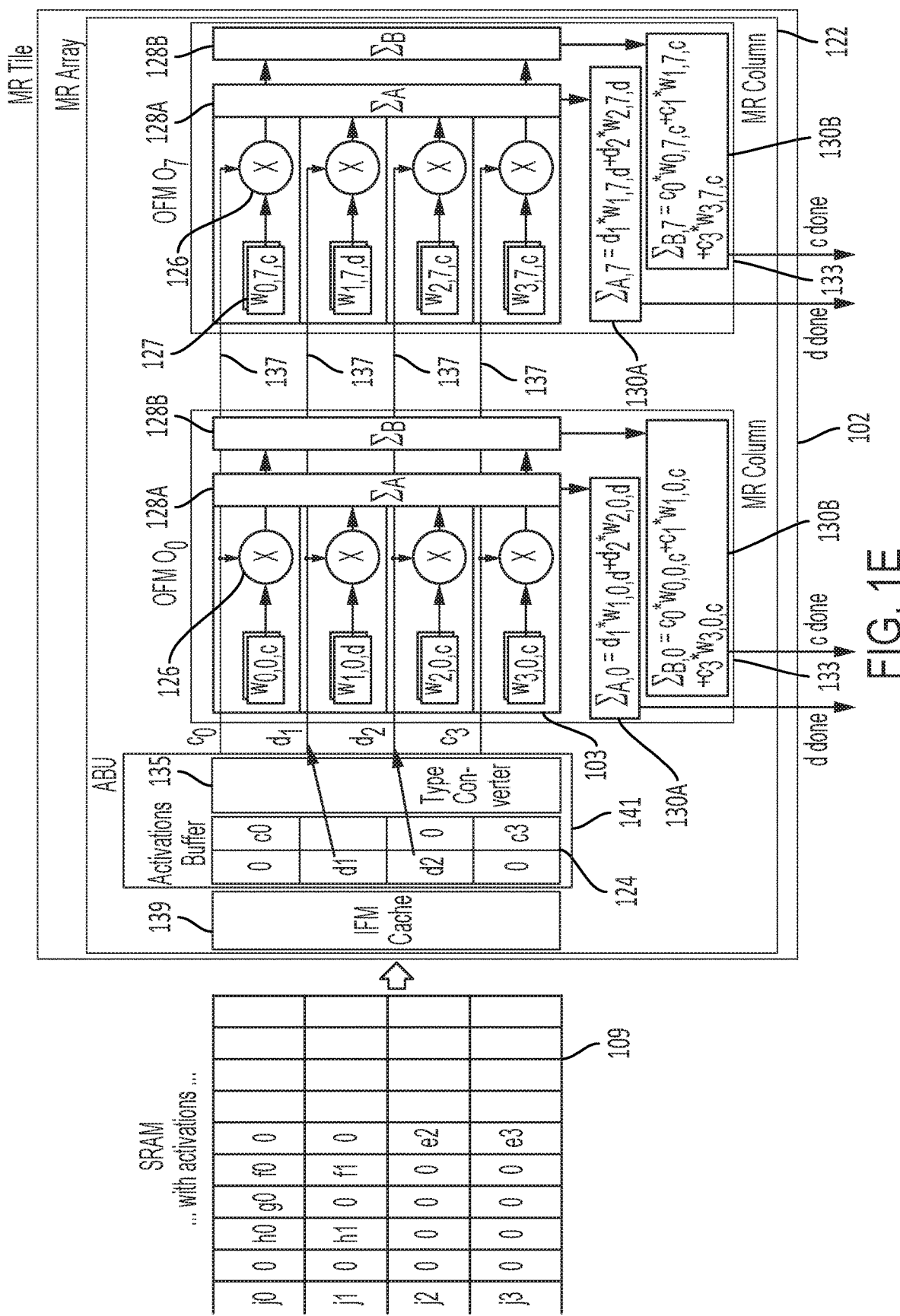
FIG. 1E is a data flow diagram in a portion of a neural processor, according to an embodiment of the present disclosure.

Referring to FIG. 1E, in a subsequent operation (e.g., during the next clock cycle) the remainder of the products of the elements of the third vector of the IFM (c0, c3) with the weight vectors may be formed (by the first and fourth multipliers 126 of each column of the MR array 122), and added, in the second accumulator 130B, to the one product already stored in the second accumulator 130B to complete, in the second accumulator 130B, the dot products of the third vector of the IFM (c[ ]) with the respective weight vectors.

$$\sum_{B,0} = c_0 * w_{0,0,c} + c_1 * w_{1,0,c} + c_3 * w_{3,0,c}$$

$$\ldots$$

$$\sum_{B,7} = c_0 * w_{0,7,c} + c_1 * w_{1,7,c} + c_3 * w_{3,7,c}$$

The dot products of the fourth vector of the IFM (consisting of the elements d0 through d3, with d0=d4=0) with the weight vectors may be calculated at the same time, by advancing out of turn both d1 (because the product involving c1 was performed on the previous cycle, leaving a "hole" in the activations buffer 124) and d2 (because c2=0).

$$\sum_{A,0} = d_1 * w_{1,0,d} + d_2 * w_{2,0,d}$$

$$\ldots$$

$$\sum_{A,7} = d_1 * w_{1,7,d} + d_2 * w_{2,7,d}$$

At this point the computation of OFM for both IFM vector c[ ] and IFM vector d[ ] is finished.

Figure 1F:
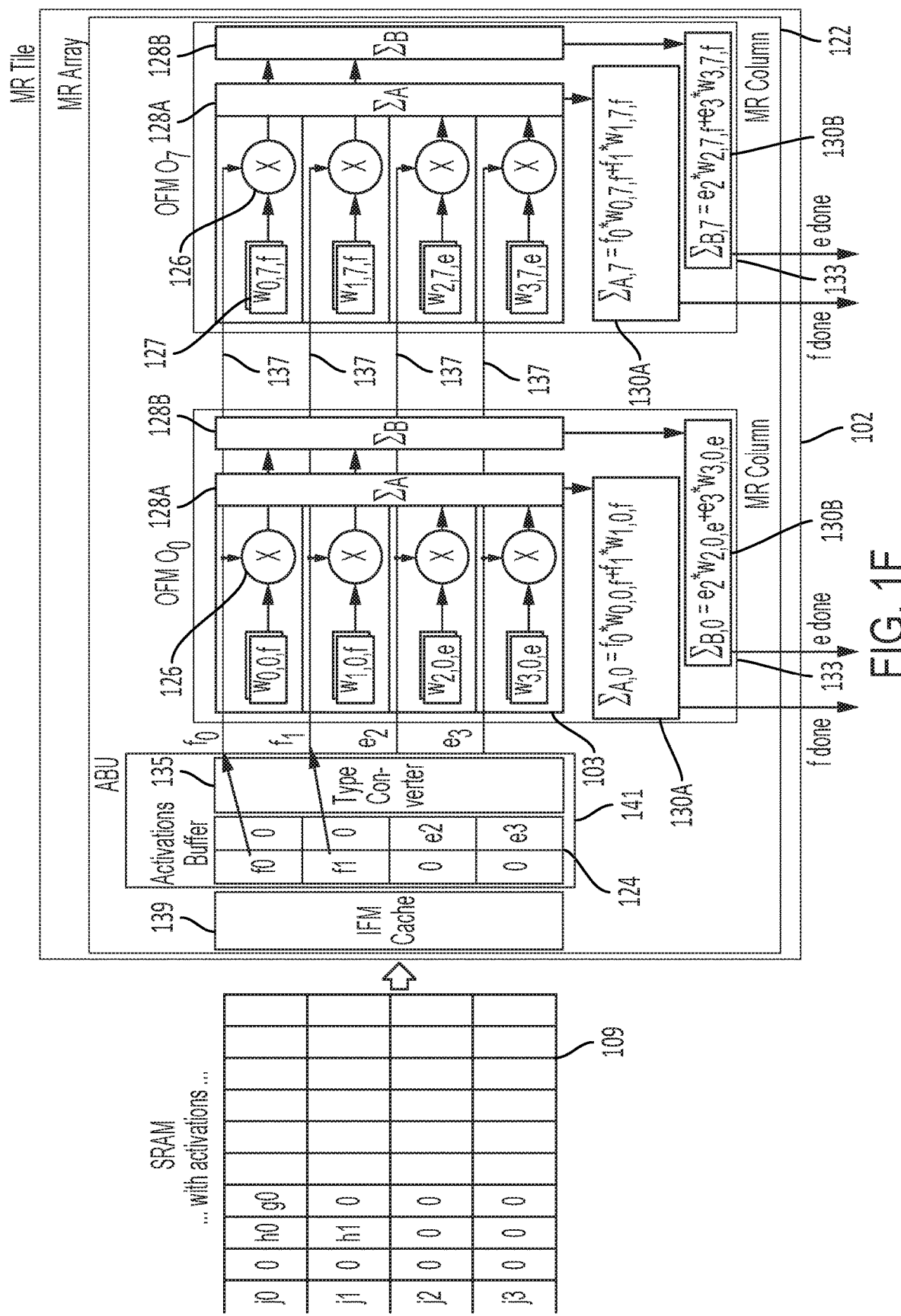
FIG. 1F is a data flow diagram in a portion of a neural processor, according to an embodiment of the present disclosure.

In a similar manner, when the activations buffer contains two vectors e[ ] and f[ ] with complementary sparsity as shown in FIG. 1F, each column of the MR column 122 may form two dot products simultaneously. In the example of FIG. 1F, for example, the dot product of the fifth vector of the IFM (consisting of the elements e0 through e3, with e0=e1=0) with each weight vector is formed at the same time as the dot product of the sixth vector of the IFM (consisting of the elements f0 through f3, with f2=f3=0) with each weight vector, both non-zero elements of the sixth vector being advanced out of turn.

Figure 1G:
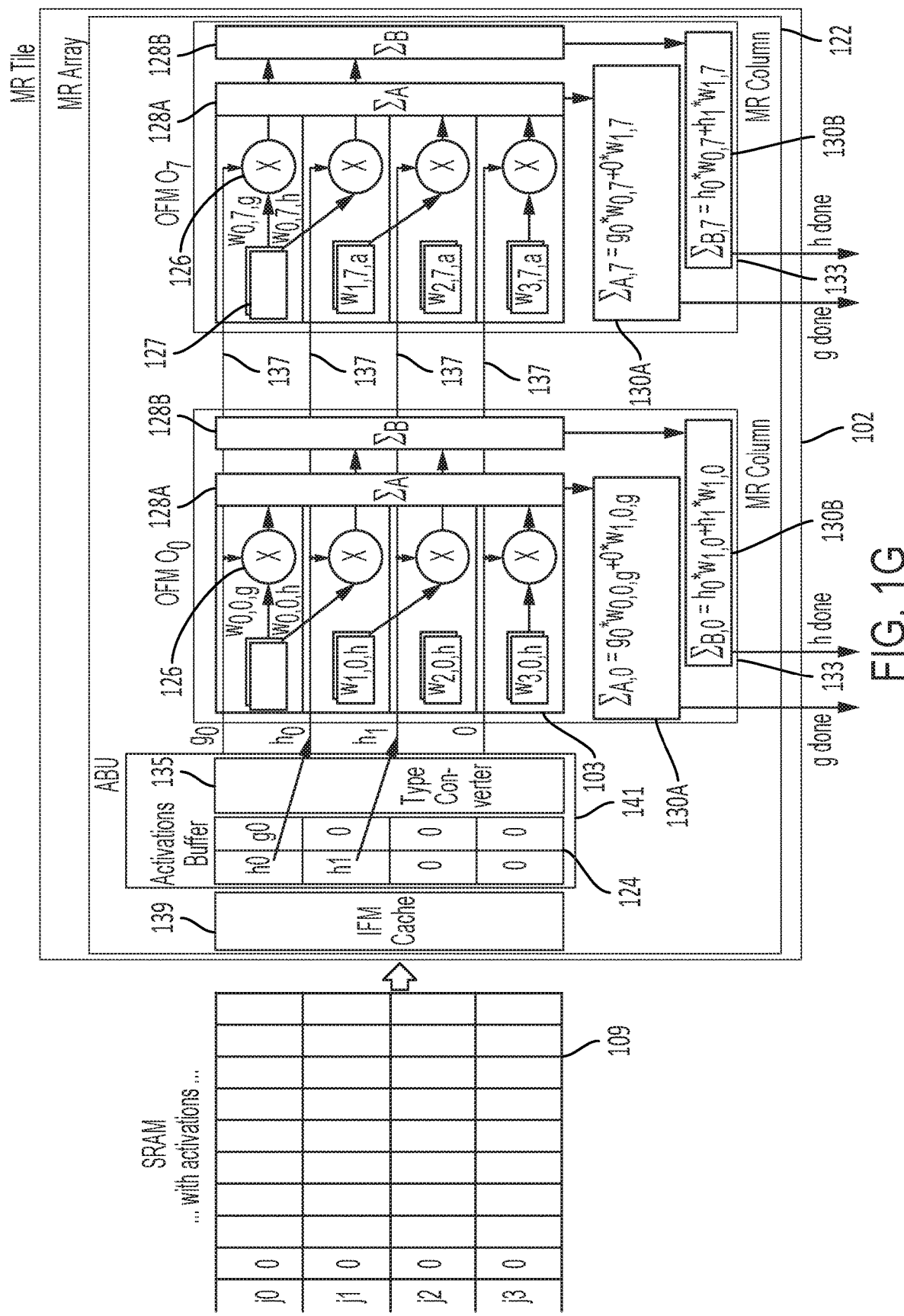
FIG. 1G is a data flow diagram in a portion of a neural processor, according to an embodiment of the present disclosure.

FIG. 1G shows a state in which the seventh vector g[ ] of the IFM (consisting of the elements g0 through g3, with g1=g2=g3=0) is in the first column of the activations buffer 124 and the eighth vector of the IFM (consisting of the elements h0 through h3, with h2=h3=0) is in the second column of the activations buffer 124. FIG. 1G shows how the dot product of the eighth vector h[ ] of the IFM with each corresponding weight is formed at the same time as the dot product of the seventh vector of the IFM with each corresponding weight, by advancing the (non-zero) elements of the eighth vector of the IFM out of turn, so that they are processed at the same time as the (non-zero) elements of the seventh vector of the IFM. Because one of the (non-zero) elements of the eighth vector of the IFM (h0) is in the same lane as a (non-zero) element of the seventh vector of the IFM (g0), each of the (non-zero) elements of the eighth vector of the IFM is shifted to an adjacent lane of the MR column 122, so that these elements may be advanced out of turn.

As such, feeding the first element (h0) of the eighth vector h[ ] of the IFM into the second-from-top multiplier 126 of each column (which is not used for the seventh vector g[ ] of the IFM since it has a zero element in this position) and feeding the second element (h1) of the eighth vector h[ ] of the IFM into the third multiplier 126 of each column (which is also not used for the seventh vector g[ ] of the IFM), allows the (non-zero) elements of the eighth vector of the IFM to be processed at the same time as the (non-zero) elements of the seventh vector of the IFM. The corresponding elements of the weight vectors are also shifted. Specifically, each multiplier unit associated with topmost lane fetches two weights, one weight associated with g0, labeled $w_{0,0 \ldots 7,g}$ in FIG. 1G, where 0..7 indicates the corresponding column, and another weight associated with h0, labeled $w_{0,0 \ldots 7,h}$ in FIG. 1G. Each weight $w_{0,0 \ldots 7,g}$ is fed into its respective multiplier 126 in the topmost lane, which is receiving g0. However each weight $w_{0,0 \ldots 7,h}$ is shifted one lane down and fed into the associated multiplier 126 of the second-from-the-top lane, which is receiving h0. Lastly, multiplier units in the second-from-the-top lane each fetch weight $w1_{,0 \ldots 7,h}$, associated with h1, and shift these weights one lane down, over to the third-from-the-top lane that is receiving h1.

In the state illustrated in FIG. 1G, each multiplier 126 of each MR column 122 in the bottom lane is unused for one cycle. The likelihood of such failures to make full use of all of the multipliers 126 may be reduced in some embodiments, by constructing the MR tile 102 to have a deeper (e.g., 3-deep) activations buffer 124 such that each activation lane can have more (e.g. three) values from the same channel to choose from. Bringing (shifting) non-zero activations from a distance larger than one away from a lane also provides more flexibility in substituting zero-valued activations with non-zero activations. Having more than two sets of adder trees and associated accumulators can also increase multiplier utilization.

Figure 1H:
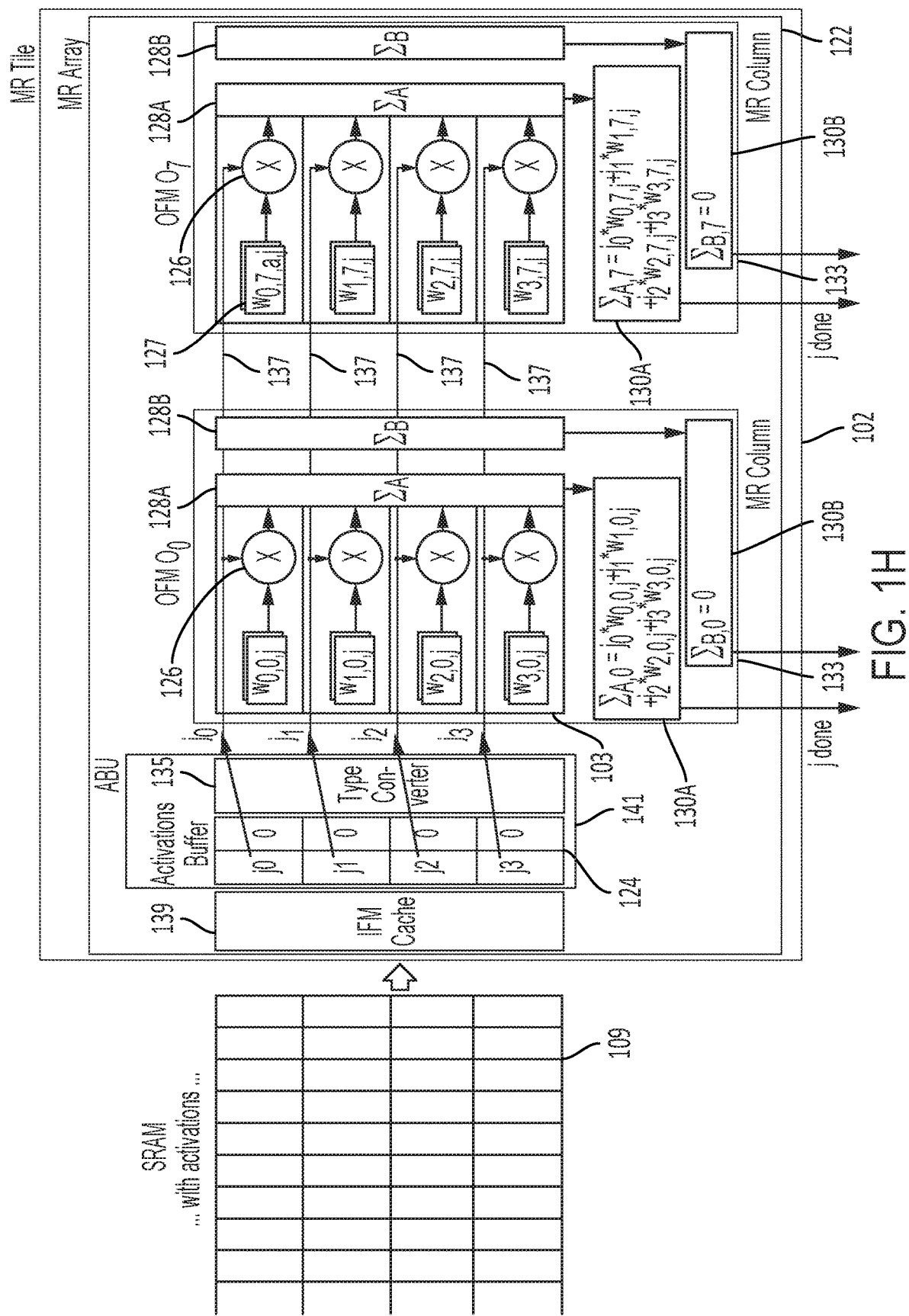
FIG. 1H is a data flow diagram in a portion of a neural processor, according to an embodiment of the present disclosure.
Figure 11:
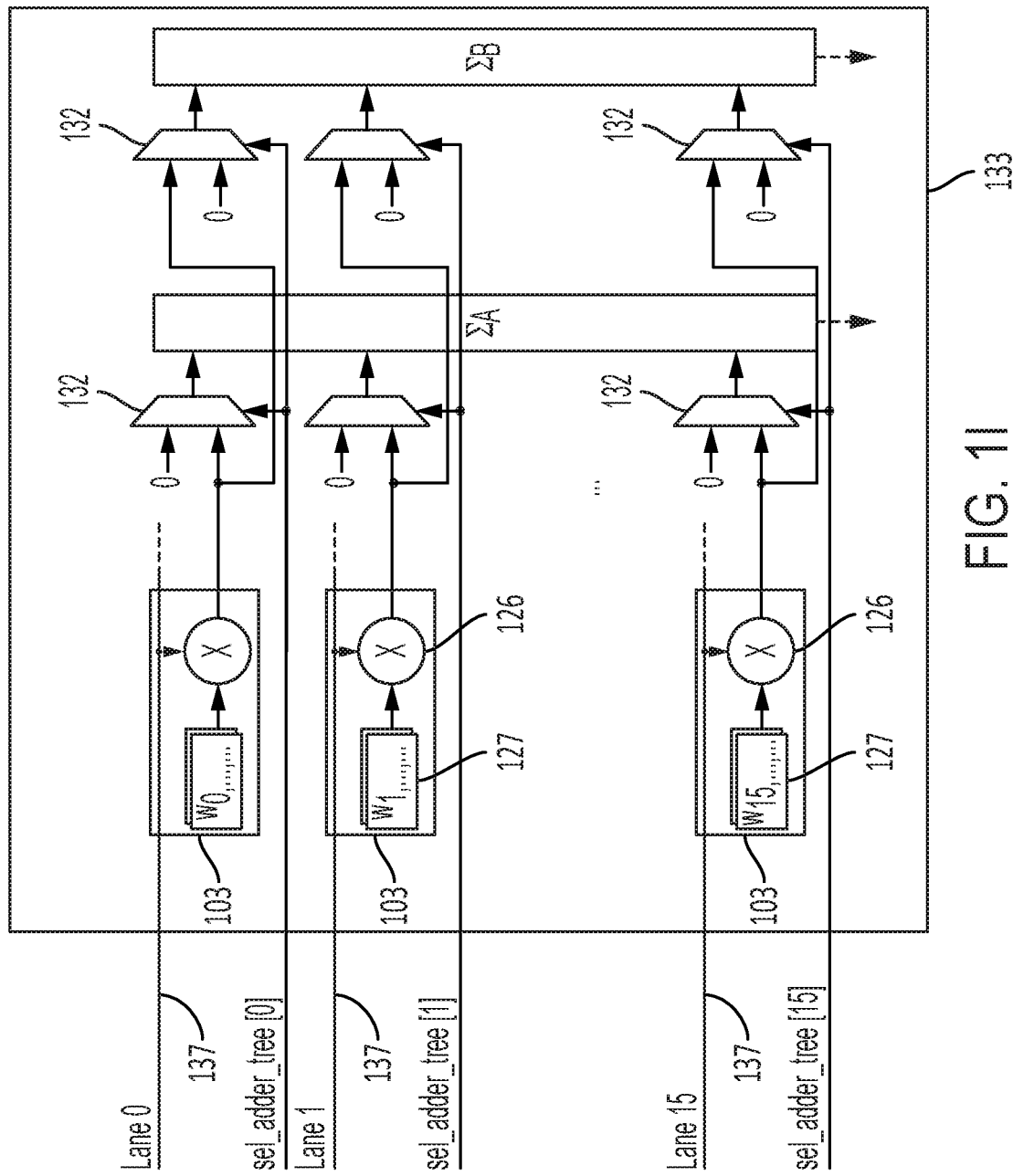

FIG. 1H shows a subsequent cycle, following that illustrated in FIG. 1G, in which the first column of the activations buffer 124 contains the ninth vector of the IFM (which consists entirely of zeros) and the second column of the activations buffer 124 contains the tenth vector of the IFM (consisting of the elements j0 through j3). In the state illustrated in FIG. 1H, all of the elements of the tenth vector of the IFM may be advanced out of turn and the dot product of the tenth vector j[ ] of the IFM with each weight vector may be calculated without incurring one cycle's delay for the processing of the ninth vector of the IFM.

As was illustrated in the example above, the multiplier unit 126 output can feed into the adder tree 128A during some clock cycles, while feeding into the adder tree 128B during other clock cycles. When the multiplier unit does not feed its output into an adder tree 128A or 128B, the corresponding adder tree input is set to zero. FIG. 1I shows a configuration using multiplexers 132 to direct the output of any multiplier 126 to either the first adder 128A or the second adder 128B, to support the operations, for example, of FIGS. 1D-1H. Here the multiplexer control signals sel_adder_tree[0 . . . 15] come from the Tile Control logic 144 that coordinates computation within a tile including fetching IFM vectors from cache, selection and multiplexing of non-zero activations from the activations buffer to activation lanes, selection of adder tree to use with each IFM vector, multiplexing multiplier unit outputs to the correct adder tree and clearing column accumulators.

Figure 1J:
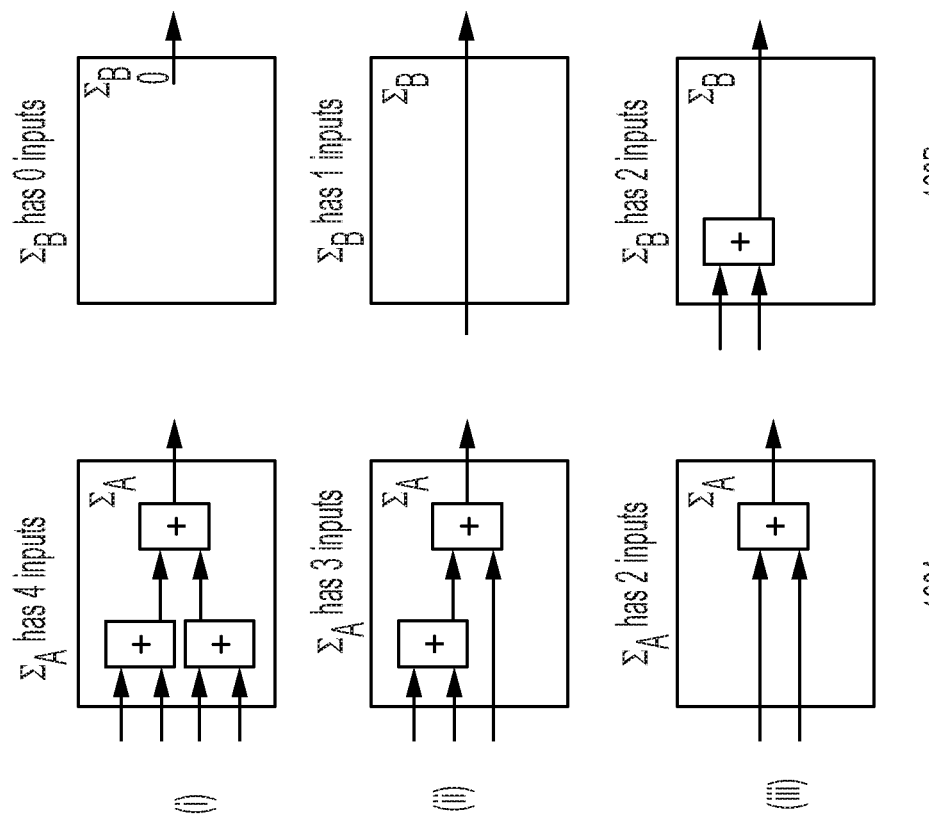
FIG. 1J is a block diagram of a portion of a neural processor for three cases, according to an embodiment of the present disclosure.

Since multiplier output always feeds either adder tree 128A or adder tree 128B, but never both adder trees 128A and 128B simultaneously, it is possible to implement both adder trees 128A and 128B with less logic. FIG. 1J shows how both the first adder 128A and the second adder 128B may be logical concepts implemented with a single physical adder tree and suitable multiplexers (not shown). For clarity of illustration, consider constructing two adder trees, each having four inputs. A four-input adder tree can be implemented using three adders. In the naïve case, each adder tree would require three adder elements, therefore constructing two four-input adder trees would take six adder sub-elements. Let us construct the two four-input adder trees using only three adder elements with the help of a few extra multiplexers. There are three cases of interest to consider. In a first case (i) all four of the inputs are summed by the first logical adder 128A (and the output of the second logical adder 128B is zero); in a second case (ii) three of the inputs are summed by the first logical adder 128A (and the output of the second logical adder 128B is equal to the remaining input); in a third case (iii) two of the inputs are summed by the first logical adder 128A, and two of the inputs are summed by the second logical adder 128B. In two further cases (not illustrated), the second logical adder 128B sums three or all four of the inputs, and the first logical adder 128A is equal to the remaining input or to zero, respectively. As used herein, an "adder" is either a physical circuit for adding at least two numbers to form a sum, or one of a plurality of logical adders formed with a combination of physical adders and multiplexers as in the example of FIG. 1J. As seen from FIG. 1J, only three adder elements (with some additional multiplexers, not shown), not six, are sufficient to implement all possible cases.

Figure 1K:
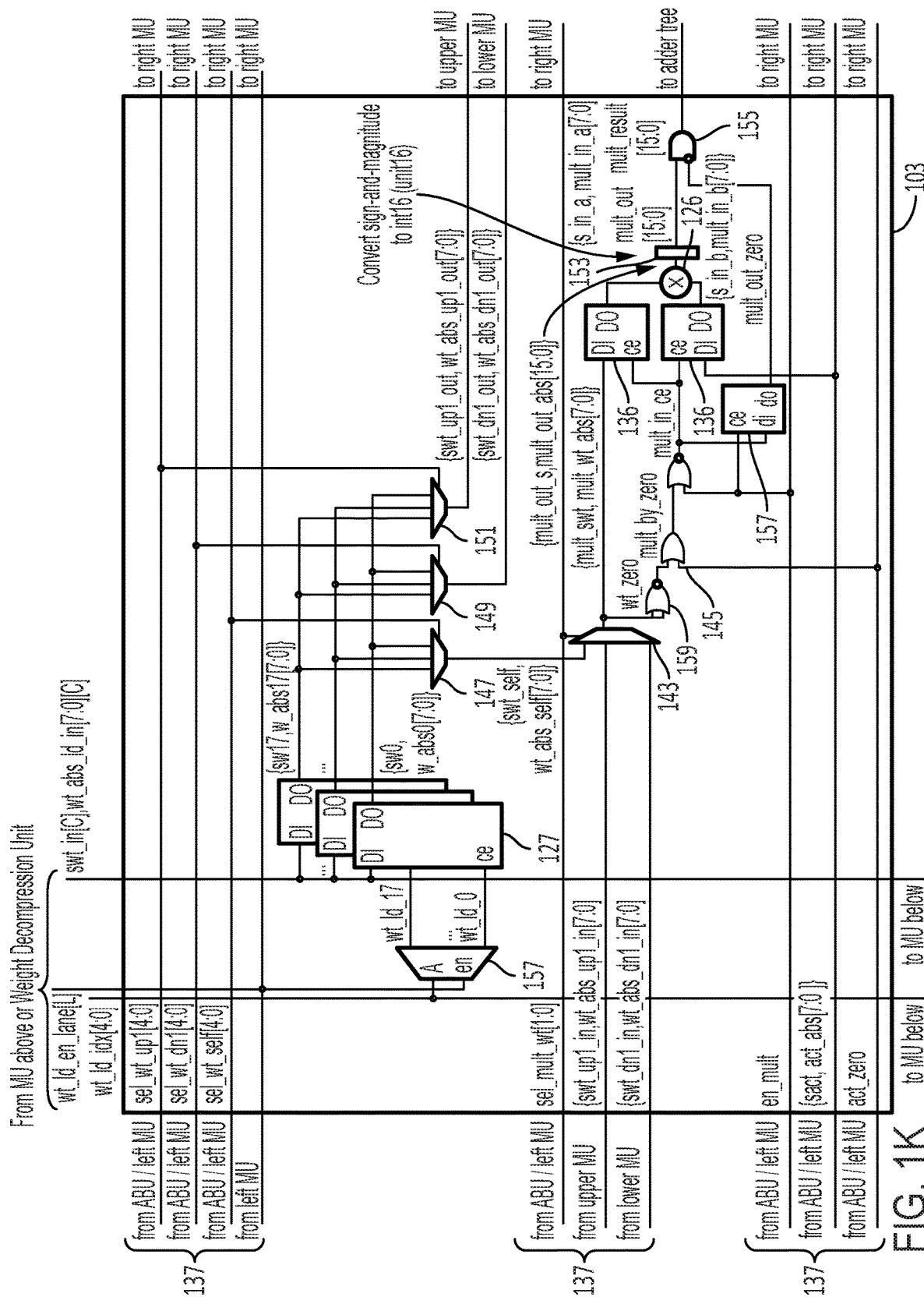
FIG. 1K is a schematic diagram of a portion of a neural processor, according to an embodiment of the present disclosure.

FIG. 1K shows an internal circuit diagram of multiplier unit 103, in some embodiments. The multiplier unit 103 contains an unsigned 8-bit by unsigned 8-bit multiplier 126, a register file 134 holding local weights, logic 143 to select an input weight for multiplier 126, logic 149 and 151 to "shift" a local weight over to an adjacent lane, logic 145, 136, 157, 155 and 159 to detect multiply-by-zero situation and idle down the multiplier to reduce dynamic power consumption, and weight loading logic 157.

Register file 134 holds weights. One register corresponds to a single int8 or uint8 weight. Weights with larger bit width occupy more than one register, for example an int16 or uint16 weight, occupies two registers. Register file 134 holds eighteen int8 or uint8 weights or correspondingly nine int16 or uint16 weights. The number of registers may be chosen to enable computing 3-by-3 convolution using 16-bit weights without having to resort to generating partial results, as described later in detail.

Register file 134 has a single input port to load weights over the vertical weight load bus 101 {swt_in[C], wt_abs_ld_in[7:0][C]}. Each MR column 133 C receives its own weight load bus, where C ranges from zero to seven. Weights are loaded from Weight Decompression Unit 138, one entire lane at a time (i.e. in all eight columns in a single lane, simultaneously), by setting weight values on the vertical weight load buses 101 {swt_in[C], wt_abs_ld_in[7:0][C]}, specifying an index of the destination register (from zero to seventeen) on the weight register index bus wt_Id_idx[4:0] and asserting the lane weight load enable wt_Id_en_lane[L] to load weights into lane L.

As shown in FIG. 1K, it takes eighteen cycles to load all weights in a single lane and 18*16=288 clock cycles total to load all weights in the entire MU array 122. In some situations this speed of weight loading may be insufficient, in particular when computing a fully-connected (FC) layer. Unlike convolution layer computation, during FC layer computation each weight is used only once and gets discarded thereafter. Therefore, to maintain maximum utilization of multipliers 126 when computing FC layer it is necessary to load one weight in each multiplier unit 103 every clock, which is sixteen times faster than shown in FIG. 1K. In this case the embodiment can be, for example, modified to include additional weight load buses 101 {swt_in[C0], wt_abs_ld_in[7:0][C0]}, {swt_in[C1], wt_abs_ld_in[7:0][C1]}, etc. to accelerate the weight loading.

In FIG. 1K the weight register file 127 has three output ports to enable fetching three weights simultaneously in case one of the weights has to be shifted one lane up, while the second weight is being shifted one lane down and the third weight is being consumed locally.

Fetching a weight from the local register file for local consumption is accomplished using multiplexer 147. For example, in FIG. 1C multiplexer 147 selects a locally-stored weight $w_{0,0a}$ to be multiplied with IFM value a0. Also, in FIG. 1D multiplexer 147 selects locally-stored weight $w_{1,0c}$ to be multiplied by IFM value c1.

Fetching a weight from the local register file 134 and shifting that weight to the lower lane is accomplished using multiplexer 149. For example, in FIG. 1G a locally-stored weight $w_{0,0,h}$ is shifted one lane down to be multiplied with h0.

Lastly, fetching a weight from the local register file 134 and shifting that weight to the upper lane is accomplished using multiplexer 151.

Activation Broadcast Unit 141 controls all three register file fetch multiplexers 147, 149 and 151 using signals sel_wt_self[4:0], sel_wt_dn1[4:0] and signals sel_wt_up1 [4:0] respectively since ABU has the complete information about each activation lane's shift and the offset into the activation buffer associated with each IFM value being broadcast (to activation lanes).

To reduce MR column 133 area, the number of output ports in register file 134 can be reduced from three to two, for example, by disallowing shifting weights up and down simultaneously from the same register file. The number of output ports in register file 134 can be further reduced to one, for example, by disallowing all weight shifting or allowing either one shift or consuming the weight locally. However, limiting the shifting and the maximum shifting distance however may somewhat reduce multiplier utilization. Multiple variations and combinations of shift target lane choices with activation buffer depth can be devised to optimize multiplier utilization while reducing MR column and Activation Broadcast Unit complexity, area and power. A particularly effective method and apparatus to achieve that involves shuffling (permuting) activation lanes in a pseudo-random fashion, while loading associated weights accordingly, as described in a related disclosure.

In FIG. 1K multiplexer 143 selects the input weight to be used in the multiplication by multiplier 126. As discussed previously, the input weight can come from the local weight register file 127 or become "shifted down" from the weight register file in the adjacent upper lane (and same column in some embodiments) or become "shifted up" from the weight register file in the adjacent lower lane (and the same column in some embodiments), correspondingly denoted by signals {swt_self, wt_abs_self[7:0]}, {swt_dn1, wt_abs_dn1[7:0]} and {swt_up1, wt_abs_up1[7:0]}. Activation Broadcast Unit 141 controls multiplexer 143 using signal sel_mult_wt [1:0] since ABU has the complete information about each activation lane's shift and the activation buffer offset associated with each IFM value being broadcast (to activation lanes).

For example, in FIG. 1C multiplexer 143 will select {swt_self, wt_abs_self[7:0]} carrying weight $w_{0,0,a}$ to be multiplied with IFM value a1. In FIG. 1D multiplexer 143 will select {swt_self, wt_abs_self[7:0]} carrying weight $w_{1,0,c}$ to be multiplied with IFM value c1. In FIG. 1G multiplexer 143 will select {swt_dn, wt_abs_dn[7:0]} carrying weight $W_{0,0,h}$ to be multiplied with IFM value h0 by the second-from-top multiplier in column zero.

Note that, as shown in FIG. 1K, each register file 134 has the bit width of nine, where eight bits hold weight magnitude and one bit holds weight sign, stored in the sign-and-8bit-magnitude format, with "zero-point" constant Z pre-added when applicable. Register file 134 bit width may be reduced to eight bits by adding logic that converts signed int8 type to sign-and-8bit-magnitude representation (including zero-point addition when applicable) on-the-fly as weights are fetched from register file 134. Such on-the-fly conversion might be of interest when the size of the register file 134 is chosen to be large enough to result in the described area savings.

Activation Broadcast Unit 141 broadcasts activation {sact, act_abs[7:0]} to be used as input to the multiplier 126. Logic gates 145 and 159 use signals wt_zero and act_zero (an auxiliary signal from ABU) to check for the multiply-by-zero situation where the weight (to be multiplied) equals zero or the activation (to be multiplied) equals zero or both. The resulting signal mult_by_zero is asserted when multiply-by-zero situation occurs, causing the clock for the weight and activation multiplier input registers to be gated using mult_in_ce signal. Gating the input multiplier registers clock causes the multiplier inputs and multiplier internal signals to keep (freeze) its previous states, thus preventing switching activity to reduce dynamic power. In parallel with this activity, flip-flop gate 157 delays mult_in_ce signal by one cycle to generate mult_out_zero signal that causes logic gate 155 to zero out multiplier output mult_result[15:0], corresponding to a multiplication by zero. Note that ABU also sends signal en_mult to idle all multipliers whenever computation in the entire tile has to be stalled, as discussed later.

Note that signal names in FIG. 1K follow a convention where "act" stands for activation, "wt" stands for weight, "s" in "sact", "swt", "mult_out_s", "s_in_a", etc. stands for "sign" and "ohs" in "wt_abs", "act_abs", etc. stands for absolute value (magnitude).

ABU broadcasts activations {sact, act_abs[7:0]} in the sign-and-8bit-magnitude format. Similarly, the selected (for multiplication) weight {mult_swt, mult_wt_abs[7:0]} is also supplied in the sign-and-8bit-magnitude format. Registers 136 latch the activation and weight to be multiplied to create input signals {s_in_a, mult_in_a [7:0]}, {s_in_b, mult_in_b [7:0]} for multiplier 126. In some embodiments the multiplier computes the product by multiplying the two absolute 8-bit values and exclusive-or-ing the two signs, resulting in a sign-and-16bit-magnitude output {mult_out_s, mult_out_abs[15:0]}. Logic 153 converts the sign-and-16bit-magnitude result into a 16-bit signed output, to be fed into an adder tree, by negating the product absolute magnitude mult_out_abs[15:0] when the product sign is asserted (i.e. the product result is negative), to produce signal mult_out[15:0]. Lastly, as already mentioned, logic 155 zeros out mult_out[15:0] in multiply-by-zero cases.

To summarize the role of ABU in multiplication control, ABU provides input IFM in sign-and-8bit-magnitude format, weight selection control, including shifting lane up and lane down and an auxiliary signal act_zero indicating the current activation being broadcast equals to zero. Note that when act_zero signal is asserted, the actual value of {sact, act_abs[7:0]} may remain unchanged to reduce activation lane switching activity. Although cases of a zero-valued activation being broadcast can happen, some embodiments aim to minimize such occurrences.

FIGS. 1B-1H illustrate computation with support for sparse activations by fetching, whenever possible, non-zero-valued activations from IFM buffer 124 inside ABU 141 and multiplexing associated weights to multipliers to obtain correct dot products. IFM buffer 124 fetches IFM from cache 139 and stages the fetched IFM values in activation staging FIFO 165, see FIGS. 1L and 1MA. Subsequently, the plurality of activation multiplexers 166 acts to fetch non-zero (when possible) activations from IFM staging FIFO 165 such that activations can be "shifted" up or down from adjacent lanes as well as fetch activations out-of-turn.

Figure 1L:
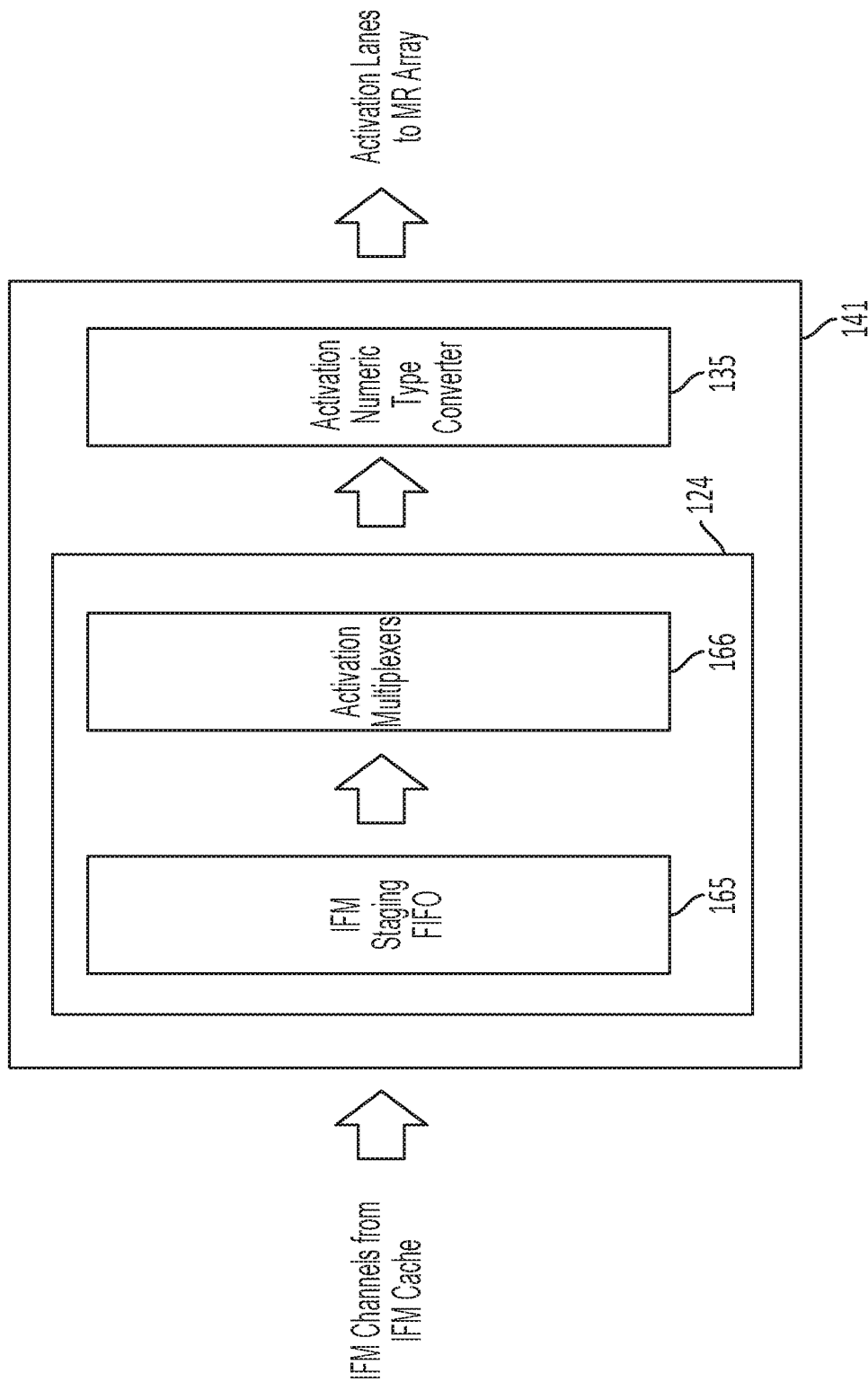
FIG. 1L is a block diagram of a portion of a neural processor, according to an embodiment of the present disclosure.
Figure 1M:
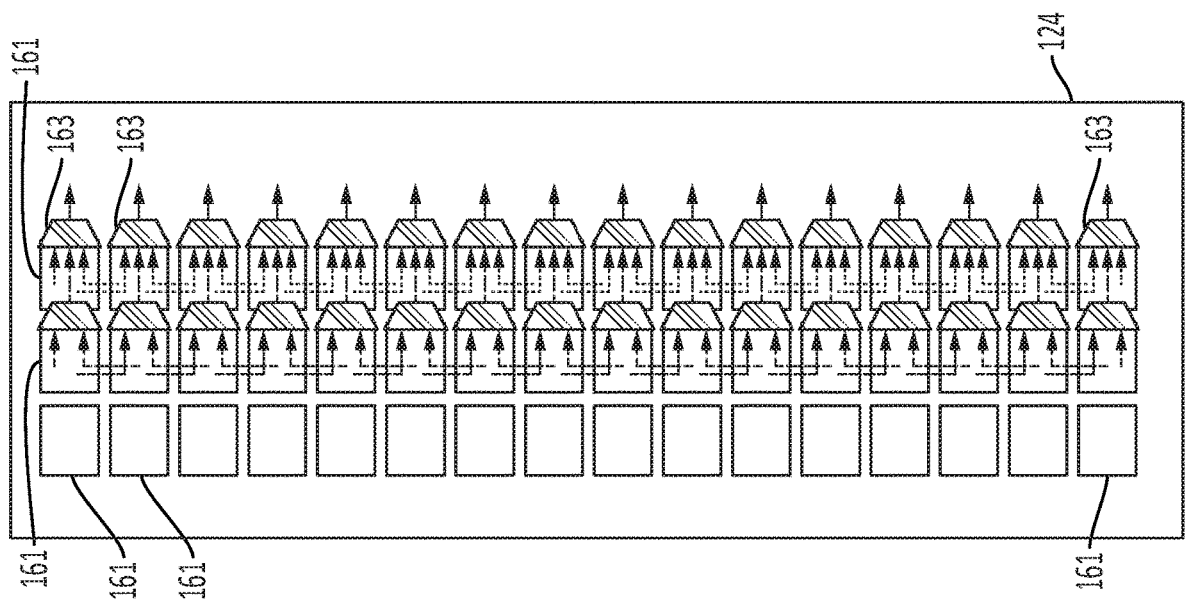
FIG. 1MA is a block diagram of a portion of a neural processor, according to an embodiment of the present disclosure.
Figure 1M:
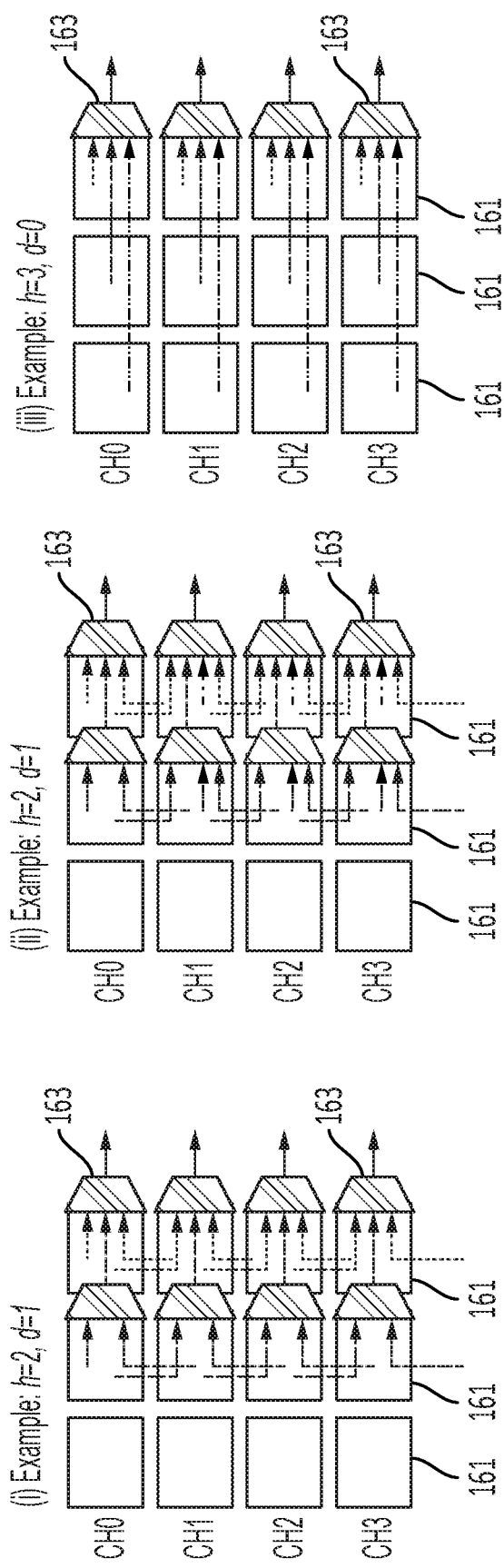

In FIGS. 1MA and 1MB (discussed below), the "look-ahead" distance (h) is the search distance along the same channel, the "look-aside" distance (d) is the search distance sideways and the FIFO depth (F) refers to the activation FIFO 165 depth. For clarity of terminology, note that the plurality 166 of activation multiplexers 163 accept IFM channels as input from IFM staging FIFO 165, apply look-ahead and look-aside to fetch activations and output resulting values to activation "lanes" (not channels). This terminology helps distinguish the notion of logical indexing of depth "channels" within a tensor vs. activations flowing along physical hardware "lanes".

Note that registers 161 inside IFM staging FIFO 165 may be optional and are shown for the sake of explanation clarity. In some case it might be possible to reduce area and power by eliminating activation staging FIFO registers 161, connecting IFM multiplexers 163 to multi-port cache output directly and revising IFM cache read logic to fetch IFM from cache 139 to multiplexers 163 directly in the correct order.

FIG. 1MA shows a configuration of multiplexers 163 that may be used to select an activation from activation staging FIFO registers 161 to be broadcast to MR array 122 (via type converter 135) and fed to a multiplier 126 in any of a plurality of lanes of a tile (e.g. a total of 16 lanes in a tile), from among any one of several possible values stored in the activations FIFO 165, including a value in the same lane, and values in other lanes. For a more general case, each cell may go to 2*d multiplexers, and each destination may have an equal number of sources (2*h*d), except that lane 1 and lane 16 have h*(d+1) sources due to being at the ends.

Figure 1N:
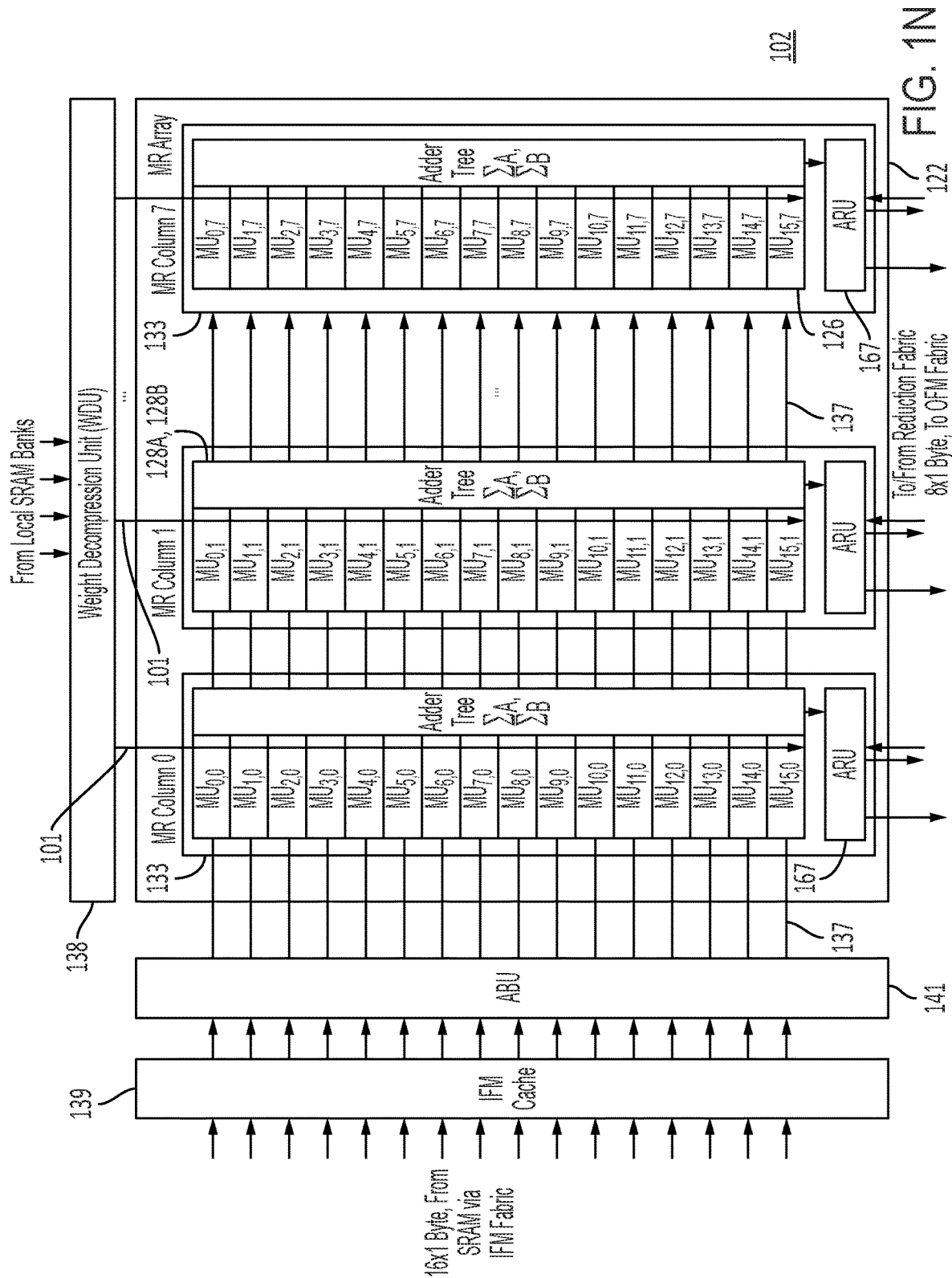
FIG. 1N is a block diagram of a portion of a neural processor, according to an embodiment of the present disclosure.
Figure 10:
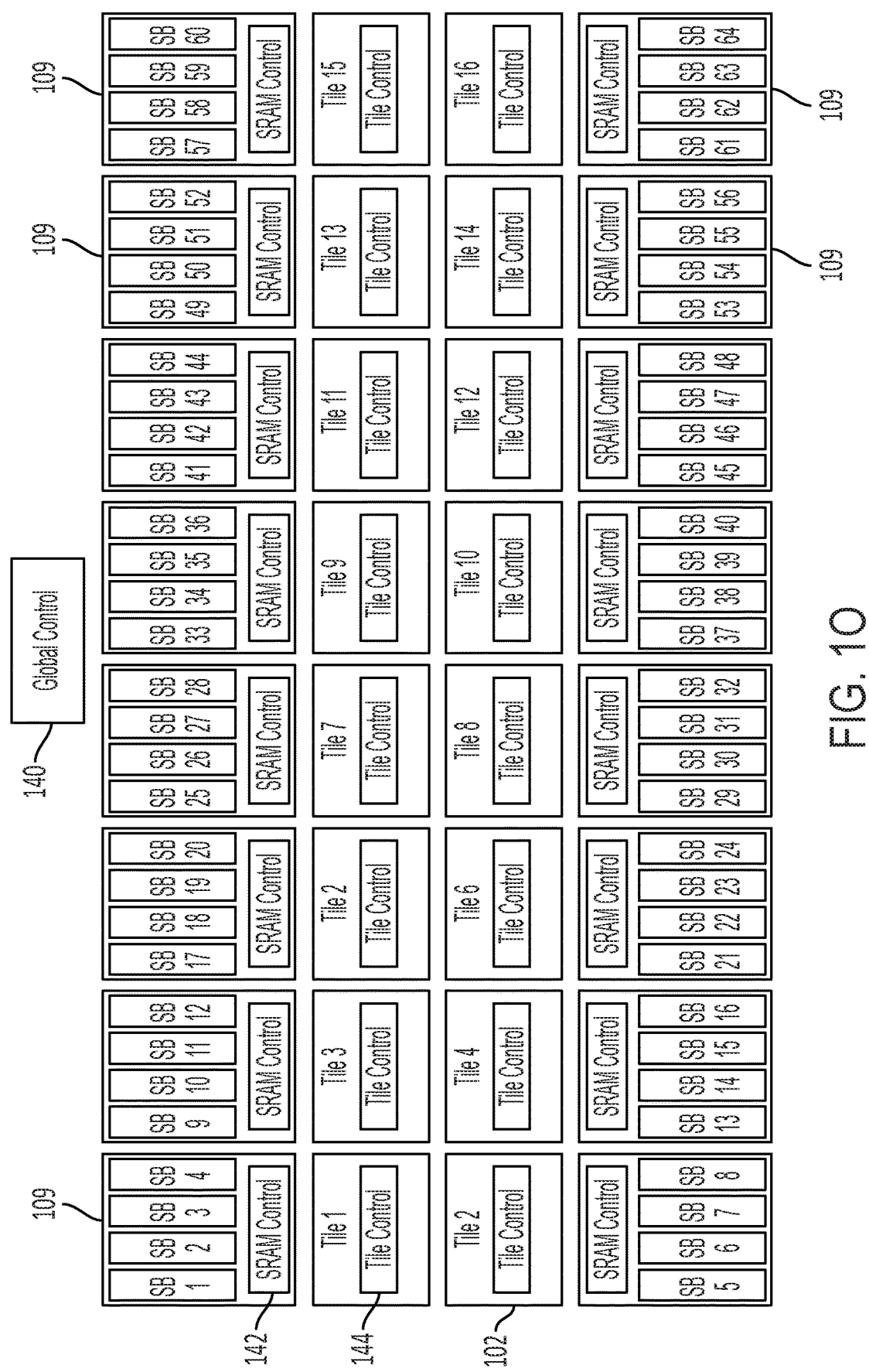

Let us further define the output cache size (C) as the size of the output cache, which resides in the Accumulate and Return Unit (ARU) 167 of each MR column, see FIG. 1N; the input bandwidth (I) is the IFM streaming bandwidth (the number of 16-byte-long IFM vectors per clock cycle); and the output bandwidth (O) is the OFM delivery fabric bandwidth (the number of 8-byte-long OFM vector results per clock cycle). Further, the raw sparsity ($s_r$ %) is the observed sparsity based on counting zero elements in the activation tensor (in proportion to the total number of activations in the activation tensor); the actual sparsity ($s_a$ %) is the actual number of zero elements applied during the two-dimensional convolution (conv2d) process for an activation tensor (in proportion to the total number of activations in the activation tensor), which takes convolution strides into consideration (e.g., convolution striding may not use certain zero-valued activations or may include certain zero-valued activations multiple times), and which takes convolution padding into consideration; and the multiplier utilization ($U_M$) is the percentage of cycles during which multipliers perform valid multiplications (multiplying non-zero activations). For example, for a 1×1 convolution, if the activation tensor has a raw sparsity of $s_r$ %, the multiplier utilization would be (1-$s_r$ %) if using a "naive" approach ("dense"

computation mode with no zero-skipping), and for a non-1×1 convolution, the multiplier utilization is (1-$s_a$ %) when using the naive (dense) computation.

FIG. 1MB shows (i) an enlarged view of four rows of the circuit of FIG. 1MA, in a first configuration, which is the one shown in FIG. 1MA, (ii) an enlarged view of four rows of the circuit of FIG. 1MA, in a second configuration, and (iii) an enlarged view of four rows of the circuit of FIG. 1MA, in a third configuration. In the first configuration, multiplexer inputs come from rows above and below, but not from the same row. The first configuration has fewer wires, and spreads the search to other channels (i.e., to fewer rows), which may be advantageous if one channel tends to have consecutive zeros. Further, if targeting a speed-up of a factor of two, then two locations may be enough, and channels 1 and 16 have the same number of candidates in the h=2, d=1 configuration. The second configuration may be referred to as a "full multiplex scheme". In this configuration, multiplexer inputs come from channels above and below and the same channel of the next depth. In the third configuration, multiplexer inputs come from the same channel only (i.e., look-aside d=0). This configuration has a low complexity, i.e. fewer than half of the multiplexers and wires are needed, and allows a simpler weight skipping support at a cost of somewhat reduced multiplier utilization.

FIG. 1N shows a top-level diagram of a tile 102 including MR Array 122 containing a grid of multiplier units 126 organized in eight MR columns 133 and 16 rows. Each multiplier unit 126 element, labeled MU, has subscripts ($MU_{row,col}$)corresponding to the multiplier unit's row and column coordinates within MR array 122. A weight decompression unit 138 may be used to receive compressed weights from SRAM bank set 109 situated local to the tile, decompress weights during the process of writing the weights to the weight registers 134. The weights may be compressed to take advantage of sparsity in the weights, reducing the memory required to store them and the bus bandwidth required to transmit them to the multiplier units 126. Alternatively, weights can be stored in SRAM uncompressed. An IFM cache 139 may be used to cache data to reduce the bottleneck effect of the IFM delivery fabric 104, and an activation broadcast unit (ABU) 141 may be used to implement skipping of zero-valued activations (or "activation skipping"), as described, for example, in the context of FIGS. 1D-1H.

FIG. 1O illustrates the hierarchy of neural processor control. The neural processor may have state machines, or "control finite state machines" (control FSMs) or "control logic" that may control the various elements shown in FIG. 1A. Control hierarchy has two levels including "global" and "local". In operation, a global control (GC) FSM 140 orchestrates operation of local control state machines 142 and 144, including starting a weight load phase, and starting, and controlling, a computation phase. Since tiles 102 support skipping zero-valued activations, output rates of tiles 102 may vary somewhat depending on the actual sparsity of IFM slices being received by each tile 102. Therefore, computation in tiles 102 may run a few clocks ahead or behind. Thus, global control logic 140 coordinates operation of local tile control logic 144 to bring output from the plurality of tiles 102 back into sync to complete reduction using reduction fabric 111 and transmit final OFM results via OFM delivery fabric 106 to SRAM bank sets 109. The synchronization of outputs of the plurality of tiles can be accomplished, for example, using a small output FIFO 198 (also 179) inside ARU and, in extreme cases of a tile output FIFO 198 becoming full, by throttling (stalling) the tile with output FIFO full, to allow other tiles to catch up.

Each of a plurality of SRAM control (SC) FSMs 142 generates SRAM addresses, and read/write signals for each SRAM bank within SRAM bank set 109. Each of a plurality of tile control (TC) FSMs 144 skips activations (e.g., when they have a value of zero). To prepare for operation, the host CPU loads the start address and size (height, width, depth, batch size) of each IFM and OFM tensor to the SRAM control FSMs 142, loads the operation type (fully connected (FC) or convolution) and IFM, OFM and weight data types to the global control FSM 140, IFM and OFM weight cycling configuration, order of IFM traversal, number of IFM passes (explained later in detail) and other computation mapping settings, choice of activation function and pooling (if any), enables or disables partial result generation, loads the weight tensor size (height, width, number of input and output depth channels), loads the zig-zag Z height (discussed in further detail below), and loads options for convolution padding and convolution stride. The host CPU further writes into registers associated with IFM delivery fabric, OFM delivery fabric and reduction fabric (RF) to configure connectivity as required by operation parameters, including addresses of IFM and OFM tensors within each SRAM bank set 109. To start operation, the host CPU writes to registers in the global control FSM 140. The global control FSM 140 then signals the SRAM control FSMs 142 and the tile control FSMs 144 to start.

In some embodiments, the global control FSM 140 controls scanning within the convolution window, translates the convolution window and traverses over the IFM tensor to produce a stream of IFM slices. The global control FSM 140 sends planar pixel (x, y) coordinates, depth channel index d, and IFM slice and read signals to the SRAM control FSMs 142. Each of the SRAM control FSMs 142 adds start addresses, fetches appropriate IFM data and outputs data to the IFM delivery fabric 104. Typically IFM (and OFM) tensor size is too large to fit in a single SRAM bank set 109, causing IFM (and OFM) tensors to be sub-divided into portions to be stored across multiple SRAM bank sets 109. During computation the global control FSM 140 orchestrates IFM and (correspondingly) OFM tensors to be traversed (fetched or stored in a certain sequence) while also effecting on-the-fly reconfiguration of IFM and OFM delivery fabrics to fetch IFM from and write OFM to the correct SRAM bank set.

All tile caches 139 may receive that data substantially simultaneously. The global control FSM 140 computes and provides all tile control FSMs 144 with (i) the address for the IFM cache 139 register file in which to save each incoming data and (ii) a write enable signal to write data from the IFM delivery fabric 104 into cache 139. The write enable signal is active when an IFM slice comes from an SRAM bank set 109 over IFM delivery fabric 104 and inactive when the IFM slice has already been cached. As the global control FSM 140 traverses an IFM layer (tensor) in a particular sequence, it also keeps track of which IFM slices necessary for computation have been cached and signals the SRAM control FSMs 142 when to read data not already-present in IFM caches 139. If the data has already been cached in the tile cache, the global control FSM 140 keeps the read signal inactive so that the SRAM control FSM 142 skips the SRAM read. Note that in order to simplify management of IFM caches, each IFM slice from IFM delivery fabric is written to all associated destination tiles (prescribed by mapping, as discussed later in detail) and their respective IFM caches at same addresses in IFM caches 139, regardless of the destination tile's number. However, since tile computations run a somewhat different rates due to uneven activation sparsity, each tile's control logic manages IFM cache 139 reading locally, independently of other tiles.

In some embodiments, the process of writing OFM results is similar. Due to activation skipping, however, the computation delay may vary. Each tile control FSM 144 has information indicating when all columns in that tile have finished a computation. The tile control FSM 144 of each tile sends an ofm_ready signal to the global control FSM 140, which instructs the SRAM control FSM 142 to write the resulting OFM slice from the OFM delivery fabric to SRAM banks at the proper (x, y, d) index into the OFM tensor. During OFM tensor traversal, the global control FSM 140 generates OFM (x, y, d) OFM slice coordinates in a manner analogous to its generating of IFM (x, y, d) slice coordinates during IFM tensor traversal. Once a computation is complete, the global control FSM 140 sends an interrupt to the host CPU.

As mentioned previously, due to activation skipping, a tile can produce, for example, up to two output results per clock. Therefore, IFM delivery fabric 104 should be able to supply up to two IFM slices per clock to avoid a decrease in multiplier utilization. Accordingly, local tile control FSMs 102 inform the global control FSM 140 about the amount of data in cache remaining to be processed, so that the global control FSM 140 can direct SRAM control logic 142 to resume fetching IFM data to avoid IFM caches underflow. When any of the tile IFM caches becomes full, the global control FSM 140 instructs the SRAM control FSM 142 to pause IFM tensor traversal, including reading IFM slices from SRAM and writing IFM slices into the tile caches.

Figure 1P:
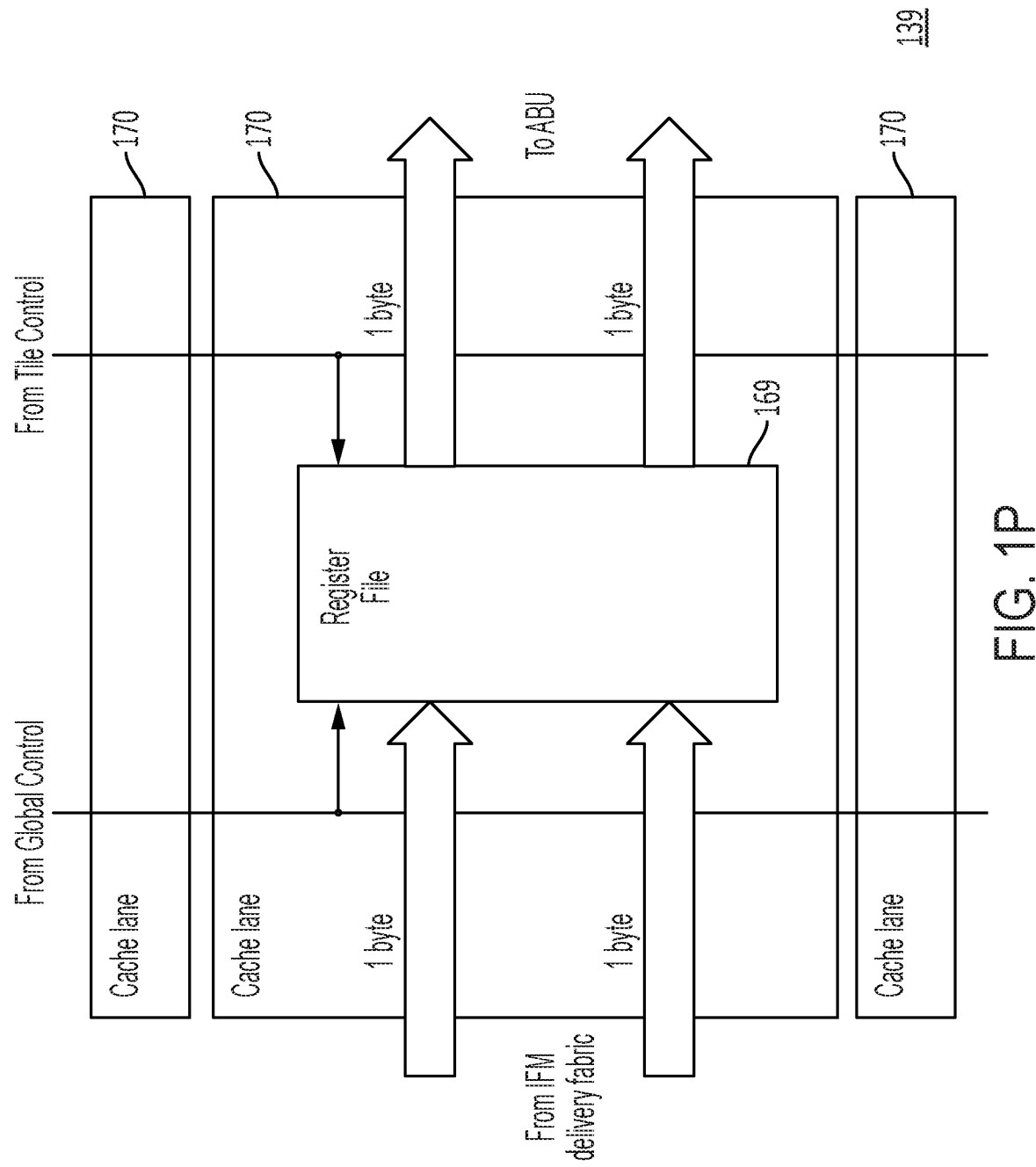
FIG. 1P is a block diagram of a portion of a neural processor, according to an embodiment of the present disclosure.

Referring to FIG. 1P, in some embodiments, IFM cache 139 includes sixteen lanes 170. Each lane contains a register file 169 with dual input ports and dual output ports. Dual ports may be used because due to activation skipping (and having two adder trees per MU column) the system tile 102 is capable of processing up to two activations per clock (when there are sufficient zero activations). To process activations faster, say three IFM slices per clock, a triple input port, a triple output port, triple IFM delivery fabric bandwidth, triple OFM delivery fabric bandwidth and three adder trees per MU column may be used.

Activations come in from the SRAM over the IFM delivery fabric at up to double rate. The tile control FSM 144 keeps track of the amount of IFM data remaining to be processed in each cache lane 146. When any of cache lanes is about to become full, tile control FSMs 144 inform the global control FSM 140 that at least one lane cache is about to become full and the global control FSM 140 may throttle (stall) IFM reads controlled by the SRAM control FSM 142 to avoid tile cache lane(s) overflow until cache space frees up.

The global control FSM 140 also informs the tile control FSMs 144 when a convolution window scan is complete (and the window is translated to the next position) and when IFM cycling is complete—so that tiles properly reset column accumulators and do not mix the performing of a convolution at one location with the performing of a convolution at the next location. The concept of IFM cycling is defined and discussed in detail later.

Tile control FSM 144 generates signals required for reading IFM data from each cache lane register file 169, including read address and read enable for each register file's output port. Each clock cycle, the tile control FSM 144 reads one or two data values (from one port or both cache ports correspondingly), unless the tile has finished processing and is waiting for other tiles to finish their processing (so that results are available to be reduced by the reduction fabric). Whether one or two bytes are read per single clock depends on activation sparsity. IFM buffer 124 within activation broadcast unit 141 checks whether the activations are sparse and informs the tile control FSM 144, so that the tile control FSM 144 will load one byte if the ABU IFM staging FIFO 165 frees up one slot and two bytes if the ABU IFM staging FIFO 165 frees up two slots.

Table in FIG. 1Q shows the cache size sufficient to hold all IFM slices while performing convolution operation with convolution window sizes of 1×1, 2×2, 3×3 and 4×4 to avoid duplicate reads from SRAM as the convolution window slides planar-wise from one (x, y) location to the next one. Data in the table assumes that multiplier unit's register file 134 contains 18 weight registers and that the convolution window scans the input tensor in the "zig-zag" sequence, as discussed in further detail below, since "zig-zag" scan sequence acts to maximize the use of IFM cache and thus minimize reads from SRAM and power consumption since a single read from SRAM typically consumes considerably more power compared to a single read from a local register file 169.

For example, with zig-zag scan parameter Z (discussed in further detail below) set to 2 and MU holding 18 weights (sufficient to hold two 3×3 8-bit convolution kernels or one 3×3 16-bit convolution kernel), register file 169 should have the size of 20 bytes.

Neural networks may have between 50% and 90% of multiplies in which at least one multiplication argument (activation and/or weight) is zero. This may be the case, for example, for an Inception v3 neural network, after applying weight pruning. If MR tile 102 can skip multiply-by-zero occurrences efficiently, MR tile 102 may be able to process data in, e.g., 100%-80%=20% of the time without skipping, which is five times faster. Correspondingly, as mentioned previously, in some embodiments, the MR implementation may be configured for the cache to use more than two inputs to deliver data fast enough (to be multiplied or skipped). In some block diagrams herein, only double input bandwidth (and, correspondingly, an activations buffer 124 that is only two deep) is shown for simplicity and clarity of the explanation. It will be understood, however, that the depth of the IFM activations buffer 124 may be greater than two, and that, correspondingly, the speed increase (over a configuration in which no multiplications by zero are skipped) may be greater than a factor of two, for sufficiently sparse data.

Data sparsity may be used to achieve significant improvements in processing throughput, as described above in the context of FIGS. 1B through 1H, and as described in greater detail in the following paragraphs, by suitable operation of the IFM cache and the ABU. FIG. 1R illustrates a 3×3 convolution window positioned at a starting location within an IFM tensor, stored in SRAM, to initiate input layer convolution. For the layer convolution operation to start, the nine IFM slices $a_0[0 \ldots 15]$ through $i_0[0 \ldots 15]$ are read from SRAM, delivered over the IFM fabric to target tiles and written into the IFM cache 139 of each target tile. FIG. 1S shows another example of such data, in which several of the elements are zero.

FIG. 1T illustrates how the data may be logically stored in IFM cache 139, just before a layer convolution operation starts, with values ordered in arrival sequence (from SRAM), and does not necessarily show their arrangement according to the actual storage addresses of the values. In the present example, a 3×3 convolution is performed; for clarity the drawings show nine (3×3=9) 8-bit activation values, although the cache may store more, to accommodate the motion of the convolution window. Similarly, FIG. 1U illustrates the present example from FIG. 1T explicitly having some activations having the value of zero.

FIG. 1V illustrates a single lane 171 of activation broadcast unit 141 according to some embodiments. Each ABU lane 171 includes an IFM lane staging FIFO 173, which may be implemented using a register file, a lane multiplexer 163, a lane control logic module 146, and an activation lane numeric type conversion circuit 148. Each ABU lane 141 (together with the tile control FSM 144 and other ABU lanes) may control activation skipping in that lane, i.e., the skipping of activation elements having a value of zero.

It may further convert activations from signed two's complement numerical encoding to sign-and-8bit-magnitude format, in order to simplify multiplier circuits' processing signed and unsigned data of various bit width including uint8, int8, uint16, int16, uint24, int24, uint32, int32, etc. Each ABU lane 171 may also broadcast activations to the associated row of multiplier units 126 within MR columns 133, as part of activation lane 137 set of signals.

The lane IFM staging FIFO 173 has two input ports, two output ports and may be two-value deep. The two input ports are used to bring in activations from the IFM cache, at a rate of up to two activations (bytes) per clock cycle. As such, when there are enough zero activations, it may be possible to process up to two activations per clock cycle, as a result of having two adder trees in the MU columns, a lane cache with two input ports and two output ports, and a staging buffer 173 with a depth of two. In some embodiments, if it is anticipated that the IFM will be sufficiently sparse to justify a larger number of activations per clock, e.g., three activations per clock, activations may be processed by using a circuit with three adder trees per MU column, three lane cache input/output ports, three staging FIFO input ports and a staging FIFO depth of three (where the "staging FIFO", in this context, refers to the IFM lane staging FIFO 173).

The lane control logic 146 may broadcast a set of control signals, as part of activation lane 137 set of signals, to the associated row of multiplier units 126 to inform the multiplier units 126 whether the activation is zero or not—and if the activation is zero, which non-zero activation is being multiplexed in to replace the zero, including from which lane and how deep in (offset into) the staging FIFO, so that each multiplier will be able to select the correct weight and adder tree to use for the multiplication. Similarly, the lane control logic 146 also controls the lane multiplexer 163 to multiplex an activation from the correct staging FIFO 173 depth offset located in the correct adjacent IFM channel and onto the activation lane 137.

FIG. 1V shows the IFM lane staging FIFO 173 having four output logical connections, sufficient to provide any one of the two buffered activations to the adjacent lane above, any one of the two buffered activations to the adjacent lane below and both buffered activations to the lane activation multiplexer 163. Note that although FIG. 1V shows the staging FIFO 173 having four output logical connections, FIFO 173 has only two physical output ports since FIFO 173, in the illustrated embodiment, is only two-value-deep and thus holds only two values, available for simultaneous output.

Figure 1W:
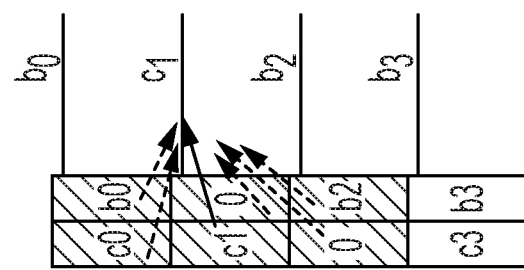
FIG. 1WA is a block diagram of a portion of a neural processor, according to an embodiment of the present disclosure.
Figure 1W:
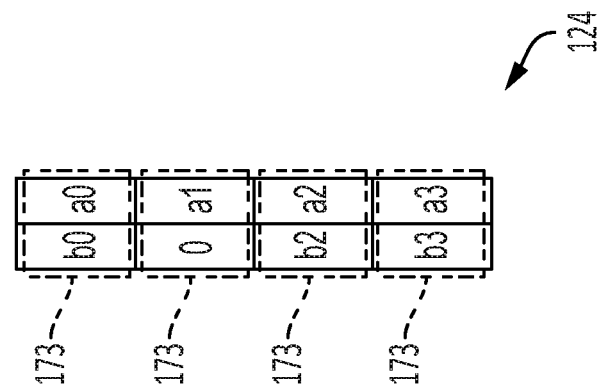
Figure 1W:
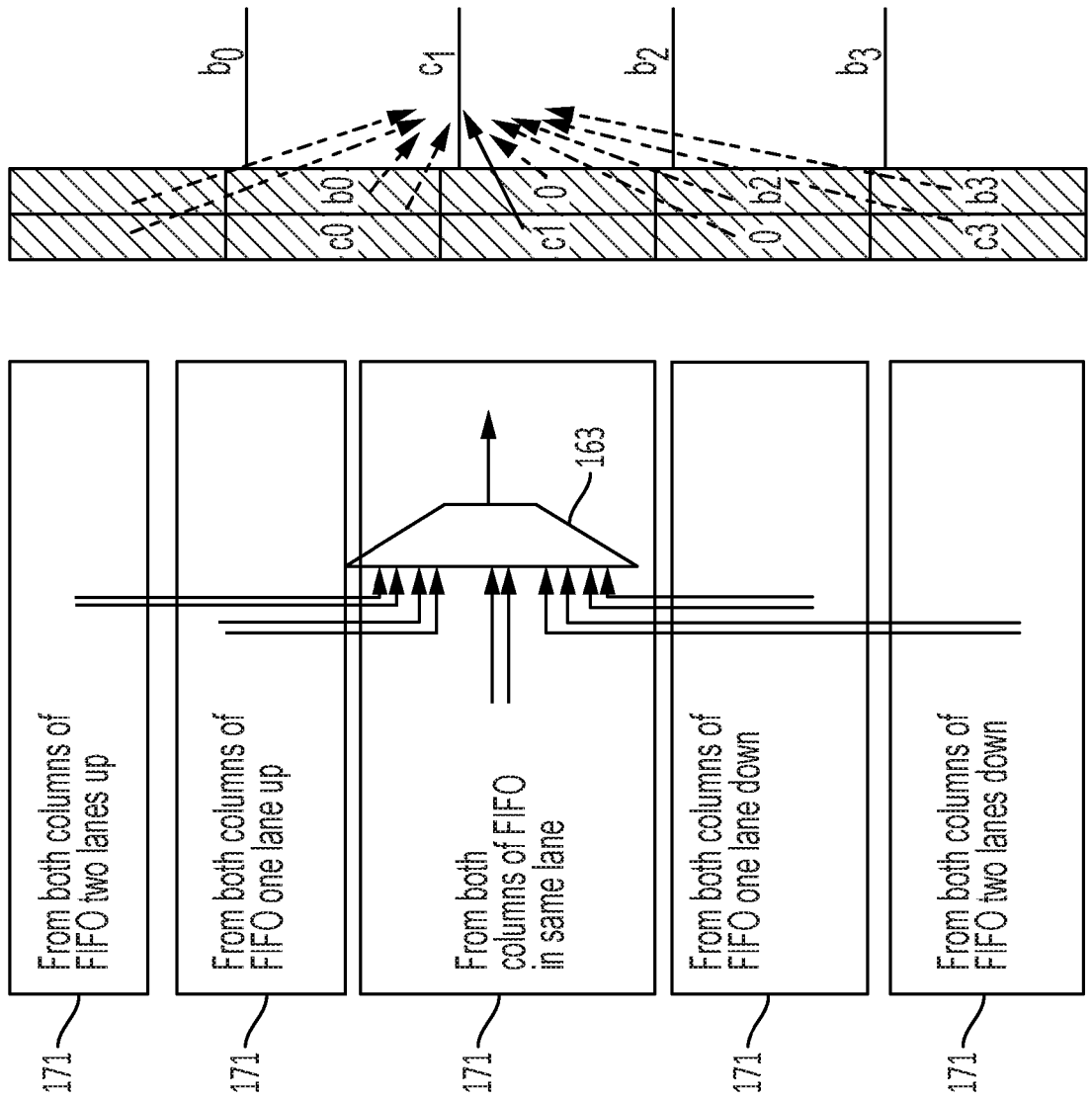
Figure 1W:
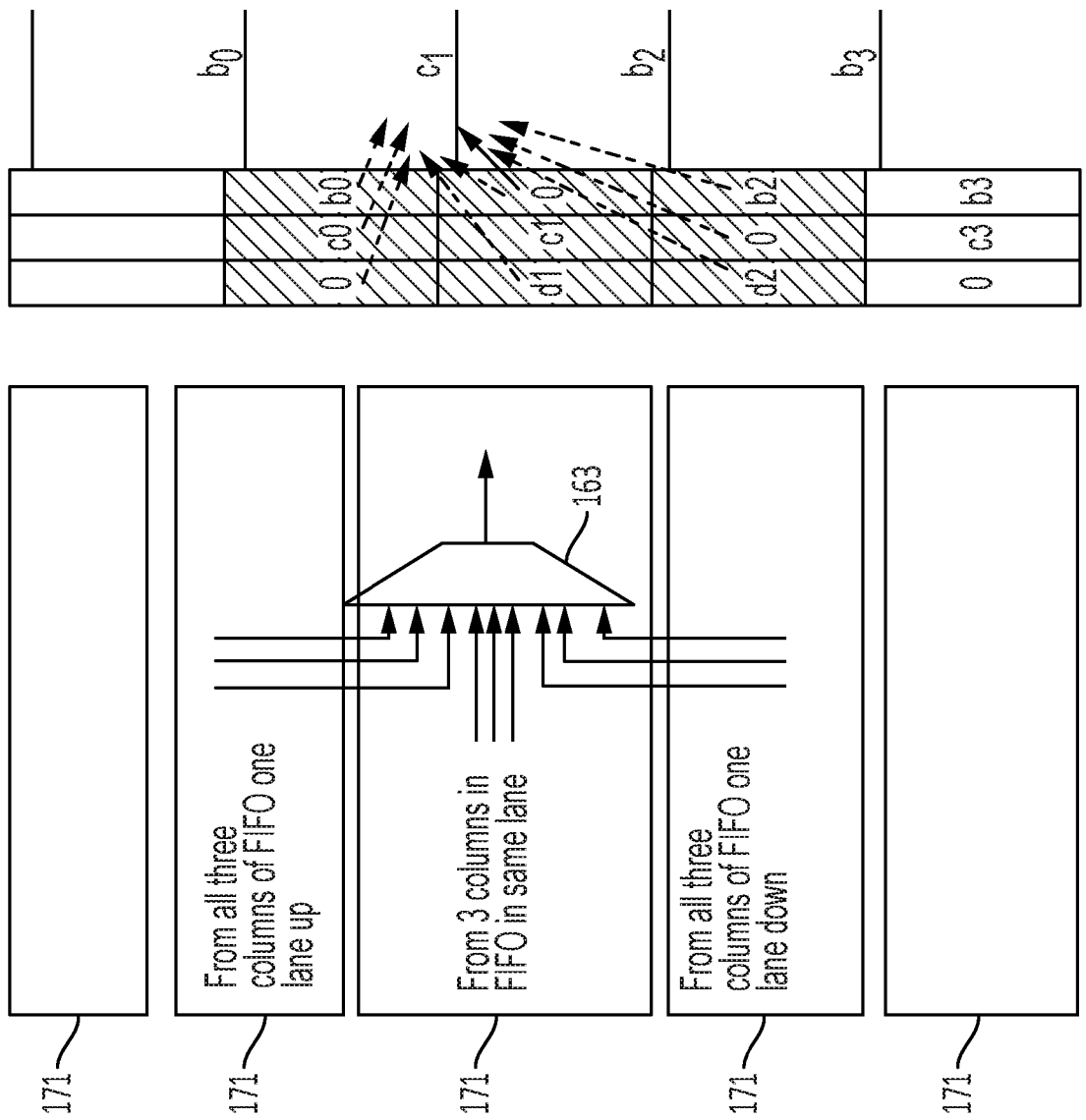
Figure 1W:
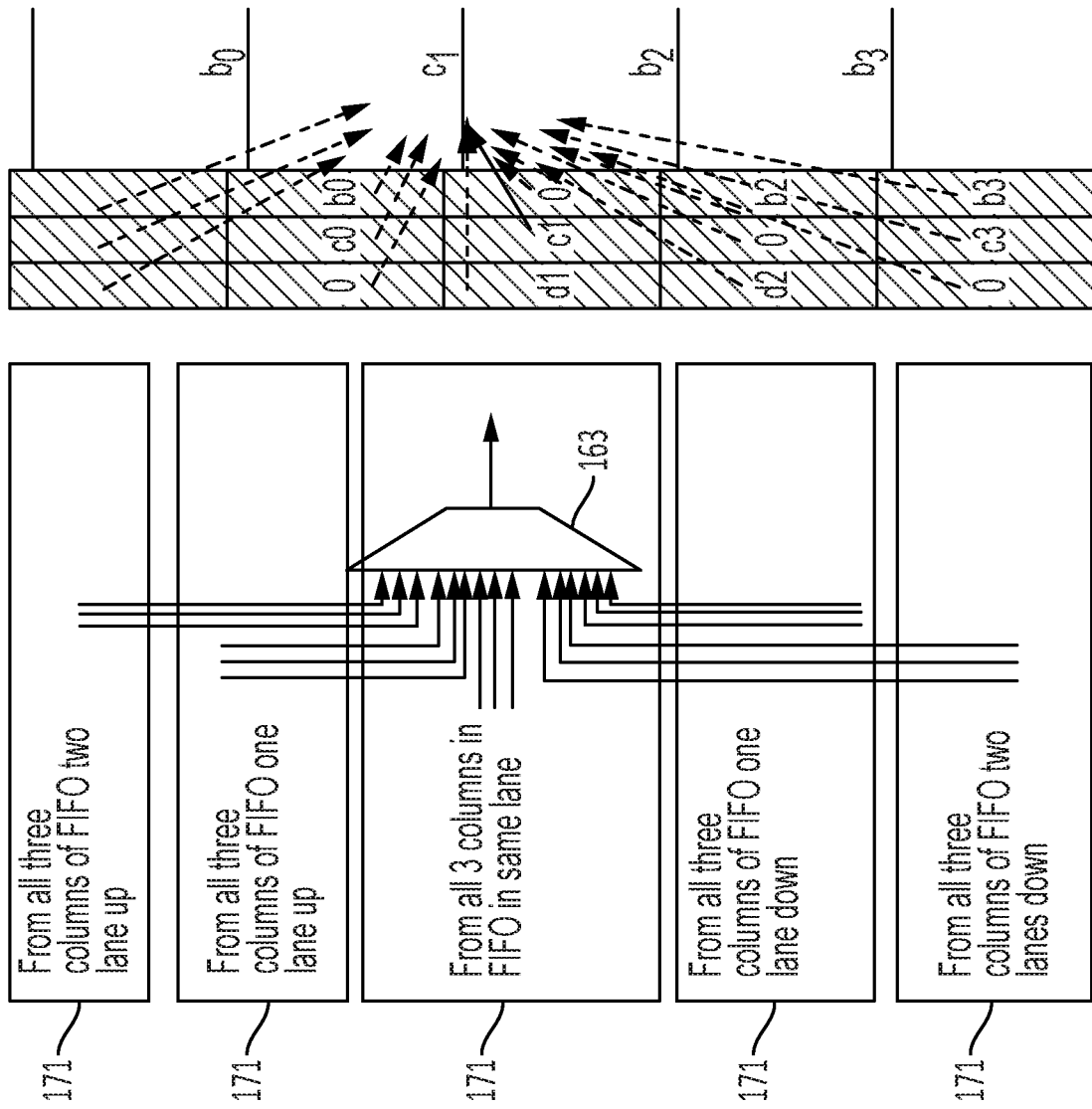

FIG. 1WA shows the contents of the IFM staging FIFO 165, having four individual IFM lane staging FIFOs 173 (not 16 for clarity of illustration), after the first two vectors of the IFM have been read in (as also shown in FIG. 1C). In this state, the FIFO may check which activation values are zero and which are not zero. In some embodiments, each FIFO register has a zero detector (e.g., 8-input NOR logic). Each lane staging FIFO 173 reports which activations are zero to the respective lane control logic 146, which keeps track of which activations in that lane have been used up (e.g., borrowed, which results in creating a "hole" as illustrated in FIG. 1D). Each lane's control logic 146 forwards this information about lane staging FIFO occupancy, including which activations are zero, to the tile control FSM 144. The activations a0, a1, a2, and a3 undergo numeric format conversion (if they are signed activations like int8 or int16), become subdivided into 8-bit values (if activation bit width exceeds 8, e.g. uint16, int16, uint24, int24, uint32, int32, etc.), and are broadcast to the respective rows of multiplier units 126.

On the next clock cycle, the IFM staging FIFO 165 may contain the values shown in FIG. 1WB (and in FIG. 1D). At this point, the activations a0 . . a3 have been processed, and b0, b2 and b3 are being broadcast to the respective rows of multiplier units 126. Since b1 is 0, b1's lane is unused. Each lane's control logic 146 forwards this information (which activations are zero or "holes") to the tile control FSM 144. The tile control FSM 144 then makes decisions regarding (i) which data to multiplex out (in FIGS. 1WB and 1D, b0 onto lane 0, c1 onto lane 1, b2 onto lane 2, b3 onto lane 3, etc.) and (ii) using inputs from every lane's control logic 146, detect whether an entire FIFO column consists of holes and/or zeros, and thus can be skipped. When the latter happens, the tile control FSM 144 causes (i) the cache to fetch two values (instead of one) and (ii) the FIFO to accept these two values (instead of one), thus skipping the entire hole-and/or-zero FIFO column. Also, lane control logic also causes the cache to fetch two values if the plurality values in IFM lane staging FIFO 173 associated with that lane (as opposed to entire column) is comprised of zeros and/or holes.

For example, lane 1 (outputting c1) has 6 choices to output: c0, c1, c2 (which is zero) and b0, b1 (which is also zero) and b2. The multiplexer 163 outputs one of these 6 choices. Which choice to output is determined by the tile control FSM 144. To be able to accomplish this, the multiplexer 163 may be configured to be capable of retrieving data from both FIFO columns one lane above, from both FIFO's columns one lane below, and from both FIFO columns in same lane as the multiplexer 163. This capability may be implemented using, e.g., circuits similar to those illustrated in FIGS. 1MA and 1MB. As mentioned earlier in the description of those drawings, the ability to retrieve (and multiplex in) data from one lane above and below may be referred to as a "look-aside of 1", and the ability to retrieve (and multiplex in) data from up to the second-from-right FIFO column may be referred to as a "look-ahead of 2". Note that each IFM staging FIFO 165 column and lane combination may have a separate look-ahead and/or look-aside value associated with it, however for clarity of illustration let us assume that all columns and lanes to in IFM staging FIFO 165 have same associated look-aside value and same look-ahead value. Also, one can adopt other variations on how many inputs each multiplexer 163 has and where those inputs connect, not covered by the look-ahead and look-aside concepts, including, for example, prohibiting forwarding input from staging FIFO onto same activation lane and connecting lanes 0 and 15 in a more flexible way to compensate for them not having one of two adjacent lanes.

The look-aside and/or look-ahead may be greater than two. Larger numbers may result in better performance—skipping zero activations more optimally so that tile computation time is further reduced. This benefit may be achieved because when the look-aside and/or look-ahead numbers are greater, each lane has more choices regarding from where to retrieve a non-zero activation. More choices of non-zero activations helps spread non-zero activations more evenly across all lanes, such that each lane ends up having about the same number of non-zero activations as opposed to some lanes more and others fewer, potentially causing tile processing to wait to finish until the lane with the most activations finishes the computation. As mentioned earlier, spreading non-zero activations can be achieved by shuffling activation lanes and associated weights pseudo-randomly as described in a separate, related disclosure.

FIG. 1WC shows a configuration in which the look-ahead is 2 and the look-aside is 2, for each FIFO column, and in which the multiplexer 163 has 10 inputs. In such an embodiment, the FIFO may be two-deep and, correspondingly, may have two output ports.

FIG. 1WD shows a configuration in which the look-ahead is 3 and the look-aside is 1, and in which the multiplexer 163 has 9 inputs. In such an embodiment, the FIFO may be three deep and it may have three output ports.

FIG. 1WE shows a configuration in which both the look-ahead and the look-aside are 3, and in which the multiplexer 163 has 15 inputs. In such an embodiment, the FIFO may be three deep and may have three output ports.

The activation broadcast unit 141 and the tile control FSM 144 may be similarly involved in the operations illustrated in FIGS. 1E-1G. For example, FIG. 1E illustrates that when c1 has been borrowed (multiplexed from the second-from-rightmost column) in the previous clock cycle, a "hole" is created that the lane control logic 146 (in the lane where c1 originally was) tracks. Each lane control logic 146 informs the tile control FSM 144 of which data cells in the IFM staging FIFO 165 are zero or empty, so that the tile control FSM 144 can control the activation multiplexers 163 appropriately. The tile control FSM 144 decides multiplexer control to spread out activations, so as to increase or optimize throughput. Optimal throughput may be achieved when all lanes have the same number of non-zero activations, as opposed to being unbalanced such that some lanes have many non-zero activations, while other lanes (in same tile) have mostly zeros. In such an unbalanced case, lanes that mostly have zeros may finish their computations sooner (i.e., may output all non-zero activations sooner) than lanes having many non-zero activations, which may delay the end of computation of that tile and cause reduced multiplier utilization in the zero-rich lane.

As another example, in the state illustrated in FIG. 1G, the lane control logic 146 also receives a multiplexer selection signal from the tile control FSM 144 to keep track of (i) holes that were created and of (ii) which activations were multiplexed from where. The lane control logic 146 then broadcasts this information to the associated row of multiplier units 126, so that when an activation has been multiplexed out of order (where "in order" in FIG. 1G, for example, means g0 from the activations buffer being output onto activation lane marked as g0), each multiplier unit 126 in that row may multiply that out-of-order activation by its corresponding weight.

For example, if the activation was multiplexed from one lane up, from the second-from-rightmost staging FIFO column, the corresponding weight to multiply this activation is located in multiplier units one lane above (for each column), as shown.

When the look-ahead is greater than two, e.g., three, and an activation is retrieved from the third-from-rightmost column, the corresponding weight to be retrieved is 3−1=2 ahead, meaning if the in-order activation would have been multiplied with weight w[row, col, i], the appropriate weight to multiply by is instead w[row, col, i+2].

FIG. 1H illustrates the (advantageous, from a throughput perspective) situation when activations are multiplexed (advanced out of order) so that an entire FIFO column (all 16 lanes) becomes free (contains only zeros or holes). The tile control FSM 144 detects this condition and instructs the IFM cache 139 to load two values into the FIFO because both FIFO columns get consumed simultaneously—the rightmost all-zero column getting skipped (discarded) and the second from rightmost column broadcast and used up for calculation. This reduces computation delay in the tile by one clock cycle.

Figure 1X:
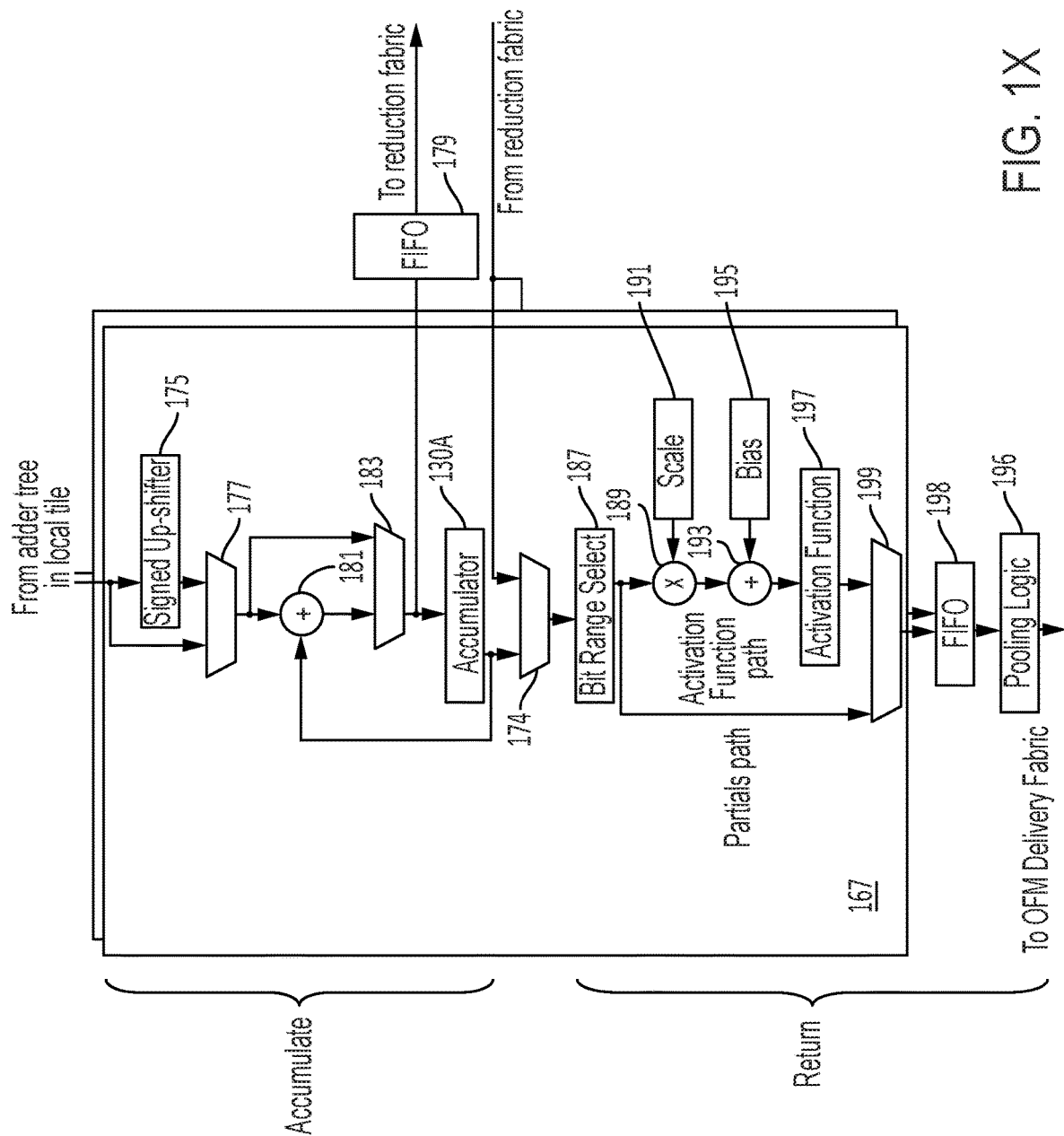
FIG. 1X is a block diagram of a portion of a neural processor, according to an embodiment of the present disclosure.

FIG. 1X illustrates the accumulate-and-return unit (ARU) 167. ARU's role is to complete dot product calculation and apply the activation function (when applicable) to produce a finished output feature map (OFM), ready for transmission over OFM delivery fabric back to SRAM for storage. As illustrated in FIG. 1N, each MR column 133 contains two ARUs 167, one per adder tree 128A and 128B.

ARUs 167 have two inputs, one from local adder tree 128A or 128B and one from the reduction fabric 111. Central to each ARU are the adder 181 and the accumulator register 130A, which can complete dot product computation by accumulation (over time), as explained later in detail. To finish OFM computation, a fully reduced dot product may be (optionally) truncated (via rounding) using unit 187, scaled by factor 191 using multiplier 189, may be summed with the OFM bias term 195 using adder 193 and may pass via an activation function 197. The activation function module 197 may support activation functions such as rectified linear unit (ReLU), sigmoid, hyperbolic tangent, and so on. If dot product reduction cannot be completed (for reasons explained later in detail), the partial dot product, or just "partial product", from accumulator 130A (130B) can bypass the scaling, bias and activation functions on its way to the OFM delivery fabric via multiplexer 199 and output FIFO 198. Multiplexer 183 bypassing adder 181 allows loading an adder tree value directly into accumulator 130A, e.g. to initiate accumulation.

Multiplexer 174 chooses ARU's input source for "return" (scale, bias and activation application, when applicable, along with the partials path) between (i) adder trees within same (local) tile where the ARU is located, and (ii) reduction fabric that comprises a configurable adder tree combining local ("intra-tile") adder trees 128A and 128B into even larger ("inter-tile") adder trees capable of reducing multiplier unit products from multiple tiles, e.g. from 32 or 64 or 128 or 256 multiplier units.

Tile ARUs 167 are controlled by the tile control FSM 144 since the tile control FSM keeps track of which lane and adder tree, in each MR column 133, was used to obtain each partial IFM reduction. ARU 167 has two outputs, including one connecting to OFM delivery fabric via FIFO 198 and on-the-fly pooling logic 196, and one connecting to the reduction fabric via FIFO 179. Tile control FSM 144 also keeps track of output FIFO 198 and 179 state. Since each tile performs calculations at a slightly different speed (due to the unpredictability of zero activation skipping), output FIFOs 198 and 179 each acts to restore synchronization of tile outputs by delaying outputs of tiles that end up running ahead (faster) than other tiles. Having tile outputs synchronized by FIFO 179 may be required since tile outputs may undergo further reduction by reduction fabric 111, which can be thought of a set of additional adder tree stages and thus may require its inputs (from tiles) to arrive in parallel and synchronized. Similarly, having tile outputs synchronized by FIFO 198 may be required in order to output all channels of OFM slice to OFM delivery fabric simultaneously. Output FIFO 198 and 179 sizes of four or less entries each may suffice in many cases. In cases when an output FIFO 198 or 179 is about overflow in one or more tiles, tile control FSM 144 may stall computation until output FIFO 198 or 179 empties up. The output FIFO 198 or 179 may have two input ports in order to merge results from two adder tree (A and B) paths.

Lastly, tile control FSMs 144 and SRAM controls 142 work together to read data from output FIFO 198, perform reduction fabric processing, transmit results over OFM delivery fabric and store to SRAM.

Let us review how Activation Numeric Type Converter 135 works together with the accumulate-and-return unit 167 to support signed and unsigned input and output data types of various bit width, including being able to use one data type for activations and another data type for weights, arbitrarily, referred below to "mixing data types".

In some embodiments, the following data types may be used: int8, uint8, int16, uint16, int24, uint24, int32, and uint32 for IFM, OFM and weights. As explained in detail below, IFM and weight data types can be mixed freely. For example, one can perform convolution or fully-connected layer calculation using uint8 activations and int8 weights, or int8 activations and int8 weights, or int16 activations and int8 weights, or int16 activations and int16 weights, etc. OFM data type can also be chosen at will, including uint8, int8, uint16, int16, uint24, int24, uint32, int32 and so on by applying combinations of scaling, rounding and choice of activation function.

Activations may be prepared for operations as follows. Activations may be stored in SRAM, for example, as int8 or uint8 or int16 or uint16, as specified by the user.

This IFM data is fetched to cache (i.e., to the IFM cache 139), then passes via the activation broadcast unit 141, including the activation numeric type converter 135, as shown in FIG. 1L. As a first step, if activations were quantized using "zero point" offset, as used in Google's TensorFlow, the type converter 135 adds "zero point" offset to activations. Subsequently, the numeric type converter 135 prepares activations by applying a suitable transform (or "transformation"), which makes possible multiplications that use data types wider than 8 bit, e.g. 16-bit weight and/or 16-bit activations, signed or unsigned, to be performed using 8-bit unsigned multipliers 126. For each lane, the activation broadcast unit 141 broadcasts an 8-bit absolute value act_abs[7:0] of the activation accompanied by a 1-bit sign sact, as illustrated in FIG. 1K. The transform applied by the activation numeric type converter 135 converts int8/uint8 to "sign and 8-bit absolute value". If the input activation is uint8, the type converter 135 sets the output broadcast 8-bit absolute value equal to the input uint8 value (i.e. no transform), and sets the broadcast sign to zero (which means that a non-negative value is represented).

If the input activation data type is int8, the activation numeric type converter 135 sets the output absolute value to the absolute value of the activation, and sets the output sign to 1 if the activation is negative and to 0 otherwise.

Weights may be prepared for operations as follows. Weights may be stored in SRAM as int8 or uint8 or int16 or uint16, as specified by the user. As weights are loaded into MU registers, weights are transformed (using the same transform as that used by the activation numeric type converter 141 to transform activations) in the weight decompression unit 138. Weights are stored as an 8-bit absolute value and a 1-bit sign. Referring to FIGS. 1K and 1N, values represented as int8 and uint8 are converted to 8-bit absolute value wt_abs_ld_in[7:0][C] and 1-bit sign representation swt_in[C] as weights are loaded from SRAM into MU registers and fed into multiplier units over vertical weight load buses 101.

Eight-bit multiplication may be performed as follows. The multiplier may be an unsigned 8-bit by unsigned 8-bit multiplier. The multiplication operation may take as input an activation and a weight, both in 8-bit-absolute-value-and-1-bit-sign representation. The multiplier then multiplies the two 8-bit absolute values, and exclusive-ors the two signs. If the product of the two 8-bit absolute values is zero, the output sign is set to zero. The multiplier result (the 16-bit absolute value accompanied by its sign) is then converted to int17 and delivered to an adder tree. Subsequently, the adder tree reduces signed int17 values received from column multiplier units and delivers the signed sum to the ARU 167 associated with the adder tree.

In some embodiments, 16-bit and 8-bit input data types may be mixed as follows. An 8-bit weight and an 8-bit activation may be multiplied in one cycle. In some embodiments, all possible combinations of 8-bit numeric data type are supported, e.g., uint8 activation×int8 weight, int8 activation×int8 weight, uint8 activation×uint8 weight, and int8 activation×int8 weight. The product of (i) a 16-bit weight and an 8-bit activation, or (ii) of a 16-bit activation and an 8-bit weight, may be calculated using two cycles. The product of a 16-bit activation and 16-bit weight may be calculated using four cycles. All possible combinations of 8-bit and 16-bit numeric data types may be supported, e.g., uint16 activation×int8 weight, int16 activation×int8 weight, uint16 activation×int16 weight, uint8 activation×int16 weight, int16 activation×int16 weight and so on.

In some embodiments, 16-bit activations may be handled as follows. When activations are uint16 or int16, type converter 135 may prepare the data by applying a transform (similar to the 8-bit transformation described above). Values in uint16 or int16 format may be transformed to 16-bit-absolute value and sign format. If an 8 bit (uint8 or int8) weight is used, the first cycle output of the activation broadcast unit 141 may be the least significant byte (LSB) of the 16-bit absolute value and sign resulting from the transformation (for multiplication with the 8-bit weight), and the second cycle output of the activation broadcast unit 141 may be the most significant byte (MSB) of the 16-bit-absolute value and sign resulting from the transformation (also for multiplication with the 8-bit weight). Both partial product results, each converted to signed int17, may then be sent to the column's accumulator 130A or 130B (via a column's adder tree 128A or 128B to the column's accumulate-and-return unit 167, as usual) and may be added together by the accumulator 130A (or 130B), except that the most significant byte product may also be shifted up 8 bits using sign extended shift 175 (and multiplexer 177) before being added.

If the weight is 16-bit (uint16 or int16), then four clock cycles may be used to perform the multiplication of a (16-bit) activation and a weight. The first cycle output of the activation broadcast unit 141 may be the least significant byte of the 16-bit-absolute value and sign resulting from the transformation of the activation, the multiplier may simultaneously be fed the least significant byte of the 16-bit-absolute-value of the weight, and a first multiplication may be performed. During the second cycle, the product of the same portion of the activation (i.e., the least significant byte of the 16-bit-absolute value and sign resulting from the transformation of the activation) may again be fed to the multiplier, along with the most significant byte of the 16-bit-absolute-value of the weight, and a second multiplication may be performed.

The third cycle output of the activation broadcast unit 141 may be the most significant byte of the 16-bit-absolute value and sign resulting from the transformation of the activation, the multiplier may simultaneously be fed the least significant byte of the 16-bit-absolute-value of the weight, and a third multiplication may be performed. During the fourth cycle, the product of the same portion of the activation (i.e., the most significant byte of the 16-bit-absolute value and sign resulting from the transformation of the activation) may again be fed to the multiplier, along with the most significant byte of the 16-bit-absolute-value of the weight, and a fourth multiplication may be performed. All four partial product results may each be sent to a column's accumulator 130A (or 130B) (via the associated column's adder tree 128A or 128B to the column's accumulate and return unit, as usual) and added together, except that the second and third partial product may each be pre-shifted before the addition by 8 bits and by 16 bits for the fourth partial product using a sign extended up-shifter 175 and multiplexer 177.

Performing a convolution operation involves traversing the IFM tensor, stored in SRAM 109, streaming contents of the IFM tensor to one or more tiles 102 as a series of IFM slices delivered over IFM delivery fabric 104. IFM tensor has three dimensions with coordinates expressed as (x, y, d) (and batch index, which we omit for now for clarity of explanation), where x and y indices correspond to the activation's planar coordinate and index d corresponds to the depth channel. The neural processor traverses the IFM tensor by cycling via (x, y, d) index values in a certain sequence. Let us refer to cycling over (x, y) coordinates as "planar" traversal and to cycling over the d coordinate as "depth-wise" traversal.

The following several paragraphs describe the planar traversal, including the use of the IFM cache 139. Referring to FIG. 1N, IFM delivery fabric 104 may connect to IFM tile 102 via IFM cache 139. There may be one IFM cache 139 per each tile, each placed locally to the associated tile. Utilizing IFM cache 139 (per each tile) helps reduce the number of reads from SRAM 109. Reducing the number of reads from SRAM 109 can be beneficial in three aspects, including (i) reducing the contribution of SRAM to the overall power consumption of the neural processor, (ii) reducing chances of SRAM read or write stalls and (iii) reducing the amount of traffic flowing via IFM delivery fabric 104.

The SRAM power consumption reduction aspect may be of interest when SRAM consumes a considerably higher power compared to flip-flop register power consumption, which may happen in practice. The SRAM stall aspect may be of particular importance when the number of SRAM banks, located in each SRAM unit 109, is low compared to the number of input-output (I/O, read or write) operations to be performed. For example, as will be described later in more detail, each SRAM bank set unit 109 may contain four SRAM banks, thus able to execute up to 4 I/O operations simultaneously (each clock period). These I/O operations may be an IFM slice read, a write of one or two OFM slices, a partial result read or write and a slice read or write requested by AXI interconnect 114.

A bank access collision can occur when more than four such I/O operations must access data residing in the same SRAM bank simultaneously or one or more I/O operation must access data in same bank, causing SRAM bank arbitration logic to stall either AXI access or IFM fetch or OFM write or partial result I/O, potentially causing a computation stall as well. Hence, IFM cache 139 reducing IFM reads from SRAM units 109 acts to reduce the chances of having stalls of these types.

As will be discussed later in more detail, in cases when weight kernel size is particularly large, one may or must resort to splitting computation into parts and store partially-finished computation results ("partial results" or "partials") in SRAM. In order to maintain acceptable computation precision, partial results usually have considerably longer bit width (e.g. 4 or 6 bytes) compared to IFM and OFM. Writing and reading partial results with long bit width to (from) SRAM consumes correspondingly higher SRAM bandwidth, which can increase chances of SRAM bank access collision and therefore AXI or computation stalls. Thus, having IFM cache 139 can help alleviate SRAM I/O bottleneck in particular for computations that use partial results.

Reducing IFM delivery fabric traffic may be of interest when communication bus area comes at a premium. Recall that IFM delivery fabric, as shown in FIG. 1P, can deliver up to two IFM slices per clock to IFM cache 139. Let us refer to IFM delivery fabric having "width of N slices" when IFM delivery fabric can deliver N slices to IFM cache 139 simultaneously, e.g. every single clock. By caching IFM slices locally (to each tile), IFM delivery fabric 104 can stay idle when an IFM slice required for computation has been already cached locally by the tile and is readily available for processing. IFM delivery fabric 104 having idle cycles (having utilization less than 100%) makes it possible to use the idle cycles to transmit extra IFM slices, thus making the overall "effective" IFM delivery bandwidth exceed 2×. Therefore, when IFM delivery fabric area is at a premium, the width of IFM delivery fabric 104 can be reduced from, for example, two slices to one, while still keeping the overall IFM delivery bandwidth at 1× or more, sometimes reaching 2× or more.

As will be seen below, IFM cache 139 delivers biggest benefits for convolution operations having kernel planar width and/or height larger than one. "Depth-wise" convolutions (those having kernel width and height both equal to 1) and fully-connected computations can also benefit from IFM caching, but typically only in rare circumstances.

Figure 2A:
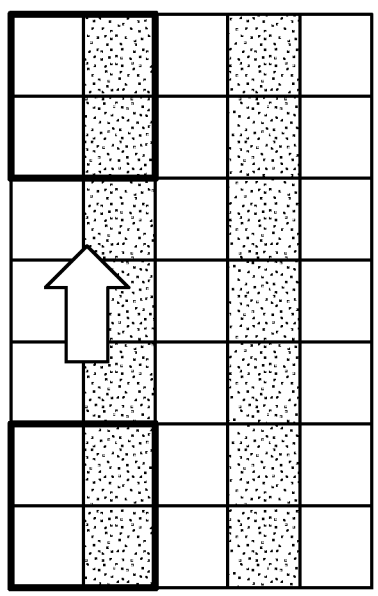
FIG. 2AA is a convolution diagram, according to an embodiment of the present disclosure.
Figure 2A:
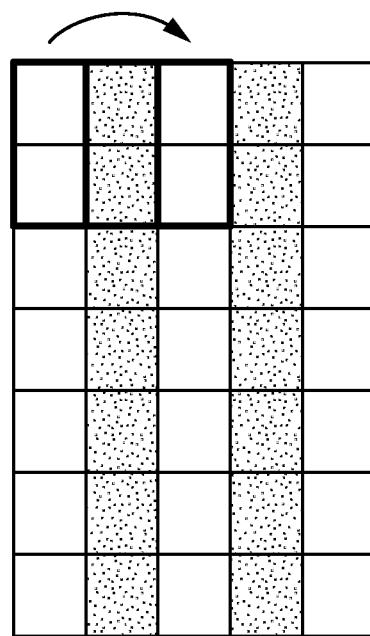

In order to appreciate the solution of one embodiment, called "zig-zag" planar traversal, designed to increase IFM cache hit rate, let us first consider traversing the IFM tensor planar-wise in a "naïve" fashion, using a 2×2×16×16 weight kernel, as illustrated in FIGS. 2AA-2AD. Here 2×2 refers to the weight kernel's planar height and width, 16 refers to IFM depth (i.e. one slice) and 1 refers to OFM depth. For clarity of explanation, however, we can treat the convolution as purely planar, i.e. 2×2×1×1. In FIG. 2AA shows the convolution operation starting with the convolution (kernel weight) window placed at the IFM tensor's upper left corner. After computing the 2×2 convolution at that location, the window slides one pixel to the right. The computation followed by sliding process repeats until the window reaches the IFM tensor's upper-right corner. Once at the upper right corner, the convolution gets calculated and the convolution window now slides one row down (instead of to the right), as shown in FIG. 2AB. Subsequently, same compute-and-slide steps repeat further, as shown in FIG. 2AC, except the convolution window now keeps sliding to the left until it reaches the IFM tensor's left edge where it slides one row down once again, as shown in FIG. 2AD. Repeating these steps eventually results in a complete planar scan (traversal)

of the IFM tensor. Let us refer to such scan as horizontal (as opposed to vertical) since the window slides predominantly horizontally, i.e. the inner loop cycles over the x coordinate.

Consider using IFM cache 139 in conjunction with the naïve "horizontal" scan as illustrated in FIGS. 2BA-2BL. In the beginning of the convolution operation the IFM cache 139 gets cleared, the 2×2 convolution window is placed at the IFM tensor's top left corner, followed by retrieving four IFM values required to compute convolution at that starting location. As illustrated in FIG. 2BA, the first of the four IFM values is retrieved from the top leftmost position in the IFM sensor. Let us refer to that position as being in row 0, column 0. Since the cache has been cleared, the IFM value at row 0, column 0 must be retrieved from SRAM, not IFM cache, resulting in a cache miss, marked as "M" in FIG. 2BA. Once retrieved, the IFM value becomes cached. FIG. 2BB shows the second IFM value (of the four) retrieved at row 0, column 1. The cache does not contain the value associated with that location (row 0, column 1), resulting in another cache miss, marked by "M". The light shading of the location at row 0, column 0 indicates that the IFM value retrieved in the previous step has been cached. FIGS. 2BC and 2BD illustrate retrieval of the remaining two IFM values, each resulting in a cache miss. At this point all four IFM values have been retrieved, the convolution calculation at the current location can complete, all four IFM values have also been cached and the convolution window can slide one column to the right.

FIGS. 2BE-2BH illustrate retrieval of four more IFM values to calculate convolution at the new location. In FIG. 2BE, retrieving IFM value at row 0, column 1 results in a cache hit, thus obviating the SRAM read. Similarly, FIG. 2BG shows another cache hit at row 1, column 2, while retrieving the other two IFM values cause a cache miss each.

As the convolution window keeps sliding, the leftmost previously-cached IFM values, as indicated by dark shading in FIGS. 2BI-2BL (and FIGS. 2BE-2BH), will not participate in computation for an extended period of time, or at all, until the convolution window slides all the way to IFM tensor rightmost edge, slides one row down and slides all the way back to the cached value. Therefore, once the convolution window slides, these values may be purged from the cache to keep cache size small.

FIGS. 2BI-2BL illustrate retrieving next four IFM values to calculate convolution at the next location (one step over to the right), resulting in two cache hits and two cache misses. As illustrated in FIG. 2BM, caching IFM values horizontally during 2×2 convolution results in, approximately, 50% cache hit probability (rate) as two out of four IFM values (marked with light shading) get re-used once every time the convolution window slides one step over to the right. More generally, a convolution using H×W planar kernel size in conjunction with horizontal caching and assuming a cache of sufficient size, results in H*(W−1)/(H*W) cache hit rate. The cache size sufficient for such convolution may be (W−1) bytes, per lane, per tile. However, as will be explained in detail later, the neural processor can also use "IFM weight cycling" (to accumulate several IFM channels into a dot product by cycling multiplier units' weights sequentially) during dot product computation. Therefore, as will become clear later, in a most general case, the maximum cache size equals to the number of weights stored in MU weight register file 127 (which equals to 18 for 8-bit weight data types), per lane, per tile.

In FIGS. 2BA-2BM, keeping the cache size relatively small requires purging cache values aggressively. Referring to FIG. 2BM, as the convolution window slides over row R (row 2) the IFM values from the previous row R−1 (row 1) have been long purged from the cache (indicated as cache miss "M" at row 1, column 2). In order to increase cache hit rate above H*(W−1)/(H*W) one might consider, for example, caching values of one or more rows, of the IFM tensor. However, caching a whole IFM tensor row would require cache size to increase, such that, in general, cache size becomes a function of IFM tensor width. Since IFM tensor width is usually unknown at ASIC design time, and since IFM tensor width can be relatively large, caching IFM rows appears expensive in terms of silicon area and thus undesirable. Same reasoning applies in the symmetrical case when the convolution window scans predominantly vertically (the planar coordinate inner loop iterates over row number) instead of horizontally.

Figure 2C:
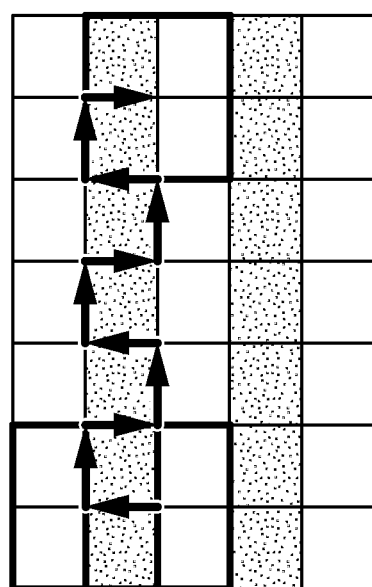
FIG. 2C is a convolution diagram, according to an embodiment of the present disclosure.

As opposed to the naïve planar scan, some embodiments perform planar traversal of IFM tensor in a "zig-zag" shape during convolution operation. Zig-zag planar traversal helps increase the cache hit probability, while still keeping cache size small. FIG. 2C shows the down-right-up-right zig-zag path along which the convolution window may be displaced (slide), in such an embodiment. Unlike the naïve horizontal traversal, the convolution window in FIG. 2C slides to the right after having calculated two convolutions (in vertically adjacent locations), not one. Therefore, a single complete left-to-right edge-to-edge sweep of IFM tensor by the convolution window produces two rows of convolution results, as opposed to one row of results by the naïve horizontal traversal.

In a more general case, zig-zag traversal can be parametrized using "Z number" corresponding to the number of output rows processed in a single horizontal IFM tensor sweep. For example, in FIG. 2C the Z number equals to two. As will be seen later, higher Z numbers result in higher cache hit rates.

In FIG. 2C the zig-zag traversal producing two rows of results per single horizontal sweep can be imagined as performing a naïve horizontal traversal on an IFM tensor that is twice as wide, but half the height. More generally, one can view a zig-zag traversal path being "unrolled" into a single (horizontal) sweep of length of H*Z columns, requiring a total of H/Z sweeps to complete IFM tensor convolution, where H and W are IFM tensor height and width respectively. For example, in FIG. 2C Z=2, therefore instead of traversing H×W IFM layer, by naïve scanning, the length of the arrow path is approximately H*Z=W*2, so the logical IFM layer width becomes W*Z=2W, while the logical IFM layer height becomes H/Z=H/2. The naïve horizontal is equivalent to zig-zag traversal with Z=1.

Figure 2D:
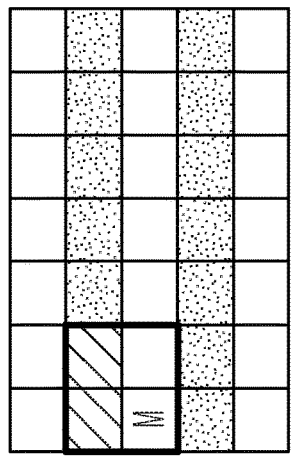
FIG. 2DA is a convolution diagram, according to an embodiment of the present disclosure.
Figure 2D:
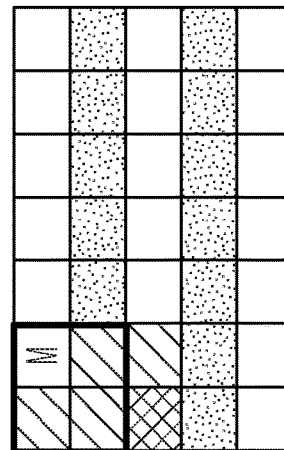
Figure 2D:
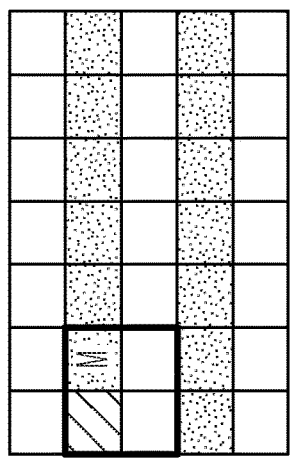
Figure 2D:
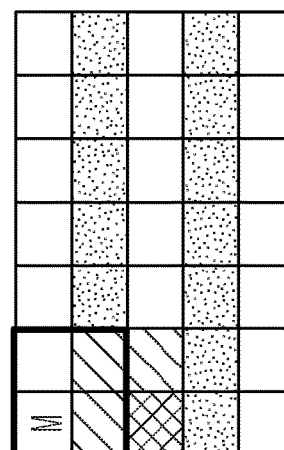
Figure 2D:
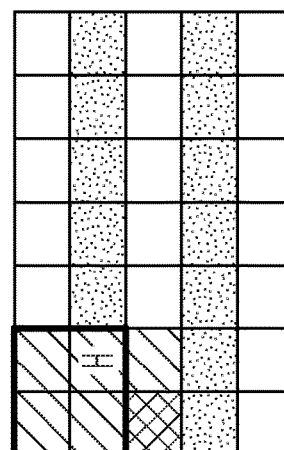
Figure 2D:
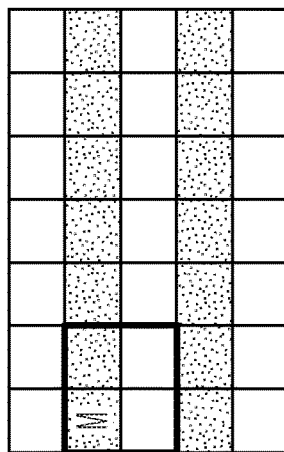
Figure 2D:
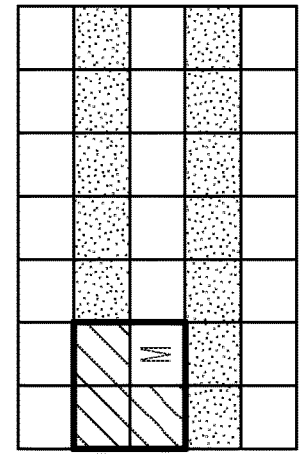
Figure 2D:
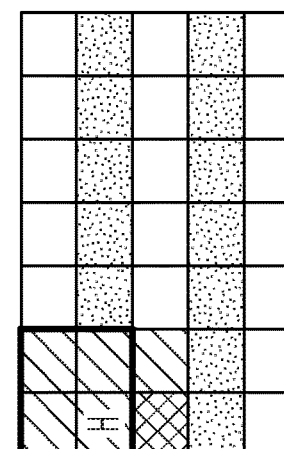
Figure 2D:
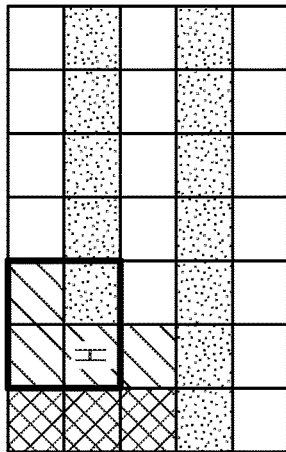
Figure 2D:
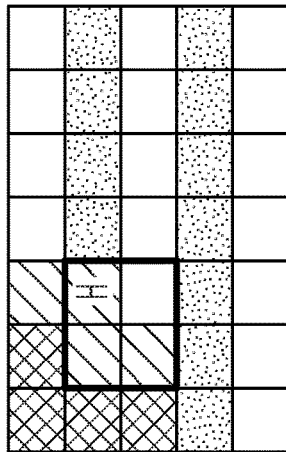
Figure 2D:
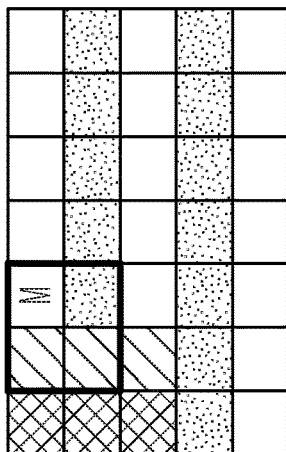
Figure 2D:
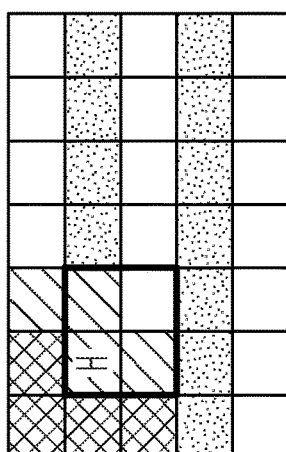
Figure 2D:
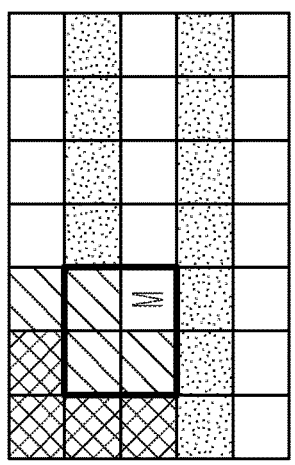
Figure 2D:
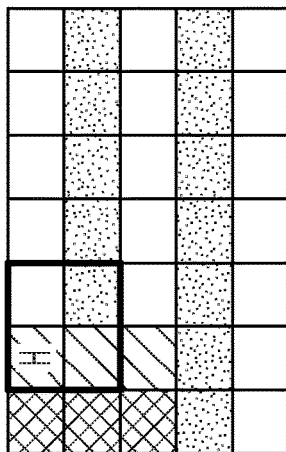
Figure 2D:
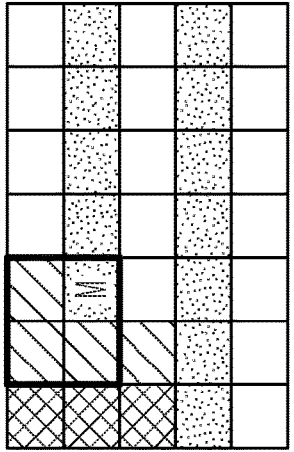
Figure 2D:
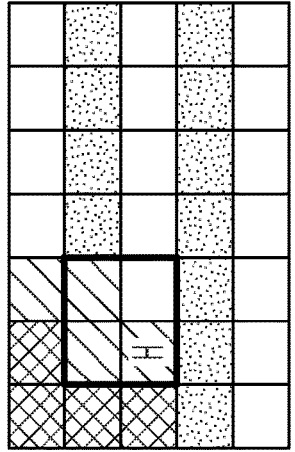
Figure 2D:
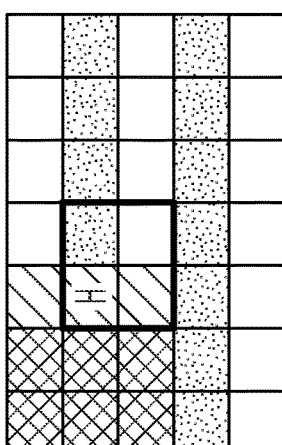
Figure 2D:
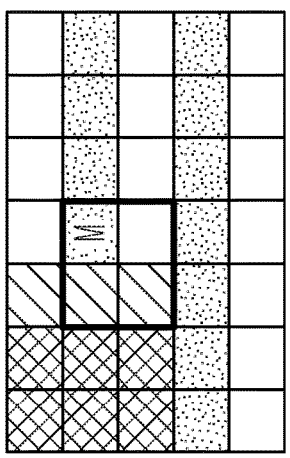
Figure 2D:
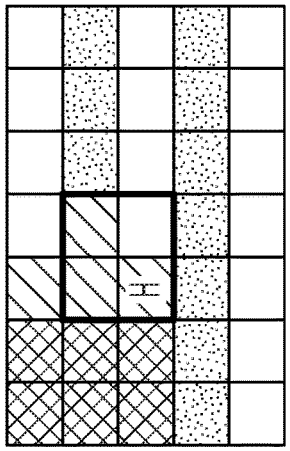
Figure 2D:
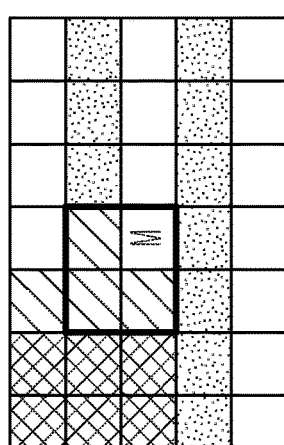
Figure 2D:
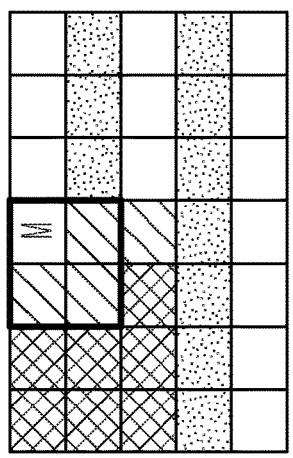
Figure 2D:
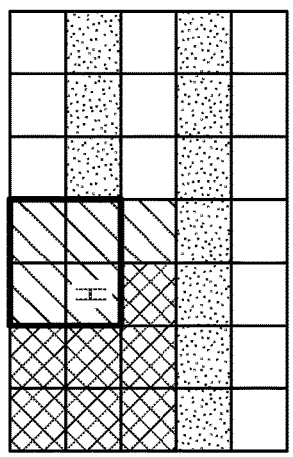
Figure 2D:
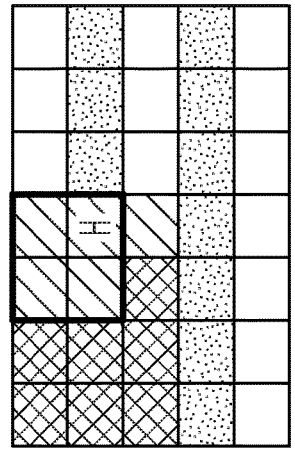

FIGS. 2DA-2DD illustrate that for the first position of the convolution window, retrieving all four IFM values results in cache misses, causing four SRAM reads to occur. For the next position of the convolution window, fetching two more IFM values results in cache misses, while the other two IFM fetch locations overlap with the previous position of the convolution window, thus resulting in two cache hits, as shown in FIGS. 2DE-2DH.

As shown in FIGS. 2DI-2DL, for the next position of the convolution window, two IFM values are cache misses, and two overlap with the previous position of the convolution window, each resulting in a cache hit. For the next position of the convolution window, one IFM value is a cache miss, and three overlap with the previous position of the convolution window, and are cache hits, as shown in FIGS. 2DM-2DP. As such and further referring to FIGS. 2DQ-2DX, the use of a zig-zag path significantly improves the ratio of cache hits to cache misses.

FIG. 2E is a table showing the actual number of SRAM reads associated with zig-zag traversal referred to the number of SRAM reads in ideal cache, a measure of zig-zag traversal efficiency. The table assumes that cache sizes are sufficient for a given Z while performing a single sweep, i.e. values from a previous sweep become purged. Lower numbers in the table correspond to higher efficiency, and 1.0 is the ideal case. Convolution size refers to planar dimensions of square weight kernels. For example, a 3×3 convolution with zig-zag traversal having Z=2 results in 2× more SRAM reads compared to 3×3 convolution using an ideal cache, i.e. one that has infinite capacity and never purges any values. However, a 3×3 convolution using zig-zag traversal having Z=1, i.e. naïve (e.g. horizontal) traversal, results in 3× more SRAM reads compared to using an ideal cache. Thus, in this case, zig-zag traversal with Z=2 reduces SRAM read count by 3/2=1.5× compared to the naïve traversal, while cache size for both zig-zag Z=2 and Z=1 naïve traversals remains little changed, as computed by formulas described below. Note that larger numbers of Z produce bigger SRAM read count savings. For example, increasing cache Z to 4 results in 3/1.5=2× SRAM read savings for 3×3 convolution.

FIG. 2F shows a table of average expected IFM SRAM reads, per clock, necessary for suppling IFM cache, assuming one IFM slice is processed per each clock. For example, 5×5 convolution with cache Z=4 perform SRAM read only 8% of the time, on average, compared to 100% (i.e. every clock) without cache and compared to 20% of the time with cache Z=1 (i.e. naïve traversal scheme).

FIGS. 2GA-2GB illustrate the derivation of the cache hit/miss counts and cache size. Zig-zag traversal involves repetition of a two-step sequence, where the convolution window slides vertically by Z−1 rows, then slides sideways by one column. Ignoring special cases at IFM tensor edges for simplicity, a convolution window of planar size W×H sliding one column sideways (to the right in FIG. 2GA) results in H cache misses (marked "m") and H*(W−1) hits. The following step of sliding Z−1 rows vertically (downwards in FIG. 2GB) results in (Z−1) cache misses and (Z−1)*(H*W−1) cache hits.

Correspondingly, once the convolution window has slid one column horizontally, it can use previously-cached values (marked as "c" in FIG. 2GA, cached during the previous vertical translation) inside the kernel window for the current calculation.

Previously-cached values marked "c" outside the kernel window (below, in FIG. 2GA) also should stay in the cache to be used as the window will start sliding vertically (down, in FIG. 2GA). Also, values fetched from SRAM (marked "m") should be added to the cache to be used in the calculation at the current location as well as later, after the convolution window slides Z−1 rows down, one column right and comes back up. Next, every time the convolution window slides down one row, one cache value (top left) can be purged and one value from SRAM is added (marked "m"). Therefore, counting the number of "c" marks in FIG. 2GB the required cache size is (H+(H+Z−1)*(W−1)).

If weight cycling is used, as explained later in detail, the cache size may be increased by the same factor as the number of kernels stored simultaneously in any tile. As mentioned above, when the convolution kernel is small, the system may store several planar kernels into each MU. For example, if the MU has 18 weight registers, and the convolution is 2×2, then four 2×2 kernels may be stored in the MU weight registers. For example, a dot product of IFM having 64 channels 0 . . . 63 can be computed into OFM 0 . . . 7 by cycling over four stored kernels, over time. The system may fetch IFM slice holding channels 0 . . . 15, multiply by the first (of four) kernels, and keep the result in the tile's accumulator; fetch IFM slice with channels 16 . . . 31, multiply by the second 2×2 kernel (of four), and add the result to the already-stored accumulator value; and repeat a third and fourth time. These IFMs may also be cached, resulting in a correspondingly increased cache size. However, IFM cache size has an upper limit, regardless of choice of the planar translation method (naïve or zig-zag or some other), that is a function of the size of the multiplier unit weights register file. This is because each cached IFM must have a corresponding weight in the weight register file to be multiplied, and the weight register file itself is limited, e.g. to 18 weights. Note that same reason also translates into IFM cache size having a lower bound equal to the weight register file size.

Therefore, IFM cache size should be set to maximum of (H+(H+Z−1)*(W−1)−1) and MU_WEIGHTS, taken over all possible supported H and W combinations, where MU_WEIGHTS equals the multiplier unit weight register file size, e.g. 18. For example, if neural processor has 18 weights per multiplier unit, supports zig-zag traversal of Z=2 and all natural H and W for kernel weight planar size, such that H*W<=18, e.g. 1×1, 1×2, 2×1, . . . 4×4, 9×2, 2×9, the IFM cache size is the maximum of (1+(1+2−1)*(1−1)−1)=0, (1+(1+2−1)*(2−1)−1)=2, (2+(2+2−1)*(1−1)−1)=2, . . . (4+(4+2−1)*(4−1)−1)=18, (2+(2+2−1)*(9−1)−1)=25, (9+(2+2−1)*(2−1)−1)=11 and 18, which is 25.

In some embodiments the MU weight register file capacity equals to 18 8-bit weights (uint8 or int8) or, equivalently, 9 16-bit weights (uint16 or int16). When IFM data is 16-bit (uint16 or int16), the IFM cache can store 16-bit IFM data by allocating two bytes per one 16-bit IFM. Therefore, similar to MU weight register being able to store 9 16-bit weights, the IFM cache can store 9 16-bit IFM values. The zig-zag (as well as naïve) planar traversal can be applied to 16-bit IFM values similar to how it is applied to 8-bit values. In such cases, cache size calculation described above should also additional W and H terms in the maximum function, such as (H+(H+Z−1)*(W−1)−1)*size_of(IFM_DATA_TYPE), where size_of(IFM_DATA_TYPE) refers to the size in bytes of the IFM value's data type (e.g. 3 bytes for 24-bit IFM values and 4 bytes for 32-bit IFM values). Zig-zag (and naïve) caching can be used in cases when IFM data type is 24-bit, 32-bit or longer, however it is recommended to increase MU weight register file 127 size (and IFM cache size) to 3×3×size_of(IFM_DATA_TYPE). This ensures that weight kernels of a popular 3×3 planar size can be convolved without resorting to use of partial results, which may be undesirable, as explained later in detail.

As described earlier, global, SRAM, tile and lane control logic units 140, 142, 144 and 146 work together to execute proper control of SRAM IFM fetching, transmission of IFM slices over IFM delivery fabric, caching IFM values in local tiles, retrieving cached IFM values (usually at somewhat different rates for each activation lane) and re-synchronizing OFM results among tiles. To configure IFM and OFM planar traversal, the host CPU loads the computation parameters to global control FSM 140 and SRAM control logic 142, including zig-zag height Z. The global control FSM 140 then orchestrates the SRAM control FSMs 142 and the tile control FSMs 144 to start and carry out the computation.

When the convolution window traverses input- and output-layer in a zig-zag planar-wise fashion, each accumulate-and-return unit 167 may receive OFM values necessary to compute pooling on-the-fly, advantageously without saving pre-pooling results to SRAM and reading them back later to apply pooling. ARU may perform pooling in cases when pooling windows do not overlap, as shown in FIGS. 2HA through 2HD by not sending out each convolution OFM result, but instead keeping the convolution result in its pooling logic's 196 register until each pooling output is complete. Only after each pooling output is completed the ARU writes the pooling output to the SRAM. For max pooling, the ARU output register can hold the maximum value, which becomes compared with convolution outputs and updated when the latest OFM output exceeds the current maximum. Once the pooling window slides, the ARU output register is reset to start the max operation anew. For average pooling, the ARU accumulator keeps adding OFM output until the pooling window is about to slide over. The accumulator is then multiplied by 1/(POOLING_WIDTH*POOLING_HEIGHT) to compute the average, gets rounded and written to SRAM. Once the pooling window slides over, the accumulator is reset to start the averaging anew.

For example, FIG. 2HA illustrates zig-zag planar traversal with Z=2 performed in conjunction with 2×2 planar pooling, where IFM layer is traversed in such a way that causes OFM values (in each pooling window) to be computed sequentially. Since ARU output generates each four OFM values (necessary to compute each pooling) one after another, the ARU pooling logic 196 can take the maximum among the four consecutive results in order to calculate max pooling. FIG. 2HB illustrates zig-zag planar traversal with Z=3 and 3×3 planar pooling. Since Z value equals to the pooling kernel height, traversing IFM layer in a zig-zag manner naturally results in OFM within each pooling window being generated in a sequence suitable for max and average polling. FIG. 2HC provides an additional illustration of Z=H=4, where H refers to the pooling kernel's height.

FIG. 2HD illustrates a case when Z value does not match the pooling kernel's height, such that Z=4 and the pooling kernel's height is 2. In this case, the pooling logic 196 may subdivide pooling into two areas (upper 2×2 and lower 2×2 as shown) and use an additional register to temporarily store unfinished results from one of the two pooling areas (lower 2×2 in FIG. 2HD). More generally, zig-zag pooling window height can be a natural multiple of the zig-zag's traversal height. Reasonable numbers may include 2, 3 and 4. As mentioned previously, zig-zag pooling vertical stride should equal the zig-zag traversal height, which restricts on-the-fly pooling to such cases only. However, pooling windows may overlap horizontally as long as output pooling logic 196 has sufficient copies of pooling logic, each processing the respective horizontally-overlapping pooling window, in parallel for all such horizontally-overlapping pooling windows. Zig-zag pooling window width and stride can be generally arbitrary with reasonable pooling window width numbers including, for example, 2, 3 and 4.

In cases when pooling windows overlap vertically, thus making on-the-fly pooling problematic, and/or cases that need custom pooling (other than max and average), pooling can be accomplished by (i) placing read-modify-write logic near SRAM banks (not disclosed in the current invention) and/or (ii) reading out SRAM over AXI to an external CPU, GPU, DSP or other type of computing core, performing the pooling and writing results back to NPU SRAM over AXI. Note that custom read-modify-write logic near SRAM banks can be also re-used to add partial results efficiently, without sending partial results back to tiles.

In order to configure the neural processor to perform a certain operation (e.g. convolution or fully-connected layer computation) it is necessary to consider IFM and OFM tensor sizes and, in conjunction with operation's parameters (e.g. operation type, stride, etc.) "map" the computation onto the available hardware. Each individual tile may have only a fixed number of 16 IFM depth channel inputs and 8 OFM depth channel outputs, while the number of depth channels in deep learning neural network model layers varies and usually far exceeds 16 and 8. A "mapping algorithm" runs offline (during compile time as opposed to run time) to sub-divide these large IFM and OFM tensors into portions (sub-tensors), assign these portions to the available tiles for computation and produce a description (configuration) of how outputs from the available tiles will be re-assembled to complete computation. The mapping algorithm also determines the order of IFM (and correspondingly OFM) tensor traversal both planar-wise and in particular depth-wise, as will be explained in more detail below. Since there may be multiple solutions to a particular mapping problem, i.e. for given IFM, OFM and weight tensor sizes and operation parameters, the mapping algorithm may also accept a parameter indicating whether to optimize the solution for lowest power, lowest SRAM size, lowest computation latency (achieved by maximizing multiplier utilization) or a combination of these (e.g. lowest power given the available fixed SRAM size).

Aspects of the mapping operation of some embodiments may be understood from a set of examples, as we progress from trivial to increasingly more advanced cases. For the sake of explanation clarity let us ignore features associated with zero activation skipping and assume each OFM column has only one adder tree and accumulator, i.e. that computation is "dense", as activation skipping largely does not affect mapping. Let us also ignore caching, including zig-zag planar translation method, and assume that the convolution window moves (slides planar-wise) in a raster fashion since caching largely does not affect mapping. In a first example, illustrated in FIGS. 3AA-3AK, a 3×3×16×8 convolution is calculated, using a single tile. FIG. 3AA shows the tile accepting IFM with 16 depth channels as inputs (one IFM slice) and producing OFM with 8 depth channels (one OFM slice). The IFM tensor 304 size is 64×64×16, the OFM tensor size is 64×64×8, and the weight tensor size is 3×3×16×8 as shown in FIG. 3AB.

Initially, the weights are pre-loaded from SRAM into MU weight register files 127, as shown in FIG. 3AC. The weight kernel 302 size is 3×3×16×8. Having a planar size of 3×3, the weight kernel has 3*3=9 planar "locations", marked A through I in FIG. 3AC. Each planar location is associated with a 16-long weight vector used to compute dot product with 16-long IFM value vector for one OFM channel. Since there are 8 OFM channels, the weight kernel can be thought of as having one 3D tensor for each OFM, as illustrated in FIG. 3AC.

Specifically, the weights may be loaded into MU weight register files 127 as follows. The plurality of MU weight register files in the entire MR array 122 can be thought of a tensor having dimensions 18×16×8 (18 weights per MU, 16 MU rows and 8 MU columns), more than enough to hold the entire weight kernel of size 3×3×16×8. The weight register file tensor size of 18×16×8 can also be re-written as (3×3)× 16×8, where each MU weight register file at row R, column C stores all 9 weights of 3×3=9 planar locations (x, y) in weight tensor W×H×R×C, where W and H are weight kernel planar width and height, i.e. W=3 and H=3. For example, referring to FIG. 3AC, the weight register file in row 0, column 0 stores weights {A0[0], B0[0], C0[0], D0[0], E0[0], F0[0], G0[0], H0[0], I0[0]}, where the notation is "A . . . I" followed by OFM column "0 . . . 7" and IFM row "[0 . . .

15]". Correspondingly, the weight register file in row 15, column 0 stores weights {A0[15], B0[15], C0[15], D0[15], E0[15], F0[15], G0[15], H0[15], I0[15]}, the weight register file in row 15, column 7 stores weights {A7[15], B7[15], C7[15], D7[15], E7[15], F7[15], G7[15], H7[15], I7[15]} and so on. Since tiles compute dot products "vertically" (using column-wise adder trees), one can see that the described ordering of loaded weights allows computing dot product of IFM input at each planar location A . . . I.

Referring to FIG. 3AD, the convolution window may then be positioned at the start position, and the eight accumulators (of which, as mentioned earlier, there is one for each of the 8 OFM channels for the sake of mapping explanation clarity) may be cleared.

Referring to FIG. 3AE, the tile may then read IFM a[0 . . 15] (where a . . . z refer to IFM's planar locations and 0 . . . 15 refers to IFM depth channels) from SRAM, and broadcast these values to its 8 columns. The first column may multiply a[0 . . 15] element-wise with pre-loaded weights A0[0] . . . A0[15], the second column may multiply a[0 . . 15] element-wise with pre-loaded weights A1[0] . . . A1[15], etc. The resulting products may be summed (reduced) vertically (using each column's adder tree), and added to the accumulator. The resulting dot product is not yet a finished result as 8 more (out of 3*3=9) planar locations remain to be processed to complete 3×3 convolution at a single location.

Referring to FIG. 3AF, the tile may then read IFM b[0 . . 15] from SRAM, and broadcast these values to its 8 columns. The first column may multiply b[0 . . 15] element-wise with pre-loaded weights B0[0] . . . B0[15], the second column may multiply b[0 . . 15] element-wise with pre-loaded weights B1[0] . . . B1[15], etc. The resulting products may be summed vertically, and added to the accumulator. Referring to FIG. 3AG, the tile may then read IFM c[0 . . 15] from SRAM, and broadcast these values to its 8 columns. The first column may multiply c[0 . . 15] element-wise with pre-loaded weights C0[0] . . . C0[15], the second column may multiply c[0 . . 15] element-wise with pre-loaded weights C1[0] . . . C1[15], etc. The resulting products may be summed vertically, and added to the accumulator.

Referring to FIG. 3AH, the tile may then read IFM g[0 . . 15] from SRAM, and broadcast these values to its 8 columns. The first column may multiply g[0 . . 15] element-wise with pre-loaded weights D0[0] . . . D0[15], the second column may multiply g[0 . . 15] element-wise with pre-loaded weights D1[0] . . . D1[15], etc. The resulting products may be summed vertically, and added to the accumulator. Referring to FIG. 3AI, the tile may then read IFM h[0 . . 15] from SRAM, and broadcast these values to its 8 columns. The first column may multiply h[0 . . 15] element-wise with pre-loaded weights E0[0] . . . E0[15], the second column may multiply h[0 . . 15] element-wise with pre-loaded weights E1[0] . . . C1[15], etc. The resulting products may be summed vertically, and added to the accumulator.

Referring to FIG. 3AJ, analogous operations may be performed for the remaining position of the nine positions of the kernel, labelled a through o. The values stored in the accumulators may then be rounded to form the 8-bit output OFM, and all 8 OFM results may be written to SRAM. This completes the calculation of one convolution. The convolution window may then be translated planar-wise by one column, as shown in FIG. 3AK, and the operations may be repeated.

In a second example, illustrated in FIGS. 3BA-3BC, a 3×3×16×128 convolution is calculated, using a single tile. As mentioned earlier, for convenience, the term "IFM slice" may be defined to mean the 16 IFM depth channels, a unit of IFM read (and tile input), and the term "OFM slice" may be defined to mean 8 IFM depth channels, a unit of OFM tile output as shown in FIG. 3BA. It may be convenient to illustrate operation mapping in a rectangle, where the height of the rectangle corresponds to the number of IFM channels, and the width of the rectangle represents the number of OFM channels, as illustrated in FIG. 3BB. The 3×3×16×128 convolution may be accomplished by splitting it into 16 3×3×16×8 convolutions, so that the previous example of performing 3×3×16×8 convolution can be repeated 16 times. In a first step, the 3×3×16×8 convolution for OFM[0 . . 7] may be computed; in a second step, the 3×3×16×8 convolution for OFM[8 . . 15] may be computed, and so forth, until, in a sixteenth step, the 3×3×16×8 convolution for OFM[120 . . 127] may be computed. The processing of a next subset of OFM channels may be referred as "stepping the OFM". The sixteen steps may correspond to sixteen rectangles, the first, second, and sixteenth of which are shown in FIG. 3BC, and it may be seen from FIGS. 3BB and 3BC that when the sixteen steps are complete, the 3×3×16×128 convolution has been calculated.

Hypothetically, an unlimited number of OFM channels may be processed in this manner, simply by splitting the OFM into sufficiently small pieces. Each time the system "steps the OFM" the IFM is re-read entirely (in this example, sixteen times). Each reading of the (entire) IFM may be referred to as an "IFM pass", and each such IFM pass may consume a considerable amount energy (or power, if the operation is performed repeatedly). Reducing power consumption is usually highly desirable, especially for battery-powered devices such as mobile smartphones. The next example illustrates an approach for avoiding some of this energy cost.

In a third example, illustrated in FIGS. 3CA and 3CB, a 3×3×16×128 convolution is calculated, this time using sixteen tiles (as opposed to one). Each tile has 16*8=128 multipliers, so the 16 tiles have 128*16=2,048 multipliers total. The IFM[0 . . 15] may be broadcast to all 16 tiles, so that Tile 1 will compute OFM[0 . . 7], Tile 2 will compute OFM[8 . . 15], and so forth, and Tile 16 will compute OFM[120 . . 127]. Note that, as used herein, an IFM "broadcast" refers to the feeding of an IFM simultaneously to several MR tiles 102, as opposed to the description of tile 102 where broadcast refers to feeding ABU output to all MU columns with a single tile.

The neural processor has multiple SRAM bank sets 109 (FIGS. 1A and 3AC). As such, referring to FIG. 3CB, the input IFM[0 . . 15] may be fed from SRAM bank set 0. The output of tile 1 (OFM[0 . . 7]) may be concatenated with the output of tile 2 (OFM[8 . . 15]) into a 16-channel OFM[0 . . 15] and saved into SRAM bank set 1. Similarly, the output of tile 2 may be concatenated with the output of tile 3 and saved to SRAM bank set 2, and so forth, with the output of tile 15 being concatenated with the output of tile 16 and saved to SRAM bank set 8. It may be seen that, in this third example, all OFMs are computed in a single "pass" (i.e., reading entire IFM once) and that most of the energy consumption incurred in the second example by performing multiple IFM passes is avoided, because the IFM is read only once, as a result of the use of an IFM broadcast.

In a fourth example, illustrated in FIG. 3DA, a 3×3×16×256 convolution is calculated, using sixteen tiles. Sixteen tiles may be capable of generating up to 16*8=128 OFM channels in a single pass; in this example, 256 OFM channels are to be generated. Two OFM steps may therefore be run, with a first step being used to calculate OFM[0 . .

127] and a second step being used to calculate OFM [128 . . 255]. Two IFM passes may be used (reading the IFM entirely twice). The forming of the OFM in two steps is illustrated in FIG. 3DA.

In a fifth example, illustrated in FIGS. 3EA and 3EB, a 3×3×32×64 convolution is calculated, using sixteen tiles. This example involves 32 IFM channels, unlike the preceding examples that had 16. All 32 IFM channels (2 slices) may be read from SRAM simultaneously. The neural processor may have several SRAM banks sets. Each bank set (in mapping examples) can stream 1 slice per clock cycle. As such, to read (stream) 2 slices (32 IFM channels) concurrently, two bank sets may be used, of which a first bank set may stream IFM[0 . . 15], and a second bank set may stream IFM[16 . . 31].

Referring to FIG. 3EB, the calculation of OFM[0 . . 7] may be split across tile 1 and tile 9. Tile 1 may reduce (add) IFM[0 . . 15] into unfinished OFM[0 . . 7]. Tile 2 may reduce IFM[16 . . 31] into unfinished OFM[0 . . 7]. The calculation of OFM[0 . . 7] may then be completed by adding tile 1 and tile 2 outputs (and applying bias, activation function, etc.). To perform this addition, adder trees of tile 1 and tile 2 may be "joined" using one more additional hardware adder stage. Reduction fabric 111 provides such additional hardware adder stages. Analogous operations may be used for OFM[8 . . 15] (adding tile 2 and 10), . . . OFM[56 . . 63] (adding tile 8 and 16). Referring to FIG. 3EB, in this example, there is no output from tiles 1 . . 8 to SRAM; only tiles 9 . . 16 save OFM to SRAM, as will be explained in detail later.

In a sixth example, illustrated in FIGS. 3FA-3FC, a 3×3×32×512 convolution is calculated, using sixteen tiles. Referring to FIG. 3FA, as in the fifth example, two IFM slices (IFM[0 . . 31]) may be read from two SRAM banks and each of the two IFM slices may be broadcast to 8 tiles. Two such sets of 8 tiles together may compute OFM [0 . . 63] and these results may be saved to 4 SRAM bank sets. Referring to FIG. 3FB, 64 OFMs may be computed per IFM pass (i.e., the entire IFM may be read to calculate 64 OFMs). As such, in a manner similar to that of the fourth example, 512 OFMs may be computed in 8 IFM passes (and, equivalently, 8 OFM "steps"). OFM[0 . . 63] may be calculated during a first IFM pass, OFM[64 . . 127] may be calculated during a second IFM pass, and so forth, with OFM[448 . . 511] being calculated during an eighth IFM pass. In this example, a "2 IFM slices by 64 OFM slices" operation has been split into 8 OFM steps. Each OFM step convolves "2 IFM slices by 8 OFM slices". Referring to FIG. 3FC, in some embodiments, virtual SRAM banks may be used to handle cases in which an SRAM bank (which may have a capacity of about 32 kB) runs out of IFM data or fills up with OFM data.

In such a case the data fabric of the neural processor may transparently (to tiles receiving IFM streams) switch to connect another SRAM bank set. As mentioned earlier, IFM and OFM tensors may be too large to be stored in a single SRAM bank set 109 and may thus need to be split up into sub-tensors each being small enough to fit into an SRAM bank set 109 for storage. Global control logic 140 contains configuration registers specifying how IFM and OFM tensors have been split up and stored in SRAM bank sets, including IFM and OFM sub-tensor indices, sizes, index of SRAM bank set storing each sub-tensor as well as addresses at which each sub-tensor is stored within the associated SRAM bank set.

As computation proceeds and IFM (OFM) traversal moves from sub-tensor stored in one SRAM bank set 109 to another sub-tensor, stored in another SRAM bank set 109, the global control FSM 140 orchestrates the on-the-fly reconfiguration of IFM and OFM delivery fabrics, switching over IFM source (and OFM destination) SRAM bank set from current one to the next one. In some embodiments, the reconfiguration is accomplished in a way that is transparent to tiles consuming IFM (and tiles generating outputs) and does not stall or slow down computation during the bus switch-over.

As mentioned earlier, a piece of software, referred to as a "mapper" may decide statically (at compile time) how to split entire the IFM and OFM storage across SRAM bank sets and physical SRAM banks—as well as weight kernel storage and partial results. For clarity of mapping explanation, let us ignore details of physical IFM and OFM storage across multiple SRAM bank sets and regard SRAM bank sets as being "virtual" or "logical" views 306 into IFM and OFM, as illustrated in FIG. 3FC.

In a seventh example, illustrated in FIGS. 3GA-3GD, a 3×3×32×512 convolution is calculated, using sixteen tiles. In this example, the same convolution as in the sixth example is calculated, using fewer IFM passes to save energy. Referring to FIG. 3GA, each multiplier unit weight register file 127 may have 18 weights, of which only 9 were used in the sixth example, for a 3×3 convolution. As such, two sets of 3×3 weights may be stored (as opposed to one), and "cycled" through over time. In particular, the 3×3×32×512 convolution may be split into two 3×3×16×512 convolutions interleaved in time. Referring to FIG. 3GB, in a manner analogous to that of the third example, the 3×3×16×512 convolution may be mapped to 16 physical tiles. For each IFM pass, one IFM slice may be read (from the SRAM bank set) and broadcast to 16 physical tiles, which output 128 OFM channels (to 8 SRAM bank sets). In this example, it takes four IFM passes (and four OFM steps) to finish the OFM computation.

Referring to FIG. 3GC, in some embodiments, in a first step, IFM[0 . . 15] may be fed in to compute the convolution for OFM[0 . . 127] at OFM location (x, y), but the OFM result may be kept in the accumulators, instead of writing it out to SRAM. Referring to FIG. 3GD, in a second step, each multiplier unit weight register file 127 may then switch to the second set of 3×3 weights and feed in IFM[16 . . 31] to finish computing OFM[0 . . 127]. This process may be referred to as "IFM weight cycling". Then, in a third step, OFM[0 . . 127] may be saved to SRAM, and the accumulators may be cleared. These three steps may be repeated until the calculation is complete.

Referring to FIG. 3GA, in some embodiments, logical tiles may be defined as physical tiles storing multiple sets of weights. It may be seen that in the present example (the seventh example) two sets of 16 such logical tiles (interleaved in time) (i.e., 32 logical tiles) are formed by storing two 3×3 sets of weights. In the seventh example the 32 logical tiles can physically calculate more (e.g., a wider) OFM in each IFM pass, so that the number of IFM passes (and SRAM IFM read energy) is reduced by a factor of two compared to the sixth example.

In an eighth example, illustrated in FIGS. 3HA-3HC, a 3×3×512×256 convolution is first calculated, using sixteen physical tiles. Note that the number of IFM and OFM channels (512 and 256 respectively) in this example are both fairly large. As discussed in further detail below, partial results, or "partials" may be used when a convolution kernel is too large to be calculated otherwise. However, this example illustrates how convolution with a large weight kernel can still be performed without the use of partials. A 3×3×512×256 convolution may be calculated as shown in FIG. 3HB. For a 3×3 8-bit convolution 2 sets of 3×3 8-bit weights may be stored into each multiplier unit, so that there are (2 sets of weights)*(16 physical tiles)=32 logical tiles. 32 logical tiles can reduce 32 IFM slices, so that the maximum number of IFM channels that may be processed without using partials is (32 slices)*(16 IFM channels per slice)=512 IFM channels. As such, it is possible to compute a 3×3×512×N convolution, where N is any positive integer, without using partials.

Referring to FIGS. 3HB and 3HC, 256 IFM channels per clock may be reduced using tile adder trees combined with reduction fabric. In order to reduce all 512 IFM channels (and generate 8 OFM channels) let us perform two weight cycles. In weight cycle 1, as illustrated in FIG. 3HB, IFM [0 . . . 15] may be fed to tile 1, IFM [16 . . 31] may be fed to tile 2, and so forth, and IFM [240 . . 255] may be fed to tile 16. The hardware trees may be joined over all 16 tiles (per each column) using hardware adder stages provided by the reduction fabric. The adder tree root may end at tile 16 (as discussed in further detail later, in the context of the reduction fabric, OFM delivery fabric and adder tree), so that only tile 16 generates a result, while accumulators of tiles 1 . . . 15 are not used in this configuration. In weight cycle 2, illustrated in FIG. 3HC, IFM [256 . . . 271] may be fed to tile 1, IFM [272 . . . 287] may be fed to tile 2, and so forth, and IFM [496 . . . 511] may be fed to tile 16. Tile 16 may then write the finished OFM[0 . . 7](x, y) result to SRAM bank 16. Finally, 32 IFM passes (32 OFM steps) may be performed to compute OFM[0 . . . 7], then OFM[8 . . 15], and so forth, through OFM[248 . . 255]. Note while the IFM pass and OFM step numbers are identical in this particular example, the difference between IFM pass and OFM step will become clearer in later examples.

FIG. 3HD additionally illustrates how 3×3×512×256 convolution shown in FIGS. 3HA-3HC can be altered into 3×3×512×512 convolution simply by performing 64 IFM passes (64 OFM steps) instead of 32 IFM passes (32 OFM steps).

In a ninth example, illustrated in FIGS. 3IA-3IF, a 3×3×512×256 convolution is calculated using sixteen tiles and using partial results. In some cases, using partials may make energy savings possible, by reducing the number of SRAM reads (compared to, e.g., the eighth example). When using partials, the mapping algorithm can partition the weight tensor in several parts, in particular depth channel-wise, converting a single convolution operation (including loading weight tensor, traversing IFM, writing OFM) into two or more. Outputs of these two or more resulting convolutions later become combined to produce final result.

At first, let us recall FIGS. 3HB-3HC illustrating 3×3×512×256 convolution calculated without partials. FIGS. 3IA-3IB and 3IC-3ID illustrate hardware resource mappings associated after the weight tensor (and the corresponding IFM and OFM) 512 IFM channels partitioned into 256 and 256, corresponding to two separate convolutions, each of size 3×3×256×256.

FIGS. 3IA-3IB illustrate the first of the two 3×3×256×256 convolutions. Since the weight kernel planar size is 3×3=9, each MU weight register file capable of holding 18 8-bit weights has enough capacity to store two sets of 3×3 weights, thus making 32 logical tiles available for computation.

Eight IFM slices may then be loaded. Each IFM slice may then be broadcast to 2 physical tiles. Sixteen OFM steps (16 IFM passes) may be performed. During the first weight cycle, as illustrated in FIG. 3IA, 3×3 IFM [0 . . 127] may be fed in, convolved with the first set of 3×3 weights, reduced using adder trees and accumulated in accumulator registers of tiles 8 and 16. Referring to FIG. 3IB, during the second weight cycle, 3×3 IFM [128 . . 255] may be fed in, convolved with the second set of 3×3 weights, reduced using adder trees and further accumulated in accumulator registers in tiles 8 and 16. At this point the convolution of 3×3 IFM [0 . . 255] with a corresponding 3×3×256×16 weight kernel is completed for OFM channels 0 . . . 15 and can be written to virtual SRAM bank sets 8 and 9 as a partial result. Since this is a partial result, as opposed to finished result, accumulator 130 values bypass the activation function module 197 on their way to SRAM. Optionally, in order to reduce SRAM size requirement and power consumption, the bit range select module 187 may reduce partial results bit width by rounding, e.g. down to 4 bytes when using 8-bit activations and weight or down to 6 bytes when using 16-bit activations and weights.

The steps above are repeated until the entire IFM[0 . . . 255] has been processed, i.e. for all desired planar (x, y) locations, corresponding in one pass over IFM[0 . . . 255] and resulting in the corresponding set of partial results computed for OFM[0 . . . 15]. Partial results for the remaining OFM channels [16 . . . 255] are computed by performing 15 more passes over IFM[0 . . . 255] (corresponding to 15 more OFM steps).

Note that in this mapping example, the use of two partials passes allows to widen (extend) the OFM that is physically and concurrently generated, in one pass, by a factor of two (from one OFM slice to two). Also, the size of the IFM tensor processed during each partials pass is shortened by a factor of two, from H×W×512 to H×W×256.

The second partials IFM pass may be same as the first, except IFM [256 . . 383] may be fed during the first weight cycle, and IFM [384 . . 511] may be fed during the second weight cycle, as illustrated in FIGS. 3IC and 3ID respectively.

Completing the original 3×3×512×256 convolution requires adding partial results (from the two 3×3×256×256 convolutions, element-wise) and applying scaling, bias and activation function, similar to ARU. There may be several ways to accomplish this final step, including (i) reading partial results generated by the first partial convolution, transmitting the partials over the IFM delivery fabric to tile ARUs, to be summed with the second set of partial results, element-wise, such that ARUs will generate final results during the second partial convolution; (ii) having ARUs output partial results during both partial convolutions, while having additional logic in SRAM bank sets performing read-modify-write to add partials and apply the activation function. More specifically, the additional logic to finalize partials would be receiving partial results during the second partial convolution, read from SRAM results of the first partial convolution, sum these results and apply the activation function on-the-fly and write the final result back to SRAM; (iii) have the additional logic in SRAM bank sets capable of read-add-write operation for partials in order to continue adding partial results from two or more partial operations, element-wise, without applying the activation function, followed by reading and sending partial results to tile ARUs to be finalized during the last partial operation round.

Unlike cases in which partials are not used, when partials are used, the OFM height and width may need to be taken into account when arranging a convolution operation. Referring to FIG. 3IE, four bytes may be used to store each partial result (assuming both IFM and OFM are 8-bit). In this case the SRAM storage size for partial results equals to (OFM height)*(OFM width)*(OFM depth)*(4 bytes). If SRAM (on-chip) storage capacity is insufficient for partial results, the OFM may be split into sub-windows and processed one at a time, as shown. However, every time a sub-window is processed, it may be necessary to load (or re-load) an entire set of kernel weights, which may increase energy consumption. For example, let us assume that the OFM planar size is set to 10×10, and the IFM planar size is set to be equal to the OFM planar size. The kernel weight size in this case is relatively large, at 3*3*512*256=1.2 Mbytes. The SRAM size to store the entire partial result (for the whole IFM planar size, without sub-dividing it into planar sub-windows) is 10*10*256*4=102,400 bytes. For the sake of simplicity let us further assume SRAM having plenty of capacity, such that the use of sub-windows is not necessary.

FIG. 3IF summarizes the process of calculating the convolution in this example, whereby a first set of partials for IFM[0 . . 255] and all OFM partials [0 . . 255] is calculated and saved, a second set of partials for IFM[0 . . 255] and all OFM[0 . . 255] is calculated (but not written to SRAM since this is the last partials round), and the partials are added element-wise and an activation function is applied on-the-fly and written to SRAM as the second partial convolution is being calculated.

As mentioned earlier, the use of MR tiles for the adding of the partials element-wise and the application of the activation function is optional. Instead, Auxiliary Planar and Activation Processing (APAP) units dedicated for element-wise and planar (no reduction across channels) operations may be used. These units may be located inside SRAM bank sets, having access to those partials stored locally in SRAM as well as partials arriving to SRAM bank sets. The APAP units then write the finished results into SRAM.

A calculation performed according to this ninth example may save a significant amount of energy by performing two passes. Since the number of IFM passes was reduced from 32 to 16, the amount of IFM data read from is (IFM height)*(IFM width)*(IFM channels)*(IFM passes)= 10*10*512*(32−16)=819,200 bytes (ignoring caching), the amount of partials data written to SRAM is (OFM height)*(OFM width)*(OFM channels)*(number of partial convolutions−1)*(4 bytes)=10*10*256*(2−1)*4=102,400 bytes. In other words, twice this amount would be incurred if the second partials pass were to save the result to SRAM instead of directly feeding it to the planar/activation units. Further, the amount of partials data read from SRAM is (OFM height)*(OFM width)*(number of partial convolutions−1)* (4 bytes)=10*10*256*(2−1)*4=102,400 bytes. In other words, twice this amount would be incurred if the second partials pass were to save the result to SRAM instead of directly feeding it to the planar/activation units. As such, performing 3×3×512×256 (8-bit) convolution using partials vs. without partials in our example results in 819,000 fewer IFM bytes read from SRAM, while incurring additional 102,400 bytes to write partials to SRAM and another 102, 400 bytes to read partials from SRAM.

Assuming that the energy of one SRAM write is about double that of one SRAM read, the total saved SRAM energy equals to 819,000−2*102,400−102,400=511,800* (energy per SRAM read).

In a tenth example, illustrated in FIGS. 3JA-3JD, a 8×8×16×64 convolution is calculated, using four tiles. An 8×8 convolution has 8*8=64 weights, which may not fit into a single multiplier unit, which may store, for example, only 18 weights. The 64 weights may therefore be split among four tiles, as shown in FIG. 3JA, so that Tile 1 stores W[0 . . 1,0 . . 7,*,*], Tile 2 stores W[2 . . 3,0 . . 7,*,*], Tile 3 stores W[4 . . 5,0 . . 7,*,*], and Tile 4 stores W[6 . . 7,0 . . 7,*,*], where the weight kernel notation is W[row, column, IFM channel, OFM channel] and "*" refers to the entire applicable range. The system may then add (reduce) across tiles to calculate OFM[0 . . 7], such that, effectively, each tile performs a 2×8×16×64 convolution and four 2×8× 16×64 convolutions, performed concurrently using four tiles, become aggregated into one 8×8×16×64 convolution. Each 2×8×16×64 convolution further consists of two 1×8× 16×64 convolutions, combined together using IFM weight cycling.

FIG. 3JB illustrates the first step of the IFM weight cycling wherein even (not yet odd) rows within convolution window get convolved. Here tile 1 convolves convolution window's row 0 W[0,*,*,*] with IFM values "a0, b0, c0, d0, e0, f0, g0, h0", while tile 2 convolves convolution window's row 2 W[2,*,*,*] with IFM values "a2, b2, c2, d2, e2, f2, g2, h2", tile 3 convolves convolution window's row 4 W [4,*,*,*] with IFM values "a4, b4, c4, d4, e4, f4, g4, h4" and tile 4 convolves convolution window's row 6 W[2,*,*,*] with IFM values "a6, b6, c6, d6, e6, f6, g6, h6". Multiplier unit products are reduced using tile adder trees within tiles as well using addition adder tree stages provided by the reduction fabric, as well as accumulated (as IFM values "a*, b*, . . . h*" stream over IFM delivery fabric to the four tiles) in the accumulator register 130 of tile 4.

FIG. 3JC illustrates the second step of the IFM weight cycling wherein odd rows within convolution window get convolved. Here tile 1 convolves convolution window's row 1 W[1,*,*,*] with IFM values "a1, b1, c1, d1, e1, f1, g1, h1", while tile 2 convolves convolution window's row 3 W [3,*,*,*] with IFM values "a3, b3, c3, d3, e3, f3, g3, h3", tile 3 convolves convolution window's row 5 W[5,*,*,*] with IFM values "a5, b5, c5, d5, e5, f5, g5, h5" and tile 4 convolves convolution window's row 7 W[2,*,*,*] with IFM values "a7, b7, c7, d7, e7, f7, g7, h7". Similar to the first IFM weight cycling step, multiplier unit products are reduced using tile adder trees within tiles as well using addition adder tree stages provided by the reduction fabric, as well as accumulated (as IFM values "a*, b*, . . . h*" stream over IFM delivery fabric to the four tiles) in the accumulator register 130 of tile 4. However, unlike during the first IFM weight cycling step, the accumulator registers 130 are not cleared at the beginning of the second IFM weight cycle step, such that once both IFM weight cycling steps complete the accumulator registers 130 contains dot product for both even and odd rows.

The resulting OFM [0 . . . 7] may then be written to SRAM, completing the convolving of the 8×8×16×8 window for one OFM location. As illustrated in FIG. 3JD, to continue the calculation, the convolution window may then be translated to compute the next 8×8 convolution, and the process may be repeated until the entire OFM is complete.

In an eleventh example, illustrated in FIGS. 3KA and 3KB, an 8×8×64×64 convolution is calculated, using sixteen tiles. An 8×8 convolution may be applied to 16 tiles, and more IFM and OFM channels may be used. Splitting up an 8×8 convolution over four physical tiles causes the number of "logical" tiles to decrease by a factor of four, e.g., (16 physical tiles)/(4 physical tiles per operation)=4 logical tiles, as illustrated in FIG. 3KA. As used herein, a "physical grouping" of physical tiles is defined by connecting tile adder trees into a single adder tree (per column) to perform an operation that is too large for a single physical tile.

Referring to FIG. 3KA, because an 8×8 convolution may be too big to fit into a single tile, the 8×8 convolution may be split over four tiles. The four tiles may become physically grouped into one logical tile by connecting adder trees from the four tiles into a single adder tree. Referring to FIG. 3KB, mapping 8×8×64×64 to 16 physical tiles logically transforms to mapping 8×8×64×64 to 4 logical tiles, where each logical tile has 18*4=72 weights, enough to fit 8×8=64 convolution weights.

FIG. 3KB illustrates the mapping of the 8×8×64×64 convolution operation onto the 4 logical (and thus 16 physical) tiles. The transformed operation may be performed as follows. First, the four IFM slices may be read; all IFM channels may be read at once to avoid partials. Second, each IFM slice may be "broadcast" to one logical tile. Third, 8 OFMs (one OFM slice) may be computed in one IFM pass. This may be repeated, so that (64 OFMs)/(8 OFM per pass)=8 IFM passes (8 OFM steps) may be performed to compute all OFM channels.

In some circumstances more OFM channels may be needed, for example to calculate a 8×8×64×1024 convolution. This is possible, without using partials, by adding more OFM steps by means of performing more IFM passes to re-read IFM. In some circumstances more IFM channels may be needed, for example to calculate a 8×8×128×64 convolution. In such a case it may be necessary to use partials unless (i) the number of physical tiles is increased or (ii) the number of weights per multiplier is increased. However, in some applications large size convolutions like 8×8 may apply only to RGB images or images with few IFM channels. MU weights register file holding N weights can accommodate convolution kernel up to H*W<=N,where H and W refer to weight kernel's planar height and width. For example, MU with 18 8-bit weight capacity can hold convolution kernels including 4×4, 5×3, 3×5, 6×2, 2×6, 7×2, 2×7, 8×2, 2×8, 9×2, 2×9, 18×1 and 1×18. In practice the need to calculate an 8×8×128×64 convolution may be rare and therefore may be performed by CPU instead of the neural processor, thus making the associated neural processor additional hardware logic optional. For purposes of clarity IFM, OFM and reduction fabric illustrations will omit connections required cases of H*W>N, such as one described in this example.

In a twelfth example, illustrated in FIGS. 3LA-3LD, a 1×1×1024×64 convolution is calculated, using sixteen tiles. Each MU may have 18 weights. Since a 1×1 convolution requires only 1×1=1 weight, it may be possible to fit (18 weights per multiplier)/(1 weight per convolution window) =18 sets of 1×1 convolution weights into each tile. The number of logical tiles may be calculated to be (16 physical tiles)*(18 convolution weight sets per multiplier)=288 logical tiles. The calculation of a 1×1×1024×16 convolution using 16 physical tiles may be transformed to a calculation of a 1×1×1024×16 convolution using 288 logical tiles. All (1024) IFM channels may be read in one IFM pass, to avoid partials. With 288 logical tiles it may be possible to accept IFMs up to a size of (16 IFM channels per IFM slice)*(288 logical tiles)=4,608 channels. 1×1×1024×64 convolution requires only 1024 IFM channels, out of the 4,608 available without using partials. Therefore, the number of OFM slices that can be computed per IFM pass is floor((4,608 max IFM channels)/(1024 IFM channels))=4 OFM slices.

The calculation be performed as follows. First, 16 sets of 1×1 weights may be stored in each MU. During each OFM step (IFM pass), 64 slices (all 1024 IFM channels) may be read. Physically, this corresponds to reading (64 IFM slices)/ (16 sets of 1×1 weights per MU)=4 IFM slices at a time. Each of the four IFM slices may be broadcast to (16 physical tiles)/(4 IFM slices)=4 tiles, to compute 4 OFM slices in one OFM step (and one IFM pass). The OFMs may be computed using (8 OFM slices)/(broadcast over 4 tiles)=2 OFM steps (and 2 IFM passes). The IFM weights may be cycled 16 times.

Specifically, referring to FIG. 3LA, the calculation of the convolution may proceed along the following steps. In a first step, the accumulators are cleared. In a second step, IFM[0 . . 15], IFM[16 . . 31], IFM[32 . . 47] and IFM[48 . . 63] are fetched and broadcast respectively to tiles 1, 5, 9, and 13, tiles 2, 6, 10, and 14, tiles 3, 7, 11, and 15 and tiles 4, 8, 12, and 16. In a third step, the system accumulates the dot product calculated by tiles 1 . . 4 to OFM[0 . . 7], tiles 5 . . 8 to OFM[8 . . 15], tiles 9 . . 12 to OFM[16 . . 23], and tiles 13 . . 16 to OFM[24 . . 31] as intermediate (unfinished) results in accumulator registers of tiles 4, 8, 12 and 16 respectively.

Referring to FIG. 3LB, in a fourth step, the accumulators are not cleared, and the MUs are switched to use the next set of 1×1 weights, corresponding to a step in IFM weight cycling. In an fifth step, IFM[64 . . 79], IFM[80 . . 95], IFM[96 . . 111] and IFM[112 . . 127] are fetched and respectively broadcast to tiles 1, 5, 9, and 13, tiles 2, 6, 10, and 14, tiles 3, 7, 11, and 15 and tiles 4, 8, 12, and 16. In a twelfth step, the system accumulates the dot product calculated by tiles 1 . . 4 to OFM[0 . . 7], tiles 5 . . 8 to OFM[8 . . 15], tiles 9 . . 12 to OFM[16 . . 23], and tiles 13 . . 16 to OFM[24 . . 31] as intermediate (unfinished) results in accumulator registers of tiles 4, 8, 12 and 16 respectively.

Referring to FIG. 3LC, the calculation may proceed, continuing to cycle IFM weights (for a total of 16 IFM weight cycling steps), fetch and broadcast IFMs, calculate and accumulate dot product until reaching last IFM slices (channels 960 through 1023). At this step, the accumulators are not cleared, and the MUs are switched to the next (last $16^{th}$) set of 1×1 weights, corresponding to the last step in IFM weight cycling. In the next step, IFM[960 . . 975], IFM[976 . . 991], IFM[992 . . 1007] and IFM[1008 . . 1023] are fetched and broadcast respectively to tiles 1, 5, 9, and 13, tiles 2, 6, 10, and 14, tiles 3, 7, 11, and 15 and tiles 4, 8, 12, and 16. In the next step the system accumulates the dot product computed by tiles 1 . . 4 to OFM[0 . . 7], tiles 5 . . 8 to OFM[8 . . 15], tiles 9 . . 12 to OFM[16 . . 23], and tiles 13 . . 16 to OFM[24 . . 31] to obtain finished dot product results, in accumulator registers of tiles 4, 8, 12 and 16 respectively. In the next step activation is applied to the dot product results accumulated in accumulator registers of tiles 4, 8, 12 and 16 and the four resulting OFM slices are written to SRAM. This completes the calculation of OFM[0 . . 31].

Referring to FIG. 3LD, the system then proceeds to the next OFM step (by means of performing another IFM pass), and repeats the computation, this time for OFM[32 . . 63]. The system loads slice of weights for next OFM step: W[0,0,0 . . 1023,32 . . 63]. Weight loading may take place concurrently with computation using vertical weight loading buses 101 as shown in FIGS. 1K and 1N, in which case there is no additional delay incurred by the weight loading process. The system may clear the accumulators, and switch the MUs to the first set of 1×1 weights. The system may then repeat the operations as described in the context of FIGS. 3LA-3LC to calculate OFM[32 . . 63].

As shown in FIG. 3LD (similar to the case of FIG. 3LC), once the system have gone through 15 of 16 IFM weight cycles, has fetched corresponding IFM slices, calculated and accumulated intermediate dot product results, the system reaches the last ($16^{th}$) round of IFM weight cycling. In this round the accumulators are not cleared, and the MUs are switched to the next (last $16^{th}$) set of 1×1 weights (last, $16^{th}$ IFM weight cycling step). The system fetches IFM[960 . .

975], IFM[976 . . 991], IFM[992 . . 1007] and IFM [1008 . . 1023] and broadcasts respectively to tiles 1, 5, 9, and 13, tiles 2, 6, 10, and 14, tiles 3, 7, 11, and 15 and tiles 4, 8, 12, and 16. Next, the system accumulates the dot product calculated by tiles 1 . . 4 to OFM[32 . . 39], the dot product computed by tiles 5 . . 8 to OFM[40 . . 47], tiles 9 . . 12 to OFM[48 . . 55], and tiles 13 . . 16 to OFM[56 . . 63]. At the end of this process, the system applies activation functions 197 (in tiles 4, 8, 12 and 16) to the finished dot product, stored in accumulators 130 (in tiles 4, 8, 12 and 16), and writes the final OFM[32 . . 63] result to SRAM to complete the convolution operation.

Let us now consider fully-connected (FC) layer computation (as opposed to convolution). Let us first consider a trivial case of 16×8 FC computation using a single tile and single IFM sample. Note that FC layer calculation is similar to 1×1 convolution (described in the previous example), except weights have to be discarded after getting multiplied with IFM. A single 16×8 FC computation can be accomplished by loading 1 weight into each MU, fetching a single IFM[0 . . . 15] slice, calculating the dot product using tile's adder trees, applying activation function to the resulting dot product and writing the finished OFM[0 . . . 7] result to SRAM.

Consider a case of calculating 16×16 FC by a single tile and single IFM sample. A single 16×16 FC computation can be accomplished by loading 2 weights into each MU, fetching a single IFM[0 . . . 15], having MU select the first of the two pre-loaded weights for multiplication, computing OFM[0 . . . 7] as described above, having MU select the second of the two pre-loaded weights for multiplication and computing OFM[8 . . 15]. This process of cycling through MU weights in order to compute multiple OFM from same IFM is called "OFM weight cycling".

Note that the 16×16 FC computation was accomplished using one IFM pass, but two OFM steps (corresponding to two OFM weight cycles). Therefore, as observed in most other examples, the number of OFM steps typically equals the number of IFM passes unless OFM weight cycling is used.

Consider another simple case of calculating 16×128 FC using a single tile and a single IFM sample. This can be accomplished by loading 16 weights into each MU, fetching the single IFM slice, performing 16 OFM steps by means of OFM weight cycling, i.e. by cycling via MU weights to compute OFM[0 . . . 7], OFM[8 . . 15], OFM[120 . . 127] one after another.

Consider a simple case of calculating 16×8 FC using a single tile for a batch of 18 IFM samples (i.e. IFM tensor shape can be expressed as 1×16×18). As a side note, since the disclosed neural processor performs inference (not training), mapping examples have implicitly assumed the IFM batch size of one, as is typical for inferencing applications. Computations with IFM batch size larger than one can also be mapped onto hardware. For example, computations can be repeated as already-described for each sample in the IFM batch. However, 16×8 FC single-tile computation on a batch of 18 IFM samples can utilize MU weight register file capacity to pre-load 18 weights into each MU, one weight for each IFM sample. Subsequently, the calculation can be accomplished by fetching the first (from the batch of 18) IFM[0 . . 15][0] sample, computing a dot product of the fetched IFM sample with the first of the 18 weights in each MU, applying the activation function and writing the resulting OFM[0 . . 7][0] to SRAM. Next, IFM[0 . . 15][1] sample is fetched and multiplied with the second of the 18 weights in each MU to obtain OFM[0 . . 7][1] after activation function application. This sequence of steps continues until the entire batch of IFM[0 . . 15][0 . . 17] samples (18 total) has been processed, resulting in a batch of OFM[0 . . 7] [0 . . 17] samples. Let us refer to cycling over MU weights in order to process a batch of IFM samples as "IFM batch cycling". Note that IFM weight cycling, OFM cycling and IFM batch cycling can be combined to perform computations as long as MU weight register file capacity is sufficient.

In a thirteenth example, illustrated in FIGS. 3MA and 3MB, a 288×8 fully connected calculation is performed using a single tile. Referring to FIG. 3MA, as mentioned previously, a fully connected computation is similar to 1×1 convolution, where the convolution window is not translated and weights are not reused and must be discarded after single use. One tile may compute 8 OFM channels in parallel (i.e. 1 OFM slice). 288 IFM channels may correspond to 288/(16 rows per MR tile)=18 slices. The system may use 18 weights in each MU to store all 18 slices of FC weights.

To perform the fully connected calculation, the system may execute the following steps (which may be performed, to some extent, concurrently, i.e., they may overlap in time). In a first step, the weights may be loaded from SRAM. The weights may be loaded concurrently with computation using, for example, vertical weight loading buses 101 as illustrated in FIGS. 1K and 1N. As such, the system may ensure that the FC weights are placed into SRAM. In a second step, the accumulators for OFM[0 . . 7] may be cleared. In a third step, one sample of IFM[0 . . 15] may be fed into the tile, and the result may be added into the OFM[0 . . 7] accumulators 130 to form intermediate (unfinished) result.

In a fourth step, the OFM[0 . . 7] accumulators may be left un-cleared, and the system may switch to the next set of FC weights (cycle IFM weights). In a fifth step, IFM[16 . . 31] may be fed into the tile, and the result may be added into the OFM[0 . . 7] accumulators. Referring to FIG. 3MB, these steps may be repeated until all IFM channels (and associated weights) have been cycled through, with IFM[280 . . 287] being the last slice. Finally, the activation function may be applied to the accumulated dot product and the final OFM[0 . . 7] result may be written to SRAM. This completes the fully connected computation.

In a fourteenth example, illustrated in FIG. 3NA, a 288×64 fully connected calculation is performed. In this example the OFM channel count is increased from 8 (in the thirteenth example) to 64. This is equivalent to the thirteenth example, if the system splits the FC 288×64 calculation into 8 smaller FC calculations of size 288×8 and performs them one by one (e.g., in 8 OFM steps). This results in 8 IFM passes.

In a fifteenth example, illustrated in FIGS. 3OA-3OC, a 1024×32 fully connected calculation is performed on a single IFM sample (i.e. batch size of 1). Referring to FIG. 3OA, since FC is similar to a 1×1 convolution, there may be (18 weights per MU)*(16 physical tiles)=up to 288 logical tiles each performing a 1×1 convolution. As such, the system may read all 1024 IFM channels (1024/16=32 IFM slices) in a single round to avoid partials.

To read all 32 IFM slices, 32 logical tiles may be used. The calculation may involve computing 32 OFMs (4 OFM slices). To do this in one pass (compute all OFMs at once), (32 IFM slices)*(4 OFM slices)=128 logical tiles may be used. As such, the available number of logical tiles (288) is sufficient. The number of logical tiles may be decreased to the needed 128 by storing 8 weights in each MU (instead of storing up to 18 weights per MU).

The calculation may proceed as follows. The system may store 8 sets of IFM FC weights per MU, and use 128 logical tiles (as mentioned above). The entire calculation may be completed in a single IFM pass by computing four OFM slices. Each of the four IFM slices may be fetched, and broadcast to the four tiles. The weights may be cycled eight times, because there are 8 IFM weight sets stored in each MU. The sequence may include the following steps. In a first step, the OFM accumulators may be cleared. In a second step, IFM[0 . . 63] (4 IFM slices) may be fetched and each slice may be broadcast to the four tiles. In a third step, not-yet-finished OFM[0 . . 31] (4 OFM slices) may be computed and added to the OFM accumulators.

Referring to FIG. 3OB, in a fourth step, the OFM accumulators may be left uncleared, and the next set of weights may be used. In a fifth step, IFM[64 . . 127] (4 IFM slices) may be fetched. In a sixth step, the system may continue computing (not-yet-finished) OFM[0 . . 31] (4 OFM slices) by adding sum-of-products to the OFM accumulators. Referring to FIG. 3OC, the system may continue cycling weights and accumulating OFM results until all of the IFM has been processed. As a last step, the system may fetch IFM[960 . . 1023] and accumulate into OFM[0 . . 31], then apply the activation function to the accumulated OFM[0 . . 31] and write the result to SRAM.

In a sixteenth example, illustrated in FIGS. 3PA-3PC, a 4096×1024 fully connected calculation is performed, using sixteen tiles and batch size of 1. This calculation may use (4096/16 IFM channels per tile)=256 IFM slices, and (1024/8 OFM channels per tile)=128 OFM slices. As in some of the other examples discussed above, it may be advantageous to read the entire IFM to avoid partials. Up to (18 weights per MU)*(16 physical tiles)=288 logical tiles may be available for use in performing the calculation. To read the entire IFM, 256 logical tiles may be used. As such, the available number of logical tiles (288) is sufficient. The system may be configured to use 256 logical tiles by loading 16 sets of weights into each MU. To read 256 IFM slices in one round (without partials), all 256 logical tiles may be used. Accordingly, (256 logical tiles/256 IFM slices)=1 OFM slice will be generated per IFM pass, and, to complete the calculation, (128 OFM slices)/(1 OFM slice per IFM pass)=128 OFM steps (and thus 128 IFM passes) will be performed.

The physical configuration is shown in FIG. 3PA. The reduction fabric may be configured to reduce outputs of all 16 tiles into a single OFM slice. Sixteen IFM slices (from 16 virtual SRAM banks) will be fetched, and each "broadcast" to only one tile.

The calculation may be performed in several steps, as follows. In a first step, the OFM[0 . . 7] accumulators are cleared. In a second step, 16 IFM slices (IFM[0 . . 255]) are fetched, and reduced into OFM[0 . . 7] accumulators as intermediate (unfinished) results.

In a third step, the OFM[0 . . 7] accumulators are left un-cleared, and the system switches to the next IFM weight set in the MUs. In a fourth step, the next 16 IFM slices (IFM[256 . . 511]) are fetched, reduced and added to the OFM[0 . . 7] accumulators. These steps may be continued until all of the IFM (up to and including IFM[4080 . . 4095]) has been processed, as illustrated in FIG. 3PB. The activation function may be applied to the accumulated dot products (in tile 16)] and the final result may be written to SRAM. This completes the calculation of OFM[0 . . 7]. Referring to FIG. 3PC, to perform the next OFM step, the system may repeat the previous computation for OFM[8 . . 15], loading weights W[0 . . 4095,8 . . 15], and continue stepping the OFMs until all OFMs are computed, up to OFM[1016 . . 1023], to complete the entire FC computation.

There may be FC computation cases when IFM has more than (18 weights) * (16 IFM channels per IFM slice)*(16 physical tiles)=4,608 channels. In this case one may be forced to use partials by splitting IFM channels into portions (of size sufficient to map onto existing physical hardware), compute FC for each portion separately, keep adding up partial results (stored in SRAM) element-wise, as described previously, and finish the calculation by applying the activation function.

In case when weights are 16 bit, MU weight register file capacity becomes 9 (16-bit weights) instead of 18 (8-bit weights) and calculations can be performed using multi-cycling, as described earlier. Similar reasoning applies for larger weight bit length, e.g. 24-bit or 32-bit, where, for example, MU weight register file has enough capacity to hold 6 24-bit weights or hold 4 32-bit weights.

Optionally, besides mapping an operation to all available physical tiles a neural processor can be logically subdivide into several neural processors, each having a smaller number of tiles, For example a neural processor having 16 physical tiles can be logically viewed as two neural processors, each having half the original number of tiles, e.g. 8 tiles each, or four neural processors, each having one quarter of the original number of tiles, e.g. 4 tiles each and so on. Each neural processor resulting from such subdivision substantially same mapping principles as described above, given the number of physical tiles remaining after the division. Subdividing a neural processor into a plurality of smaller ones may be desirable for operations that require relatively few IFM reductions and relatively few OFM channels generated (more specifically a product thereof). For example, a 1×1×32×32 convolution mapping requires only 4 tiles. If mapped to 16 tiles, 1×1×32×32 convolution would result in 12 of 16 tiles being unused, thus considerably reducing multiplier utilization. In cases like this one, a neural processor having 16 physical tiles can be subdivided into four neural processors, each having 4 tiles, mapping 1×1×32×32 convolution onto each of the four resulting neural processors, subdividing the IFM tensor, e.g. of size H×W×32, into four non-overlapping IFM tensors of size (H/2×W/2×32), assigning one such quarter-size IFM tensor to one of the four smaller neural processors and thus computing the convolution on all four IFM sub-tensors in parallel. Note that such small weight tensor sizes may be relatively uncommon and an operation mode like this requires appropriate support by the IFM, OFM and reduction fabrics.

The various mappings of neural network layer operations onto available hardware require support from IFM delivery fabric 104, OFM delivery fabric 106 and reduction fabric 111. FIG. 4AA shows a physical layout sketch of a neural processor having 16 hardware tiles 102 and 16 SRAM bank sets 109. In one embodiment, SRAM bank sets 109 memory may be placed in a distributed fashion, where each SRAM bank set 109 is adjacent (local) to exactly one tile 102 forming a tile-and-SRAM-bank-set unit 401. This allows streaming IFM and OFM data between every tile and its local SRAM in a highly parallel fashion, i.e. have up 16 IFM and/or streams run in parallel, in order to avoid a bandwidth bottleneck between SRAM and computing tiles that might exist if SRAM is aggregated into larger storage arrays and placed further away from tiles (i.e. when memory is not distributed).

FIGS. 4AB and 4AC illustrate connections between a tile 102 and its local SRAM bank set 109, as well as the contents of SRAM bank set 109. Each SRAM bank set 109 may have four SRAM banks B0, B1, B2, B3 in order to provide sufficient bandwidth for concurrent read-write operations to serve IFM, OFM delivery fabrics, CPU access over AXI port (not shown), reading and writing partial results, and weight loading. FIG. 4AB illustrates a path between banks B0, B1, B2, B3 to IFM delivery fabric 104 via multiplexer 403. This path can deliver up to two IFM slices per computation clock in order to supply enough IFM data to tiles capable of activation zero skip. IFM delivery fabric 104 connects to tile 102 to bring in IFM data from the local SRAM bank set as well as the other 15 SRAM bank sets. Each SRAM bank set 109 also supplies weights directly to its local tile 102, specifically to the weight decompression unit 138 inside the local tile 139. In order to make weight loading fast, all four SRAM banks B0 through B3 can fetch and feed weights to WDU 139 in parallel. Loading weights to tiles as fast as possible is particularly important during fully-connected layer computation since, unlike in a convolution, FC weights must be discarded after each multiplication.

The plurality of MU weight register files in each MR tile 102 can accept a weight kernel of size 18*16*8=2,304 bytes=144 words, where each word has 128 bits. For example, if the total SRAM capacity available to the neural processor is 2M bytes, each SRAM bank set has (2M bytes)/(16 SRAM bank sets)=128K bytes. Also, if each SRAM bank set contains 4 SRAM banks, each SRAM bank size is (SRAM bank set size)/(SRAM banks per SRAM bank set)=128K/4=32K bytes. Therefore, each of the four local SRAM banks may store 144/4=36 words (of 2048 available).

FIG. 4AC illustrates local OFM connections between a tile and its local SRAM bank set. Tile 102 outputs finished or partial results to OFM delivery fabric, which transports that data to the local SRAM bank set as well as other SRAM bank sets elsewhere and makes that data available to SRAM banks B0 through B3 via a de-multiplexer 405.

The following several paragraphs discuss the IFM and OFM data delivery fabrics. IFM delivery fabric forms connections and transports data from SRAM bank sets 109 to tiles 102, while OFM delivery fabric forms connections and transports data from tiles 102 back to SRAM bank sets 109.

Considering the task of bringing IFM from SRAM bank sets to tiles an OFM from tiles back to SRAM it may appear that connections between SRAM bank sets to tiles must be all-to-all and connections between tiles and SRAM bank sets must be all-to-all as well. Having all-to-all connections may require using cross-bar switches (e.g. 16-to-16), which can consume a prohibitively large silicon area in case like this and are thus highly undesirable. More specifically, the area of a full cross-bar switch is proportional to O(NM), where N is the number of switch inputs and M is the number of switch outputs. In our case N=M=T=16, where T is the number of physical tiles, thus making $O(NM)=O(T^2)$ which is quadratic in the number of tiles, making increasing (scaling up) the number of tiles (e.g. from 32 to 32 or 64) particularly costly with respect to silicon area.

However, as discussed below in detail, all-to-all connections between tiles and SRAM bank sets are not required. In order to reduce the size and complexity of communication fabric, some embodiments aim to store OFMs locally to where OFMs will be produced (by each of the physical tiles) by partitioning SRAM into non-overlapping storage. IFM data is still delivered to each tile from various SRAM bank sets, however IFM delivery fabric configuration can be reduced to 5 essential patterns corresponding to the 5 main patterns of reduction between tiles. Note that, instead of storing OFMs locally and fetching IFM in a distributed (global) fashion it is also possible to construct IFM and OFM delivery fabrics to fetch IFM locally while writing OFM results in a distributed (global) fashion.

In general, a convolution or fully-connected layer computation may be decomposed into one these five configurations with respect to inter-tile reduction: (1) feed one IFM slice by broadcasting it to all 16 tiles which altogether produce 16 OFM slices as shown in FIG. 4AD, (2) feed two IFM slices in parallel, by broadcasting each of the two IFM slices to 8 tiles, as shown in FIG. 4AE, (3) feed 4 IFM slices in parallel, by broadcasting each of the four IFM slices to 4 tiles, as shown in FIG. 4AG, (4) feed 8 IFM slices in parallel, by broadcasting each of the four IFM slices to 2 tiles, as shown in FIG. 4AJ, (4) feed 16 IFM slices in parallel, by broadcasting each of the 16 IFM slices to 1 tile, as shown in FIG. 4AL.

Let us refer to case (2) as "broadcast 8 reduce 2" case since each IFM slice is broadcast to 8 tiles and output of 2 tiles is reduced (by reduction fabric 111) in order to obtain finished (or partial) result. Similarly, let us refer to case (3) as "broadcast 4 reduce 4" case since each IFM slice is broadcast to 4 tiles and output of 4 tiles is reduced, to case (4) as "broadcast 2 reduce 8" case since each IFM slice is broadcast to 2 tiles and output of 8 tiles is reduced, to case (5) as "broadcast 1 reduce 16" case since each IFM slice is broadcast to only one tile (i.e. no broadcast) and output of all 16 tiles is reduced, and to case (1) as "broadcast 16 reduce 1" case since the IFM slice is broadcast to 16 tiles and output of 1 tile is reduced (i.e. no reduction).

Let us consider the five inter-tile reduction configuration in more detail and exactly what connectivity patterns IFM and OFM delivery fabrics have to support in each of the five reduction configuration cases. For additional clarity, let us refer to "inter-tile" reduction to designate reduction of tile outputs (using a reconfigurable adder tree provided by the reduction fabric 111) as opposed to "intra-tile" reduction to designate reduction of multiplier unit products using adder trees 128A, 128B inside tiles.

The following notation may be used to identify the cases for which the interconnect fabric may be put to use. The notation Bm-Rn- refers to a case in which each IFM slice is broadcast to m tiles and output of n tiles is reduced (by the inter-tile reduction fabric 111) in order to obtain a result. With 16 physical tiles available, the five inter-tile reduction cases include B16-R1, shown in FIG. 4AD, B8-R2, shown in FIG. 4AF, B4-R4, shown in FIG. 4AH, B2-R8 shown in FIG. 4AK and B1-R16 shown in FIG. 4AM.

The maximum number of inter-tile reduction cases equals to LOG2(N), where N is the number of physical tiles in neural processor. Inter-tile reduction configurations available in a neural processor with N tiles are constructed starting from configuration BN-R1 (m=N and n=1) followed by dividing m by two and multiplying n by two for each next configuration until m reaches 1. For example, if a neural processor has only 8 tiles, there may be four inter-tile configurations available, including B8-R1, B4-R2, B2-R4 and B1-R8. A neural processor having 32 tiles can provide up to six inter-tile configurations including B32-R1, B16-R2, B8-R4, B4-R8, B2-R16 and B1-R32.

Since computation can produce final results (e.g. with activation function applied) as well as partial results, each inter-tile configuration may have two cases to consider with respect to OFM delivery path. Let us refer to the case of producing final results as Bm-Rn-F and to the case of producing partial results as Bm-Rn-P.

FIGS. 4AE, 4AG, 4AJ, 4AL and 4AN additionally illustrate tile outputs getting added together by reduction fabric

111 in each of the five reduction configurations. For example, FIG. 4AL shows B2-R8 configuration with outputs of 8 tiles T0, T8, T4, T10, T2, T14 and T6 summed up by one adder tree (the left adder tree in FIG. 4AK), while output of 8 tiles T7, T15, T3, T11, T13, T5, T9 and T1 is summed up by another adder tree (the right adder tree in FIG. 4AK).

Note that the configurable adder tree of reduction fabric 111 is designed to add outputs of tiles that are adjacent to each other, as opposed to adding outputs of tiles spread around away from each other, thus making the reduction fabric's configurable adder tree wiring compact and the tree itself "distributed". Note also that, unlike in previous examples, the 16 tiles here are identified as T0 through 15 and ordering of tile identifiers has changed (compared to notation used in mapping examples) in order to simplify notation in examples below.

Let us examine each inter-tile reduction configuration one by one in detail. A first example case includes B16-R1 operations. Following the store-OFM-as-locally-as-possible while fetching IFM globally (from any SRAM bank set) principle, in this configuration the input IFM may stream from any SRAM bank set S0 . . S15. As illustrated in FIG. 4BA, SRAM bank set S10 furnishes a stream of IFM slices to all 16 tiles T0 through T15 over IFM delivery fabric 104 (broadcasts one IFM slice to all 16 tiles as illustrated in FIG. 4AD). When one SRAM bank set (e.g. S10), for example, runs out of IFM data another SRAM bank set (e.g. S11) can become the data source and continue streaming IFM data to tiles. These steps can continue until the entire IFM tensor has been streamed in. In a case when multiple IFM passes are required, the IFM tensor streaming sequence can repeat as necessary.

In B16-R1 configuration there is no inter-tile reduction, such that the adder unit of each tile accumulates only the result of that tile, and the OFM finished or partial result will be written to a nearby SRAM bank set as described below. Hence, each of 16 tiles in B16-R1 generates a stream of OFM slices when results are final or a stream of partial results. Specifically, in the partials case each value can be up to 32-bit-wide when working with 8-bit IFM and OFM or 48-bit-wide assuming 16-bit IFM and OFM, and each partial result will be stored locally as illustrated by arrows 106 in FIG. 4BB. In this case each SRAM bank set acts as a destination to store partial results. Moreover, each SRAM bank set 109 receives data from its local tile, e.g. SRAM bank set S8 receives data from tile T8, S0 receives data from T0 and so on. Since each SRAM bank set 109 has 4 SRAM banks 108 each SRAM bank set 109 can generally store 16 4-byte partial results per clock. However, the current source SRAM bank set must concurrently fetch IFM, while also writing partial results, which may exceed SRAM bank set's available total bandwidth in some cases. IFM cache 139 may be helpful in cases like this to reduce IFM reads from the source SRAM bank set when convolution planar kernel size is larger than 1×1. Also, operations using IFM weight cycling and/or convolution planar kernel size being larger than 1×1 generate output once in several clocks (as opposed one result per every clock), thus reducing requirement for OFM bandwidth and avoiding SRAM access bottlenecks.

When generating final results, each final value will be quantized to 8-bit (or 16-bit, etc.) and the values may be written to SRAM bank sets [S0 . . S7] or [S8 . . S15]. FIGS. 4BC and 4BD illustrate OFM delivery fabric connection and configuration choices. Since OFM slice width is half the IFM slice width (8 depth channels vs. 16), outputs of two vertically-adjacent tiles ("tile column") can be sent over short, local connections to the upper SRAM bank set or to the lower SRAM bank set. Each SRAM bank set is capable of handling slices having 16 channels (due to IFM slice having 16 channels), therefore each SRAM bank set can also accept two OFM slices. For example, outputs of tiles T0 and T8, which together comprise a tile column, can be grouped together and sent over local short connections 106 to either SRAM bank set S8, located immediately below T8 as illustrated in FIG. 4BC, or S0, located immediately below T0 as illustrated in FIG. 4BD. Similarly, tile column T4 T12 outputs can be grouped and sent locally to S4 or S12, tile column T10 T2 outputs to S10 or S2, tile column T14 T6 outputs to S14 or S6, tile column T7 T15 outputs to S7 or S15, tile column T3 T11 outputs to S3 or S11, tile column T13 T5 outputs to S13 or S5 and tile column T19 T1 outputs to S9 or S1.

A second example case illustrates B8-R2 operations. As shown in FIG. 4CA, one IFM slice is supplied from upper SRAM bank sets 109, where "upper" is defined to include S0, S4, S10, S14, S7, S3, S13 and S9, and one IFM slice is supplied from lower SRAM bank sets 109, where "lower" is defined to include S8, S12, S2, S6, S15, S11, S5 and S1. More specifically, any of the upper SRAM bank sets 109 can act as a source sending (broadcasting) an IFM slice to all upper tiles T0, T4, T10, T7, T3, T13 and T9. For example, IFM delivery fabric can be configured to read IFM slice from S10 and broadcast that IFM slice to T0, T4, T10, T14, T7, T3, T13 and T9. Alternatively, for example, IFM delivery fabric can be configured to read IFM slice from S3 and broadcast that IFM slice to T0, T4, T10, T14, T7, T3, T13 and T9.

Similarly, any of the lower SRAM bank sets 109 can act as a source sending (broadcasting) an IFM slice to all lower tiles T8, T12, T2, T6, T15, T11, T5 and T1. For example, IFM delivery fabric can be configured to read IFM slice from S11 and broadcast that IFM slice to T8, T12, T2, T6, T15, T11, T5 and T1. Alternatively, for example, IFM delivery fabric can be configured to read IFM slice from S8 and broadcast that IFM slice to T8, T12, T2, T6, T15, T11, T5 and T1.

Additionally, referring to FIG. 4CA, SRAM bank sets may be paired to send IFM slices such that in one (clock) cycle data is received from one of the following pairs [S0,S1] [S2,S3] [S4,S5] [S6,S7] [S8,S9] [S10,S11] [S12, S13] [S14,S15]. For example, in FIG. 4CA IFM slices are sourced from the [S10, S11] pair of SRAM bank sets.

FIG. 4CB shows feeding two IFM slices, each IFM slice getting broadcast to 8 tiles and the reduction of outputs of two tiles in a column-wise fashion. For example, following FIG. 4AF, output of T0 is reduced with output of T8 to generate one result, T4 and T12 outputs are reduced to generate another result, T10 and T2 outputs are reduced to generate yet another result, T14 and T6 outputs are reduced to generate yet another result, T7 and T15 outputs are reduced to generate yet another result, T3 and T11 outputs are reduced to generate yet another result, T13 and T5 outputs are reduced to generate yet another result and T9 and T1 outputs are reduced to generate yet another result.

In the case of partial results, the eight reduction results may be stored in one of the two groups of SRAM bank sets [S0 . . S7] and [S8 . . 15]. For example, FIG. 4CB shows the eight partial results stored in SRAM bank sets [Sa.S7]. In the case of final results, the OFM delivery fabric 106 may merge two neighboring tile columns' results, stored in one of the four SRAM bank set groups, including [S0 . . S3], [S4 . . S7], [S8 . . S11] and [S12 . . S15]. For example, FIG. 4CC shows the eight final results stored in SRAM bank sets [S4 . . S7].

A third example case illustrates B4-R4 operation. As shown in FIG. 4DA, one IFM slice is supplied from each quarter of the floorplan. Referring to FIG. 4DB, the operation may involve broadcasting four IFM slices and generating four results after reduction. The IFM delivery fabric and the OFM delivery fabric may manage to send inputs and receive outputs in one (clock) cycle, as long as IFM slices come from one four groups, including [S0 . . S3], [S4 . . S7], [S8 . . S11], and [S12 . . S15], and as long as outputs are written to one of four groups [S0 . . S3], [S4 . . S7], [S8 . . S11], and [S12 . . S15] if the results partial, as illustrated in FIG. 4DB, and one of eight groups [S0 S1], [S2 S3], [S4 S5], [S6 S7], [S8 S9], [S10 S11], [S12 S13], and [S14 S15] if the results are final, as illustrated in FIG. 4DC.

Referring to FIG. 4AJ, note that each reduction group 407 generates one output result. Two results will be stored in the top part, and two results will be stored in the bottom part. Since OFM slice containing final results has size of 8 bytes, the OFM delivery fabric may merge two neighboring columns' results. FIG. 4AH also illustrates the four IFM slices being broadcast to form four output results after reduction.

A fourth example case illustrates B2-R8 operation. As shown in FIG. 4EA, one IFM slice is supplied from each eighth of the floorplan. Referring to FIG. 4EB, the operation may involve broadcasting eight IFM slices to produce two results after reduction.

The IFM delivery fabric and the OFM delivery fabric may manage to send inputs and receive outputs in one (clock) cycle, as long as input comes from one of two groups, including [S0 . . S7] and [S8 . . S15], and as long as the outputs are written to one of eight groups [S0 S1], [S2 S3], [S4 S5], [S6 S7], [S8 S9], [S10 S11], [S12 S13], and [S14 S15] if the results are partial, and any SRAM bank set if the results are final.

FIG. 4EA shows the source data being broadcast, FIG. 4EB shows the partial results being formed, and FIG. 4EC shows the final results being formed, for the fourth example case. Referring to FIG. 4AJ, each section 407 generates one result after reduction. One of the two results may be stored in the top part, while the other result may be stored in the bottom part. Since OFM slice containing final results has size of 8 bytes, the OFM delivery fabric may merge two neighboring columns' results. FIG. 4AK also illustrates the four IFM slices being broadcast to form two output results after reduction.

A fifth example case illustrates B1-R16 operation. As shown in FIG. 4FA, one IFM slice is supplied from each SRAM bank set, corresponding to broadcast of one. Referring to FIG. 4FB, the operation may involve reducing outputs of all 16 tiles to generate one result, which can be stored in any SRAM bank set, both in case when the result is partial and final.

Since OFM slice containing final results has size of 8 bytes, the OFM delivery fabric may merge two neighboring columns' results. FIG. 4AM also illustrates the 16 IFM slices fed in to form a single output result after reduction.

The IFM and OFM delivery fabrics may be designed in a way, including one illustrated above, that makes it always possible for one operation to calculate and store to SRAM via in such a way that a following operation (that consumes results a previous operation) is able to fetch those results, for all permutations of reduction configurations of the current and the following operations. For example, the current operation may use B4-R4 and store its results to SRAM bank sets following OFM delivery fabric connectivity choices associated with B4-R4. The next (or a next) operation may use B2-R8 reduction configuration with associated choices for IFM delivery fabric connectivity, while being able to successfully fetch data calculated and stored by the previous B4-R4 operation.

FIG. 4G shows one possible implementation of IFM delivery fabric 104 that supports all IFM delivery fabric connectivity options for all reduction configurations, as described earlier. The fabric consists of four two-way multi-drop buses, with two of the two-way buses placed between the upper SRAM bank sets and upper tiles and the other two two-way buses placed between the lower SRAM bank sets and lower tiles. The buses are connected in a circular fashion by registers 411, such that data from upper buses can flow to lower buses and back. Note that additional pipelining registers that may be present in IFM delivery fabric 104 have been omitted in FIG. 4G for the sake of explanation clarity.

FIG. 4H shows one possible implementation of OFM delivery fabric 106 that supports all OFM delivery fabric connectivity options for all reduction configurations, as described earlier. The fabric consists of four two-way 16-byte-wide multi-drop buses to support reduction configurations B2-R8 and B1-R16. Note that pipelining registers that may be present in OFM delivery fabric 106 have been omitted in FIG. 4H for the sake of explanation clarity.

Reduction fabric 111 performs "inter-tile" reduction (as opposed to intra-tile reduction accomplished by adder trees 128A and 128B) for all reduction configurations except R1 (when there is no inter-tile reduction), for example B8-R2, B4-R4, B2-R8 and B1-R16. Reduction fabric 111 is comprised of a reconfigurable adder tree made up of reduce-and-accumulate (RAA) nodes 520 illustrated in FIG. 5A. Each RAA node operates on partially reduced results, i.e. linear results before activation function application. RAA receives inputs either from same tile column ARUs 167 where that RAA node is located or inputs from other RAA nodes. RAA sends outputs either to RAA nodes further up in the adder tree or back to ARU. Subsequently, if results are final, ARU applies activation function and forwards the final results to OFM delivery fabric. Alternatively, if results are partial, ARU forwards partial results to OFM delivery fabric while bypassing the activation function.

FIG. 5B illustrates reduction fabric 111 configured for the R16 configuration. Here ARU modules 167 generate partially reduced results (from intra-tile adder trees 128A and 128B), stream out these partially reduced results via the "To reduction fabric" output as shown in FIG. 1X to the first level of RAA nodes 502. RAA nodes 502 reduce 16 ARU streams of partially reduced data pairwise down to 8 streams of partially reduced data. RAA second-level nodes 504 further reduce the 8 streams produced by RAA nodes 502 pairwise down to 4 streams of partially reduced data. Third and fourth-level RAA nodes complete the reduction process to produce one stream of fully-reduced data that gets forwarded to ARU of tile T14 for activation function application (when generating final results) and output to the OFM delivery fabric. Note that T14 is physically located near the tree root RAA node 508 and corresponds to ARU 167 of tile T14 in FIG. 4FB.

FIG. 5C illustrates reduction fabric 111 configured for the R8 configuration. Unlike R16 configuration, R8 configuration comprises two adder trees (as opposed to one), each adder tree having three levels (as opposed to four). The first adder tree reduces partially-reduced data from ARUs of tiles T0, T8, T4, T12, T10, T2, T14 and T6 and forwards the fully-reduced result to the ARU of tile T12 to complete the data return. The second adder tree reduces partially-reduced data from ARUs of tiles T7, T15, T2, T11, T13, T5, T9 and T1 and forwards the fully-reduced result to the ARU of tile T13 to complete the data return. Note that tiles T12 and T13 are each physically located near the respective tree root RAA nodes 506 and corresponds to ARUs 167 of tile T12 and T3 respectively in FIG. 4FB.

FIG. 5D illustrates configuration R4 having four adder trees, each adder tree reducing partially-reduced outputs from four tiles. FIG. 4DB illustrates physical locations of ARUs associated with the four tree root nodes.

FIG. 5E illustrates configuration R2 having eight adder trees, each adder tree reducing partially-reduced outputs from two tiles. FIG. 4CB illustrates physical locations of ARUs associated with the eight tree root nodes.

Lastly, FIG. 5F illustrates configuration R1 having no adder trees and tile ARUs outputting results directly to OFM delivery fabric, without the need for reduction fabric 111. FIG. 4BB shows physical locations of ARUs in this case. Note that the number inside ARUs 167 in FIGS. 4BB, 4BC, 4BD, 4CB, 4CC, 4DB, 4DC, 4EB, 4EC and 4DB indicates the RAA tree node level as illustrated in FIGS. 5B-5F, where level 0 corresponds to configuration R1 (not using the reduction fabric). Configuration R1 is implemented by ARU multiplexer 174 in ARU forwarding data from accumulator 130A (or 130B) to the activation function and partial paths (which start with the bit range select unit 187) directly, thus bypassing the reduction fabric, as illustrated in FIG. 1X. Note that some auxiliary logic required to properly bypass the reduction fabric in case of sparse activation support is not shown for clarity of general explanation.

FIG. 5G illustrates reduction fabric 111 comprised of RAA nodes 502, 504, 506, 508. Note again that each RAA node is physically located near exactly one tile. Each RAA node 502 receives inputs from both tiles in the tile column where node 502 is located. There is exactly one RAA node 502 per tile column. RAA node 508 receives its inputs from nodes 506, which in turn receive their inputs from nodes 504, which in turn receive inputs from nodes 502. Note that tile T12 does not have an RAA node associated with it since there are 15 tree nodes while the number of physical tiles is 16.

As illustrated in FIG. 5A, each RAA node has two functions including reducing two inputs A and B using adder 512 as well as accumulating reduced results using accumulator 518 and adder 514. Multiplexer 516 allows loading a reduced result from adder 512 directly into accumulator 518 at the start of an accumulation, for example to start IFM weight cycling. Multiplexer 516 also allows accumulating reduced results as, for example, IFM weight cycling proceeds over time.

Storing weights in a compressed format may be beneficial to reduce amount of SRAM (and off-chip DDR) storage required to store weights, to reduce SRAM (and off-chip DDR) power associated with fetching weights and to speed up weight loading, in particular during fully-connected layer computation. In some embodiments, idle cycles may be used to load multiplier unit weights. Also, in some embodiments, multiple vertical weight loading buses 101 may be used to accelerate weight loading, as opposed to FIG. 1K showing only one weight loading bus per MR column.

More specifically, as illustrated previously in FIG. 4AB, weights are stored in four SRAM banks 108 local to each tile, capable of reading all 4 banks in parallel. Each SRAM bank fetches 16 8-bit weights. Since each tile has 8 MR columns, it takes (8 MR columns per tile)/(4 local SRAM banks per tile)=2 clocks to load one 8-bit weight per activation lane in case when weights are not compressed. Each tile also contains a weight decompression unit 138 per tile, which may be used to decompress FC and convolution weights. For example, each multiplier unit may have 18 weights, and it may take (18 weights per MU)*(2 clocks per weight load)=36 clock cycles to load all MU weights. Smaller kernels that do not use all 18 weights may load faster.

Weight streaming that is concurrent with FC calculation may be used to improve throughput in fully connected calculations, so as to keep multiplier utilization high during large FC computations. As mentioned earlier, FC calculation does not reuse weights. Therefore, as such, it may be necessary to stream weights rapidly during FC calculation. Specifically, FC calculation with IFM weight cycling of 1 would require providing one weight per clock to each MU in order to keep all multipliers fully utilized. IFM weight cycling of 2 requires providing one weight per two clocks to each MU in order to keep all multipliers fully utilized. More generally, IFM weight cycling of N requires providing one weight per N clocks per MU to keep all multipliers fully utilized.

According to various deep learning research publications, fully-connected layer weights can be compressed, sometimes by a factor of 2 or more. In such cases, one decompressed weight may be loaded into each MU per one clock, as opposed to loading one uncompressed weight into each MU per two clocks.

However, additionally, IFM data must also be fetched from SRAM along with weights, thus reducing SRAM bandwidth available to fetch weights. The amount of IFM data being fetched from SRAM, in turn, depends on the mapping reduction configuration. Large reduction numbers, e.g. R16, require fetching IFM with more channels compared to smaller reduction configurations, e.g. R1.

Since all 64 SRAM banks may be busy fetching FC weights, it may not be possible to read the IFM from SRAM at the same time. To increase multiplier utilization, the IFM may be stored spliced across all 64 banks. In some embodiments, to fetch the IFM, weight reading stops for one clock cycle, and all 64 banks make one IFM read into a 1-deep cache register located next to the SRAM output. The IFM then streams from the cached 64 16-byte line. More specifically, one IFM fetch from all 64 banks in parallel may fetches enough data at once to equal R=(64 SRAM banks)*(broadcast configuration number B)/(number of physical tiles) number of IFM reads. Thus, the maximum multiplier utilization for fully-connected layer computation may be calculated according to R/(1+R) as a function of broadcast configuration number B, as shown, for some embodiments, in FIG. 6.

As mentioned earlier, global control 140 as well as local control units 142, 144 may have various configuration registers. In some embodiments, contents of some of these configuration registers are able to switch on-the-fly to change neural processor configuration instantly, for example as the neural processor transitions from one operation to another or when one SRAM bank set runs out of data and IFM delivery fabric must switch on-the-fly (without delay) streaming IFM data from another SRAM bank set. Following generally-known design practices, such on-the-fly reconfiguration may be accomplished by making configuration registers double-buffered, and put a new configuration into effect by switching between the two buffers. As illustrated in FIG. 1A, central control 110 may receive configuration data from CPU over AXI bus, pass that configuration data over to utility bus 112, which in turn may transmit and load configuration values from CPU into configuration registers of control logic such as 140, 142 and 144 as well as various other registers including ARU bias register 195, scale register 191, activation function 197 configuration register and so on. To coordinate on-the-fly configuration changes involving a large number of double-buffered registers switching at various time as needed, utility bus 112 may load not only configuration register values, but also time (clock count) at which the double-buffered register must switch its configuration into effect.

FIG. 1A also illustrates SRAM bank sets 109 each having an AXI slave interface, enabling CPU to write IFM and weight tensors and read back OFM results. Since SRAM bank sets serve I/O requests coming from IFM and OFM delivery fabrics as well as local weight load connections, CPU I/O requests over AXI interface may be arbitrated and assigned a lower priority in order to allow neural network computation to continue without delay while CPU waits for results.

As used herein, the terms "multiplexer" and "demultiplexer" are used interchangeably; each term means a switchable device with a plurality of data terminals (e.g., data inputs or data outputs) on one side (the "multi-port" side) and a single data terminal (e.g., a data output or a data input) on the other side (the "single-port" side), the device being configured to connect on of plurality of data terminals on the one side, selected according to a control signal received at a control input of the device, to the single data terminal on the other side.

The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed circuit board (PCB) or distributed over several interconnected PCBs. A processing unit may contain other processing units; for example a processing unit may include two processing units, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Some embodiments have the features of the following first set of numbered clauses.
  1. A processor, comprising:
    a first tile,
    a second tile,
    a memory, and
    a bus, the bus being connected to:
  the memory,
  the first tile, and
  the second tile,
the first tile comprising:
  a first weight register,
  a second weight register,
  an activations buffer,
  a first multiplier, and
  a second multiplier,
the first tile being configured to perform a convolution of an array of activations with a kernel of weights, the performing of the convolution comprising, in order:
  forming a tensor product of the kernel with a first subarray of the array of activations;
  forming a tensor product of the kernel with a second subarray of the array of activations, the second subarray being offset from the first subarray by n array elements in a first direction, n being a positive integer; and
  forming a tensor product of the kernel with a third subarray of the array of activations, the third subarray being offset from the second subarray by one array element in a second direction, perpendicular to the first direction.

2. The processor of clause 1, wherein the performing of the convolution further comprises, in order, after the forming of the tensor product of the kernel with the third subarray:
forming a tensor product of the kernel with a fourth subarray of the array of activations, the fourth subarray being offset from the third subarray by m array elements in a third direction, opposite to the first direction, m being a positive integer, and
forming a tensor product of the kernel with a fifth subarray of the array of activations, the fifth subarray being offset from the fourth subarray by one array element in the second direction.

3. The processor of clause 2, wherein m equals n.

4. The processor of clause 3, wherein n equals 1.

5. The processor of clause 1, wherein the performing of the convolution further comprises, in order, after the forming of the products of the kernel with the first subarray: forming n−1 products of the kernel with n−1 respective subarrays of the array of activations, the subarray in a k-th product, of the n−1 products, being offset from the first subarray by k+1 array elements in the first direction.

6. The processor of clause 5, further comprising a cache, connected to the activations buffer and configured to supply activations to the activations buffer, the cache having a size sufficient to store H+(H+n)*(W−1)−1 activations, wherein:
H is a size of the kernel in the first direction, and
W is a size of the kernel in the second direction.

7. The processor of clause 1, wherein:
the activations buffer is configured to include:
  a first queue connected to the first multiplier, and
  a second queue connected to the second multiplier,
the first queue comprises a first register and a second register adjacent to the first register, the first register being an output register of the first queue,
the first tile is further configured:
  in a first state:
    to multiply, in the first multiplier, a first weight by an activation from the output register of the first queue, and
  in a second state:
    to multiply, in the first multiplier, the first weight by an activation from the second register of the first queue.

8. The processor of clause 7, wherein, in the second state, the output register of the first queue contains zero.

9. The processor of clause 7, further comprising:
a first adder, configured, in the first state:
  to be connected to
    an output of the first multiplier, and
    an output of the second multiplier, and to add;
  a product received from the output of the first multiplier, and
  a product received from the output of the second multiplier.

10. The processor of clause 9, further comprising a second adder, configured, in the second state, to be connected to the output of the first multiplier.

11. A method for calculating with a processing circuit, the processing circuit comprising:
  a first tile,
  a second tile,
  a memory, and
  a bus,
  the bus being connected to:
    the memory,
    the first tile, and
    the second tile,
  the first tile comprising:
    a first weight register,
    a second weight register,
    an activations buffer,
    a first multiplier, and
    a second multiplier,
the method comprising performing a convolution of an array of activations with a kernel of weights, the performing of the convolution comprising, in order:
  forming a tensor product of the kernel with a first subarray of the array of activations;
  forming a tensor product of the kernel with a second subarray of the array of activations, the second subarray being offset from the first subarray by n array elements in a first direction, n being a positive integer; and
  forming a tensor product of the kernel with a third subarray of the array of activations, the third subarray being offset from the second subarray by one array element in a second direction, perpendicular to the first direction.

12. The method of clause 11, wherein the performing of the convolution further comprises, in order, after the forming of the tensor product of the kernel with the third subarray:
forming a tensor product of the kernel with a fourth subarray of the array of activations, the fourth subarray being offset from the third subarray by m array elements in a third direction, opposite to the first direction, m being a positive integer, and
forming a tensor product of the kernel with a fifth subarray of the array of activations, the fifth subarray being offset from the fourth subarray by one array element in the second direction.

13. The method of clause 12, wherein m equals n.

14. The method of clause 13, wherein n equals 1.

15. The method of clause 11, wherein the performing of the convolution further comprises, in order, after the forming of the products of the kernel with the first subarray: forming n−1 products of the kernel with n−1 respective subarrays of the array of activations, the subarray in a k-th product, of the n−1 products, being offset from the first subarray by k+1 array elements in the first direction.

16. The method of clause 15, wherein the processing circuit further comprises a cache, connected to the activations buffer and configured to supply activations to the activations buffer, the cache having a size sufficient to store H+(H+n)*(W−1)−1 activations, wherein:
H is a size of the kernel in the first direction, and
W is a size of the kernel in the second direction.

17. The method of clause 11, wherein:
the activations buffer is configured to include:
  a first queue connected to the first multiplier, and
  a second queue connected to the second multiplier,
the first queue comprises a first register and a second register adjacent to the first register, the first register being an output register of the first queue,
the first tile is further configured:
  in a first state:
    to multiply, in the first multiplier, a first weight by an activation from the output register of the first queue, and
  in a second state:
    to multiply, in the first multiplier, the first weight by an activation from the second register of the first queue.

18. The method of clause 17, wherein, in the second state, the output register of the first queue contains zero.

19. The method of clause 17, wherein the processing circuit further comprises a first adder,
the method further comprising, in the first state:
connecting the first adder to:
  an output of the first multiplier, and
  an output of the second multiplier, and
adding, by the first adder:
  a product received from the output of the first multiplier, and
  a product received from the output of the second multiplier.

20. A method for calculating with a means for processing, the means for processing comprising:
a first tile,
a second tile,
a memory, and
a bus,
the bus being connected to:
  the memory,
  the first tile, and
  the second tile,
the first tile comprising:
  a first weight register,
  a second weight register,
  an activations buffer,
  a first multiplier, and
  a second multiplier,
the method comprising performing a convolution of an array of activations with a kernel of weights, the performing of the convolution comprising, in order:
forming a tensor product of the kernel with a first subarray of the array of activations;
forming a tensor product of the kernel with a second subarray of the array of activations, the second subarray being offset from the first subarray by n array elements in a first direction, n being a positive integer; and
forming a tensor product of the kernel with a third subarray of the array of activations, the third subarray being offset from the second subarray by one array element in a second direction, perpendicular to the first direction.

Some embodiments have the features of the following second set of numbered clauses.

1. A processor, comprising:
a first tile,
a second tile,
a memory, and
a bus,
the bus being connected to:
  the memory,
  the first tile, and
  the second tile,
the first tile comprising:
  a first weight register,
  a second weight register,
  an activations buffer,
  a first multiplier, and
  a second multiplier,
the processor being configured to perform a first convolution of an array of activations with a first kernel of weights, the performing of the first convolution comprising:
broadcasting a first subarray of the array of activations to:
  the first tile, and
  the second tile;
forming a first tensor product, the first tensor product being a tensor product of a first subarray of the first kernel of weights with the first subarray of the array of activations;
storing the first tensor product in the memory;
broadcasting a second subarray of the array of activations to:
  the first tile, and
  the second tile;
forming a second tensor product, the second tensor product being a tensor product of a second subarray of the first kernel of weights with the second subarray of the array of activations; and
adding the first tensor product and the second tensor product.

2. The processor of clause 1, wherein the first tile further comprises a weight decompression unit configured to:
decompress a data word encoding a plurality of weights in compressed form, to extract a first weight and a second weight;
feed the first weight to the first weight register; and
feed the second weight to the second weight register.

3. The processor of clause 1, wherein the first tile is further configured to perform a second convolution of an array of activations with a second kernel of weights, the performing of the second convolution comprising, in order:
forming a tensor product of a first portion of the second kernel with a first subarray of the array of activations, the first portion of the second kernel comprising a weight stored in the first weight register;
forming a tensor product of a second portion of the second kernel with the first subarray of the array of activations, the second portion of the second kernel comprising a weight stored in the second weight register; and
forming a tensor product of the first portion of the second kernel with a second subarray of the array of activations, the first portion of the second kernel comprising the weight stored in the first weight register.

4. The processor of clause 1, wherein:
the activations buffer is configured to include:
  a first queue connected to the first multiplier, and
  a second queue connected to the second multiplier,
the first queue comprises a first register and a second register adjacent to the first register, the first register being an output register of the first queue, the first tile is further configured:
  in a first state:
    to multiply, in the first multiplier, a first weight by an activation from the output register of the first queue, and
  in a second state:
    to multiply, in the first multiplier, the first weight by an activation from the second register of the first queue.

5. The processor of clause 4, wherein, in the second state, the output register of the first queue contains zero.

6. The processor of clause 4, further comprising:
a first adder, configured, in the first state:
to be connected to
  an output of the first multiplier, and
  an output of the second multiplier; and to add;
  a product received from the output of the first multiplier, and
  a product received from the output of the second multiplier.

7. The processor of clause 6, further comprising a second adder, configured, in the second state, to be connected to the output of the first multiplier.

8. The processor of clause 7, further comprising:
a first accumulator connected to the first adder, and
a second accumulator connected to the second adder,
the first accumulator comprising a register and being configured, in the first state:
  to add to a value in the register of the first accumulator a sum received from the first adder, to form an accumulated value of the first accumulator, and
  to store the accumulated value of the first accumulator in the register of the first accumulator.

9. The processor of clause 8, wherein the second accumulator comprises a register and is configured, in the second state,
to add to a value in the register of the second accumulator a sum received from the second adder, to form an accumulated value of the second accumulator, and
to store the accumulated value of the second accumulator in the register of the second accumulator.

10. The processor of clause 8, further comprising an activation zero skip control circuit configured to:
determine whether the output register of the first queue contains zero, and
in response to determining that the output register of the first queue contains zero, cause the first tile to operate in the second state.

11. A method for calculating with a processing circuit, the processing circuit comprising:
a first tile,
a second tile,
a memory, and
a bus,
the bus being connected to:
  the memory,
  the first tile, and
  the second tile,
the first tile comprising:
  a first weight register,
  a second weight register,
  an activations buffer,
  a first multiplier, and
  a second multiplier,
the method comprising performing a first convolution of an array of activations with a first kernel of weights, the performing of the first convolution comprising:
broadcasting a first subarray of the array of activations to:
  the first tile, and
  the second tile;
forming a first tensor product, the first tensor product being a tensor product of a first subarray of the first kernel of weights with the first subarray of the array of activations;
storing the first tensor product in the memory;
broadcasting a second subarray of the array of activations to:
  the first tile, and
  the second tile;
forming a second tensor product, the second tensor product being a tensor product of a second subarray of the first kernel of weights with the second subarray of the array of activations; and
adding the first tensor product and the second tensor product.

12. The method of clause 11, wherein the first tile further comprises a weight decompression unit, and the method further comprises:
decompressing, by the weight decompression unit, a data word encoding a plurality of weights in compressed form, to extract a first weight and a second weight;
feeding the first weight to the first weight register; and
feeding the second weight to the second weight register.

13. The method of clause 11, wherein the method further comprises performing a second convolution of an array of activations with a second kernel of weights, the performing of the second convolution comprising, in order:
forming a tensor product of a first portion of the second kernel with a first subarray of the array of activations, the first portion of the second kernel comprising a weight stored in the first weight register;
forming a tensor product of a second portion of the second kernel with the first subarray of the array of activations, the second portion of the second kernel comprising a weight stored in the second weight register; and
forming a tensor product of the first portion of the second kernel with a second subarray of the array of activations, the first portion of the second kernel comprising the weight stored in the first weight register.

14. The method of clause 11, wherein:
the activations buffer is configured to include:
  a first queue connected to the first multiplier, and
  a second queue connected to the second multiplier,
the first queue comprises a first register and a second register adjacent to the first register, the first register being an output register of the first queue,
the first tile is further configured:
  in a first state:
    to multiply, in the first multiplier, a first weight by an activation from the output register of the first queue, and
  in a second state:
    to multiply, in the first multiplier, the first weight by an activation from the second register of the first queue.

15. The method of clause 14, wherein, in the second state, the output register of the first queue contains zero.

16. The method of clause 14, wherein the processing circuit further comprises a first adder,
the method further comprising, in the first state:
connecting the first adder to:
an output of the first multiplier, and
an output of the second multiplier; and
adding, by the first adder:
a product received from the output of the first multiplier, and
a product received from the output of the second multiplier.

17. The method of clause 16, wherein the processing circuit further comprises a second adder,
the method further comprising, in the second state, connecting the second adder to the output of the first multiplier.

18. The method of clause 17, wherein the processing circuit further comprises:
a first accumulator connected to the first adder, and
a second accumulator connected to the second adder,
the first accumulator comprising a register,
the method further comprising, in the first state:
adding, by the first accumulator, to a value in the register of the first accumulator, a sum received from the first adder, to form an accumulated value of the first accumulator, and
storing, by the first accumulator, the accumulated value of the first accumulator in the register of the first accumulator.

19. The method of clause 18, wherein the second accumulator comprises a register and the method further comprises, in the second state,
adding, by the second accumulator, to a value in the register of the second accumulator, a sum received from the second adder, to form an accumulated value of the second accumulator, and
storing, by the second accumulator, the accumulated value of the second accumulator in the register of the second accumulator.

20. A method for calculating with a means for processing, the means for processing comprising:
a first tile,
a second tile,
a memory, and
a bus,
the bus being connected to:
the memory,
the first tile, and
the second tile,
the first tile comprising:
a first weight register,
a second weight register,
an activations buffer,
a first multiplier, and
a second multiplier,
the method comprising performing a first convolution of an array of activations with a first kernel of weights, the performing of the first convolution comprising:
broadcasting a first subarray of the array of activations to:
the first tile, and
the second tile;
forming a first tensor product, the first tensor product being a tensor product of a first subarray of the first kernel of weights with the first subarray of the array of activations;
storing the first tensor product in the memory;
broadcasting a second subarray of the array of activations to:
the first tile, and
the second tile;
forming a second tensor product, the second tensor product being a tensor product of a second subarray of the first kernel of weights with the second subarray of the array of activations; and
adding the first tensor product and the second tensor product.

Some embodiments have the features of the following third set of numbered clauses.

1. A processor, comprising:
a first tile,
a second tile,
a memory,
an input bus, and
an output bus,
the input bus being connected to:
the memory,
the first tile, and
the second tile,
the first tile comprising:
a first weight register,
a second weight register,
an activations buffer,
a first multiplier, and
a second multiplier,
the first tile being configured to perform a first convolution of an array of activations with a kernel of weights;
the memory comprising:
a first memory bank set, and
a second memory bank set;
the input bus comprising:
a first segmented bus for data propagating in a first direction, and
a second segmented bus for data propagating in a second direction, opposite the first direction;
the first segmented bus comprising:
a first switch block, and
a second switch block;
the first switch block being connected to:
the first tile, and
the first memory bank set;
the second switch block being connected to:
the second tile, and
the second memory bank set;
the second segmented bus comprising:
a third switch block, and
a fourth switch block;
the third switch block being connected to:
the first tile, and
the first memory bank set;
the fourth switch block being connected to:
the second tile, and
the second memory bank set;
an input of the first switch block being connected to an output of the second switch block; and
an output of the third switch block being connected to an input of the fourth switch block.

2. The processor of clause 1, wherein the first segmented bus is configured, in a first bus state,
to connect the first memory bank set, through the first switch block, to the first tile, and
to connect the second memory bank set, through the second switch block, to the second tile.

3. The processor of clause 2, wherein
the first segmented bus is further configured, in a second bus state,
to connect the second memory bank set, through the first switch block, and through the second switch block, to the first tile, and
to connect the second memory bank set, through the second switch block, to the second tile.

4. The processor of clause 1, wherein:
the activations buffer is configured to include:
a first queue connected to the first multiplier, and
a second queue connected to the second multiplier,
the first queue comprises a first register and a second register adjacent to the first register, the first register being an output register of the first queue,
the first tile is further configured:
in a first state:
to multiply, in the first multiplier, a first weight by an activation from the output register of the first queue, and
in a second state:
to multiply, in the first multiplier, the first weight by an activation from the second register of the first queue.

5. The processor of clause 4, wherein, in the second state, the output register of the first queue contains zero.

6. The processor of clause 4, further comprising a first adder, configured, in the first state:
to be connected to:
an output of the first multiplier, and
an output of the second multiplier; and
to add:
a product received from the output of the first multiplier, and
a product received from the output of the second multiplier.

7. The processor of clause 6, further comprising a second adder, configured, in the second state, to be connected to the output of the first multiplier.

8. The processor of clause 7, further comprising:
a first accumulator connected to the first adder, and
a second accumulator connected to the second adder,
the first accumulator comprising a register and being configured, in the first state:
to add to a value in the register of the first accumulator a sum received from the first adder, to form an accumulated value of the first accumulator, and
to store the accumulated value of the first accumulator in the register of the first accumulator.

9. The processor of clause 8, wherein the second accumulator comprises a register and is configured, in the second state,
to add to a value in the register of the second accumulator a sum received from the second adder, to form an accumulated value of the second accumulator, and
to store the accumulated value of the second accumulator in the register of the second accumulator.

10. The processor of clause 8, further comprising an activation zero skip control circuit configured to:
determine whether the output register of the first queue contains zero, and
in response to determining that the output register of the first queue contains zero, cause the first tile to operate in the second state.

11. The processor of clause 10, further comprising a multiplexer having:
an input, at a single-port side of the multiplexer, connected to the first multiplier,
a first output, at a multi-port side of the multiplexer, connected to the first adder, and
a second output, at the multi-port side of the multiplexer, connected to the second adder.

12. A method for calculating with a processing circuit, the processing circuit comprising:
a first tile,
a second tile,
a memory,
an input bus, and
an output bus,
the input bus being connected to:
the memory,
the first tile, and
the second tile,
the first tile comprising:
a first weight register,
a second weight register,
an activations buffer,
a first multiplier, and
a second multiplier,
the first tile being configured to perform a first convolution of an array of activations with a kernel of weights;
the memory comprising:
a first memory bank set, and
a second memory bank set;
the input bus comprising:
a first segmented bus for data propagating in a first direction, and
a second segmented bus for data propagating in a second direction, opposite the first direction;
the first segmented bus comprising:
a first switch block, and
a second switch block;
the first switch block being connected to:
the first tile, and
the first memory bank set;
the second switch block being connected to:
the second tile, and
the second memory bank set;
the second segmented bus comprising:
a third switch block, and
a fourth switch block;
the third switch block being connected to:
the first tile, and
the first memory bank set;
the fourth switch block being connected to:
the second tile, and
the second memory bank set;
an input of the first switch block being connected to an output of the second switch block; and
an output of the third switch block being connected to an input of the fourth switch block, the method comprising:
in a first bus state,
connecting, by the first switch block, the first memory bank set to the first tile, and
connecting, by the second switch block, the second memory bank set to the second tile.

13. The method of clause 12, wherein the method further comprises:
in a second bus state,
connecting, by the first switch block and the second switch block, the second memory bank set to the first tile, and
connecting, by the second switch block, the second memory bank set to the second tile.

14. The method of clause 12, wherein:
the activations buffer is configured to include:
  a first queue connected to the first multiplier, and
  a second queue connected to the second multiplier,
the first queue comprises a first register and a second register adjacent to the first register, the first register being an output register of the first queue,
the first tile is further configured:
  in a first state:
    to multiply, in the first multiplier, a first weight by an activation from the output register of the first queue, and
  in a second state:
    to multiply, in the first multiplier, the first weight by an activation from the second register of the first queue.

15. The method of clause 14, wherein, in the second state, the output register of the first queue contains zero.

16. The method of clause 14, wherein the processing circuit further comprises a first adder,
the method further comprising, in the first state:
  connecting the first adder to:
    an output of the first multiplier, and
    an output of the second multiplier; and
  adding, by the first adder:
    a product received from the output of the first multiplier, and
    a product received from the output of the second multiplier.

17. The method of clause 16, wherein the processing circuit further comprises a second adder,
the method further comprising, in the second state, connecting the second adder to the output of the first multiplier.

18. The method of clause 17, wherein the processing circuit further comprises:
  a first accumulator connected to the first adder, and
  a second accumulator connected to the second adder,
  the first accumulator comprising a register,
  the method further comprising, in the first state:
    adding, by the first accumulator, to a value in the register of the first accumulator, a sum received from the first adder, to form an accumulated value of the first accumulator, and
    storing, by the first accumulator, the accumulated value of the first accumulator in the register of the first accumulator.

19. The method of clause 18, wherein the second accumulator comprises a register and the method further comprises, in the second state,
  adding, by the second accumulator, to a value in the register of the second accumulator, a sum received from the second adder, to form an accumulated value of the second accumulator, and
  storing, by the second accumulator, the accumulated value of the second accumulator in the register of the second accumulator.

20. A method for calculating with a means for processing, the means for processing comprising:
  a first tile,
  a second tile,
  a memory,
  an input bus, and
  an output bus,
  the input bus being connected to:
    the memory,
    the first tile, and
    the second tile,
  the first tile comprising:
    a first weight register,
    a second weight register,
    an activations buffer,
    a first multiplier, and
    a second multiplier,
  the first tile being configured to perform a first convolution of an array of activations with a kernel of weights;
  the memory comprising:
    a first memory bank set, and
    a second memory bank set;
  the input bus comprising:
    a first segmented bus for data propagating in a first direction, and
    a second segmented bus for data propagating in a second direction, opposite the first direction;
  the first segmented bus comprising:
    a first switch block, and
    a second switch block;
  the first switch block being connected to
    the first tile, and
    the first memory bank set;
  the second switch block being connected to
    the second tile, and
    the second memory bank set;
  the second segmented bus comprising:
    a third switch block, and
    a fourth switch block;
  the third switch block being connected to
    the first tile, and
    the first memory bank set;
  the fourth switch block being connected to
    the second tile, and
    the second memory bank set;
  an input of the first switch block being connected to an output of the second switch block; and
  an output of the third switch block being connected to an input of the fourth switch block, the method comprising:
    in a first bus state,
      connecting, by the first switch block, the first memory bank set to the first tile, and
      connecting, by the second switch block, the second memory bank set to the second tile.

Although exemplary embodiments of a neural processor have been specifically described and illustrated herein, many modifications and variations will be apparent to those skilled in the art. Accordingly, it is to be understood that a neural processor constructed according to principles of this disclosure may be embodied other than as specifically described herein. The invention is also defined in the following claims, and equivalents thereof.

What is claimed is:
1. A processor, comprising:
  a first tile,
  a second tile,
  a memory,
  an input bus, and
  an output bus,
  the input bus being connected to:
    the memory,
    the first tile, and
    the second tile, the first tile comprising:
a first weight register,
a second weight register,
an activations buffer,
a first multiplier, and
a second multiplier,
the first tile being configured to perform a first convolution of an array of activations with a kernel of weights;
the memory comprising:
a first memory bank set, and
a second memory bank set;
the input bus comprising:
a first segmented bus for data propagating in a first direction, and
a second segmented bus for data propagating in a second direction, opposite the first direction;
the first segmented bus comprising:
a first switch block, and
a second switch block;
the first switch block being connected to:
the first tile, and
the first memory bank set;
the second switch block being connected to:
the second tile, and
the second memory bank set;
the second segmented bus comprising:
a third switch block, and
a fourth switch block;
the third switch block being connected to:
the first tile, and
the first memory bank set;
the fourth switch block being connected to:
the second tile, and
the second memory bank set;
an input of the first switch block being connected to an output of the second switch block; and
an output of the third switch block being connected to an input of the fourth switch block.

2. The processor of claim 1, wherein the first segmented bus is configured, in a first bus state,
to connect the first memory bank set, through the first switch block, to the first tile, and
to connect the second memory bank set, through the second switch block, to the second tile.

3. The processor of claim 2, wherein
the first segmented bus is further configured, in a second bus state,
to connect the second memory bank set, through the first switch block, and through the second switch block, to the first tile, and
to connect the second memory bank set, through the second switch block, to the second tile.

4. The processor of claim 1, wherein:
the activations buffer is configured to include:
a first queue connected to the first multiplier, and
a second queue connected to the second multiplier,
the first queue comprises a first register and a second register adjacent to the first register, the first register being an output register of the first queue,
the first tile is further configured:
in a first state:
to multiply, in the first multiplier, a first weight by an activation from the output register of the first queue, and in a second state:
to multiply, in the first multiplier, the first weight by an activation from the second register of the first queue.

5. The processor of claim 4, wherein, in the second state, the output register of the first queue contains zero.

6. The processor of claim 4, further comprising a first adder, configured, in the first state:
to be connected to:
an output of the first multiplier, and
an output of the second multiplier; and
to add:
a product received from the output of the first multiplier, and
a product received from the output of the second multiplier.

7. The processor of claim 6, further comprising a second adder, configured, in the second state, to be connected to the output of the first multiplier.

8. The processor of claim 7, further comprising:
a first accumulator connected to the first adder, and
a second accumulator connected to the second adder,
the first accumulator comprising a register and being configured, in the first state:
to add to a value in the register of the first accumulator a sum received from the first adder, to form an accumulated value of the first accumulator, and
to store the accumulated value of the first accumulator in the register of the first accumulator.

9. The processor of claim 8, wherein the second accumulator comprises a register and is configured, in the second state,
to add to a value in the register of the second accumulator a sum received from the second adder, to form an accumulated value of the second accumulator, and
to store the accumulated value of the second accumulator in the register of the second accumulator.

10. The processor of claim 8, further comprising an activation zero skip control circuit configured to:
determine whether the output register of the first queue contains zero, and
in response to determining that the output register of the first queue contains zero, cause the first tile to operate in the second state.

11. The processor of claim 10, further comprising a multiplexer having:
an input, at a single-port side of the multiplexer, connected to the first multiplier,
a first output, at a multi-port side of the multiplexer, connected to the first adder, and
a second output, at the multi-port side of the multiplexer, connected to the second adder.

12. A method for calculating with a processing circuit, the processing circuit comprising:
a first tile,
a second tile,
a memory,
an input bus, and
an output bus,
the input bus being connected to:
the memory,
the first tile, and
the second tile, the first tile comprising:
a first weight register,
a second weight register,
an activations buffer,
a first multiplier, and
a second multiplier,
the first tile being configured to perform a first convolution of an array of activations with a kernel of weights;
the memory comprising:
a first memory bank set, and
a second memory bank set;
the input bus comprising:
a first segmented bus for data propagating in a first direction, and
a second segmented bus for data propagating in a second direction, opposite the first direction;
the first segmented bus comprising:
a first switch block, and
a second switch block;
the first switch block being connected to:
the first tile, and
the first memory bank set;
the second switch block being connected to:
the second tile, and
the second memory bank set;
the second segmented bus comprising:
a third switch block, and
a fourth switch block;
the third switch block being connected to:
the first tile, and
the first memory bank set;
the fourth switch block being connected to:
the second tile, and
the second memory bank set;
an input of the first switch block being connected to an output of the second switch block; and
an output of the third switch block being connected to an input of the fourth switch block,
the method comprising:
in a first bus state,
connecting, by the first switch block, the first memory bank set to the first tile, and
connecting, by the second switch block, the second memory bank set to the second tile.

13. The method of claim 12, wherein the method further comprises:
in a second bus state,
connecting, by the first switch block and the second switch block, the second memory bank set to the first tile, and
connecting, by the second switch block, the second memory bank set to the second tile.

14. The method of claim 12, wherein:
the activations buffer is configured to include:
a first queue connected to the first multiplier, and
a second queue connected to the second multiplier,
the first queue comprises a first register and a second register adjacent to the first register, the first register being an output register of the first queue,
the first tile is further configured:
in a first state:
to multiply, in the first multiplier, a first weight by an activation from the output register of the first queue, and in a second state:
to multiply, in the first multiplier, the first weight by an activation from the second register of the first queue.

15. The method of claim 14, wherein, in the second state, the output register of the first queue contains zero.

16. The method of claim 14, wherein the processing circuit further comprises a first adder,
the method further comprising, in the first state:
connecting the first adder to:
an output of the first multiplier, and
an output of the second multiplier; and
adding, by the first adder:
a product received from the output of the first multiplier, and
a product received from the output of the second multiplier.

17. The method of claim 16, wherein the processing circuit further comprises a second adder,
the method further comprising, in the second state, connecting the second adder to the output of the first multiplier.

18. The method of claim 17, wherein the processing circuit further comprises:
a first accumulator connected to the first adder, and
a second accumulator connected to the second adder,
the first accumulator comprising a register,
the method further comprising, in the first state:
adding, by the first accumulator, to a value in the register of the first accumulator, a sum received from the first adder, to form an accumulated value of the first accumulator, and
storing, by the first accumulator, the accumulated value of the first accumulator in the register of the first accumulator.

19. The method of claim 18, wherein the second accumulator comprises a register and the method further comprises, in the second state,
adding, by the second accumulator, to a value in the register of the second accumulator, a sum received from the second adder, to form an accumulated value of the second accumulator, and
storing, by the second accumulator, the accumulated value of the second accumulator in the register of the second accumulator.

20. A method for calculating with a means for processing, the means for processing comprising:
a first tile,
a second tile,
a memory,
an input bus, and
an output bus,
the input bus being connected to:
the memory,
the first tile, and
the second tile,
the first tile comprising:
a first weight register,
a second weight register,
an activations buffer,
a first multiplier, and
a second multiplier,
the first tile being configured to perform a first convolution of an array of activations with a kernel of weights;
the memory comprising:
a first memory bank set, and
a second memory bank set;

the input bus comprising:
  a first segmented bus for data propagating in a first direction, and
  a second segmented bus for data propagating in a second direction, opposite the first direction;
the first segmented bus comprising:
  a first switch block, and
  a second switch block;
the first switch block being connected to
  the first tile, and
  the first memory bank set;
the second switch block being connected to
  the second tile, and
  the second memory bank set;
the second segmented bus comprising:
  a third switch block, and
  a fourth switch block;
the third switch block being connected to
  the first tile, and
  the first memory bank set;
the fourth switch block being connected to
  the second tile, and
  the second memory bank set;
an input of the first switch block being connected to an output of the second switch block; and
an output of the third switch block being connected to an input of the fourth switch block,
the method comprising:
  in a first bus state,
    connecting, by the first switch block, the first memory bank set to the first tile, and
    connecting, by the second switch block, the second memory bank set to the second tile.

* * * * *